US012206552B2

(12) United States Patent
Guim Bernat et al.

(10) Patent No.: US 12,206,552 B2
(45) Date of Patent: Jan. 21, 2025

(54) MULTI-ENTITY RESOURCE, SECURITY, AND SERVICE MANAGEMENT IN EDGE COMPUTING DEPLOYMENTS

(71) Applicant: Intel Corporation, Santa Clara, CA (US)

(72) Inventors: Francesc Guim Bernat, Barcelona (ES); Kshitij Arun Doshi, Tempe, AZ (US); Kapil Sood, Portland, OR (US); Tarun Viswanathan, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 884 days.

(21) Appl. No.: 17/119,785

(22) Filed: Dec. 11, 2020

(65) Prior Publication Data

US 2021/0144517 A1    May 13, 2021

Related U.S. Application Data

(63) Continuation of application No. PCT/US2020/030554, filed on Apr. 29, 2020.
(Continued)

(51) Int. Cl.
*H04L 29/06* (2006.01)
*G06F 1/20* (2006.01)
(Continued)

(52) U.S. Cl.
CPC .......... *H04L 41/0843* (2013.01); *G06F 1/206* (2013.01); *G06F 9/4881* (2013.01);
(Continued)

(58) Field of Classification Search
None
See application file for complete search history.

(56) References Cited

U.S. PATENT DOCUMENTS

| 8,364,959 B2 | 1/2013 | Bhanoo et al. |
| 8,656,189 B2 | 2/2014 | Orsini et al. |

(Continued)

FOREIGN PATENT DOCUMENTS

| CN | 102340533 | 3/2017 |
| CN | 106911814 | 6/2017 |

(Continued)

OTHER PUBLICATIONS

Yu, Hong & He, Jingsha & Zhang, Ting & Xiao, Peng. (2012). A Group Key Distribution Scheme for Wireless Sensor Networks in the Internet of Things Scenario. International Journal of Distributed Sensor Networks. 2012. 10.1155/2012/813594. (Year: 2012).*

(Continued)

*Primary Examiner* — Jeffery L Williams
(74) *Attorney, Agent, or Firm* — Schwegman Lundberg & Woessner, P.A.

(57) ABSTRACT

Various aspects of methods, systems, and use cases for multi-entity (e.g., multi-tenant) edge computing deployments are disclosed. Among other examples, various configurations and features enable the management of resources (e.g., controlling and orchestrating hardware, acceleration, network, processing resource usage), security (e.g., secure execution and communication, isolation, conflicts), and service management (e.g., orchestration, connectivity, workload coordination), in edge computing deployments, such as by a plurality of edge nodes of an edge computing environment configured for executing workloads from among multiple tenants.

25 Claims, 86 Drawing Sheets

Related U.S. Application Data

(60) Provisional application No. 62/939,303, filed on Nov. 22, 2019, provisional application No. 62/907,597, filed on Sep. 28, 2019, provisional application No. 62/841,042, filed on Apr. 30, 2019.

(51) Int. Cl.

| | |
|---|---|
| *G06F 9/48* | (2006.01) |
| *G06F 9/50* | (2006.01) |
| *G06F 9/54* | (2006.01) |
| *G06F 11/30* | (2006.01) |
| *H04L 9/06* | (2006.01) |
| *H04L 9/32* | (2006.01) |
| *H04L 41/084* | (2022.01) |
| *H04L 41/0869* | (2022.01) |
| *H04L 41/5054* | (2022.01) |
| *H04L 47/78* | (2022.01) |
| *H04L 49/00* | (2022.01) |
| *H04L 67/10* | (2022.01) |
| *H04W 4/08* | (2009.01) |
| *H04W 12/04* | (2021.01) |

(52) U.S. Cl.
CPC ............ *G06F 9/505* (2013.01); *G06F 9/5094* (2013.01); *G06F 9/542* (2013.01); *G06F 11/3006* (2013.01); *H04L 9/0637* (2013.01); *H04L 9/3213* (2013.01); *H04L 9/3247* (2013.01); *H04L 41/0869* (2013.01); *H04L 41/5054* (2013.01); *H04L 47/781* (2013.01); *H04L 49/70* (2013.01); *H04L 67/10* (2013.01); *H04W 4/08* (2013.01); *H04W 12/04* (2013.01); *G06F 2209/5021* (2013.01)

(56) References Cited

U.S. PATENT DOCUMENTS

| | | | |
|---|---|---|---|
| 8,719,590 | B1 | 5/2014 | Faibish et al. |
| 9,430,437 | B1 | 8/2016 | Krishnan et al. |
| 9,779,269 | B1 | 10/2017 | Perlman |
| 9,887,876 | B2 | 2/2018 | Kumar et al. |
| 9,916,636 | B2 | 3/2018 | Li et al. |
| 9,928,264 | B2 | 3/2018 | Lomet et al. |
| 10,142,342 | B2 | 11/2018 | Seligson et al. |
| 10,142,390 | B2 | 11/2018 | Seedorf et al. |
| 10,198,294 | B2 | 2/2019 | Chiou et al. |
| 10,277,677 | B2 | 4/2019 | Nachimuthu et al. |
| 10,348,574 | B2 | 7/2019 | Kulkarni et al. |
| 10,388,089 | B1 | 8/2019 | Civgin et al. |
| 10,389,746 | B2 | 8/2019 | Sakalanaga et al. |
| 10,623,390 | B1 | 4/2020 | Rosenhouse |
| 10,827,033 | B1 | 11/2020 | Balasubramanian et al. |
| 11,074,091 | B1 | 7/2021 | Nayakbomman et al. |
| 11,087,006 | B2* | 8/2021 | Feroz ...................... G09C 1/00 |
| 11,139,991 | B2 | 10/2021 | Doshi et al. |
| 11,283,635 | B2* | 3/2022 | Smith ................... H04L 9/0637 |
| 11,374,776 | B2 | 6/2022 | Guim Bernat et al. |
| 11,388,054 | B2 | 7/2022 | Guim Bernat et al. |
| 11,425,111 | B2* | 8/2022 | Smith ..................... G06F 21/74 |
| 11,669,368 | B2 | 6/2023 | Doshi et al. |
| 11,757,795 | B2* | 9/2023 | Grunwald ........... G06F 11/2082 711/100 |
| 11,831,507 | B2 | 11/2023 | Guim Bernat et al. |
| 2003/0065933 | A1 | 4/2003 | Hashimoto et al. |
| 2003/0225723 | A1 | 12/2003 | Agarwalla et al. |
| 2007/0208944 | A1 | 9/2007 | Pavlicic |
| 2007/0245104 | A1 | 10/2007 | Lindemann et al. |
| 2008/0115135 | A1 | 5/2008 | Behnen et al. |
| 2009/0249014 | A1 | 10/2009 | Obereiner et al. |
| 2010/0100604 | A1 | 4/2010 | Fujiwara et al. |
| 2011/0106916 | A1 | 5/2011 | Cho et al. |
| 2011/0161672 | A1 | 6/2011 | Martinez et al. |
| 2011/0214059 | A1 | 9/2011 | King et al. |
| 2011/0264920 | A1 | 10/2011 | Rieffel et al. |
| 2011/0296019 | A1 | 12/2011 | Ferris et al. |
| 2012/0072669 | A1 | 3/2012 | Nishiguchi et al. |
| 2012/0303818 | A1 | 11/2012 | Thibeault et al. |
| 2013/0205002 | A1 | 8/2013 | Wang et al. |
| 2014/0019658 | A1 | 1/2014 | Ho et al. |
| 2014/0040449 | A1 | 2/2014 | Kinoshita et al. |
| 2014/0136710 | A1 | 5/2014 | Benari et al. |
| 2014/0164791 | A1 | 6/2014 | Chaturvedi et al. |
| 2014/0237550 | A1 | 8/2014 | Anderson et al. |
| 2014/0365549 | A1 | 12/2014 | Jenkins |
| 2015/0271169 | A1 | 9/2015 | Seligson et al. |
| 2015/0331776 | A1 | 11/2015 | Krenik et al. |
| 2016/0088054 | A1 | 3/2016 | Hassan et al. |
| 2016/0203102 | A1 | 7/2016 | Meng et al. |
| 2016/0267051 | A1 | 9/2016 | Metzler et al. |
| 2016/0359955 | A1 | 12/2016 | Gill et al. |
| 2017/0010839 | A1 | 1/2017 | Masuda et al. |
| 2017/0019446 | A1 | 1/2017 | Son et al. |
| 2017/0093942 | A1 | 3/2017 | Danielsson et al. |
| 2017/0249460 | A1 | 8/2017 | Lipton et al. |
| 2017/0324813 | A1 | 11/2017 | Jain et al. |
| 2017/0353397 | A1 | 12/2017 | Che |
| 2017/0366606 | A1* | 12/2017 | Ben-Shaul .......... H04L 67/2876 |
| 2018/0006961 | A1 | 1/2018 | Guibene et al. |
| 2018/0041958 | A1 | 2/2018 | Narayanan et al. |
| 2018/0115522 | A1 | 4/2018 | Gleichauf |
| 2018/0165218 | A1 | 6/2018 | Parker et al. |
| 2018/0189081 | A1 | 7/2018 | Upasani et al. |
| 2018/0285009 | A1 | 10/2018 | Guim Bernat et al. |
| 2018/0322158 | A1 | 11/2018 | Zhang et al. |
| 2018/0367637 | A1 | 12/2018 | Balazinski et al. |
| 2018/0376306 | A1 | 12/2018 | Ramalho De Oliveira |
| 2019/0012211 | A1 | 1/2019 | Selvaraj |
| 2019/0026450 | A1 | 1/2019 | Egner et al. |
| 2019/0034363 | A1 | 1/2019 | Palermo et al. |
| 2019/0036678 | A1 | 1/2019 | Ahmed |
| 2019/0042315 | A1 | 2/2019 | Smith et al. |
| 2019/0044703 | A1* | 2/2019 | Smith ............... G06F 18/24143 |
| 2019/0102577 | A1 | 4/2019 | Gueron et al. |
| 2019/0137287 | A1 | 5/2019 | Pazhayampallil et al. |
| 2019/0155728 | A1 | 5/2019 | Ferguson et al. |
| 2019/0236562 | A1 | 8/2019 | Padmanabhan |
| 2019/0253244 | A1 | 8/2019 | Hamel et al. |
| 2019/0266088 | A1 | 8/2019 | Kumar |
| 2019/0289610 | A1 | 9/2019 | Ju et al. |
| 2019/0324820 | A1 | 10/2019 | Krishnan et al. |
| 2019/0327152 | A1 | 10/2019 | Shemer et al. |
| 2019/0334994 | A1 | 10/2019 | Bower, III et al. |
| 2019/0356743 | A1 | 11/2019 | Park et al. |
| 2019/0373051 | A1 | 12/2019 | Binotto et al. |
| 2020/0014633 | A1 | 1/2020 | You et al. |
| 2020/0051961 | A1 | 2/2020 | Rickard et al. |
| 2020/0067907 | A1 | 2/2020 | Avetisov et al. |
| 2020/0127861 | A1 | 4/2020 | Doshi et al. |
| 2020/0127980 | A1 | 4/2020 | Smith et al. |
| 2020/0128067 | A1 | 4/2020 | Guim Bernat et al. |
| 2020/0134207 | A1 | 4/2020 | Doshi et al. |
| 2020/0136906 | A1 | 4/2020 | Guim Bernat et al. |
| 2020/0241921 | A1 | 7/2020 | Calmon et al. |
| 2021/0011908 | A1 | 1/2021 | Hayes et al. |
| 2021/0125083 | A1 | 4/2021 | Ogawa et al. |
| 2021/0144517 | A1* | 5/2021 | Guim Bernat ........ H04W 12/04 |
| 2021/0373537 | A1 | 12/2021 | Wei et al. |
| 2022/0141761 | A1 | 5/2022 | Cai et al. |
| 2022/0239507 | A1 | 7/2022 | Smith et al. |
| 2022/0337481 | A1 | 10/2022 | Guim Bernat et al. |
| 2023/0267004 | A1 | 8/2023 | Doshi et al. |

FOREIGN PATENT DOCUMENTS

| | | |
|---|---|---|
| CN | 111865647 | 10/2020 |
| CN | 112583583 | 3/2021 |
| CN | 114026834 | 2/2022 |
| DE | 112020000054 | 3/2021 |
| DE | 102020208023 | 4/2021 |
| DE | 102020208776 | 4/2021 |
| EP | 3382544 | 10/2018 |
| EP | 3535945 | 9/2019 |

(56) References Cited

FOREIGN PATENT DOCUMENTS

| EP | 3798834 B1 | 7/2024 |
|---|---|---|
| WO | WO-2006079161 A1 | 8/2006 |
| WO | WO-2019045970 A1 | 3/2019 |
| WO | 2020226979 | 11/2020 |

OTHER PUBLICATIONS

Sven Akkermans, "Software Technologies for Multi-Tenant Internet of Things Platforms", Apr. 2019, Ku Leuven, p. 1-222. (Year: 2019).*

"U.S. Appl. No. 16/722,820, Response filed Apr. 19, 2021 to Final Office Action mailed Feb. 17, 2021", 13 pgs.

"U.S. Appl. No. 16/722,820, Advisory Action mailed May 3, 2021", 5 pgs.

"U.S. Appl. No. 16/722,820, Response filed May 12, 2021 to Advisory Action mailed May 3, 2021", 15 pgs.

"U.S. Appl. No. 16/723,118, Non Final Office Action mailed May 27, 2021", 20 pgs.

"U.S. Appl. No. 16/722,917, Notice of Allowance mailed Jun. 11, 2021", 9 pgs.

"U.S. Appl. No. 16/723,358, Preliminary Amendment filed Dec. 20, 2019", 10 pgs.

"European Application Serial No. 20155735.2, Extended European Search Report mailed Jul. 24, 2020", 10 pgs.

"U.S. Appl. No. 16/722,820, Non Final Office Action mailed Aug. 17, 2020", 43 pgs.

"European Application Serial No. 20160858.5, Extended European Search Report mailed Sep. 10, 2020", 9 pgs.

"U.S. Appl. No. 16/722,820, Response filed Nov. 17, 2020 to Non Final Office Action mailed Aug. 17, 2020", 12 pgs.

Alexoudi, Theonitsa, "Optics in Computing: From Photonic Network-on-Chip to Chip-to-Chip nterconnects and Disintegrated Architectures", Ournal of Lightwave Technology, vol. 37, No. 2,, (Jan. 15, 2019), 17 pgs.

Hardjono, Thomas, "Decemtralized Trusted Computing Base for Blockchain Infrastructure Security", Frontiers in Blockchain, (Dec. 6, 2019), 15 pgs.

Latzo, Tobias, "A universal taxonomy and survey of forensic memory acquisition techniques", Digital Investigation 28, (2019), 56-69.

Lomet, David, "Multi-Version Concurrency via Timestamp Range Conflict Management", Microsoft Research, (2012), 12 pgs.

Mahir, Kaya, "An Optimal Application Partitioning And Computational Offloading Framework For Mobile Cloud Computing", (Jan. 2016), 131 pgs.

Sangster, Paul, "Virtualized Trusted Platform Architecture Specification", Specification Version 1.0Revision 0.26TCG Published, (Sep. 27, 2011), 60 pgs.

Sengupta, Dipanjan, "Scheduling Multi-tenant Cloud Workloads on Accelerator-Based Systems", International Conference For High Performance Computing, Networking, Storage And Analysis, IEEE, (Nov. 16, 2014), 513-524.

Xu, Xiaodong, "Mobile Edge Computing Enhanced Adaptive Bitrate Video Delivery With Joint Cache and Radio Resource Allocation", IEEE Access Special Section on Mobile Edge Computing, (Sep. 6, 2017), 10 pgs.

Zhao, Yangming, "Job Scheduling for Acceleration Systems in Cloud Computing", IEEE International Conference on Communications (ICC), (May 20, 2018), 1-6.

Zhou, Xuan, "Decentralizing MVCC by Leveraging Visibility", East China Normal University, (Jun. 5, 2018), 14 pgs.

"U.S. Appl. No. 16/723,358, Final Office Action mailed Sep. 8, 2022", 20 pgs.

"European Application Serial No. 20160858.5, Response filed Sep. 20, 2022 to Communication Pursuant to Article 94(3) EPC mailed May 23, 2022", 20 pgs.

"European Application Serial No. 20181908.3, Response filed Nov. 10, 2022 to Communication Pursuant to Article 94(3) EPC mailed Jun. 30, 2022", 30 pgs.

"U.S. Appl. No. 16/723,358, Response filed Dec. 2, 2022 to Final Office Action mailed Sep. 8, 2022", 15 pgs.

"U.S. Appl. No. 16/723,358, Examiner Interview Summary mailed Dec. 7, 2022" 3 pgs.

"European Application Serial No. 20181908.3, Response filed Jun. 21, 2021 to Extended European Search Report mailed Jan. 19, 2021", 25 pgs.

"U.S. Appl. No. 16/722,820, Non Final Office Action mailed Jul. 27, 2021", 56 pgs.

"U.S. Appl. No. 16/723,118, Response filed Aug. 27, 2021 to Non Final Office Action mailed May 27, 2021", 13 pgs.

"U.S. Appl. No. 16/723,118, Final Office Action mailed Sep. 10, 2021", 27 pgs.

"U.S. Appl. No. 16/723,358, Notice of Allowance mailed Jan. 25, 2023", 18 pgs.

"Indian Application Serial No. 202047055252, First Examination Report mailed Jan. 16, 2023", w English Translation, 6 pgs.

"U.S. Appl. No. 16/723,358, Notice of Allowability mailed Apr. 26, 2023", 3 pgs.

"U.S. Appl. No. 17/668,979, Non Final Office Action mailed Apr. 28, 2023", 14 pgs.

"European Application Serial No. 20801584.2, Partial Supplementary European Search Report mailed May 17, 2023", 14 pgs.

"U.S. Appl. No. 17/668,979, Examiner Interview Summary mailed Jul. 6, 2023", 2 pgs.

"U.S. Appl. No. 17/737,413, Notice of Allowance mailed Jul. 14, 2023", 20 pgs.

"U.S. Appl. No. 17/668,979, Response filed Jul. 21, 2023 to Non Final Office Action mailed Apr. 28, 2023", 11 pgs.

"U.S. Appl. No. 17/737,413, Corrected Notice of Allowability mailed Jul. 28, 2023", (4 pgs).

Cheol-Ho, Hong, "qCon: QoS-Aware Network Resource Management for Fog Computing", vol. 18, No. 10,, [Online] Retrieved from the internet:https: pdfs.semanticscholar.org 65d2 7b9576f6e39dda2413ad822a46e33a6055b5,pdf, (Oct. 13, 2018), 21 pgs.

Enas, Ahmad, "Location-Aware, Context-Driven QoS for IoT Applications", IEEE Systems Journal, IEEE, US, vol. 14, No. 1, (Feb. 12, 2019), 12 pgs.

Flathagen, Joakim, "A combined Network Access Control and QoS scheme for Software Defined Networks", IEEE Conference on Network Function Virtualization and Software Defined Networks (NFV-SDN), IEEE, (Nov. 27, 2018), 6 pgs.

Gupta, Harshit, "SDFog: A Software Defined Computing Architecture for QoS Aware Service Orchestration over Edge Devices", arxiv.org, Cornell University Library, 201 Olin Library Cornell University Ithaca, NY 14853, (Sep. 5, 2016), 8 pgs.

Joshua, Boley M, "Adaptive QoS for data transfers using software-defined networking", IEEE International Conference on Advanced Networks and Telecommunications Systems (ANTS), IEEE, (Nov. 6, 2016), 6 pgs.

Slavica, Tomovic, "An Architecture for QoS-aware Service Deployment in Software-Defined IoT Networks", 20th International Symposium on Wireless Personal Multimedia Communications (WPMC), IEEE, (Dec. 17, 2017), 7 pgs.

"U.S. Appl. No. 16/723,029, PTO Response to Rule 312 Communication mailed Feb. 17, 2022", 2 pgs.

"U.S. Appl. No. 16/722,820, Notice of Allowance mailed Feb. 18, 2022", 12 pgs.

"U.S. Appl. No. 16/723,358, Non Final Office Action mailed Apr. 6, 2022", 20 pgs.

"U.S. Appl. No. 17/668,979, Preliminary Amendment filed Apr. 22, 2022", 10 pgs.

"European Application Serial No. 20181908.3, Extended European Search Report mailed Jan. 19, 2021", 10 pgs.

"International Application Serial No. PCT US2020 030554, International Search Report mailed Jan. 15, 2021", 5 pgs.

"International Application Serial No. PCT US2020 030554, Written Opinion mailed Jan. 15, 2021", 6 pgs.

(56) References Cited

OTHER PUBLICATIONS

"U.S. Appl. No. 16/722,820, Final Office Action mailed Feb. 17, 2021", 48 pgs.
"European Application Serial No. 20160858.5, Response filed Mar. 22, 2021 to Extended European Search Report mailed Sep. 10, 2020", 27 pgs.
Ashkan, Yousefpour, "All One Needs to Know about Fog Computing and Related Edge Computing Paradigms: A Complete Survey", arxiv.org, Cornell University Library, 201 Olin Library Cornell University Ithaca, NY 14853, (Aug. 15, 2018), XP081257480, (Aug. 15, 2018), 1-31.
Guangshun, Li, "Method of Resource Estimation Based on QoS in Edge Computing, Published in: Hindawi Wireless Communications and Mobile Computing", (Jan. 22, 2018), 10 pgs.
Hesham, El-Sayed, "Edge of Things: The Big Picture on the Integration of Edge, IoT and the Cloud in a Distributed Computing Environment", (Feb. 14, 2018), 12 pgs.
"European Application Serial No. 20160858.5, Communication Pursuant to Article 94(3) EPC mailed May 23, 2022", 10 pgs.
"European Application Serial No. 20181908.3, Communication Pursuant to Article 94(3) EPC mailed Jun. 30, 2022", 10 pgs.
"U.S. Appl. No. 16/723,358, Response filed Jul. 6, 2022 to Non Final Office Action mailed Apr. 6, 2022", 16 pgs.
"U.S. Appl. No. 17/737,413, Preliminary Amendment filed Jul. 12, 2022", 9 pgs.
"U.S. Appl. No. 16/722,820, Response filed Oct. 27, 2021 to Non Final Office Action mailed Jul. 27, 2021", 14 pgs.
"U.S. Appl. No. 16/723,118, Response filed Nov. 8, 2021 to Final Office Action mailed Sep. 10, 2021", 14 pgs.
"U.S. Appl. No. 16/723,118, Examiner Interview Summary mailed Nov. 10, 2021", 2 pgs.
"U.S. Appl. No. 16/723,029, Notice of Allowance mailed Nov. 10, 2021", 11 pgs.
"CN208424434. English Translation", (2019), 5 pgs.
"International Application Serial No. PCT US2020 030554, International Preliminary Report on Patentability mailed Nov. 11, 2021", 8 pgs.
"U.S. Appl. No. 16/723,118, Advisory Action mailed Nov. 16, 2021", 3 pgs.
"U.S. Appl. No. 16/723,118, Notice of Allowance mailed Jan. 18, 2022", 20 pgs.
"U.S. Appl. No. 16/723,029, 312 Amendment filed Feb. 9, 2022", 8 pgs.
Ray, Partha Pratim, "Edge computing for Internet of Things: A survey, e-healthcare case study and future direction", Journal of Network and Computer Applications 140(7), (May 2019), 1-22.
Watada, Junzo, "Emerging Trends, Techniques and Open Issues of Containerization: A Review", IEEE, (2019), 30 pgs.
"U.S. Appl. No. 17/668,979, Final Office Action mailed Nov. 24, 2023", 19 pgs.
"U.S. Appl. No. 17/737,413, Corrected Notice of Allowability mailed Oct. 25, 2023", 2 pgs.
"U.S. Appl. No. 17/737,413, PTO Response to Rule 312 Communication mailed Oct. 10, 2023", 2 pgs.
"European Application Serial No. 20160858.5, Summons to Attend Oral Proceedings mailed Sep. 22, 2023", 13 pgs.
"Indian Application Serial No. 202047055252, Response filed Jul. 17, 2023 to First Examination Report mailed Jan. 16, 2023", w/ English Claims, 26 pgs.
Mounce, Gabriel, et al., "Chiplet based approach for heterogeneous processing and packaging architectures", IEEE Aerospace Conference, IEEE, (Mar. 5, 2016), 1-12.
"U.S. Appl. No. 17/668,979, Examiner Interview Summary mailed Jan. 30, 2024", 3 pgs.
"European Application Serial No. 20801584.2, Response filed Feb. 28, 2024 to Extended European Search Report mailed Aug. 18, 2023", 16 pgs.
"U.S. Appl. No. 18/141,681, Non Final Office Action mailed Jun. 13, 2024", 31 pgs.
"Japanese Application Serial No. 2020-571852, Notification of Reasons for Refusal mailed May 7, 2024", w/ English translation, 12 pgs.
"Japanese Application Serial No. 2020-571852, Response filed Aug. 5, 2024 to Notification of Reasons for Refusal mailed Aug. 6, 2024", W/English Claims, 11 pgs.
Ha, K, et al., "Adaptive VM Handoff Across Cloudlets", (Jun. 30, 2015), 26 pgs.
U.S. Appl. No. 17/668,979, filed Feb. 10, 2022, Dynamic Sharing in Secure Memory Environments Using Edge Service Sidecars.
U.S. Appl. No. 17/737,413, filed May 5, 2022, Modular I/O Configurations for Edge Computing Using Disaggregates Chiplets.
"U.S. Appl. No. 17/737,413, 312 Amendment filed Aug. 3, 2023", 9 pgs.
"U.S. Appl. No. 17/668,979, Non Final Office Action mailed Aug. 4, 2023", 17 pgs.
"European Application Serial No. 20801584.2, Extended European Search Report mailed Aug. 18, 2023", 12 pgs.
"European Application Serial No. 20181908.3, Summons to Attend Oral Proceedings mailed Sep. 1, 2023", 9 pgs.
"U.S. Appl. No. 17/668,979, Response filed Sep. 20, 2023 to Non Final Office Action mailed Aug. 4, 2023", 15 pgs.
Calcote, Lee, "Container Networking: A Breakdown, Explanation and Analysis—The New Stack", [Online] Retrieved from the internet:https: thenewstack.io container-networking-breakdown-explanationanalysis , (Sep. 14, 2016), 9 pgs.
Eguro, Ken, "FPGAs for trusted cloud computing", Field Programmable Logic and Applications (FPL), 22nd International Conference on, IEEE, (Aug. 29, 2012), 63-70.

\* cited by examiner

| EDGE DATA LAKE TLB | |
| --- | --- |
| VIRTUAL ADDRESS | PHYSICAL ADDRESS |
| 0 | EDGE 1 @ 5 |
| 1 | EDGE 2 @ 3 |
| 2 | EDGE 1 @ 4 |
| 3 | EDGE 1 @ 1 |
| 4 | EDGE 1 @ 2 |
| 5 | EDGE 1 @ 8 |
| 6 | EDGE 3 @ 11 |
| 7 | EDGE 4 @ 4 |
| 8 | EDGE 4 @ 10 |
| 9 | EDGE 2 @ 2 |
| 10 | EDGE 3 @ 7 |
| 11 | EDGE 2 @ 5 |

FIG. 32

MULTI-ENTITY RESOURCE, SECURITY, AND SERVICE MANAGEMENT IN EDGE COMPUTING DEPLOYMENTS

PRIORITY CLAIM

This application is a continuation under 35 U.S.C. § 111(a) and claims benefit of priority to International Patent Application Serial No. PCT/US2020/030554, filed Apr. 29, 2020, which claims the benefit of priority to: U.S. Provisional Patent Application No. 62/841,042, filed Apr. 30, 2019; U.S. Provisional Patent Application No. 62/907,597, filed Sep. 28, 2019; and U.S. Provisional Patent Application No. 62/939,303, filed Nov. 22, 2019; all of which are incorporated by reference herein in their entirety.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 32 illustrates an edge service page table.

DETAILED DESCRIPTION

Figure 1:
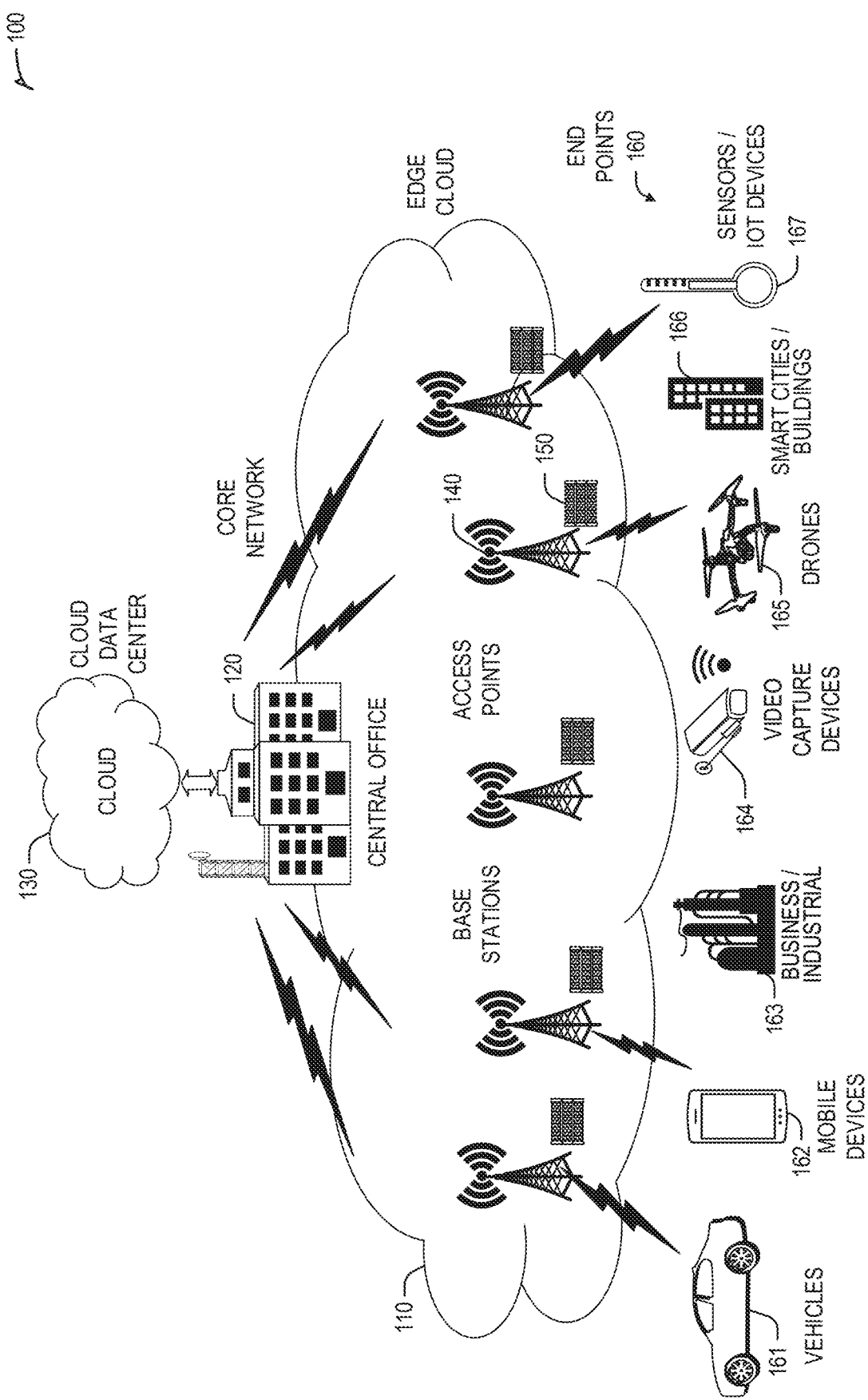
FIG. 1 illustrates an overview of an edge cloud configuration for edge computing.

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment.

In the following description, methods, configurations, and related apparatuses are disclosed for various improvements to the configuration and functional capabilities of an edge computing architecture and an implementing edge computing system. These improvements may benefit a variety of use cases, especially those involving multiple stakeholders of the edge computing system-whether in the form of multiple users of a system, multiple tenants on a system, multiple devices or user equipment interacting with a system, multiple services being offered from a system, multiple resources being available or managed within a system, multiple forms of network access being exposed for a system, multiple locations of operation for a system, and the like. Such multi-dimensional aspects and considerations are generally referred to herein as "multi-entity" constraints, with specific discussion of resources managed or orchestrated in multi-tenant and multi-service edge computing configurations.

With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or monetary or resource cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency user-cases such as autonomous driving, video surveillance, and mobile media consumption. Additionally, these resources will benefit from service management in an edge system which provides the ability to scale and achieve local SLAs, manage tiered service requirements, and enable local features and functions on a temporary or permanent basis.

An illustrative edge computing system may support and/or provide various services to endpoint devices (e.g., client user equipment (UEs)), each of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

The following initially provides an overview of terminology applicable to edge computing (Section I). This is followed by an overview of edge computing technology and configurations, and example use cases of multi-stakeholder services (Section II). This is followed by types of technical improvements offered for multi-stakeholder services (Section III) with use cases (Section III.A), including improvements directed to (a) resource allocation and deallocation (Section III.B), (b) security and privacy (Section III.C), and (c) orchestration and service levels (Section III.B), in addition to discussions of related technical areas. This is followed by a concluding discussion of potential connectivity configurations of edge computing systems (Section IV), and example configurations and methods embodying the improvements described herein.

I. Terminology

As used herein, the term "edge computing" encompasses many implementations of distributed computing that move processing activities and resources (e.g., compute, storage, acceleration resources), including those typically performed as cloud processing activities or by cloud processing resources, towards the "edge" of the network in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

Specific arrangements of edge computing applications and services accessible via mobile wireless networks (e.g., cellular and Wi-Fi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a stand-alone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like. Additionally, a compute node or compute device may encompass different types or classes of hardware, or configurations of such hardware, based on the resources available to the node or device (e.g., power, compute, space, temperature, and other operational considerations or constraints). Thus, many variations of hardware are intended to be encompassed by a compute node or compute device.

As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, monetary or resource cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, references to a "layer" of an edge network may encompass various forms or types of edge networks and edge networking configurations that have common properties relating to latency, timing, or distance, whether termed as "close edge", "local edge", "middle edge", "far edge", or with use of specifically named layers. Thus, a reference to a layer typically does not necessarily refer to a layer in the OSI model but rather will refer to some network portion or segment with a common tier or set of properties.

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy. As also used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of network functions from embedded services inside proprietary hardware appliances to software-based virtualized network functions (or VNFs) running on standardized CPUs (e.g., within standard x86@ and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized network function" (or VNF) indicates a software-based network function operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

Although many of the following examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Where technically possible, the various network connections may be wired or wireless in any of the networks disclosed herein, and a resulting system may be a hybrid deployment of both wired network technologies. Further, any of the disclosed wireless network connectivity standards disclosed herein may be used by the system or subsystem architectural requirements to achieve the functions disclosed.

II. Examples of Edge Computing Systems

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., UEs), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data (e.g., at a "local edge", "close edge", or "near edge"). For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
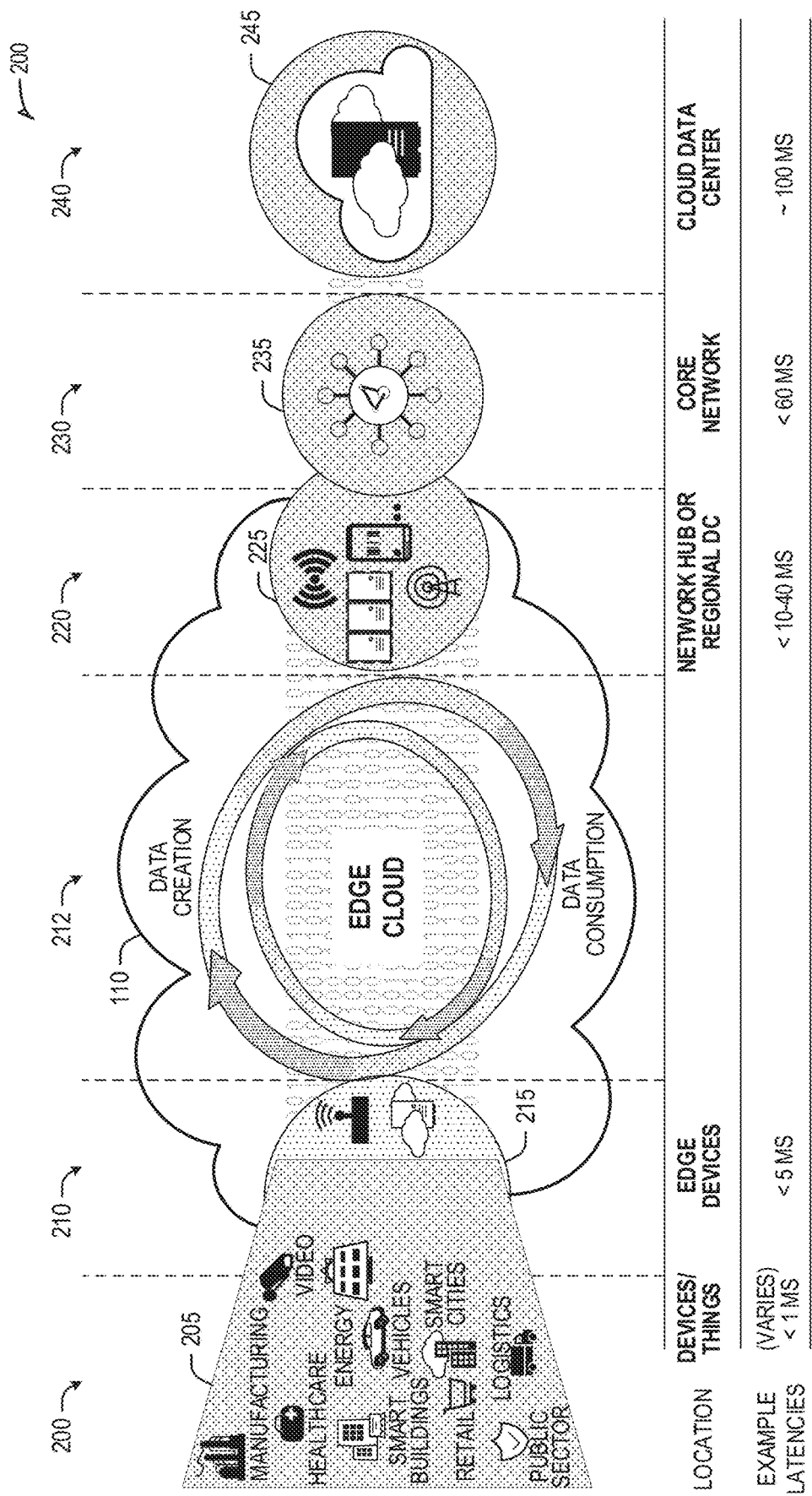
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers, or local network equipment (equipment 225); and any equipment, devices, or nodes located therebetween (in layer 212, not illustrated in detail). The network communications within the edge cloud 110 and among the various layers may occur via any number of wired or wireless mediums, including via the connectivity architectures and technologies discussed with reference to FIGS. 65 to 83.

Examples of latency, resulting from network communication distance and processing time constraints, may range from less than a millisecond (ms) when among the endpoint layer 200, under 5 ms at the edge devices layer 210 (e.g., a "near edge" or "close edge" layer), to even between 10 to 40 ms when communicating with nodes at the network access layer 220 (e.g., a "middle edge" layer). Beyond the edge cloud 110 are core network 230 and cloud data center 240 layers, each with increasing latency (e.g., between 50-60 ms at the core network layer 230, to 100 or more ms at the cloud data center layer, both of which may be considered a "far edge" layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation and (2) augment other components in the system to resume overall transaction SLA and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (VNFs, Function as a Service (FaaS), standard processes, etc.) which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

Figure 3:
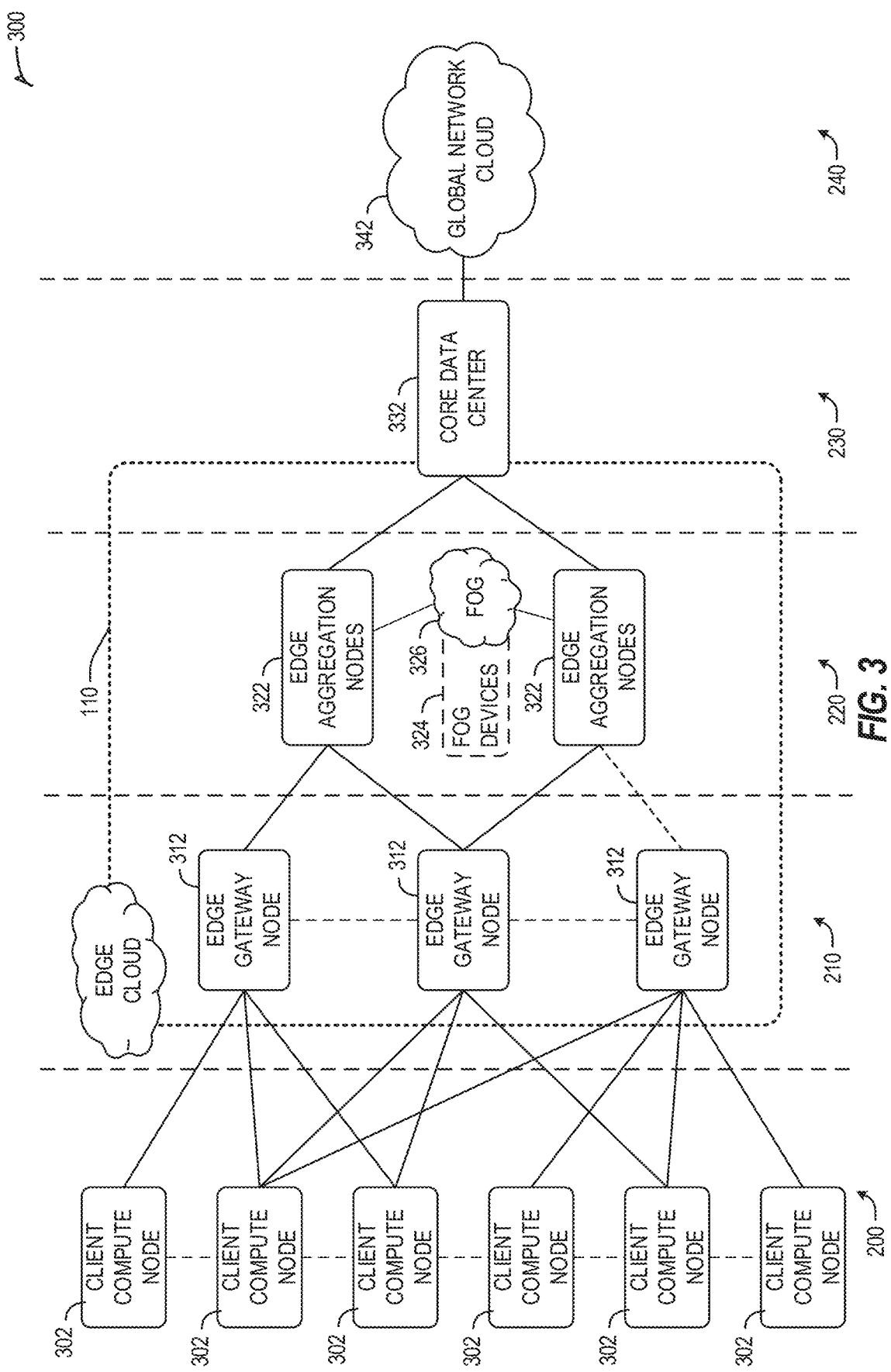
FIG. 3 provides an overview of layers of distributed compute deployed among an edge computing system.

At a more generic level, an edge computing system may be described to encompass any number of deployments at the previously discussed layers operating in the edge cloud 110 (network layers 200-240), which provide coordination from client and distributed computing devices. FIG. 3 provides an abstracted overview of layers of distributed compute deployed among an edge computing environment for purposes of illustration. Various types of network links at the same (e.g., peer-to-peer) or different layers are also depicted.

FIG. 3 generically depicts an edge computing system 300 for providing edge services and applications to multi-stakeholder entities, as distributed among one or more client compute nodes 302, one or more edge gateway nodes 312, one or more edge aggregation nodes 322, one or more core data centers 332, and a global network cloud 342, as distributed across layers of the network. The implementation of the edge computing system 300 may be provided at or on behalf of a telecommunication service provider ("telco", or "TSP"), internet-of-things service provider, cloud service provider (CSP), enterprise entity, or any other number of entities. Various implementations and configurations of the system 300 may be provided dynamically, such as when orchestrated to meet service objectives.

Individual nodes or devices of the edge computing system 300 are located at a particular layer corresponding to layers 200, 210, 220, 230, 240. For example, the client compute nodes 302 are located at an endpoint layer 200, while the edge gateway nodes 312 are located at an edge devices layer 210 (local level) of the edge computing system 300. Additionally, the edge aggregation nodes 322 (and/or fog devices 324, if arranged or operated with or among a fog networking configuration 326) are located at a network access layer 220 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provide a decentralized architecture and serves as an extension to cloud computing by collaborating with one or more edge node devices, providing the subsequent amount of localized control, configuration and management, and much more for end devices. Furthermore, Fog computing provides the ability for edge resources to identify similar resources and collaborate in order to create an edge-local cloud which can be used solely or in conjunction with cloud computing in order to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 332 is located at a core network layer 230 (a regional or geographically-central level), while the global network cloud 342 is located at a cloud data center layer 240 (a national or world-wide layer). The use of "core" is provided as a term for a centralized network location—deeper in the network—which is accessible by multiple edge nodes or components; however, a "core" does not necessarily designate the "center" or the deepest location of the network. Accordingly, the core data center 332 may be located within, at, or near the edge cloud 110. Although an illustrative number of client compute nodes 302, edge gateway nodes 312, edge aggregation nodes 322, edge core data centers 332, global network clouds 342 are shown in FIG. 3, it should be appreciated that the edge computing system 300 may include additional devices or systems at each layer. Devices at any layer can be configured as peer nodes to each other and, accordingly, act in a collaborative manner to meet service objectives. Additionally, as shown in FIG. 3, the number of components of respective layers 200, 210, 220, 230, 240 generally increases at each lower level (e.g., when moving closer to endpoints). As such, one edge gateway node 312 may service multiple client compute nodes 302, and one edge aggregation node 322 may service multiple edge gateway nodes 312.

Consistent with the examples provided herein, a client compute node 302 may be embodied as any type of endpoint component, device, appliance, or other thing capable of communicating as a producer or consumer of data. Further, the label "node" or "device" as used in the edge computing system 300 does not necessarily mean that such node or device operates in a client or slave role; rather, any of the nodes or devices in the edge computing system 300 refer to individual entities, nodes, or subsystems which include discrete or connected hardware or software configurations to facilitate or use the edge cloud 110.

As such, the edge cloud 110 is formed from network components and functional features operated by and within the edge gateway nodes 312 and the edge aggregation nodes 322 of layers 210, 220, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 3 as the client compute nodes 302. In other words, the edge cloud 110 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 110 may form a portion of or otherwise provide an ingress point into or across a fog networking configuration 326 (e.g., a network of fog devices 324, not shown in detail), which may be embodied as a system-level horizontal and distributed architecture that distributes resources and services to perform a specific function. For instance, a coordinated and distributed network of fog devices 324 may perform computing, storage, control, or networking aspects in the context of an IoT system arrangement. Other networked, aggregated, and distributed functions may exist in the edge cloud 110 between the core data center 332 and the client endpoints (e.g., client compute nodes 302). Some of these are discussed in the following sections in the context of network functions or service virtualization, including the use of virtual edges and virtual services which are orchestrated for multiple stakeholders.

As discussed in more detail below, the edge gateway nodes 312 and the edge aggregation nodes 322 cooperate to provide various edge services and security to the client compute nodes 302. Furthermore, because a client compute node 302 may be stationary or mobile, a respective edge gateway node 312 may cooperate with other edge gateway devices to propagate presently provided edge services, relevant service data, and security as the corresponding client compute node 302 moves about a region. To do so, the edge gateway nodes 312 and/or edge aggregation nodes 322 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 110. In a multi-stakeholder environment, there can be multiple loadable security modules (LSMs) used to provision policies that enforce the stakeholder's interests. Enforcement point environments could support multiple LSMs that apply the combination of loaded LSM policies (e.g., where the most constrained effective policy is applied, such as where if any of A, B or C stakeholders restricts access then access is restricted). Within the edge cloud 110, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (to identify what elements are required by the system to conduct a service, how the system responds to service conditions and changes, and the like).

A "service" is a broad term often applied to various contexts, but in general it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during and end of the service.

Figure 4:
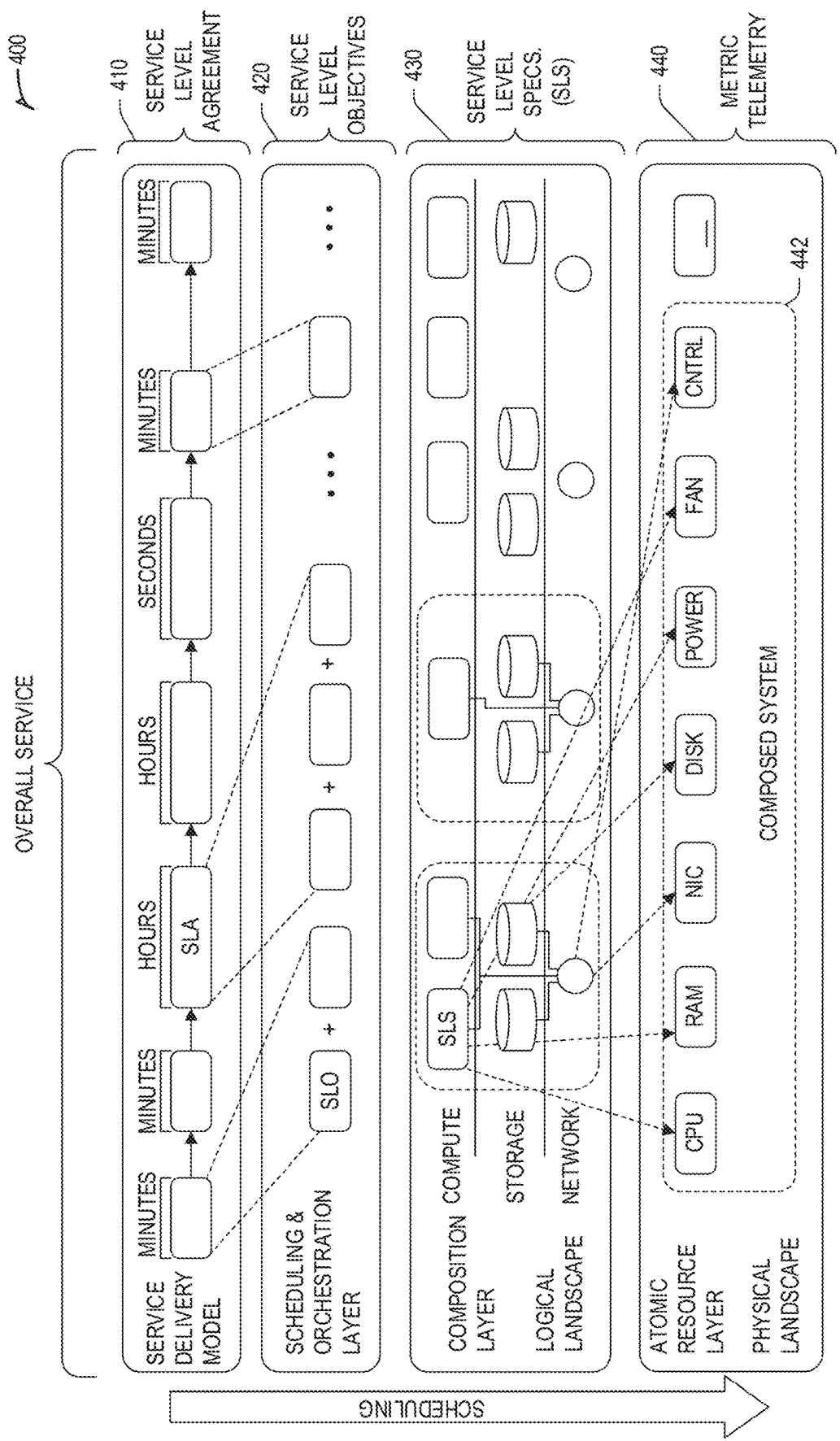
FIG. 4 provides an overview of layers of distributed compute deployed among an edge computing system.

An example relationship among services for use in an edge computing system is depicted in FIG. 4. In scenarios of edge computing, there are several services and transaction layers 400 in operation and dependent on each other—these services create a "service chain". At the lowest level, ingredients compose systems. These systems (or resources) communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in the hierarchy depicted in FIG. 4 is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement could define "transactional throughput" or "timeliness"—in case of SDSi, the system (or resource) can sign up to guarantee specific service level specifications (SLS 430) and objectives (SLO 420) of a service level agreement (SLA 410). SDSi hardware also provides the ability for the infrastructure and resource owner to empower the silicon component (e.g., components of a composed system 442 that produce metric telemetry 440) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

The higher layer in the services hierarchy, Resource Level Services, includes systems which provide (in complete or through composition) the ability to meet workload demands by either acquiring and enabling system level features via SDSi, or through the composition of individually addressable resources (compute, storage and network).

The higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling. Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

The higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

The highest layer of services in the service hierarchy, Business Level Services (BLS), is tied to the capability that is being delivered. At this level, the customer or entity might not care about how the service is composed or what ingredients are used, managed, tracked in order to provide the service(s). The primary objective of business level services is to attain the goals set by the customer according to the overall contract terms and conditions established between the customer and the provider at the agreed to financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead through an agent or middleware capability. Services such as: locate, find, address, trace, track, identify, register may be placed immediately in effect as resources appear on the framework, and the manager or owner of the resource or security domain can use management rules and policies to ensure orderly resource discovery, registration and certification.

Moreover, any number of the edge computing architectures described herein may be adapted with service management features. These features may enable a system to be constantly aware and record information about the motion, vector and direction of resources as well as fully describe these features as both telemetry and metadata associated with the devices. These service management features can be used for resource management, billing and metering, as well as an element of security. The same functionality also applies to related resources, where a less intelligent device, like a sensor, might attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

A. Edge Computing Configurations and Arrangements

Figure 5:
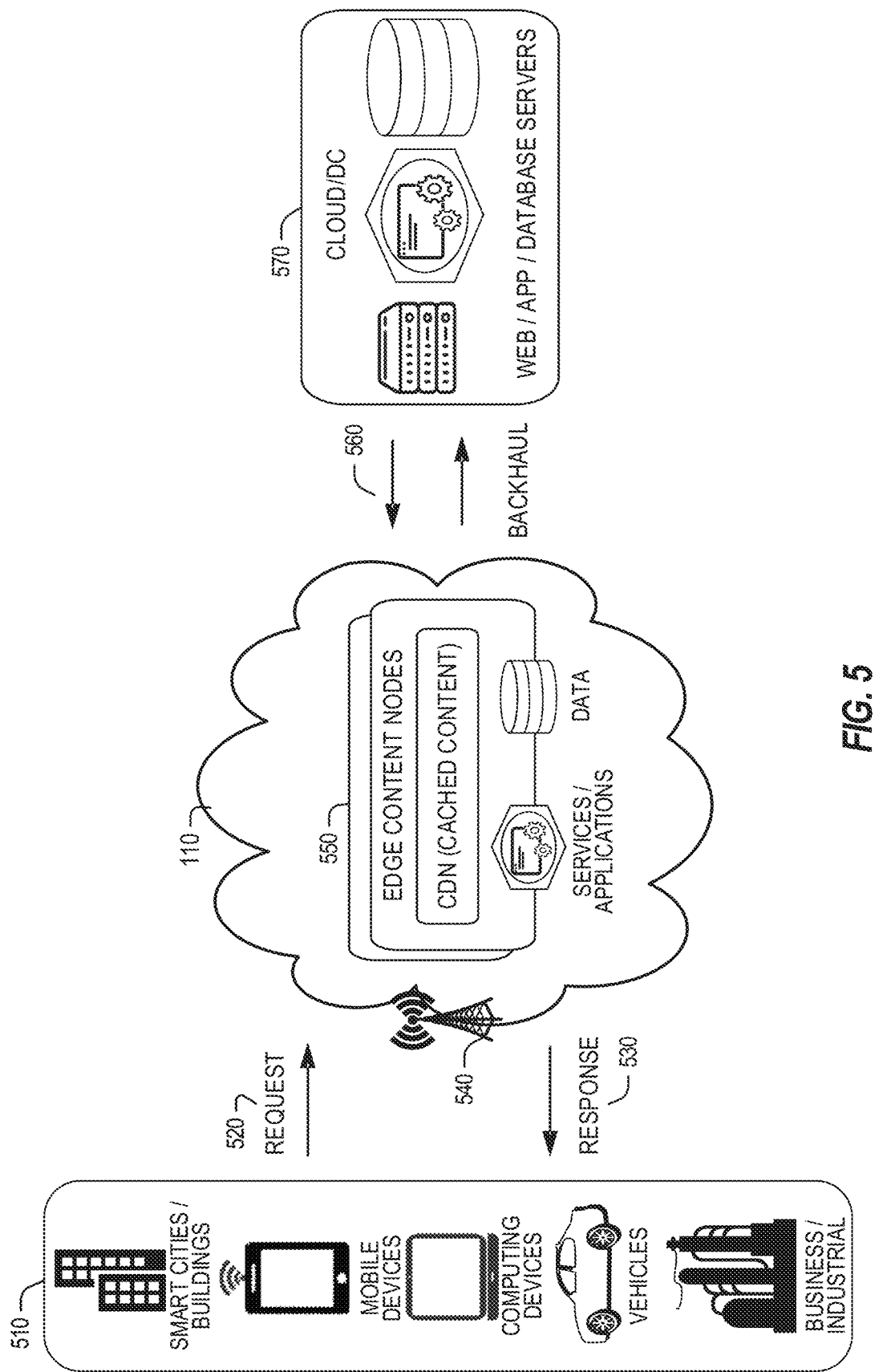
FIGS. 5 and 6 illustrate over-the-top and network-aggregation approaches for networking and services in an edge computing system.
Figure 6:
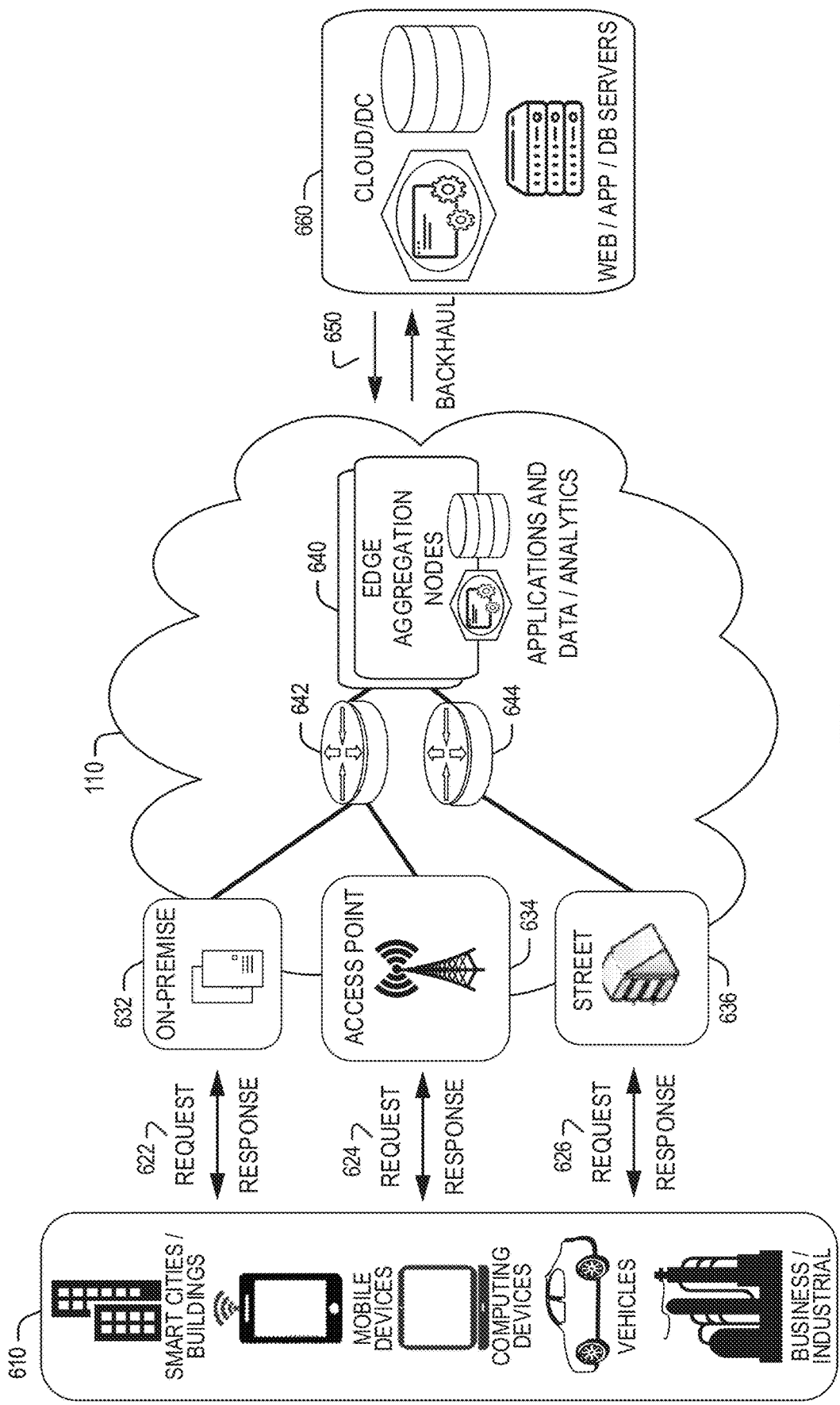

The deployment of a multi-stakeholder edge computing system may be arranged and orchestrated to enable the deployment of multiple services and virtual edge instances, among multiple edge nodes and subsystems, for use by multiple tenants and service providers. In a system example applicable to a cloud service provider (CSP), the deployment of an edge computing system may be provided via an "over-the-top" approach, to introduce edge computing nodes as a supplemental tool to cloud computing. In a contrasting system example applicable to a telecommunications service provider (TSP), the deployment of an edge computing system may be provided via a "network-aggregation" approach, to introduce edge computing nodes at locations in which network accesses (from different types of data access networks) are aggregated. FIGS. 5 and 6 contrast these over-the-top and network-aggregation approaches for networking and services in respective edge computing system. However, these over-the-top and network aggregation approaches may be implemented together in a hybrid or merged approach or configuration as suggested in later examples.

In FIG. 5, various client endpoints 510 (in the form of mobile devices, computers, autonomous vehicles, business computing equipment, industrial processing equipment) provide requests 520 for services or data transactions, and receive responses 530 for the services or data transactions, to and from the edge cloud 110 (e.g., via a wireless or wired network 540). Within the edge cloud 110, the CSP may deploy various compute and storage resources, such as edge content nodes 550 to provide cached content from a distributed content delivery network. Other available compute and storage resources available on the edge content nodes 550 may be used to execute other services and fulfill other workloads. The edge content nodes 550 and other systems of the edge cloud 110 are connected to a cloud or data center 570, which uses a backhaul network 560 to fulfill higher-latency requests from a cloud/data center for websites, applications, database servers, etc.

In FIG. 6, various client endpoints 610 (in the form of mobile devices, computers, autonomous vehicles, business computing equipment, industrial processing equipment) exchange requests and responses that are specific to the type of endpoint network aggregation. For instance, computers, business computing equipment, and industrial processing equipment may obtain network access via a wired broadband network, by exchanging requests and responses 622 through an on-premise network system 632. Mobile computing devices may obtain network access via a wireless broadband network, by exchanging requests and responses 624 through a cellular network tower 634. Autonomous vehicles may obtain network access for requests and responses 626 via a wireless vehicular network through a street-located network system 636. However, regardless of the type of network access, the TSP may deploy aggregation points 642, 644 within the edge cloud 110 to aggregate traffic and requests. Thus, within the edge cloud 110, the TSP may deploy various compute and storage resources, such as at edge aggregation nodes 640, to provide requested content. The edge aggregation nodes 640 and other systems of the edge cloud 110 are connected to a cloud or data center 660, which uses a backhaul network 650 to fulfill higher-latency requests from a cloud/data center for websites, applications, database servers, etc. (Additional or consolidated instances of the edge aggregation nodes 640 and the aggregation points 642, 644, including those deployed on a single server framework, may also be present within the edge cloud 110 or other areas of the TSP infrastructure).

Figure 7:
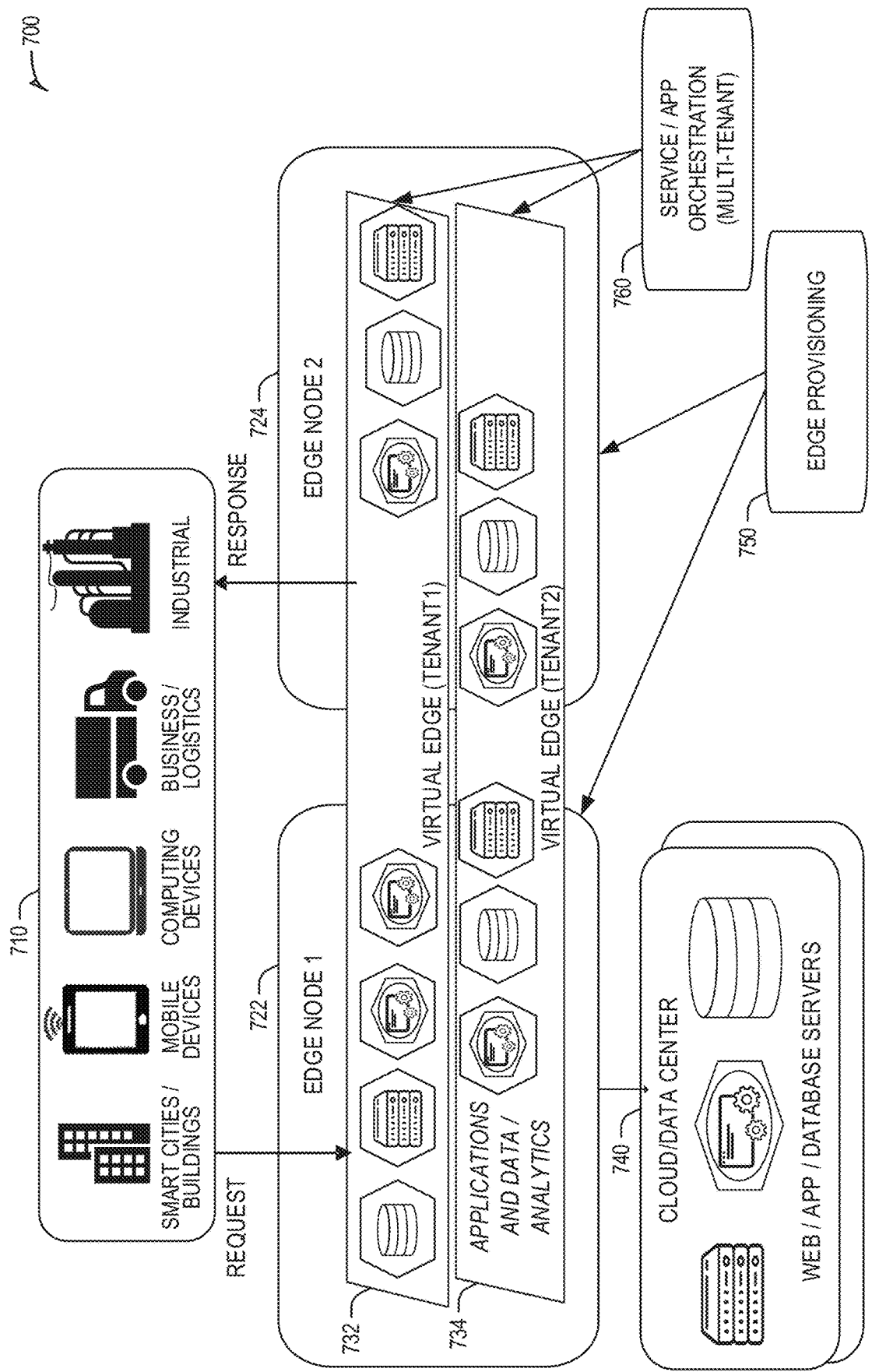
FIGS. 7 and 8 illustrate deployment and orchestration for virtual edge configurations across an edge computing system operated among multiple edge nodes and multiple tenants.
Figure 8:
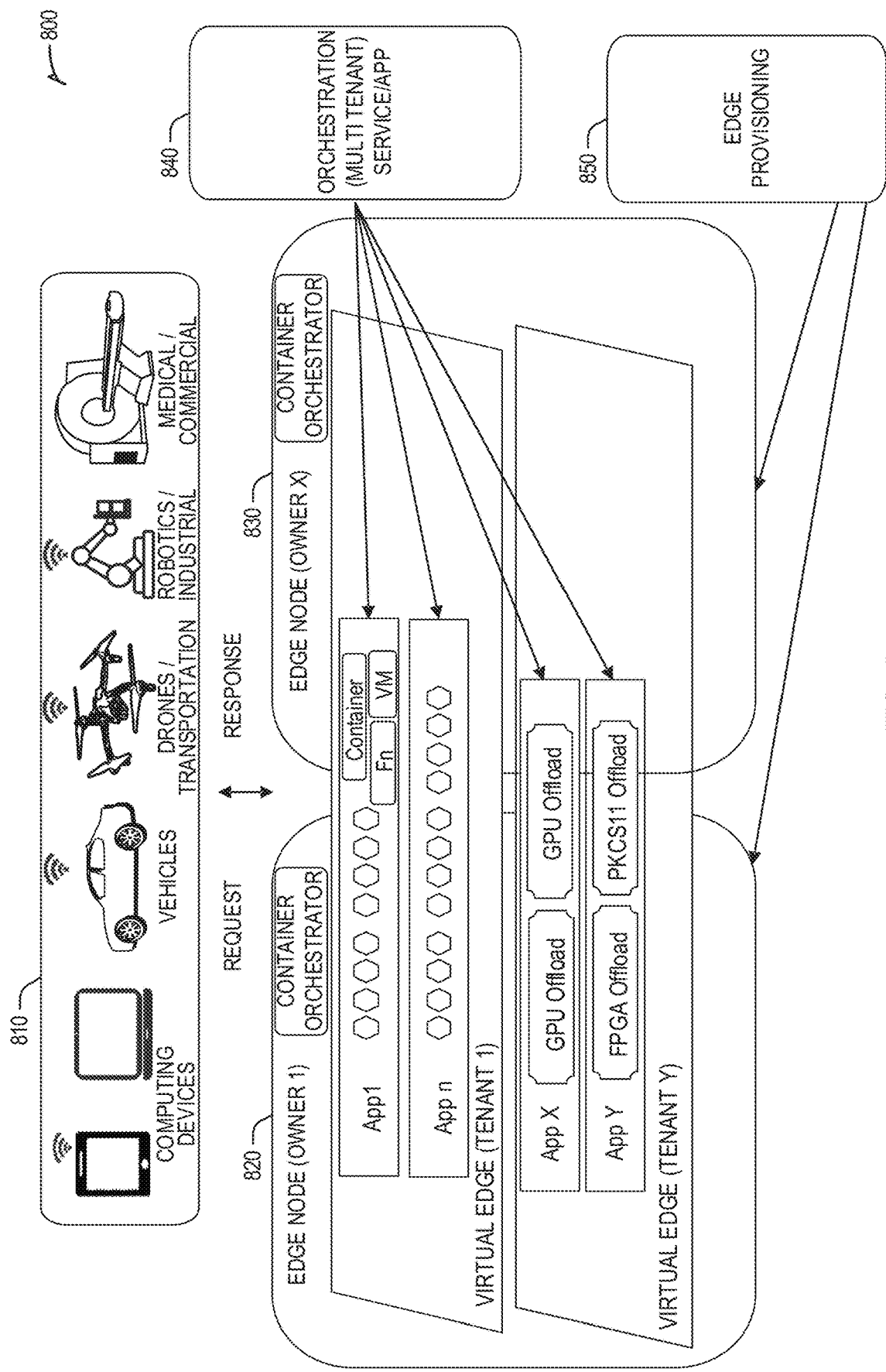

As an extension of either CSP or TSP configurations, FIGS. 7 and 8 illustrate deployment and orchestration for virtual edge configurations across an edge computing system operated among multiple edge nodes and multiple tenants. Specifically, FIG. 7 depicts coordination of a first edge node 722 and a second edge node 724 in an edge computing system 700, to fulfill requests and responses for various client endpoints 710 (e.g., smart cities/building systems, mobile devices, computing devices, business/logistics systems, industrial systems, etc.) which access various virtual edge instances. Similar to the examples of FIGS. 5 and 6, the virtual edge instances provide edge compute capabilities and processing in an edge cloud, with access to a cloud/data center 740 for higher-latency requests for websites, applications, database servers, etc. However, the edge cloud enables coordination of processing among multiple edge nodes for multiple tenants or entities.

In the example of FIG. 7, these virtual edge instances include: a first virtual edge 732, offered to a first tenant (Tenant 1), which offers a first combination of edge storage, computing, and services; and a second virtual edge 734, offering a second combination of edge storage, computing, and services. The virtual edge instances 732, 734 are distributed among the edge nodes 722, 724, and may include scenarios in which a request and response are fulfilled from the same or different edge nodes. The configuration of the edge nodes 722, 724 to operate in a distributed yet coordinated fashion occurs based on edge provisioning functions 750. The functionality of the edge nodes 722, 724 to provide coordinated operation for applications and services, among multiple tenants, occurs based on orchestration functions 760.

It should be understood that some of the devices in 710 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 722, 724 may operate as LSM or security feature enforcement points for local resources allocated to multiple tenants per node. Additionally, tenant runtime and application execution (e.g., in instances 732, 734) may serve as an enforcement point for an LSM or other security feature that creates a virtual edge abstraction of resources spanning potentially multiple physical hosting platforms. Finally, the orchestration functions 760 at an orchestration entity may operate as an LSM or security feature enforcement point for marshalling resources along tenant boundaries.

Edge computing nodes may partition resources (memory, CPU, GPU, interrupt controller, I/O controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 710, 722, and 740 may coordinate the establishment of a distributed trusted computing base (DTCB) such that a tenant-specific virtual trusted secure channel linking all elements end to end can be established.

In the example of FIG. 8, an edge computing system 800 is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 7. An orchestrator may use a DICE layering and fan-out construction to create a root of trust context that is tenant specific. Thus, orchestration functions 840, provided by an orchestrator discussed below, may participate as a tenant-specific orchestration provider.

Similar to the scenario of FIG. 7, the edge computing system 800 is configured to fulfill requests and responses for various client endpoints 810 from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

Within the edge cloud, a first edge node 820 (operated by a first owner) and a second edge node 830 (operated by a second owner) respectively operate an orchestrator to coordinate the execution of various applications within the virtual edge instances offered for respective tenants. The edge nodes 820, 830 are coordinated based on edge provisioning functions 850, while the operation of the various applications are coordinated with orchestration functions 840. Furthermore, the orchestrator may identify specific hardware features that are offered to one owner but hidden from a second owner, however offered across the ownership boundaries in order to ensure that services complete according to their SLA(s). Accordingly, the virtual edge, container orchestrator, and service/app orchestrator may provide an LSM or other security enforcement point, for node-specific resources tied to specific tenants.

Figure 9:
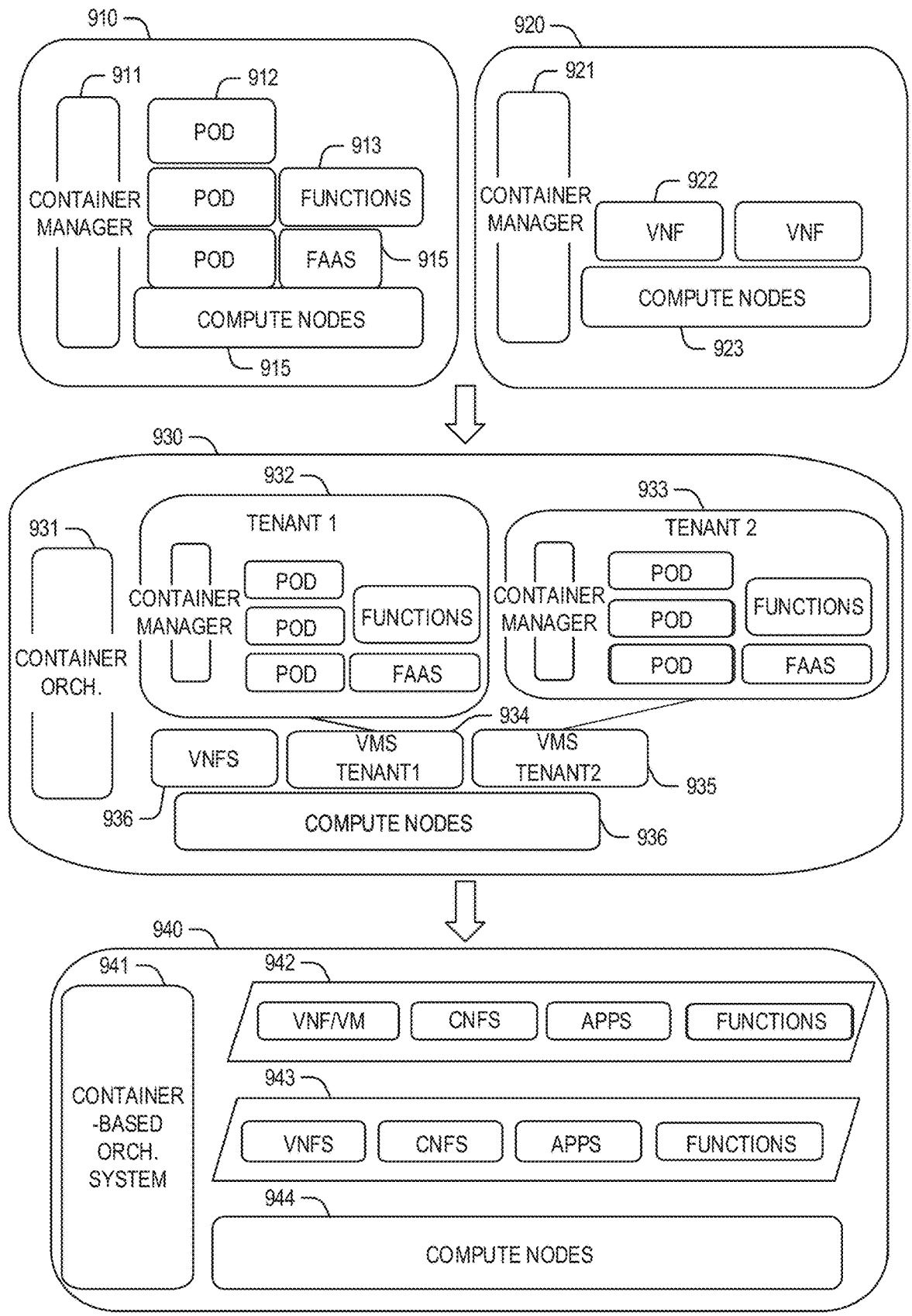
FIG. 9 illustrates various compute arrangements deploying containers in an edge computing system.

FIG. 9 illustrates various compute arrangements deploying containers in an edge computing system. As a simplified example, system arrangements 910, 920 depict settings in which a container manager (e.g., container managers 911, 921, 931) is adapted to launch containerized pods, functions, and functions-as-a-service instances through execution via compute nodes (915 in arrangement 910), or to separately execute containerized virtualized network functions through execution via compute nodes (923 in arrangement 920). This arrangement is adapted for use of multiple tenants in system arrangement 930 (using compute nodes 936), where containerized pods (e.g., pods 912), functions (e.g., functions 913, VNFs 922, 936), and functions-as-a-service instances (e.g., FaaS instance 915) are launched within virtual machines (e.g., VMs 934, 935 for tenants 932, 933) specific to respective tenants (aside the execution of virtualized network functions). This arrangement is further adapted for use in system arrangement 940, which provides containers 942, 943, or execution of the various functions, applications, and functions on compute nodes 944, as coordinated by an container-based orchestration system 941.

The system arrangements of depicted in FIGS. 8 and 9 provide an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 9, the container manager, container orchestrator, and individual nodes may provide an LSM or other security enforcement point. However in either of the configurations of FIGS. 8 and 9, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by Edge owners to enforce tenancy. Other isolation environments may include: bare metal (dedicated) equipment, virtual machines, containers, virtual machines on containers, or combinations thereof. Functions, such as those provided in a FaaS environment, discussed further below, may run in any of these isolation environments to enforce tenant boundaries.

Figure 10A:
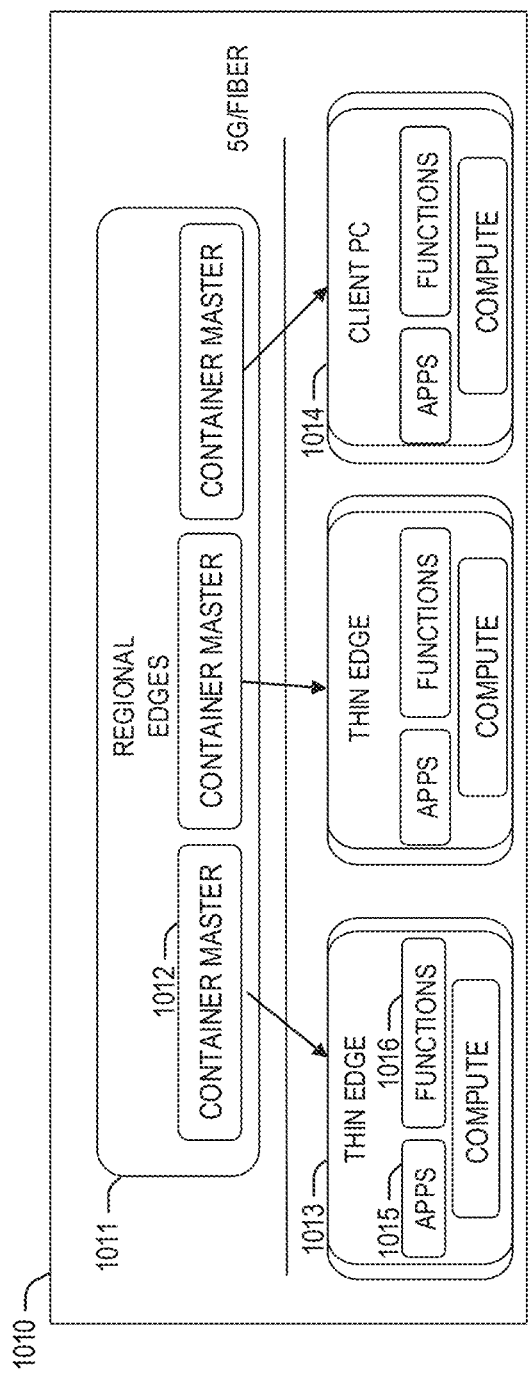
FIGS. 10A and 10B illustrate distributed edge compute deployments, using coordinated compute functions and services in an edge computing system.
Figure 10B:
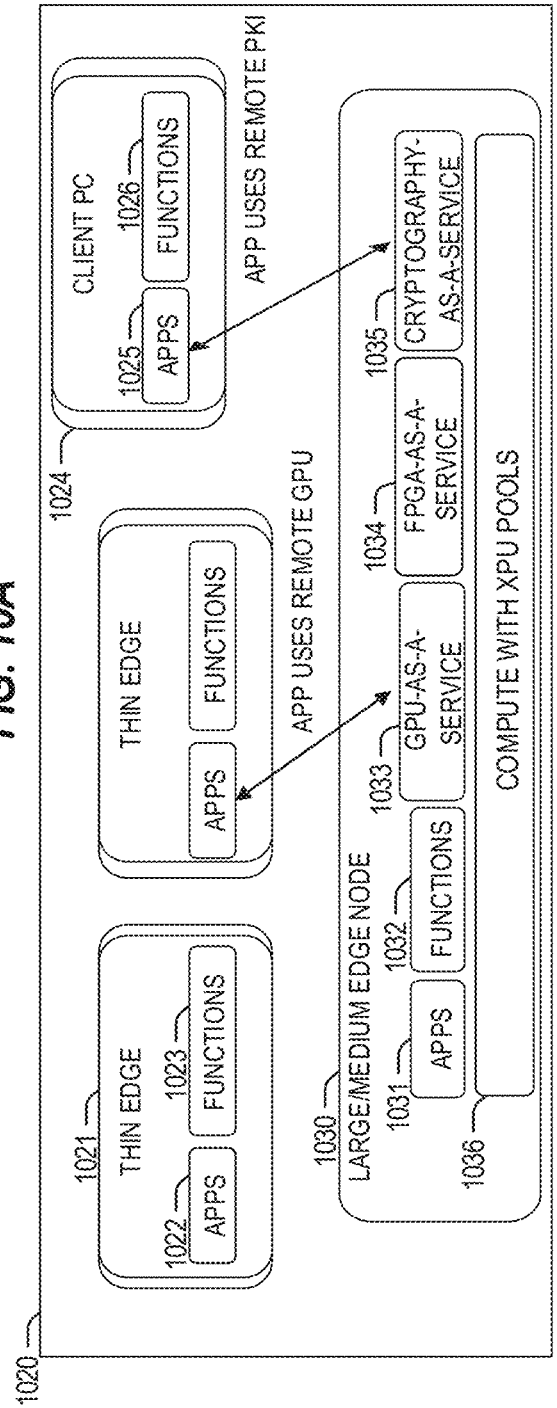

FIGS. 10A and 10B illustrate distributed edge compute deployments, using coordinated compute functions and services in instances of an edge computing system. Within edge computing environment 1010, a number of regionally located edges (e.g., 1011, 1013, 1014) include container managers (e.g., 1012) to coordinate the execution of services, via applications (e.g., 1015) and functions (e.g., 1016) on compute resources on distributed edges (thin edge instances 1013 or client PCs 1014). Within edge computing environment 1020, the distributed edges (thin edge instances 1021) are coordinated with other distributed edges having additional processing capabilities (large/medium edge instances 1030). For instance, an application or function (e.g., 1022 or 1023) operating at a specific distributed edge instance (thin edge 1021) may invoke GPU processing capabilities further in the edge cloud (offered by the large/medium edge instance 1030, in the form of a GPU-as-a-service 1030); or as another example, an application or function (e.g., 1025, 1026) at a client computer (client PC 1024) may invoke processing capabilities further in the edge cloud (offered by the offered by the large/medium edge instance 1030, in the form of cryptography-as-a-service 1035). Other applications, functions, functions-as-a-service, or accelerator-as-a-service (e.g., 1031, 1032, 1033, 1034) may be offered by the edge cloud (e.g., with compute 1036), coordinated or distributed among the edge nodes, and the like. Furthermore, in an edge computing architecture, each edge node, VM, container or even bare metal node may be self-describing, self-aware and self-managing in order to create a set of offerings that other nodes can use for-as-a-service models.

In further examples, aspects of software-defined or controlled silicon hardware, and other configurable hardware, may integrate with the applications, functions, and services of FIGS. 10A and 10B, and other scenarios discussed herein. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 11:
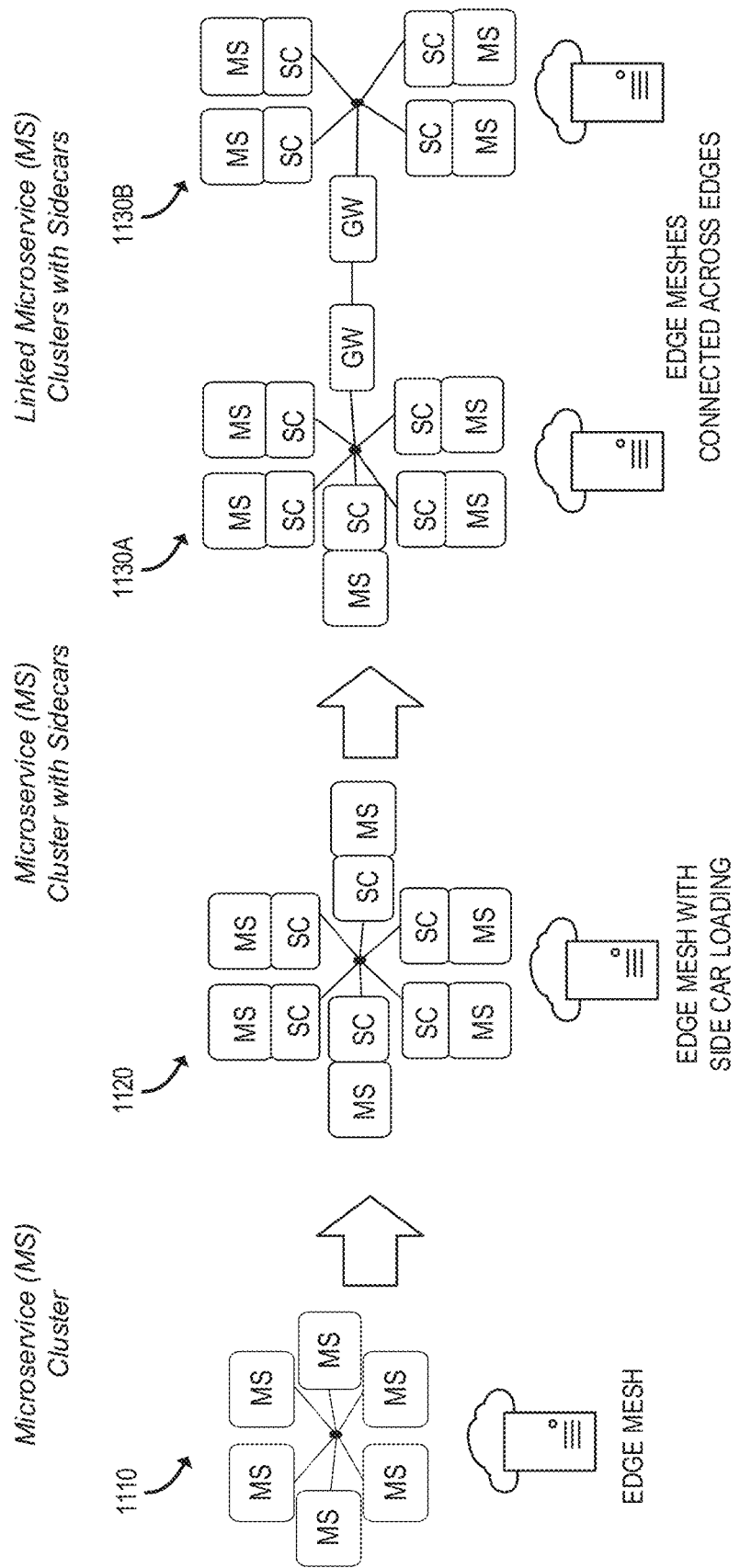
FIG. 11 illustrates configurations for coordinated edge computing among edge meshes which provide an edge computing system.

FIG. 11 illustrates configurations for coordinated edge computing among edge meshes which provide various forms of an edge computing system. A simplest example arrangement 1110 demonstrates an edge mesh. A more advanced arrangement 1120 demonstrates side car loading (with a side car denoted as "SC") used to operate aspects of the edge mesh with microservices (with a microservice denoted as "MS"). A more advanced arrangement demonstrates a first edge mesh 1130A being connected to a second edge mesh 1130B, as connected across edges. Within these environments, a micro-service offered by the edge computing nodes may be treated as a function, while side-cars are functions that support connectivity with other functions.

A valuable feature of a side-car is that it offers an LSM or other security policy enforcement point, with an environment that has a "trusted path" relationship with its paired container environment. The sidecar may also share data and state. Sidecars may not be "trusted" or "trustable" to the same extent that a secure enclave is recognized as a trusted execution environment; however, it is assumed that sidecars are at least as trusted as its paired container. Further, sidecars are often used to broker interactions with external entities because it offers a sandbox environment where different staging and filtering can be applied. This provides functionality similar to an application firewall that is specific to its paired container.

Accordingly, side-cars can provide trusted execution environments for supporting security functions such as cryptographic key generation, storage and usage. Side-cars can also enable security sensitive computations that protect privacy, intellectual property, content or other information assets from less-hardened mesh nodes. Furthermore, side-cars with trusted computing capabilities can attest the microservice configuration to peer microservice and sidecar nodes. A nesting of microservice/sidecar mesh nodes can attest the nesting structure or mesh structure such that a configuration of microservice and sidecar nodes can be evaluated for correct/incorrect structure, connectivity, and topology.

The mesh approach provided in the arrangements 1110, 1120 allows a network (cascade) of functions to exist. For example, a complex program could consist of a top level 'inner loop' that is further several inner-inner loops which may further be composed of inner-inner-inner loops etc. Each nesting of inner loop could be supported by accelerator offload. Thus, many complex or coordinated scenarios may be enabled through these edge computing arrangements.

Figure 12:
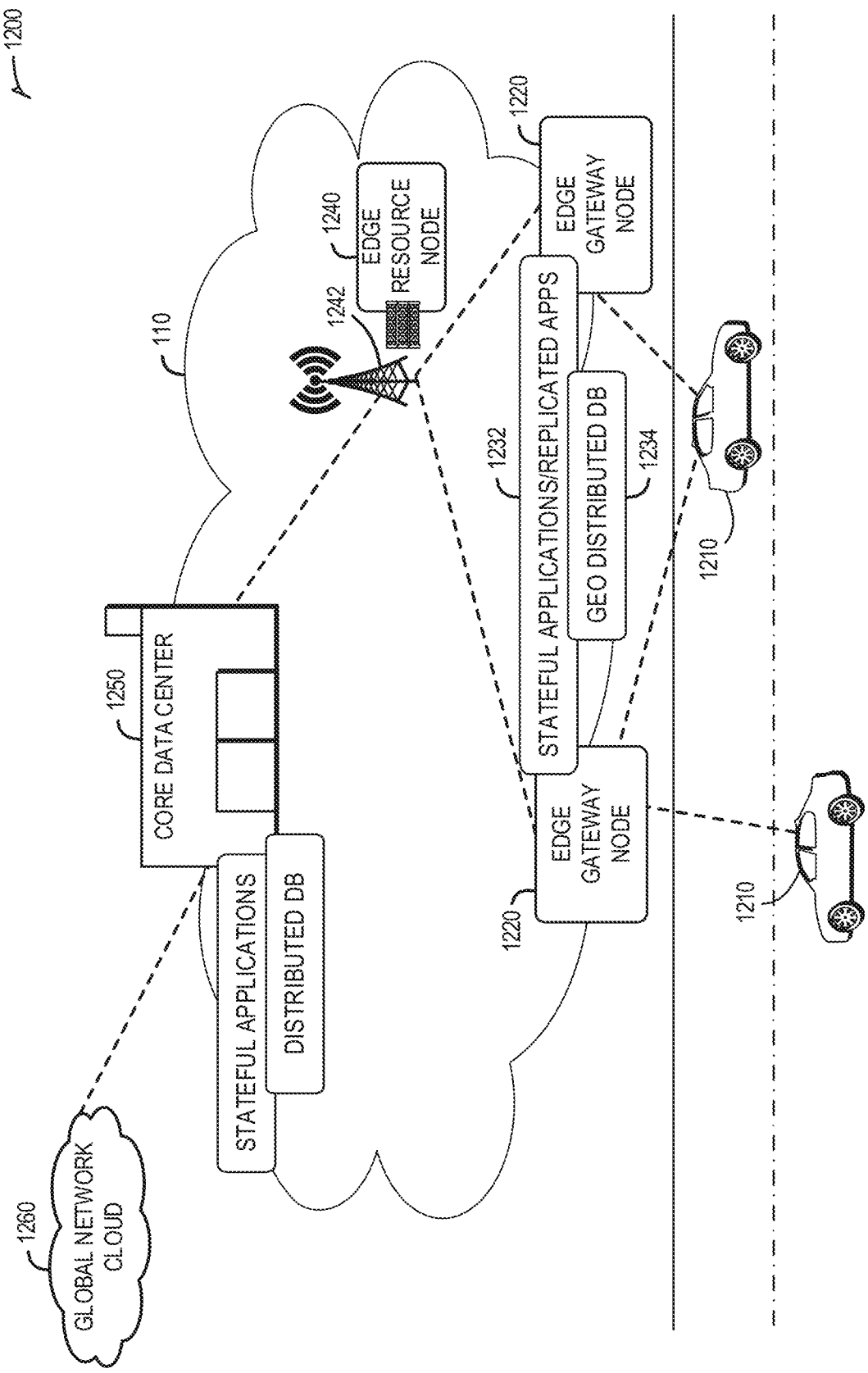
FIG. 12 illustrates a vehicle compute and communication use case involving mobile access to applications in an edge computing system.

It should be appreciated that the edge computing systems and arrangements discussed herein may be applicable in various solutions, services, and/or use cases. As an example, FIG. 12 shows a simplified vehicle compute and communication use case involving mobile access to applications in an edge computing system 1200 that implements an edge cloud 110. In this use case, respective client compute nodes 1210 may be embodied as in-vehicle compute systems (e.g., in-vehicle navigation and/or infotainment systems) located in corresponding vehicles which communicate with the edge gateway nodes 1220 during traversal of a roadway. For instance, the edge gateway nodes 1220 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 1210 and a particular edge gateway device 1220 may propagate so as to maintain a consistent connection and context for the client compute node 1210. Likewise, mobile edge nodes may aggregate at the high priority services or according to the throughput or latency resolution requirements for the underlying service(s) (e.g., in the case of drones). The respective edge gateway devices 1220 include an amount of processing and storage capabilities and, as such, some processing and/or storage of data for the client compute nodes 1210 may be performed on one or more of the edge gateway devices 1220.

The edge gateway devices 1220 may communicate with one or more edge resource nodes 1240, which are illustratively embodied as compute servers, appliances or components located at or in a communication base station 1242 (e.g., a based station of a cellular network). As discussed above, the respective edge resource nodes 1240 include an amount of processing and storage capabilities and, as such, some processing and/or storage of data for the client compute nodes 1210 may be performed on the edge resource node 1240. For example, the processing of data that is less urgent or important may be performed by the edge resource node 1240, while the processing of data that is of a higher urgency or importance may be performed by the edge gateway devices 1220 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 1240 also communicate with the core data center 1250, which may include compute servers, appliances, and/or other components located in a central location (e.g., a central office of a cellular communication network). The core data center 1250 may provide a gateway to the global network cloud 1260 (e.g., the Internet) for the edge cloud 110 operations formed by the edge resource node(s) 1240 and the edge gateway devices 1220. Additionally, in some examples, the core data center 1250 may include an amount of processing and storage capabilities and, as such, some processing and/or storage of data for the client compute devices may be performed on the core data center 1250 (e.g., processing of low urgency or importance, or high complexity).

The edge gateway nodes 1220 or the edge resource nodes 1240 may offer the use of stateful applications 1232 and a geographic distributed database 1234. Although the applications 1232 and database 1234 are illustrated as being horizontally distributed at a layer of the edge cloud, it will be understood that resources, services, or other components of the application may be vertically distributed throughout the edge cloud (including, part of the application executed at the client compute node 1210, other parts at the edge gateway nodes 1220 or the edge resource nodes 1240, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further examples, FIG. 12 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 1220, some others at the edge resource node 1240, and others in the core data center 1250 or global network cloud 1260.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

In further configurations, aspects of orchestration may be implemented in the edge computing system through service aspects of a "Orchestration as a Service (OaaS)" deployment, enabling stakeholder decentralization among many aspects of edge orchestration and multi-tenancy. In an example, an edge computing system tenant discovers OaaS providers as part of an SLA creation process (enabled as part of a bootstrap capability, a configuration wizard, a storefront, etc.). The technical capabilities needed to support the discovery and use of may be baked into respective devices by a manufacturer, and an "onboarding"-type procedure may occur with each OaaS that the tenant selects and utilizes within the edge computing system. Furthermore, during an SLA creation process, the OaaS provider may separate what resources, requirements or features are requested versus available from the pool and create a separate service request for the enablement/activation or subscription to certain features/functions in order to utilize the resource.

Various types of hardware improvements and configurations may be implemented within edge computing devices to support OaaS. For example, hardware capabilities may pre-provision OaaS trust anchors, or provide information to enable a hardware manufacturer to act as a trusted clearing house for brokering OaaS introductions. Other types of software and service improvements and configurations suggested herein may also be implemented within the edge computing system to support features of OaaS.

B. Workload Distribution and Management

Figure 13:
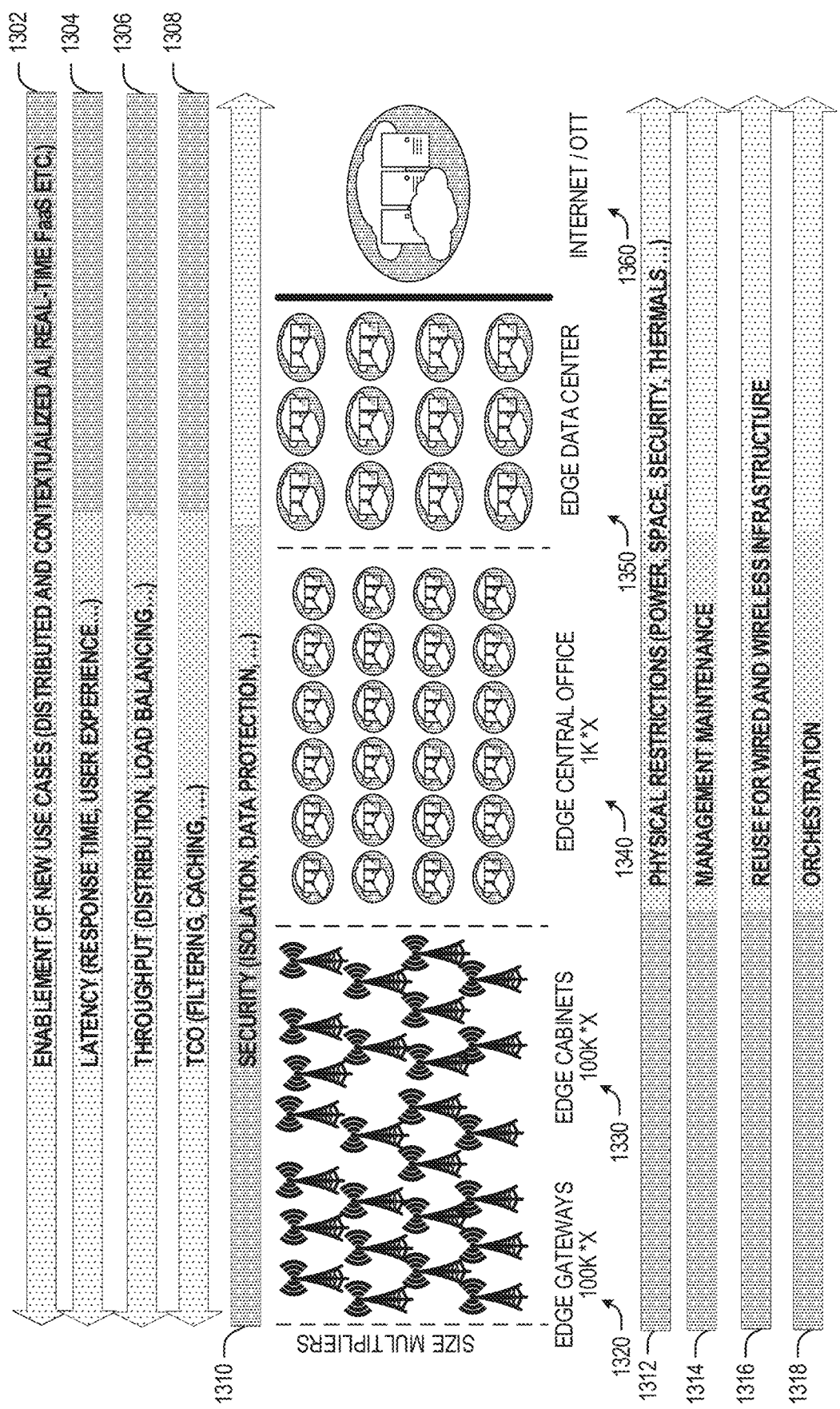
FIG. 13 illustrates a comparison of operational considerations for edge computing among operational network layers.

FIG. 13 illustrates a comparison of operational considerations for edge computing among operational network layers. Specifically, FIG. 13 illustrates the degrees and types of tradeoffs experienced among different compute processing locations. At the different layers of the network (e.g., detailing equipment located among the network access layer 220 and core network layer 230 of FIG. 2), such as among edge gateways 1320 (e.g., base stations, access points) and edge cabinets 1330 (e.g., street or roadside cabinets, on-premise cabinets) of a near-device edge cloud, a point of aggregation at a central office 1340, a point of aggregation at a data center 1350, or a cloud data center at an internet or over-the-top service 1360, various service properties 1302-1318 are increased or decreased. When moving closer to the edge endpoints, an increase may be experienced in the enablement of new use cases 1302 (e.g., distributed and contextualized AI, real-time FaaS), reduced latency 1304 (e.g., reduced response time, faster user experience), increased throughput 1306 (e.g., coordinated distribution, load balancing, etc.), reduced total monetary cost of ownership and traffic 1308 (e.g., via improved endpoint or edge filtering, caching, etc.). However, as moving closer to the cloud data center, an improvement may be found in security 1310 (e.g., via improved isolation, data protection), decreased physical restrictions 1312 (e.g., power, space, security, and thermal constraints), reduced management maintenance 1314, reuse capabilities for wired and wireless infrastructure 1316, and more complex orchestration 1318.

Figure 14:
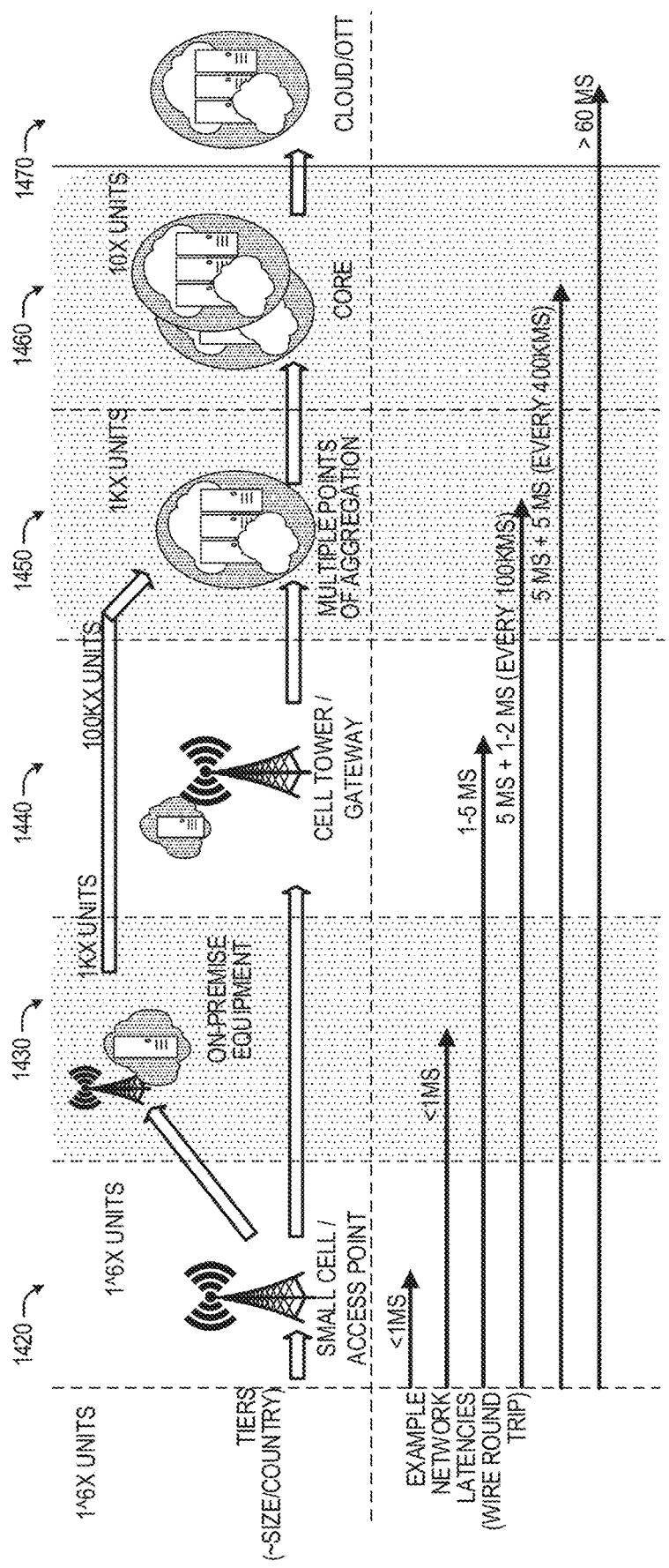
FIG. 14 illustrates deployments and latencies for edge computing among operational network layers.

These tradeoffs are magnified by characteristics of mobility and different types of communication networks. FIG. 14 illustrates operational deployments and latencies for edge computing among operational network layers, in a cellular (mobile) wireless network. Specifically, FIG. 14 illustrates an example of network latency occurring to respective mobile network layers 1420-1470 in an example country deployment, providing an example of round trip timings to a local layer 1420 (e.g., typically less than one ms to a small cell base station or access point, which may be considered a "local" or "close edge" layer), an on-premise layer 1430 (e.g., having on-premise equipment or cloudlets/edgelets, typically also under one ms, also which may be considered an "enterprise edge", "local edge" or "close edge" layer), a base station layer 1440 (e.g., having a cell tower base station or other wireless network gateway, typically between 1-5 ms, which may be considered a "near edge" layer), an aggregation layer 1450 (e.g., having multiple aggregation servers or locations, typically between 5 ms plus 1-2 ms added for every 100 kilometers (KMs) of distance, which may be considered a "middle edge" layer), a core network layer 1460 (e.g., having multiple core network servers or locations, typically between 5 ms plus 5 ms added for every 400 KMs of distance, based on currently used telecommunications technologies, which may be considered a "far edge" layer); and a cloud layer 1470 (e.g., having one or more cloud processing locations, typically exceeding 60 ms). Such latency times are provided for purposes of illustration only and may vary depending on the type of communication technology involved (although limited by the speed of light). The deployment of an edge cloud system (e.g., an implementation of edge cloud 110) is discussed below with reference to layers 1420-1450.

Endpoint devices being used by the end user or accessible via the nearby local layer 1420 may be considered as the "far edge" devices. Devices in this scenario may provide the lowest latency possible. However, at some point, far edge devices may become compute limited or may not be power efficient as needed to perform a given task. For instance, at some point of network traffic load, AR/VR use cases will experience severe degradation (even to the point of providing a worse performance than executing the workload only at the far edge on the device itself).

On premise computing at the on-premise layer 1430 (which may also be known as an enterprise edge layer) is a next potential tier of a low-latency network edge architecture. On premise refers to a location (typically within the customer premises) that may be able to host a certain amount of compute (from a small form factor rack to multiple racks). Such on-premise compute platforms may be owned and operated by the enterprise, cloud service provider, or a communications service provider.

Computing at a base station in the base station layer 1440 (which may also be known as a near or close edge layer) may aggregate multiple antennas, which in many cases may be hosted as a first potential edge from a Communication Service Provider perspective. Base stations may run virtual radio access network (e.g., vRAN) type of workloads to process 5G radio traffic. The main design challenges to run other services on the base station relate to: (1) limited space; (2) physical exposure that requires more security and better thermal solutions; (3) limited amount of power; (4) operating expense (OPEX) or total monetary cost of ownership (TCO) derived from managing such a highly distributed compute environment. Having outlined the challenges of deploying services on the base station, it is important to emphasize that they are one of the unique points in the infrastructure that can still provide sub millisecond latencies.

Computing at a central office (CO) in the aggregation layer 1450 (which may also be known as a middle edge layer or a far edge layer depending on distance and latency) may serve as an aggregation point of multiple base stations within a local area. For instance, one CO may aggregate traffic from around 30 base stations. This number may vary depending on the country and population density. These central offices may then link to regional points of presence (POPs) (e.g., with wired, including optical, links) before connecting to a regional switch site. The CO may also bring together wireless and wireline services. The latencies to reach a CO satisfy many edge use cases (e.g., power, space, ease of management) which may make them a desirable location to place edge services. Central office or switching sites may also aggregate multiple central office connections.

Figure 15:
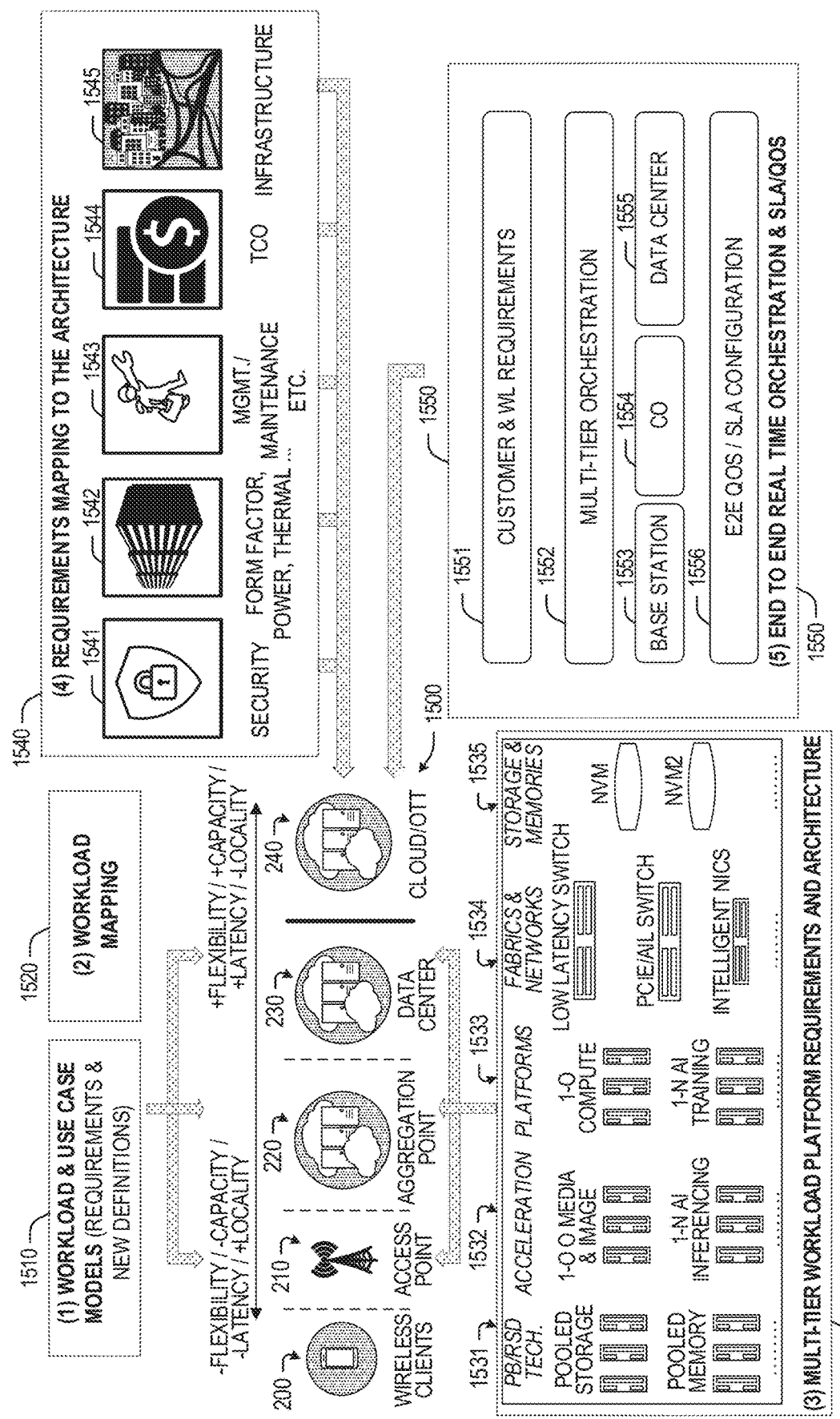
FIG. 15 illustrates workload deployments and mapping to operational layers of an edge computing system.

FIG. 15 illustrates workload deployments and mapping to operational layers (e.g., corresponding to layers 1420-1470) of an edge computing system 1500. Within this arrangement, multiple considerations and capabilities are evaluated for the location and type of workload execution among devices of the edge computing system 1500, as various coordination is performed to bring the compute resources to the workload data, and bring the workload data to the compute resources. These considerations may include:

(1) Choosing the right platform architecture, rack design, or other hardware features or configurations, for short-term and long term usage (in addition to conducting an appropriate mapping of the services and workloads) depending on the restrictions of each of the locations (e.g., power, space, and platform security). Different options may be mapped to different architecture configurations.

(2) Determining what requirements originate from network or service operators will shape the architecture. This may indicate a platform architecture that satisfies operator requirements (e.g., capital expense vs. operating expense, form factors, security, and QoS).

(3) Determining the correct software architecture to manage, monitor and orchestrate the edge computing architecture. Without the right interfaces to orchestrate, complex distributed scenarios cloud architectures will not work. Furthermore, exposing appropriate abstractions and interfaces to the services to access to the hardware resources underneath is at the same level of criticality.

Based on these and other determinations, various workloads and use case models 1510 may be first mapped among locations of the edge computing system 1500 according to workload mapping definitions 1520. Such workload mapping definitions 1520 may identify platform requirements and architecture elements 1530 (e.g., storage or rack scale design technologies 1531, acceleration 1532, platforms 1533, fabrics or networks 1534, storage or memory 1535) that can be deployed among the edge computing system 1500. Further, the workload mapping definitions 1520 may be based on requirements mapping 1540 addressing aspects such as security 1541, physical constraints 1542, management 1543, cost (e.g., monetary, resource, or other property costs) 1544, infrastructure restrictions and capabilities 1545, and the like.

Further, the end-to-end considerations of the edge computing system 1500 may include evaluation of real time orchestration, service-level agreement (SLA), and QoS characteristics, as provided in definitions 1550 (e.g., definitions for customer and workload requirements 1551, definitions for multi-tier orchestration 1552, definitions for base station, central office, and data center locations 1553, 1554, 1555), or definitions for E2E QoS or SLA configurations 1556. These definitions 1550 may be used to select the platform requirements and architecture elements 1530, rank or prioritize requirements mapping 1540, and ultimately change the workload mapping 1520. These considerations, recorded in the definitions 1550 or elsewhere, may reflect the following features:

1) Latency, used to provide a first key performance indicator (KPI) with a significant role in edge service location. Since the speed of light is approximately 300,000 km/s and transmission on the wire is ~⅔ of that a required response latency will determine how far from a device may be from the edge. For example, if some services require response latency of less than 4 ms they cannot be further than ~150 kms from the device. Thus, for some of the workloads (e.g., IoT device data processing) the unique edge definition may be only consumed by a base station, whereas others may be consumed by a central office.

2) Data Privacy, sovereignty and sensitivity, used to determine compliance and verify operability. These considerations may dictate that some of the services can only reside on certain locations of the edge. For example, in the healthcare segment, some hospitals may want to host and share some services on the edge cloud but without having the data crossing certain boundaries of the infrastructure (e.g., equipment on premise, central office etc.).

3) Reduction in backhaul traffic. Backhaul traffic data savings may be achieved by filtering traffic at the different edges of the network in order to reduce OPEX/TCO (as well as CAPEX as smaller bandwidth may be required on the backhaul network). In this case, filtering may happen at any of the different potential edges of the infrastructure. For example, video surveillance can be processed in the base station to identify what images are to be sent to the cloud or to the central office while the content delivery network may be placed into the central office.

4) Enabling of new edge processing use cases: For example, a service on the edge that allows biometry authentication. Or, a service which enables payment to be done real-time via voice analysis as long as the reliability requirements are met.

5) Definition and use of resource level trust, which allows for the authorization for access to capabilities across platforms and resources.

Defining where the actual edge resides for a particular use case or workload is directly related to the KPI or value proposition that a particular location provides to it. For example, defining edge compute for execution of an IoT or AR/VR workload in the core of an operator infrastructure might be impossible to satisfy KPI requirements in terms of latency. Thus, the edge compute for this workload is located closer to the device (in the base station or a more local central office, in a near or middle edge layer). On the other hand, edge compute for a content distribution network (CDN) (also known as a "content delivery network" or a "content defined network") workload may be located at a base station, central office or any other intermediate point of aggregation (POA or POP) of the operator infrastructure (in a middle or far edge layer). In this case, to define what is the most suitable edge location, the associated OPEX/TCO may derive what is the best location for placing the CDN workload.

Figure 16:
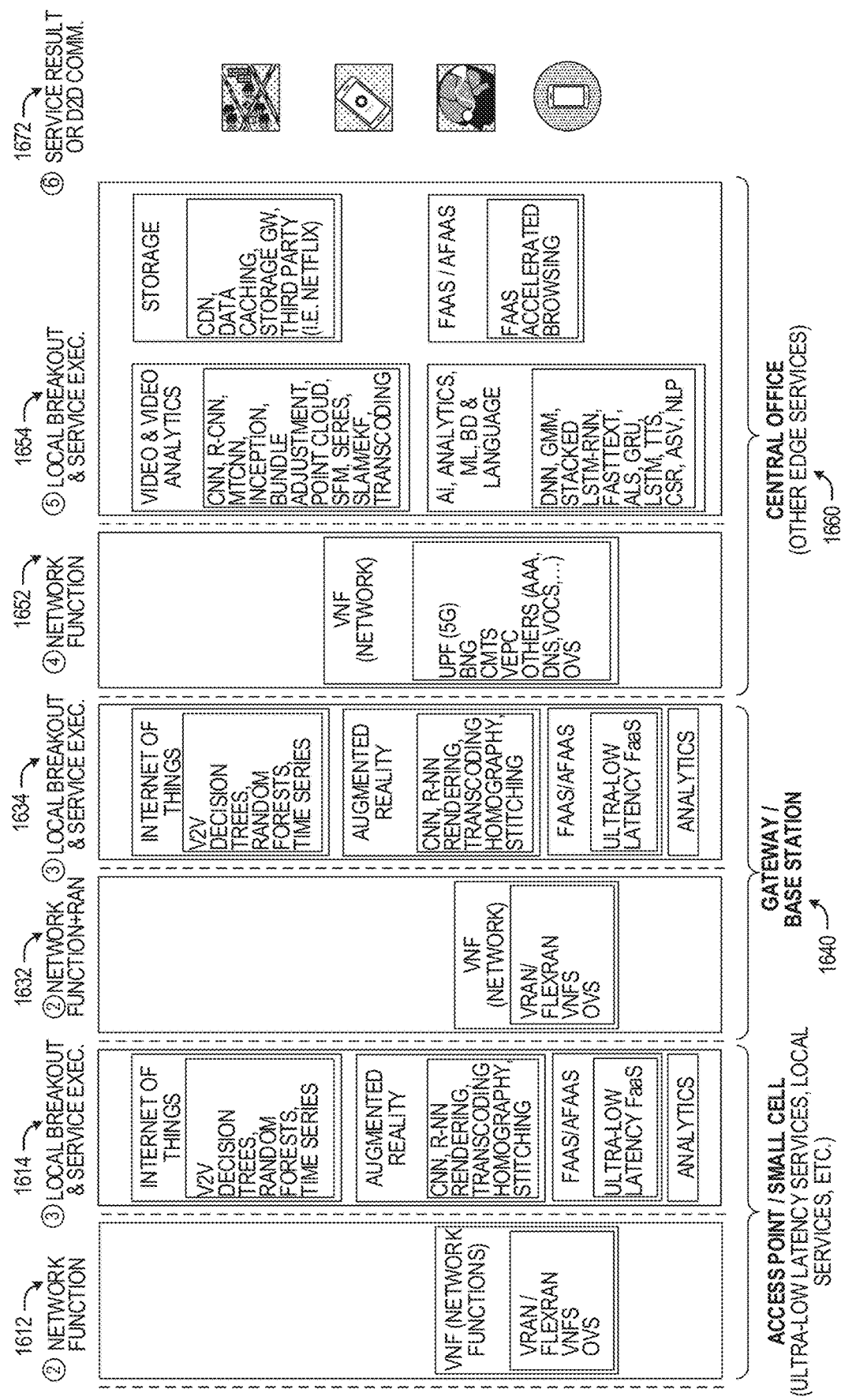
FIG. 16 illustrates workload type mapping to service features of an edge computing system.

In further examples, advanced forms of workload mapping may be used in an edge computing system to map specific forms of compute activities to specific locations and systems (or types of systems and location capabilities, to more efficiently bring the workload data to available compute resources). FIG. 16 illustrates workload type mapping to service features of an edge computing system, having a access point or small cell 1620, gateway or base station 1640, and central office 1660, each with respective capabilities.

With the use of compute at a small cell 1620, a combination of network functions 1612 and services 1614 may be offered, with an emphasis of execution of local or ultra-low latency services (e.g., augmented reality, IoT, FaaS) to produce a service result 1672. With the use of compute at a base station 1640, a similar combination of network functions 1632 and services 1634 may be offered; the amount of available hardware processing resources at the base station 1640 increases even as the amount and complexity of the of network functions increase. With the use of compute at a central office 1660 (or other aggregation location), deeper layer network functions 1652 may be offered, complimentary to services 1654 (e.g., video analytics, storage, analytics, FaaS) requiring additional compute resources not available at the access point/small cell 1620 or gateway/base station 1640.

Some of the considerations of the location and type of hardware, which is distributed throughout the edge locations 1620, 1640, 1660 and like subsystems may include:

(1) Where the workloads and use cases are mapped. This decision can be performed using different criteria or value propositions discussed herein. Once the mapping is done, the different use cases or workloads need to be broken in foundational blocks or basic blocks. A basic block can be defined by an algorithmic logic unit (for example a Deep Neural Network or a Fast Fourier Transform). Once the mapping and division of basic blocks is done at different tiers of the edge, the specific blocks for improvement may be identified at a given location. Hence, their resource requirements can be used to estimate how much resources are needed in that particular location.

(2) The characteristics of each location. As discussed earlier the location (e.g., base station) respectively has a list of physical requirements (e.g.: form factor, power, temperature etc.) as well as a number of expected subscribers (e.g.: in a base station the range can be from 1 to 4 K of subscribers). Physical requirements translate to how much resources can be placed at a given location and the subscribers translate on how much compute is need for a particular workload mapping and mount of subscribers. Accordingly, these and other factors may be important when deploying edge computing processing resources at infrastructure locations (e.g., small cells, base station, COs).

A relevant design point for these and other edge computing scenarios is that, especially in multi-tenancy and multi-stakeholder use cases, networking infrastructure services cannot "starve" or fail, and need to stay remain unimpacted by ongoing applications and services. Network traffic and network function workloads may need to remain deterministic, and as such, the design of the edge cloud architecture may be focused on high priority use cases such as VNF and network services.

Figure 17:
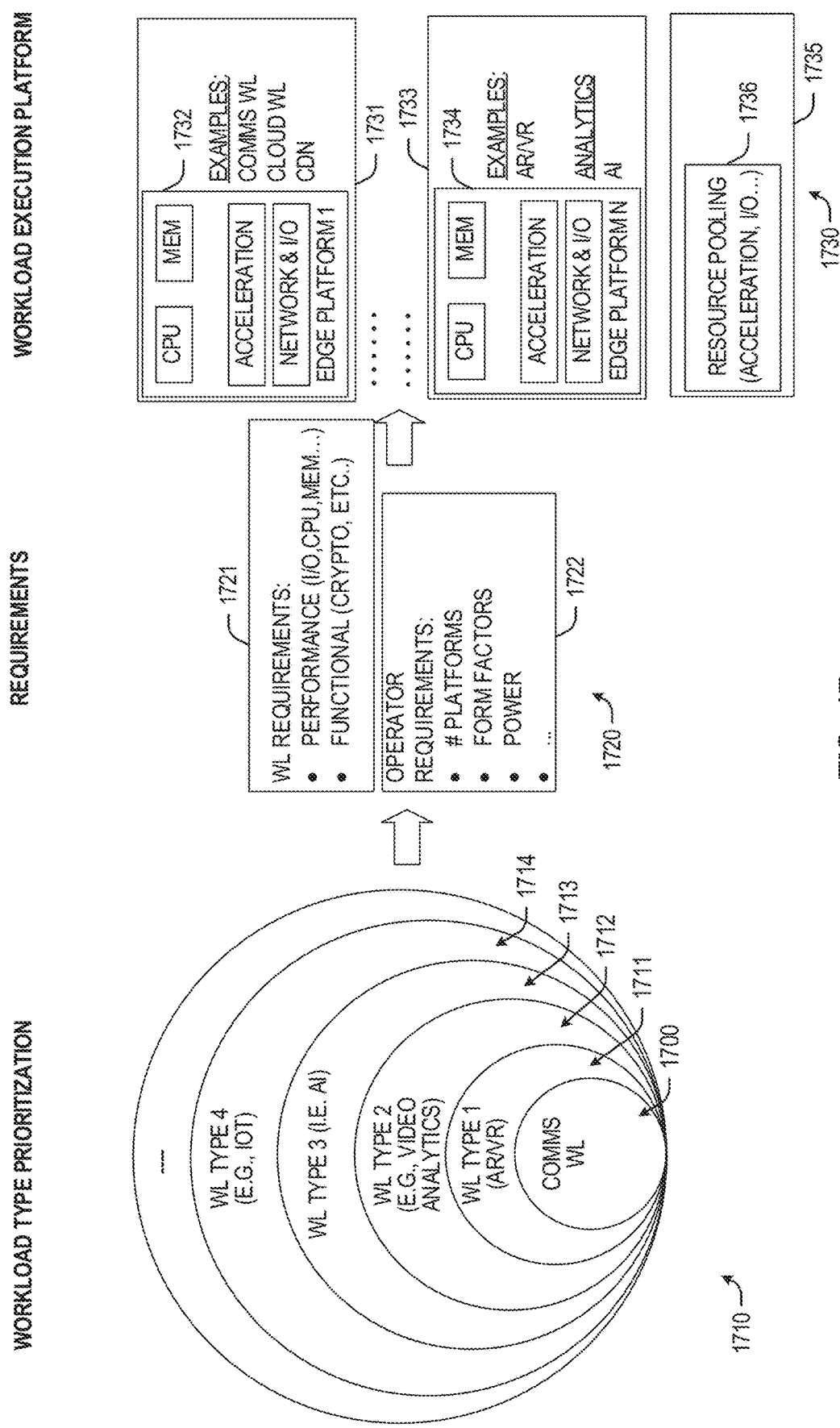
FIG. 17 illustrates workload type mapping to execution platforms in an edge computing system.

FIG. 17 illustrates workload type mapping to execution platforms in an edge computing system. As shown, a set of workload types 1710 (represented as types 1700, 1711, 1712, 1713, 1714) progressively advance from a type classification indicating lowest priority and latency requirements of the workload (e.g., for IoT data processing) to a type classification indicating highest priority and latency requirements of the workload (e.g., for network communication functions) with intermediate type classifications (e.g., for AI workloads, video analytics workloads. AR/VR workloads). These workload types 1710 may be orchestrated in a multi-stakeholder, multi-tenant edge system according to the type classification.

The respective type classifications may be associated with sets of requirements 1720, which may specify workload requirements 1721 for the particular classification (e.g., performance requirements, functional requirements), as compared with operator requirements or constraints 1722 (available number of platforms, form factors, power, etc.). As result of the requirements 1720 for the invoked workload(s), a selection may be made for a particular configuration of a workload execution platform 1730. The configuration for the workload execution platform 1730 (e.g., configurations 1731, 1733, 1735, provided from hardware 1732, 1734, 1736) may be selected by identifying an execution platform from among multiple edge nodes (e.g., platforms 1 to N); by reconfiguring an execution platform within a configurable rack scale design system; or by reconfiguring an execution platform through pooling or combining resources from one or multiple platforms.

In addition to requirements and constraints provided from the mapping of workload types, other measurements or indicators may be used to select or configure an edge execution platform. For instance, mapping of services on a particular execution platform may consider: KPI performance benefits or user experience benefits (e.g., what latency is required to provide a good user experience for 360-degree video); OPEX/TCO (e.g., derived from placing a service into a particular location versus the expected monetization); SLA and service level objective (SLO) definitions; and the like. These considerations are balanced with operator concerns to manage the potential high cost of management (e.g., high monetary or high resource cost) among a distributed ecosystem and disparate hardware locations.

Figure 18:
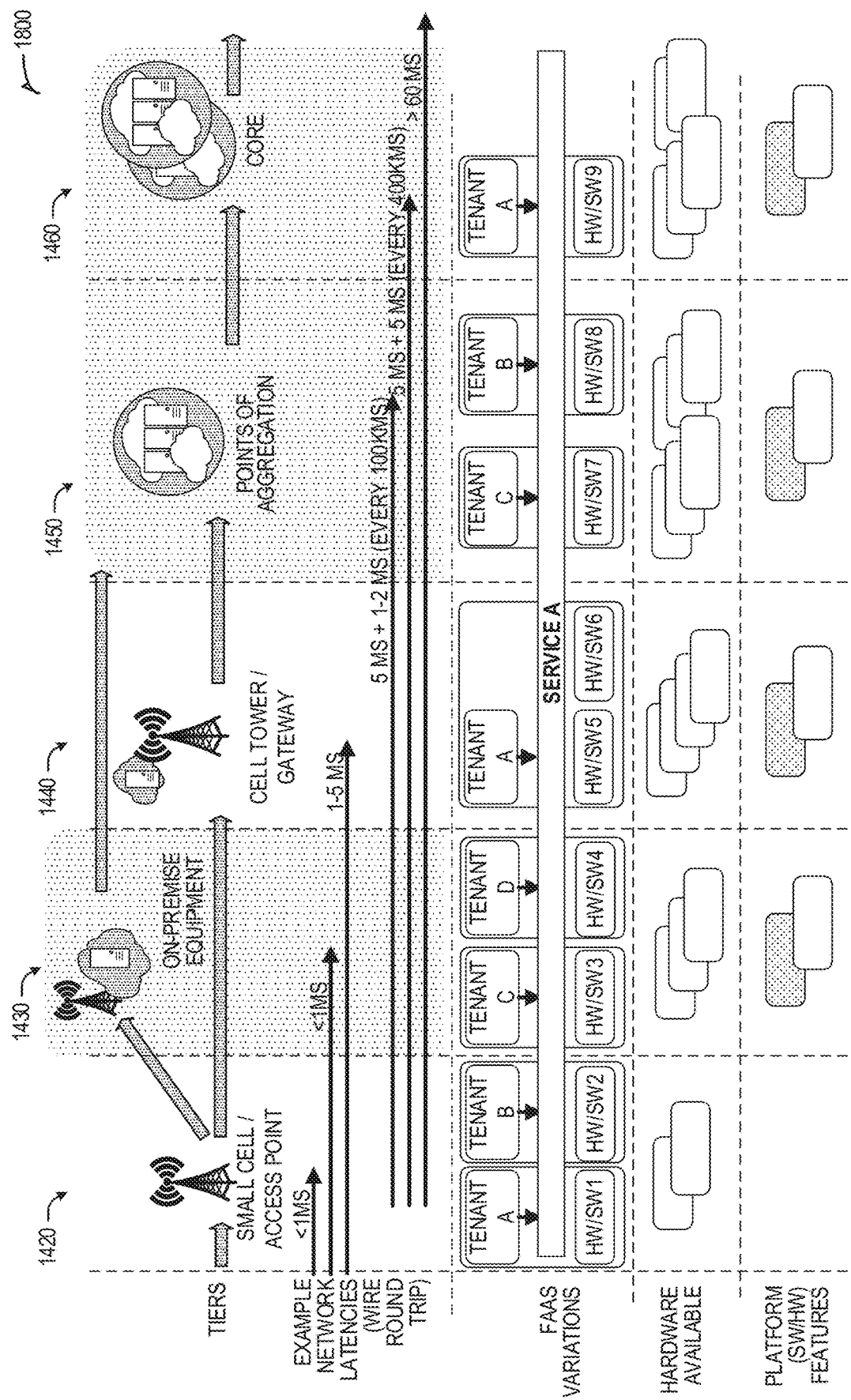
FIG. 18 illustrates operation of a service for multiple tenants among multiple layers of edge computing hardware configurations in an edge computing system.

FIG. 18 illustrates operation of a service for multiple tenants among multiple layers of edge computing hardware configurations in an edge computing system 1800. At the various operational layers (e.g., corresponding to layers 1420-1470) of the edge computing system 1800, different combinations of hardware availability and platform features are exposed. For instance, a small cell operating at a local layer 1420 may have limited hardware (e.g., low-power CPUs) with limited or no specialized platform features (software or hardware features). An on-premise cloudlet/edgelet/or other applet machine operating at the on-premise layer 1430 may host additional or more powerful hardware and offer software or hardware features (e.g., AI accelerators, FPGAs, GPUs, cryptography services, etc.). The base station layer 1440 may have even more hardware capabilities (e.g., high-powered CPUs or specialized compute architecture processing units) or more advanced platform features (advanced storage memory); more advanced combinations of hardware and platform features (including smart networking components) may be provided at the aggregation layer 1450 and the core network layer 1460.

The different types of hardware capabilities and features shown in system 1800 may enable multiple edge FaaS variations. Specifically, although a particular service or service platform ("Service A") may be virtually offered for use or execution at any of the layers 1420-1460, the different combinations of hardware and software among the layers enable different processing results or actions. Further, different combinations of hardware and software (or, capabilities of such hardware and software) may be offered for service use or execution based on the particular tenant or user. In this context, the service execution/runtime can be an LSM or other security policy enforcement point. (Likewise, in this context, hardware abstraction layers underneath the service layer and platform capabilities that allow physical partitioning or virtualization can provide LSM and other security policy enforcement points as well).

From an application point of view, there may be applications specifically designed for edge networking (such as where components of the application would be running in the cloud, with individual processing components at the edges in the edge cloud, such as along hierarchical edges). Thus, the approach depicted in system 1800 may support multiple variations of FaaS, such as ultra-low latency FaaS vs. FaaS, as part of the same or different application.

Figure 19:
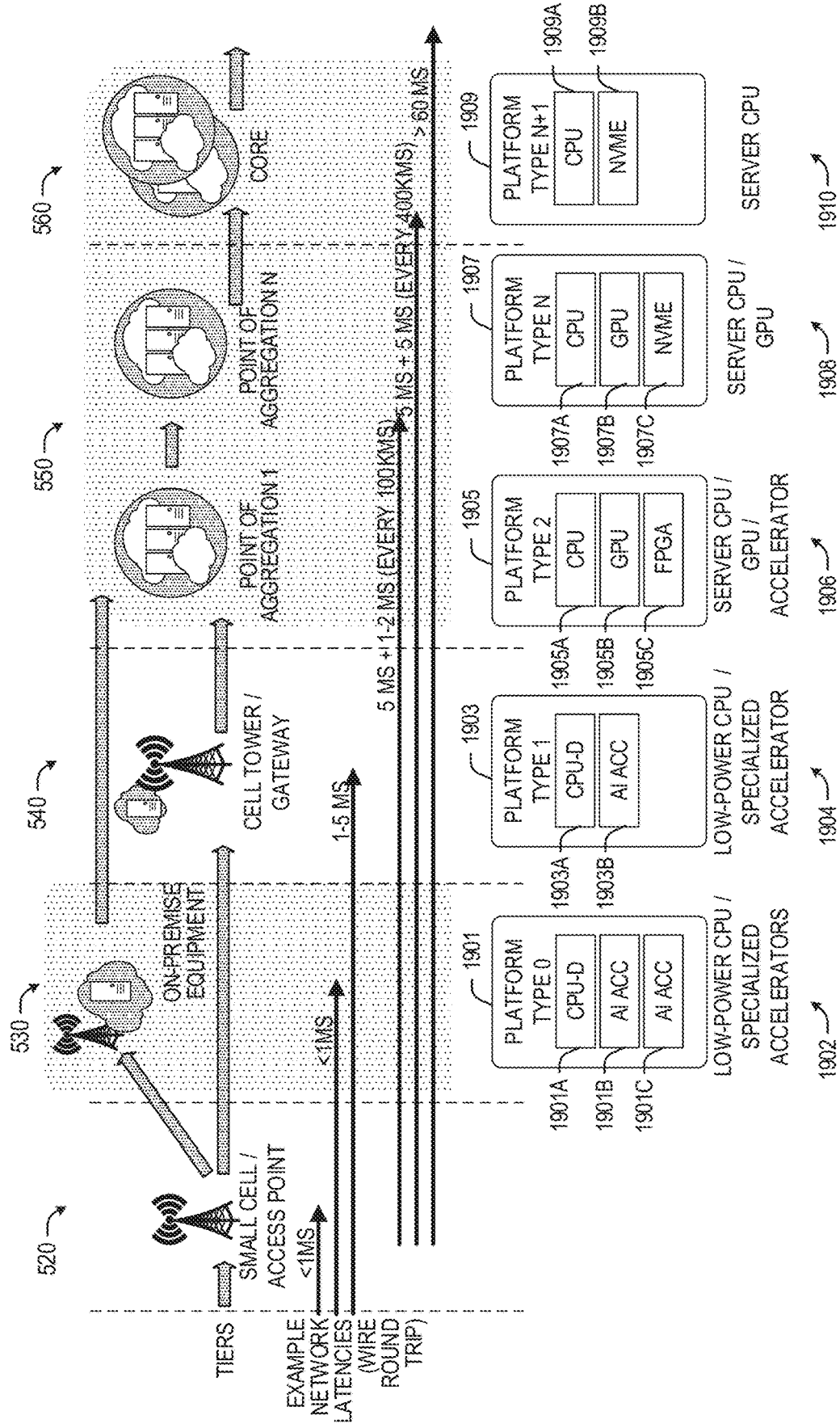
FIG. 19 illustrates further mapping of edge computing hardware configurations to operational deployments and latencies in network layers.

FIG. 19 illustrates a further mapping of edge computing hardware configurations to operational deployments and latencies in network layers, based on a mapping of hardware platforms 1902-1908 (and platform types 1901-1909) to various layers 1430-1450 of the edge cloud and beyond (extending the operational network layer examples discussed above for FIG. 4). For instance, at layer 1430, a combination of low-powered CPUs with multiple specialized accelerators (hardware 1902) may provide a first platform type suitable for execution of on-premise services (e.g., cloudlets/edgelets/or other applets requiring extremely low latency, under a millisecond). At layer 1440, a similar combination of low-powered CPUs with a specialized accelerator (hardware 1904) may provide a second platform type suitable for low-power execution of services for multiple types of devices (e.g., requiring low latency under 5 ms). Deeper into the network, a combination of server-class CPUs with specialized GPUs and accelerators (hardware 1906) or storage (hardware 1908) may be provided at the aggregation layer 1450. Finally, beyond the edge cloud, multi-core server CPUs and storage (hardware 1910) may be provided at the core network layer 1460 to enable the availability of server-class (cloud) processing but with the tradeoff of higher latencies. It will be understood that in some scenarios, the hardware platforms or configurations may operate on a modifiable platform, such as to enable the use of swappable or interchangeable hardware components at different layers of the edge cloud. In this manner, a service provider or hardware system operator may be able to upgrade the deployment of the edge system with newer/more powerful hardware (or, more cost-effective hardware), while being able to service edge workloads at the required network latencies.

Figure 20:
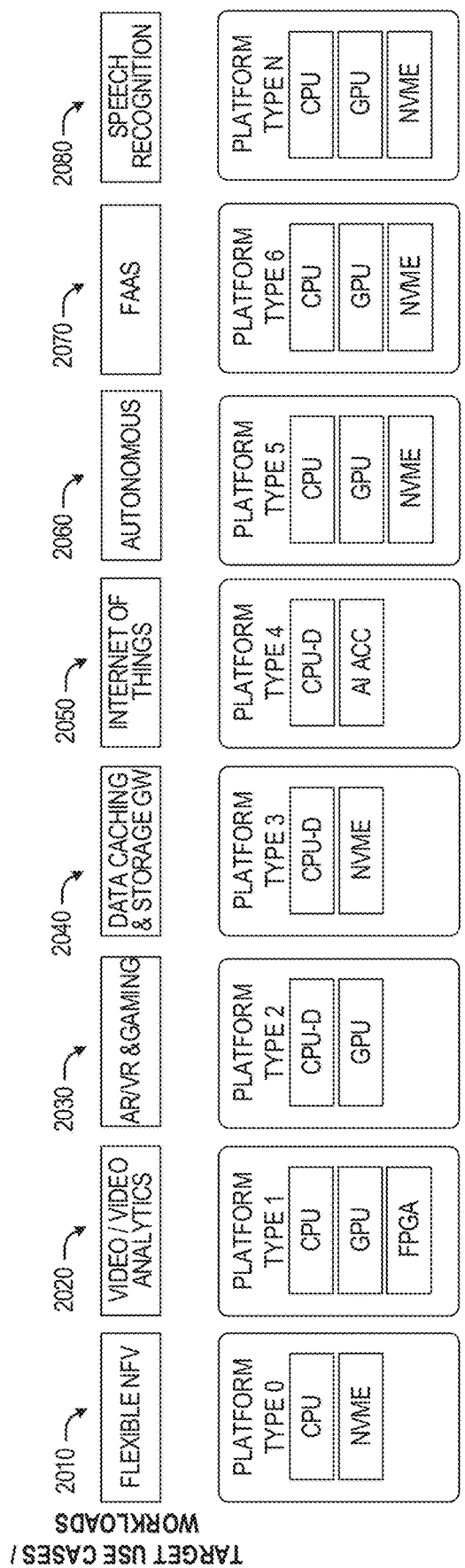
FIG. 20 illustrates further mapping of use cases and workloads to operational deployments of edge computing hardware configurations.

FIG. 20 illustrates further mapping of use cases and workloads to operational deployments of edge computing hardware configurations. Specifically, FIG. 20 shows how different workloads relevant to the edge cloud, each with varying requirements, applications and value propositions, may be deployed by service providers.

The various types of use cases and workloads may be mapped to different platform types, based on the selection or reconfiguration of hardware configurations. For example a flexible NFV workload 2010 may be mapped to a first platform type providing CPU and storage resources; a video processing or video analytics workload 2020 may be mapped to a second platform type providing low-power CPU and specialized GPU and FPGA processing; AR/VR and gaming workloads 2030 may be mapped to a third platform type providing CPU and storage resources; data caching and storage gateway workloads 2040 may be mapped to a fourth platform type providing low-power CPU and storage resources; internet of things processing 2050 may be mapped to a fifth platform type providing low-power CPU and A acceleration resources; autonomous vehicle workloads 2060 and function-as-a-service workloads 2070 may be mapped to sixth and seventh platform types providing CPU, storage, and specialized GPU processing resources; speech recognition workloads 2080 may be mapped to an Nth platform type having CPU and storage resources, and specialized GPU processing; etc.

Different locations therefore may be usable across the edge cloud 110 to perform services management, as both compute resources are mapped to the workload data, and workload data instances are mapped to the compute resources. In a highly distributed architecture, the features are based on mapping services on the base station. In this case, the platform physical requirements in terms of power and space will mostly limit the amount of hardware that can be placed in this particular edge node. Furthermore, in order to get more service density, acceleration schemes such as hardware inference acceleration may be utilized. In a central office architecture, the architecture is less distributed, but less power and space constrained, according to the capabilities and servicing location of the central office. In this case, with fewer space and power constraints, the architectural solution can be more homogenous at the cost of sacrificing some degree of performance or service density.

It should be understood that initial workload mapping may not be effective for runtime activities during the lifecycle of the workload or in the construct of a workflow. Additional services that should be enabled are the workload assessment as a service, which can provide the assessment and reallocation of a workload based on over time characterization of the workload. Based on this, as suggested by the examples below, a workload may be migrated to another location or another hardware or system configuration in order to support the workload needs.

In further examples, various types of distribution, upgrade, and change architectures may be implemented to support software (and firmware and hardware feature) updates to implement workloads and edge computing services generally. Normally, a vendor of a computing platform is responsible for producing feature changes or security patches that apply to deployed platforms. A vendor typically does not enable other supply chain entities to develop firmware updates and/or allow another entity to apply them. This scenario may also apply in edge computing environments, although a distributed computing environment may enable new software distribution and upgrade dynamics. When a workload is dissected and distributed across a 'slice' or 'flavor' of resources spanning multiple platforms and therefore multiple administrators and vendors, considerations may be made on whether the user and orchestrator have enough control over which versions of what software/firmware.

In an example, a workload may be validated or simulated on a particular configuration and deployment 'flavor' where the simulation outcome may exhaustively depend on the firmware, software and other configuration parameters. In some cases, the security vulnerabilities in hardware, firmware, and software also predict how the workload execution behaves. However, if the environment used to validate and/or simulate the workload execution differs from the actual environment that executes it, then that differential represents added risk.

An edge computing ecosystem may be optimized for minimizing risk differential as a way to manage software, firmware, and hardware feature updates. A three phased approach to workload deployment can be utilized: (1) Setup a workload validation environment that identifies the execution environment dependencies. This considers which software models are required to process the workload application. This dependency graph is identified as part of a validation environment setup. Additionally, excess functionality presents an increased attack surface that adds runtime execution risk. These non-dependencies can be removed from the validation environment. (2) The simulation creates the actual environment needed to process the workload. It could involve use of simulated hardware, virtualization or simulated performance scenarios. The workload executes with an expectation of interacting with other workloads, orchestration, users, collaborations etc. The simulation ensures the operational corner cases are exposed. The simulation may also specify which versions of hardware, software, and firmware are used. These may be actual hardware, software, and firmware resources to better understand expected actual behavior. (3) The simulation environment is reproduced in a real-world deployment. The version of hardware, software, and firmware are adjusted appropriately. Possibly, this implies moving to a backward revision or passing over backward revisions to find and allocate resources according to the simulation defined environment. This may also involve removal of hardware, software, and firmware that isn't used by the workload.

C. Hardware Components

Figure 21A:
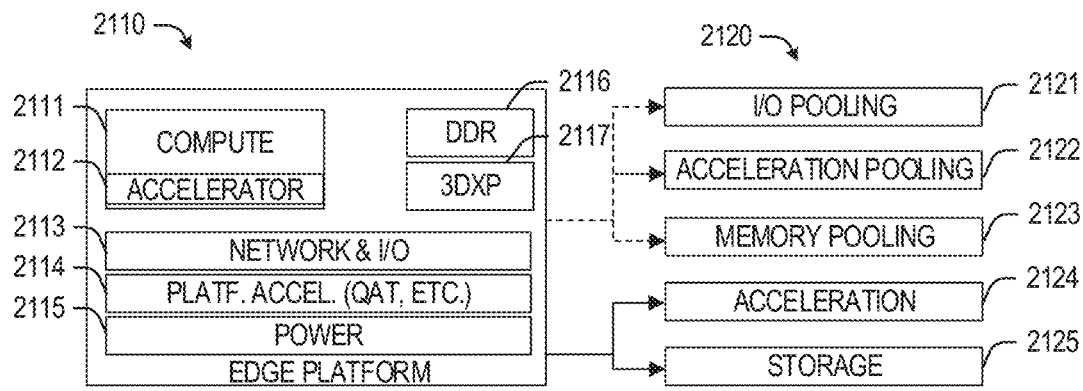
FIGS. 21A to 21C illustrates further examples of edge computing hardware configurations, based on operational objectives.

FIG. 21A illustrates a first edge computing hardware configuration, which maps various architectural aspects of an edge platform 2110 (e.g., compute hardware 2111 and 2112, network features 2113, platform acceleration features 2114, power management features 2115, memory 2116, storage 2117, etc.) to specific edge platform capabilities 2120 (e.g., I/O pooling 2121, acceleration pooling 2122, memory pooling 2123, acceleration technologies 2124, storage capabilities 2125). To offer the edge cloud configuration as an overall solution for services, then the workloads or basic hardware components for services and service requirements/constraints (e.g., network and I/O, platform acceleration, power) are considered in light of available architectural aspects (e.g., pooling, storage, etc.).

Within the edge platform capabilities 2120, specific acceleration types may be configured or identified within features in order to ensure service density is satisfied across the edge cloud. Specifically, four primary acceleration types may be deployed in an edge cloud configuration: (1) General Acceleration (e.g., FPGAs) to implement basic blocks such as a Fast Fourier transform (FFT), k-nearest neighbors algorithm (KNN) and machine learning workloads; (2) Image, Video and transcoding accelerators: (3) Inferencing accelerators: (4) Crypto and compression related workloads (implemented such as in Intel® QuickAssist™ technology). Thus, the particular design or configuration of the edge platform capabilities 2120 (e.g., with general acceleration 2141, inferencing acceleration 2142, storage 2143) can consider which is the right type of acceleration and platform product models that needs to be selected in order to accommodate the service and throughput density as well as available power.

Figure 21B:
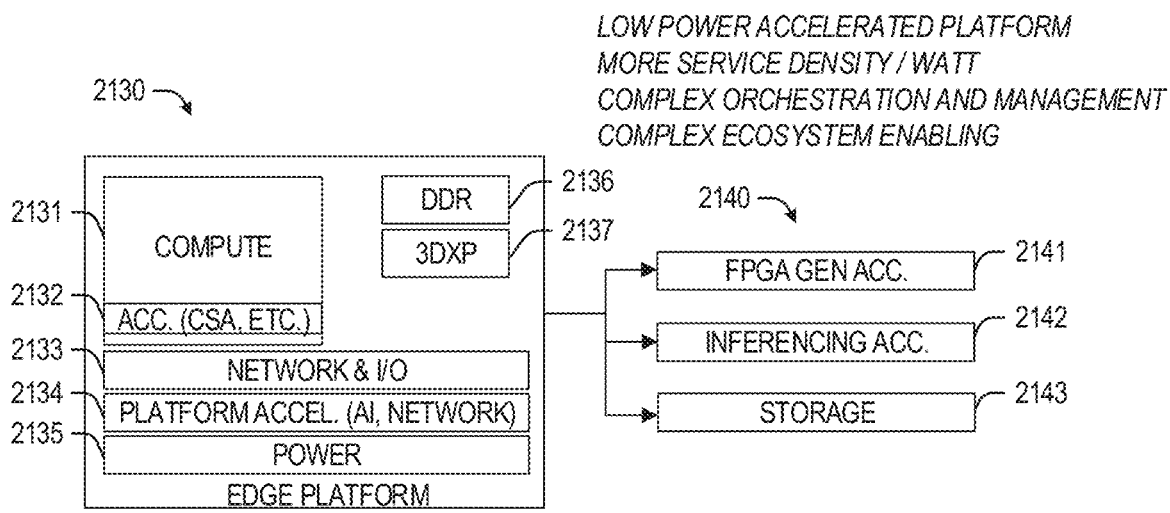

FIG. 21B illustrates a second edge computing hardware configuration, offering a second edge platform 2130 (e.g., having hardware 2131, 2132, 2133, 2134, 2135, 2136, 2137, as suggested above) with a second set of edge platform capabilities 2140 (e.g., having capabilities 2141, 2142, 2143), and deployable for a low power but more service-dense solution. This approach is targeted to define a lower power solution which uses acceleration schemes in order to achieve better service density or service throughout per watt. This main design trade-off leads to a platform that uses sacrifices general compute in favor specialized hardware (e.g., FPGAs, inferencing accelerators) that can perform the same work at better performance-per-watt ratio. In this example, a "service dense" solution enables more service actions per platform and per watt or being able to drive more throughput at a service level per watt.

The platform capabilities 2140 may be designed to be favorable in terms of power envelope as well in terms of physical space. As a result, the configuration of FIG. 21B may provide a suitable target for base station deployments (e.g., at near or middle edge layers). However, the platform capabilities 2140 may have tradeoffs including: (1) requirements in terms of orchestration, maintenance and system management (which can be translated to OPEX/TCO costs); (2) requiring an operator ecosystem to enable all a system stack to work with different accelerators that are exposed. However, these disadvantages may be mitigated with a developed software abstraction layer.

Figure 21C:
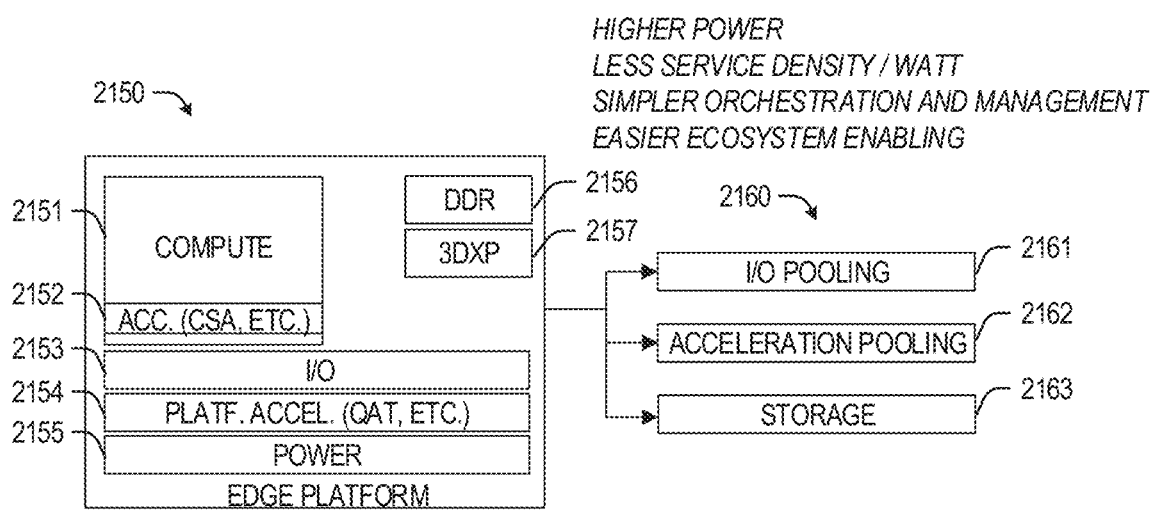

FIG. 21C illustrates a third edge computing hardware configuration, offering a third edge platform 2150 (e.g., having hardware 2151, 2152, 2153, 2154, 2155, 2156, 2157, as suggested above) with a third set of edge platform capabilities 2160 (e.g., having capabilities 2161, 2162, 2163) offering a high power yet homogenous and generic architecture. FIG. 21C provides an approach that is opposite as compared FIG. 21B, to provide a platform architecture with reduced heterogeneity in the different types of resources that an operator or edge owner has to deal with respect to management, maintenance and orchestration. However, removing accelerators in favor of homogeneity comes at a cost of having less service density and service throughput per watt at platform level. In further examples, the edge platform capabilities 2160 may implement general purpose acceleration (such as in the form of FPGAs).

Other derivative functions of the edge platforms depicted in FIGS. 21A-C may also be adapted. For example, the platform can be sized and designed in order to incorporate new ingredients that make it more service and throughput dense but keeping it more homogenous by for example including accelerators inside the platform or on die in order to make them seamlessly manageable to the operators.

In further examples, any of the compute nodes or devices discussed with reference to the present edge computing systems and environment may be fulfilled based on the components depicted in FIGS. 22A and 22B. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 22A:
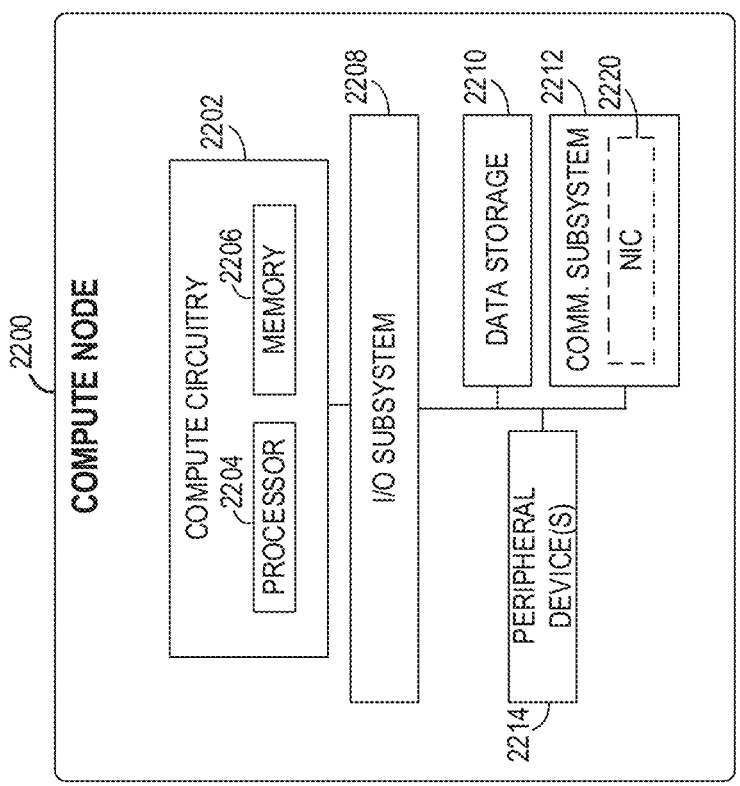
FIG. 22A provides an overview of example components for compute deployed at a compute node in an edge computing system.

In the simplified example depicted in FIG. 22A, an edge compute node 2200 includes a compute engine (also referred to herein as "compute circuitry") 2202, an input/output (I/O) subsystem 2208, data storage 2210, a communication circuitry subsystem 2212, and, optionally, one or more peripheral devices 2214. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 2200 may be embodied as any type of engine, device, or collection of devices capable of performing various compute functions. In some examples, the compute node 2200 may be embodied as a single device such as an integrated circuit, an embedded system, a field-programmable gate array (FPGA), a system-on-a-chip (SOC), or other integrated system or device. In the illustrative example, the compute node 2200 includes or is embodied as a processor 2204 and a memory 2206. The processor 2204 may be embodied as any type of processor capable of performing the functions described herein (e.g., executing an application). For example, the processor 2204 may be embodied as a multi-core processor(s), a microcontroller, or other processor or processing/controlling circuit. In some examples, the processor 2204 may be embodied as, include, or be coupled to an FPGA, an application specific integrated circuit (ASIC), reconfigurable hardware or hardware circuitry, or other specialized hardware to facilitate performance of the functions described herein.

The main memory 2206 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 2206 may be integrated into the processor 2204. The main memory 2206 may store various software and data used during operation such as one or more applications, data operated on by the application(s), libraries, and drivers.

The compute circuitry 2202 is communicatively coupled to other components of the compute node 2200 via the I/O subsystem 2208, which may be embodied as circuitry and/or components to facilitate input/output operations with the compute circuitry 2202 (e.g., with the processor 2204 and/or the main memory 2206) and other components of the compute circuitry 2202. For example, the I/O subsystem 2208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 2208 may form a portion of a system-on-a-chip (SoC) and be incorporated, along with one or more of the processor 2204, the main memory 2206, and other components of the compute circuitry 2202, into the compute circuitry 2202.

The one or more illustrative data storage devices 2210 may be embodied as any type of devices configured for short-term or long-term storage of data such as, for example, memory devices and circuits, memory cards, hard disk drives, solid-state drives, or other data storage devices. Individual data storage devices 2210 may include a system partition that stores data and firmware code for the data storage device 2210. Individual data storage devices 2210 may also include one or more operating system partitions that store data files and executables for operating systems depending on, for example, the type of compute node 2200.

The communication circuitry 2212 may be embodied as any communication circuit, device, or collection thereof, capable of enabling communications over a network between the compute circuitry 2202 and another compute device (e.g., an edge gateway node 312 of the edge computing system 300). The communication circuitry 2212 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 2212 includes a network interface controller (NIC) 2220, which may also be referred to as a host fabric interface (HFI). The NIC 2220 may be embodied as one or more add-in-boards, daughter cards, network interface cards, controller chips, chipsets, or other devices that may be used by the compute node 2200 to connect with another compute device (e.g., an edge gateway node 312). In some examples, the NIC 2220 may be embodied as part of a system-on-a-chip (SoC) that includes one or more processors, or included on a multichip package that also contains one or more processors. In some examples, the NIC 2220 may include a local processor (not shown) and/or a local memory (not shown) that are both local to the NIC 2220. In such examples, the local processor of the NIC 2220 may be capable of performing one or more of the functions of the compute circuitry 2202 described herein. Additionally, or alternatively, in such examples, the local memory of the NIC 2220 may be integrated into one or more components of the client compute node at the board level, socket level, chip level, and/or other levels.

Additionally, in some examples, a respective compute node 2200 may include one or more peripheral devices 2214. Such peripheral devices 2214 may include any type of peripheral device found in a compute device or server such as audio input devices, a display, other input/output devices, interface devices, and/or other peripheral devices, depending on the particular type of the compute node 2200. In further examples, the compute node 2200 may be embodied by a respective edge compute node in an edge computing system (e.g., client compute node 302, edge gateway node 312, edge aggregation node 322) or like forms of appliances, computers, subsystems, circuitry, or other components.

Figure 22B:
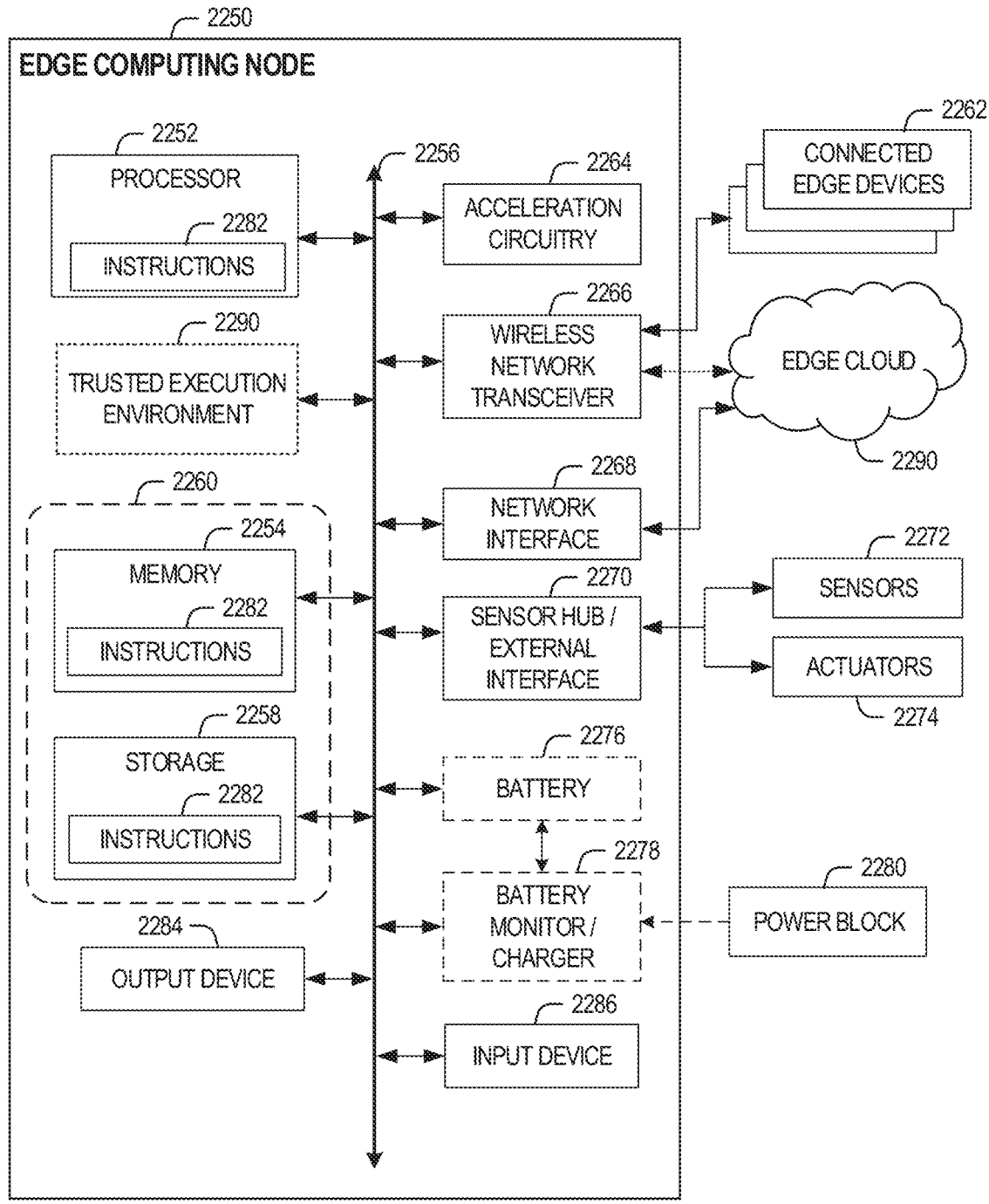
FIG. 22B provides a further overview of example components within a computing device in an edge computing system.

In a more detailed example, FIG. 22B illustrates a block diagram of an example of components that may be present in an edge computing node 2250 for implementing the techniques (e.g., operations, processes, methods, and methodologies) described herein. This edge computing node 2250 provides a closer view of the respective components of node 2200 when implemented as or as part of a computing device (e.g., as a mobile device, a base station, server, gateway, etc.). The edge computing node 2250 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 2250, or as components otherwise incorporated within a chassis of a larger system.

The edge computing device 2250 may include processing circuitry in the form of a processor 2252, which may be a microprocessor, a multi-core processor, a multithreaded processor, an ultra-low voltage processor, an embedded processor, or other known processing elements. The processor 2252 may be a part of a system on a chip (SoC) in which the processor 2252 and other components are formed into a single integrated circuit, or a single package, such as the Edison™ or Galileo™ SoC boards from Intel Corporation, Santa Clara, California. As an example, the processor 2252 may include an Intel Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 2252 and accompanying circuitry may be provided in a single socket form factor, multiple socket form factor, or a variety of other formats, including in limited hardware configurations or configurations that include fewer than all elements shown in FIG. 22.

The processor 2252 may communicate with a system memory 2254 over an interconnect 2256 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM. JESD79-2F for DDR2 SDRAM. JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2258 may also couple to the processor 2252 via the interconnect 2256. In an example, the storage 2258 may be implemented via a solid-state disk drive (SSDD). Other devices that may be used for the storage 2258 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 2258 may be on-die memory or registers associated with the processor 2252. However, in some examples, the storage 2258 may be implemented using a micro hard disk drive (HDD). Further, any number of new technologies may be used for the storage 2258 in addition to, or instead of, the technologies described, such resistance change memories, phase change memories, holographic memories, or chemical memories, among others. 8922

The components may communicate over the interconnect 2256. The interconnect 2256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2256 may be a proprietary bus, for example, used in an SoC based system. Other bus systems may be included, such as an I2C interface, an SPI interface, point to point interfaces, and a power bus, among others.

The interconnect 2256 may couple the processor 2252 to a transceiver 2266, for communications with the connected edge devices 2262. The transceiver 2266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 2266 (or multiple transceivers) may communicate using multiple standards or radios for communications at a different range. For example, the edge computing node 2250 may communicate with close devices, e.g., within about 10 meters, using a local transceiver based on BLE, or another low power radio, to save power. More distant connected edge devices 2262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 2266 (e.g., a radio transceiver) may be included to communicate with devices or services in the edge cloud 2290 via local or wide area network protocols. The wireless network transceiver 2266 may be an LPWA transceiver that follows the IEEE 802.15.4, or IEEE 802.15.4g standards, among others. The edge computing node 2250 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2266, as described herein. For example, the transceiver 2266 may include a cellular transceiver that uses spread spectrum (SPA/SAS) communications for implementing high-speed communications. Further, any number of other protocols may be used, such as Wi-Fi® networks for medium speed communications and provision of network communications. The transceiver 2266 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 2268 may be included to provide a wired communication to nodes of the edge cloud 2290 or to other devices, such as the connected edge devices 2262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 2268 may be included to enable connecting to a second network, for example, a first NIC 2268 providing communications to the cloud over Ethernet, and a second NIC 2268 providing communications to other devices over another type of network.

Given the variety of types of applicable communications from the device to another component or network, applicable communications circuitry used by the device may include or be embodied by any one or more of components 2264, 2266, 2268, or 2270. Accordingly, in various examples, applicable means for communicating (e.g., receiving, transmitting, etc.) may be embodied by such communications circuitry.

The edge computing node 2250 may include or be coupled to acceleration circuitry 2264, which may be embodied by one or more A accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

The interconnect 2256 may couple the processor 2252 to a sensor hub or external interface 2270 that is used to connect additional devices or subsystems. The devices may include sensors 2272, such as accelerometers, level sensors, flow sensors, optical light sensors, camera sensors, temperature sensors, global navigation system (e.g., GPS) sensors, pressure sensors, barometric pressure sensors, and the like. The hub or interface 2270 further may be used to connect the edge computing node 2250 to actuators 2274, such as power switches, valve actuators, an audible sound generator, a visual warning device, and the like.

In some optional examples, various input/output (I/O) devices may be present within or connected to, the edge computing node 2250. For example, a display or other output device 2284 may be included to show information, such as sensor readings or actuator position. An input device 2286, such as a touch screen or keypad may be included to accept input. An output device 2284 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 2250. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2276 may power the edge computing node 2250, although, in examples in which the edge computing node 2250 is mounted in a fixed location, it may have a power supply coupled to an electrical grid, or the battery may be used as a backup or for temporary capabilities. The battery 2276 may be a lithium ion battery, or a metal-air battery, such as a zinc-air battery, an aluminum-air battery, a lithium-air battery, and the like.

A battery monitor/charger 2278 may be included in the edge computing node 2250 to track the state of charge (SoCh) of the battery 2276, if included. The battery monitor/charger 2278 may be used to monitor other parameters of the battery 2276 to provide failure predictions, such as the state of health (SoH) and the state of function (SoF) of the battery 2276. The battery monitor/charger 2278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 2278 may communicate the information on the battery 2276 to the processor 2252 over the interconnect 2256. The battery monitor/charger 2278 may also include an analog-to-digital (ADC) converter that enables the processor 2252 to directly monitor the voltage of the battery 2276 or the current flow from the battery 2276. The battery parameters may be used to determine actions that the edge computing node 2250 may perform, such as transmission frequency, mesh network operation, sensing frequency, and the like.

A power block 2280, or other power supply coupled to a grid, may be coupled with the battery monitor/charger 2278 to charge the battery 2276. In some examples, the power block 2280 may be replaced with a wireless power receiver to obtain the power wirelessly, for example, through a loop antenna in the edge computing node 2250. A wireless battery charging circuit, such as an LTC4020 chip from Linear Technologies of Milpitas, California, among others, may be included in the battery monitor/charger 2278. The specific charging circuits may be selected based on the size of the battery 2276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2258 may include instructions 2282 in the form of software, firmware, or hardware commands to implement the techniques described herein. Although such instructions 2282 are shown as code blocks included in the memory 2254 and the storage 2258, it may be understood that any of the code blocks may be replaced with hardwired circuits, for example, built into an application specific integrated circuit (ASIC).

In an example, the instructions 2282 provided via the memory 2254, the storage 2258, or the processor 2252 may be embodied as a non-transitory, machine-readable medium 2260 including code to direct the processor 2252 to perform electronic operations in the edge computing node 2250. The processor 2252 may access the non-transitory, machine-readable medium 2260 over the interconnect 2256. For instance, the non-transitory, machine-readable medium 2260 may be embodied by devices described for the storage 2258 or may include specific storage units such as optical disks, flash drives, or any number of other hardware devices. The non-transitory, machine-readable medium 2260 may include instructions to direct the processor 2252 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 22C:
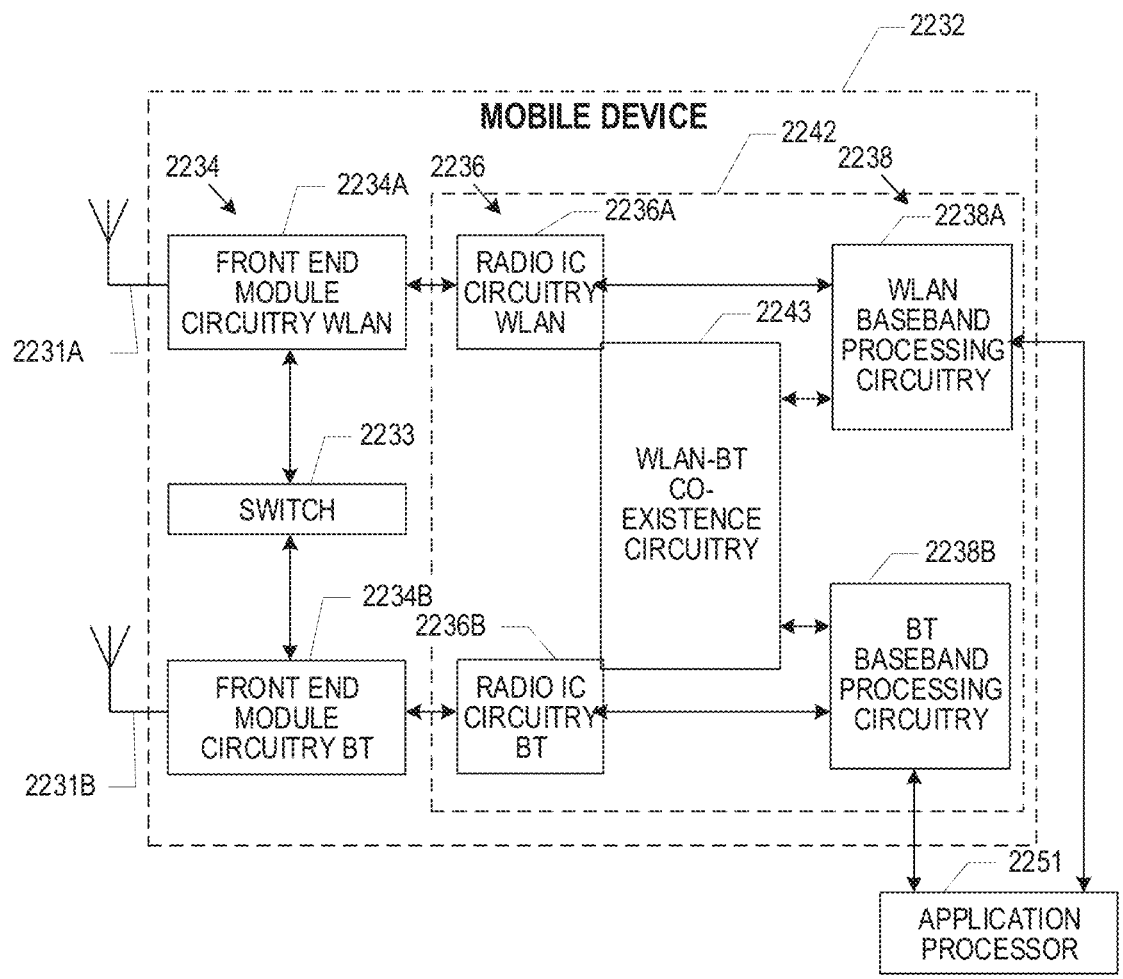
FIG. 22C provides a further overview of example components within a mobile computing device in an edge computing system.

FIG. 22C is a block diagram of communication components within an example mobile device 2232. This mobile device 2232 provides a closer view of the communication processing components of node 2200 or device 2250 when implemented as a user equipment or a component of a user equipment. The mobile device 2232 may include radio front-end module (FEM) circuitry 2234, radio IC circuitry 2236 and baseband processing circuitry 2238. The mobile device 2232 as shown includes both Wireless Local Area Network (WLAN) functionality and Bluetooth (BT) functionality although aspects of the device are not so limited, and other radio technologies discussed herein may be implemented by similar circuitry. FEM circuitry 2234 may include, for example, a WLAN or Wi-Fi FEM circuitry 2234A and a Bluetooth (BT) FEM circuitry 2234B. The WLAN FEM circuitry 2234A may include a receive signal path comprising circuitry configured to operate on WLAN RF signals received from one or more antennas 2231A, to amplify the received signals and to provide the amplified versions of the received signals to the WLAN radio IC circuitry 2236A for further processing. The BT FEM circuitry 2234B may include a receive signal path which may include circuitry configured to operate on BT RF signals received from one or more antennas 2231B, to amplify the received signals and to provide the amplified versions of the received signals to the BT radio IC circuitry 2236B for further processing. FEM circuitry 2234A may also include a transmit signal path which may include circuitry configured to amplify WLAN signals provided by the radio IC circuitry 2236A for wireless transmission by one or more of the antennas 2231A. In addition, FEM circuitry 2234B may also include a transmit signal path which may include circuitry configured to amplify BT signals provided by the radio IC circuitry 2236B for wireless transmission by the one or more antennas 2231B. In the example of FIG. 22C, although FEM 2234A and FEM 2234B are shown as being distinct from one another, aspects of the present disclosure are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 2236 as shown may include WLAN radio IC circuitry 2236A and BT radio IC circuitry 2236B. The WLAN radio IC circuitry 2236A may include a receive signal path which may include circuitry to down-convert WLAN RF signals received from the FEM circuitry 2234A and provide baseband signals to WLAN baseband processing circuitry 2238A. BT radio IC circuitry 2236B may in turn include a receive signal path which may include circuitry to down-convert BT RF signals received from the FEM circuitry 2234B and provide baseband signals to BT baseband processing circuitry 2238B. WLAN radio IC circuitry 2236A may also include a transmit signal path which may include circuitry to up-convert WLAN baseband signals provided by the WLAN baseband processing circuitry 2238A and provide WLAN RF output signals to the FEM circuitry 2234A for subsequent wireless transmission by the one or more antennas 2231A. BT radio IC circuitry 2236B may also include a transmit signal path which may include circuitry to up-convert BT baseband signals provided by the BT baseband processing circuitry 2238B and provide BT RF output signals to the FEM circuitry 2234B for subsequent wireless transmission by the one or more antennas 2231B. In the example of FIG. 22C, although radio IC circuitries 2236A and 2236B are shown as being distinct from one another, aspects of the present disclosure are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 2238 may include a WLAN baseband processing circuitry 2238A and a BT baseband processing circuitry 2238B. The WLAN baseband processing circuitry 2238A may include a memory, such as, for example, a set of RAM arrays in a Fast Fourier Transform or Inverse Fast Fourier Transform block (not shown) of the WLAN baseband processing circuitry 2238A. Each of the WLAN baseband circuitry 2238A and the BT baseband circuitry 2238B may further include one or more processors and control logic to process the signals received from the corresponding WLAN or BT receive signal path of the radio IC circuitry 2236, and to also generate corresponding WLAN or BT baseband signals for the transmit signal path of the radio IC circuitry 2236. Each of the baseband processing circuitries 2238A and 2238B may further include physical layer (PHY) and medium access control layer (MAC) circuitry, and may further interface with application processor 2251 (or, in other examples, processor circuitry 2250) for generation and processing of the baseband signals and for controlling operations of the radio IC circuitry 2236.

Referring still to FIG. 22C, according to the illustrated aspects. WLAN-BT coexistence circuitry 2243 may include logic providing an interface between the WLAN baseband circuitry 2238A and the BT baseband circuitry 2238B to enable use cases requiring WLAN and BT coexistence. In addition, a switch 2233 may be provided between the WLAN FEM circuitry 2234A and the BT FEM circuitry 2234B to allow switching between the WLAN and BT radios according to application needs. In addition, although the antennas 2231A, 2231B are depicted as being respectively connected to the WLAN FEM circuitry 2234A and the BT FEM circuitry 2234B, aspects of the present disclosure include within their scope the sharing of one or more antennas as between the WLAN and BT FEMs. or the provision of more than one antenna connected to each of FEM 2234A or 2234B.

In some aspects of the present disclosure, the front-end module circuitry 2234, the radio IC circuitry 2236, and baseband processing circuitry 2238 may be provided on a single radio card. In other aspects, the one or more antennas 2231A, 2231B, the FEM circuitry 2234 and the radio IC circuitry 2236 may be provided on a single radio card. In some other aspects of the present disclosure, the radio IC circuitry 2236 and the baseband processing circuitry 2238 may be provided on a single chip or integrated circuit (IC).

In still further examples, the compute capabilities of the computing node may be implemented with computational storage, or "compute-in-storage," which refers to data storage solutions that are implemented with computational capabilities. In various examples, compute-in-storage may be implemented as compute offloading in a block storage device; with the use of compute offloading in an object-based storage device; with the use of compute offloading in a distributed storage system; or with the use of compute offloading provided among disaggregated storage environments. An example compute-in-storage system may be provided from one or more storage devices, where each storage device comprises a non-volatile memory and a compute offload controller. In this system, the non-volatile memory stores data, and the compute offload controller performs compute tasks on the data based on compute offload commands from the host processor. Among other examples, acceleration capabilities and functions may be provided with use of such a compute-in-storage configuration.

Figure 22D:
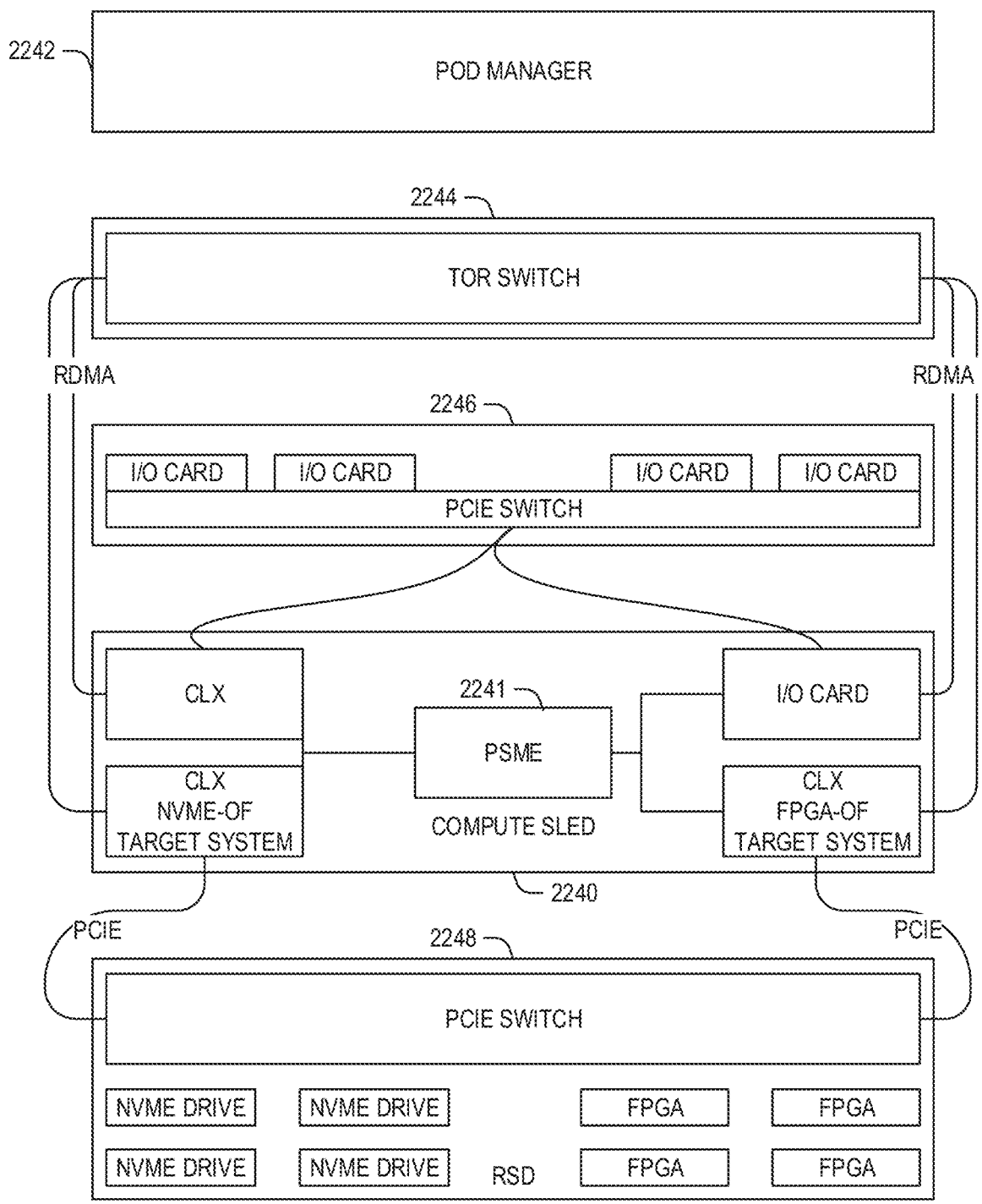
FIG. 22D provides a further overview of example components within a configurable server rack in an edge computing system.

FIG. 22D illustrates Rack Scale Design (RSD) components that may be included a part of a server or other discrete compute node in an edge platform architecture. This arrangement provides a closer view of the configurable processing components of node 2200 or device 2250 when implemented as a server (e.g., in a server rack, blade, etc.). This configurable architecture differs from some others by disaggregating field programmable gate array (FPGA), non-volatile memory express (NVMe), and input-output (I/O) pooling resources. The FPGA and NVMe resources provide elements that may be used for any type of edge services, such as video or speech analytics. I/O pooling may be used to provide flexible network functions. This architecture enables scaling network interfaces according to the expected data rate or network load for a particular virtual network function (VNF). This architecture also enables flexibility to map different network cards to compute nodes depending on the type of network processing happening at a given node.

The illustrated RSD architecture includes a point of delivery (POD) Manager 2242. The POD Manager 2242 is responsible of managing the resources-including compute and disaggregated resources-within a POD (e.g., one or more racks). The POD Manager 2242 exposes interfaces to an orchestrator in order to create, manage, or destroy composed nodes. Managing a composed node includes the feature of scaling up or down the amount of pooled resources 2248 connected to a particular compute sled 2240. The POD Manager 2242 typically runs on a node controller. The POD Manager 2242 is responsible for discovery of resources in the POD, configuring and managing the resources, and composing a logical server. In an example, the POD Manager 2242 is an optional separate component and will not be required in-rack. However, in an example, to be "RSD conformant" a Rack is manageable by a certified POD Manager.

The following are some example attributes of a POD Manager 2242. For example, a rack may include a set of compute sleds 2240 used to execute edge services and other related system software stacks (e.g., such as orchestration or other system services). One type of compute sled 2240 may be a Pooled Resources Sled. This compute sled 2240 may manage a set of disaggregated resources. Here, a compute sled 2240 may include a pooled System Management Engine software (PSME) 2241. The PSME 2241 provides a management interface to manage the modules or blades at a drawer level. In an example, a rack contains one or more logical PSME(s). For example, each drawer may have a PSME or server drawers may share a PSME, or a PSME may run on a top-of-rack (TOR) 2244 switch or on a separate host. In an example, the PSME 2241 supports the RSD APIs.

In an example, the compute sled 2240 may include processors (e.g., CLX) to run an RSD software stack implementing NVM-oF or FPGA-oF acting as a target system and managing a set of disaggregated resources. In an example, the processors are connected using PCIe ×16 bifurcation port to a PCIe switch 2246 providing access to the target resources (FPGA or NVME in the RSD 2248).

Various RSD edge-composed node flavors may be used in the compute sled 2240 to run edge services. Services running on those nodes may use client software libraries or drivers to provide transparent access to the disaggregated FPGAS and NVME in the RSD 2248. In a further example, the rack includes one or more PCIE switches connecting the compute sleds 2240 to a set of disaggregated resources (e.g., RSD 2248).

The block diagrams of FIGS. 22A, 22B, 22C, and 22D are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 21A-21C and 22A-22D may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions-even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

D. Use Cases for Edge Computing Systems

Edge computing meets several value propositions and key performance indicators (KPI) for many types of use cases and deployments involving multi-system compute operations (multi-tenant, multi-user, multi-stakeholder, multi-device, etc.). These value propositions enable improved response latency, increased security, lower backhaul traffic, all while enabling new use cases.

Defining where the actual computing edge "resides" for a particular use case or workload is directly related to the KPI or value proposition that a particular location provides to it. For example, defining a compute edge for an IoT or augmented reality/virtual reality (AR/VR) workload in the core of the operator infrastructure does not satisfy its KPI requirements in terms of latency. Thus, the compute edge for this workload is located closer to the device (such as in near edge or middle edge layers at the base station or central office, bringing the compute resources closer to the workload data). On the other hand, a computing edge for a CDN workload may be hosted at a base station, at a central office, or at any other intermediate point of aggregation (POA or POP) of the operator infrastructure.

Devices being used by the end user (or meshes of devices) may be considered as the far edge devices, but many also offer some compute edge capabilities. Devices in this scenario may provide the lowest latency possible and may serve in types of mesh or connected IoT networks. However, at some point end devices may become compute limited or may not be power efficient as needed to perform a given task. For instance, at some point of network traffic load, the AR/VR user will experience severe degradation (even to the point of providing a worse performance than executing the workload in the far edge on the device itself).

Top priorities for edge computing among various network layers include central office (telecom) functionality, video on demand/content data network serving, Media Analytics, Live Streaming/Transcoding, and AV/VR including online gaming. Central office workloads may include, for example, SDN/NFV for converged footprint and new service models. Video on demand/content data network workloads may include, for example, streaming, surveillance, alarm systems, building access, and the like. Live Streaming/Transcoding may include, for example, enhanced user experience (UX) such as live streaming from social networking applications. AR/VR workloads may include, for example, real-time retail, gaming networks, etc. Media analytics (including both audio and video) may also be extensively deployed within edge deployments. These workloads constitute another important pillar used in many of the aforementioned workloads (such as surveillance, AR etc.).

In addition to these priorities, other use cases may be enabled within the edge cloud. In-memory databases (IMBD) are becoming more relevant in the design on edge computing deployments. Their target utilization is to serve online transaction processing (OLTP, to handle small transaction processing requests—such as small reads or writes) and online analytical processing (OLAP, to handle larger analytic processing requests—such as bigger data set queries and compute tasks). These two types of workloads are mostly mapped to network analytics to improve infrastructure management or other type of analysis or data storage (such as IoT).

Enterprise and government use cases also may be enabled within the edge cloud. In this case, some of the enterprise customers are looking potentially edge deployment as potential ways to improve some of their own processes. Examples of this are thin clients. Thin clients can move across the edge infrastructure as the employees of a given enterprise move across the geography in order to provide a low latency access to the thin clients.

Use cases related to Industry 4.0 initiatives may also be enabled. This may be improved by virtualization in manufacturing—such as with use cases for ultra-reliable low latency communications via 5G. Such communications may allow TSP providers to offer more complete solutions for both industrial workloads and localized 5G networking.

Healthcare is another area where as technology evolves, and security technologies become more mature, hospitals and other healthcare institutions will use the edge cloud to securely store and process healthcare related data. In this setting, the edge cloud will facilitate resource sharing, and assist with reducing CAPEX and OPEX/TCO costs.

Another use case area that may be enabled via the edge cloud includes V2V, V2X, and other type of advanced driver assistance system (ADAS) workloads. As automotive technologies become more mature, the edge cloud will enable communication between devices as well as a means for users inside the edge to access to edge services (V2X).

The following sections lay out many different example workload use cases relevant for edge clouds, along with their requirements, example applications, and value propositions for third-party service providers. These sections are broadly classified into the following areas: Data Caching, Video/Video Analytics, NFV, RAN, Augmented Reality/Virtual Reality (AR/VR), Vehicle Driving and Assistance, Internet of Things (IoT), Industry Applications, Gaming, Accelerated Browsing, and Speech Analytics. However, it will be understood that some edge cloud use cases or architectures may be relevant under multiple or other categories.

Use Case—Data Caching

Data caching refers to caching data at the edge for faster loading at user equipment. Examples of data caching include caching popular videos in a region for quicker access. Data caching uses storage and compute resources, and is typically not latency bound. Data caching is used in content delivery networks (CDNs). Global mobile data traffic has steadily grown, with video data now accounting for a majority of mobile network data traffic. Due to the distribution of video content, the possibility of redundant content being fetched and delivered to users in a same region is high.

Based on this scenario, the edge cloud becomes an apt infrastructure to cache content at the edge of the network, which can significantly reduce the backhaul traffic. This has the potential to save OPEX/TCO costs for the third-party service providers (and even CSPs and TSPs). Content caching may extend beyond video to other areas such as music and documents.

Within the edge cloud, a number of ways may be used to perform content caching:

(a) Content caching based on traffic learning. Cache content in a particular region based on its popularity and growing requests/traffic. Along with it, content similar to a particular popular content can cached as a proactive strategy.

(b) Targeted content caching. Targeted caching means caching content at the edge for a target audience. For example, for an audience in a stadium or a gathering.

(c) User guided caching. The user indicates the content that is to be cached (for a service fee or a part of the data plan of the user). A simple example is videos that user adds as "watch later" in a video site or puts in favorite list in a streaming video service could be candidates for caching. Since there may several users in the same region having similar content interests, caching this content paves way for saving the backhaul traffic costs (monetary and resource costs).

(d) Service experience caching. This feature is based on the transaction and experience contractual agreement between the user and the provider. For instance, if the user wants to obtain 4K video and 9.1 sound data but the remote and local services cannot handle the throughput, latency, and transcoding requirements; then the system should negotiate pre-fetching the content at the expected QoS but with a possible delay or workaround (e.g., delay at the beginning of playback).

Content caching as a use case has different workloads that may run together to perform the caching. Some of these use cases may involve the execution of content caching algorithms, data aggregation procedures, machine learning codes, content traffic analytics, web servers, etc.

This use case is not latency bound. Since the caching increases the chances of servicing the requests faster than normal time, the end-user experience is expected to be positive.

This use case can use a various set of workloads that work together to enable the caching. Therefore, the resource usage may also vary. Content caching algorithms are traditionally optimized for CPUs. However, any machine learning codes or inference codes that aid the analytics may use FPGAs. The most used resources are storage resources and is a natural user of pooled storage.

The fulfillment of content caching may be provided via many configurations (such as one master process and several worker processes). For instance, a master process may be used to read and evaluate configurations, and maintain worker processes, as worker processes do actual processing of requests. This may be implemented by a content service provider that employs asynchronous and event-based model and OS-dependent mechanisms to efficiently distribute requests among worker processes. The number of worker processes may be defined in a configuration file and fixed for a given configuration or automatically adjusted to the number of available CPU cores. This means that instead of dedicating separate processes for each connection, the content service provider may handle multiple requests from one worker process as shown.

The content service provider may support multiple protocols (e.g., over HTTP such as HDS (HTTP dynamic streaming by Adobe), HLS (HTTP live streaming by Apple) and MPEG-Dash (open source and used by YouTube and Netflix)). In general, these protocols work by cutting the video stream in several chunks and create metadata and a playlist. The client will first download the metadata along with the playlist in order to know what chunks compose the whole video and then perform the HTTP requests to get each one. The difference between video on demand (VOD) and live streaming is that the chunks and playlist are previously generated for VOD while for live streaming the playlist is generated as new chunks are being created (after being read from the stream).

The throughput for vCDN may be expressed in terms of the number of parallel streams that the CDN can support in a given hardware and network configuration for a smooth video viewing experience (e.g., such that the user does not see a pause for loading the content while video is played).

In another example, an edge cloud CDN enables cable, telco, and mobile network service providers to build a private CDN to distribute their own or partner's managed content to their subscribers with a broadcast TV-like experience, regardless of the type of consuming device or the subscriber location. The edge cloud CDN is optimized to support streaming delivery of TV services including video-on-demand (VoD), live events and cloud digital video recorders (CDVR). This may be provided by a content service provider which establishes two primary aspects of a CDN: (a) Deploy CSP software delivery nodes (e.g., using on commodity hardware at the edge location); and (b) Connect nodes to a CSP. This may occur with use of an edge cloud configured to enable secure access to the service provider's cloud-based dashboard, which manages configurations, operations and performance.

In an example, individual CSP edge nodes can support the following three modes of content delivery: (a) Open Caching: Delivery of third party and partner content, both HTTP and HTTPS, through delegation and using specifications (e.g., specifications approved by the Streaming Video Alliance); Transparent Caching: Delivery of partner, over-the-top, and service provider owned HTTP content through transparent caching (e.g., as transparent caching works autonomously to detect, classify, cache and deliver popular content at the network edge, and optimize streaming content across the network); (c) Open Edge CDN: Delivery of service provider owned content, both HTTP and HTTPS, via edge nodes deployed in the service provider network and managed by cloud-based operations.

Use Case—Video/Video Analytics

Video analytics refers to performing live video analytics and video pre-processing or transcoding, at the edge for presenting to a user device. Traffic video analysis and alarm systems are examples of video analytics at the edge. Storage and compute resources are relied upon for this type of usage.

Video analytics play an important role in many fields. For example, face recognition from traffic and security cameras is already playing an essential role in law and order. Several other type of analytics can be done on video contents such as object tracking, motion detection, event detection, flame and smoke detection, AI learning of patterns in live stream or archive of videos, etc. Presently, video analytics is done on the cloud or on dedicated private servers depending upon the need and the functions to be established. Performing video analytics at the edge poses both as a requirement as well as an opportunity for several fields. For example:

Surveillance and public safety: For example, processing live video streams almost instantaneously at the edge can lead to better surveillance and enforcing law and order. Face detection and incident identification and triggering are some of the functions that can be done at the edge. These functions can enable law enforcement officers to take immediate actions pertaining to an incident.

Supporting connecting cars and self-driving: For example, a live stream of the scene as seen by a self-driving car needs be analyzed in very short time to decide the actions to be taken by the car. A self-driving could already contain resources to process the scene instantaneously. Edge video analytics can serve for processing (or preprocessing) farther scenes or post-processing video scenes for continual training and feedback.

Enabling smart cities and IoT: Video analytics at the edge is an important element to enable smart cities. For example, traffic video analysis can be used to route traffic in the most efficient way. Fire or smoke detection in an area can be identified instantaneously and ensure no traffic is continued towards the danger zone by sending feedback to both the city infrastructure as well as to connected cars in a particular area.

Enhanced infotainment services: Video analytics at the edge can be used to enhance the real-life experience of event audiences such as sports, concerts and other shows. Videos from different camera angles at an event can be analyzed and applied with AR/VR functions and presented to live audience through large screens, smart phones, VR devices etc.

The latency and turnaround time requirements for video analytics at the edge vary for different scenarios. These are illustrated in TABLE 1, below.

TABLE 1

| Latency (including computations) | Remarks |
| --- | --- |
| 0-15 ms (from device to device) | For time critical situations such video processing for self-driving vehicles. |
| 15-50 ms (from device to other devices/alarms) | Traffic routing actions, smoke/fire detection and feedback to neighboring devices. |
| 50-500 ms (from device to other devices) | Ideal incident identification and reporting to relevant authorities. |
| 50 ms-1 or 2 seconds (from device to device) | Enhanced infotainment services. |

TABLE 1-continued

| Latency (including computations) | Remarks |
|---|---|
| Not latency bound | Video pre-processing before storing into archives or cloud. |

TSPs have several ways of monetizing video analytics services that are offered at the edge:
  a. Improved surveillance and monitoring can be offered as services to government agencies as well as private security firms.
  b. Video analytics for smart cities (and specific functions thereof) can be offered as services to both government agencies, IoT device providers and households as required.
  c. Video analytics for enhanced infotainment can be offered as service to event audience or organizers (who in turn provide to the audience).

Use Case—Network Function Virtualization (NFV) and Radio Access Network (RAN) Operations Flexible NFV is heavily reliant on storage and compute resources (e.g., CPU or FPGA). Edge cloud deployments may control user experience by co-hosting network (NFV) and service functions on same platform/same location. The ability to place local breakouts close to the services actually providing the requested service may provide better response times and reduce OPEX/TCO by reducing unnecessary traffic through the infrastructure or data center.

Regarding the integration of MEC and Network Functions Virtualization (NFV) in the same network deployment, as per an ETSI specification deployment, MEC and NFV are complementary concepts that can exist independently. The MEC architecture has been designed in such a way that a number of different deployment options of MEC systems are possible. With respect to NFV, a MEC system can be realized independently from the presence of an NFV environment in the same network, or can be coexisting with it. As both MEC and NFV may utilize virtualization technology, MEC applications and NFV virtualized network functions can be instantiated partly or entirely over the same virtualization infrastructure.

The MEC reference architecture in an NFV environment reuses the concept of a virtualization infrastructure manager similar, with some enhancements, to the Virtualized Infrastructure Manager of the NFV framework, as well as the concept of virtualization infrastructure, which corresponds roughly to an NFV Infrastructure Point-of-Presence (NFVI-PoP), as described in NFV specifications. The reference architecture has been designed in such a way that further synergy between MEC and NFV can be achieved.

Multiple scenarios for deployments are possible, depending on operators' preferences for their networks and their migration strategy, e.g., fully virtualized environments or mixed environments, with MEC being deployed first, or NFV being deployed first, with different levels of integration between the two technologies, taking into account secondary aspects such as multi-tenancy, etc. The way MEC and NFV management and orchestration components relate to each other (e.g., integration, interworking, coexistence) is an important aspect of integrated MEC-NFV deployments. The RAN use case also includes use of a de-centralized RAN (e.g., at the edge) and UPF. As is well understood, RAN is heavily reliant on storage and compute resources (e.g., CPU or FPGA). Further discussion of RAN configurations is provided below in 5G connectivity examples.

Use Case—Augmented Reality/Virtual Reality (AR/VR)

Augmented reality (AR) use cases mostly involve image recognition (face, objects, etc.) and analytics on them. Usages of AR (and, VR) are expected to be focused at user-controlled endpoints, including among endpoints who interact with each other, as supported by the edge. Such an envisioned usage, whether involving a single endpoint device, group of devices, or a device-to-device approach, often requires low-latency times to fulfill service requirements.

The client devices involved with AR are typically in the form of wearables or mobile phones with a camera. A typical usage scenario is where a user points camera device to an object and sees useful annotations about the object. There are already several smartphone apps that offer AR services such as ViewAR, Vivino, Augment, etc., and such apps or related wearables are designed for providing AR on specific purposes. For example, Vivino provides useful information about a wine when a picture of the wine bottle's label is captured and provided. Similarly, ViewAR helps with 3D visualization for packaging and planning the space in a room.

An AR scenario typically consists of three stages: (i) sending a captured image from a device, (ii) image recognition and object identification, and (iii) performing analysis and producing result (in the form of annotations of useful information found from the internet, object identification, etc.). In the above stages, (ii) and (iii) are generally the most time-consuming parts. An AR service that is dedicated for specific functionalities will specify certain targets to an image recognition service. The image recognition service will identify the image and look for these targets. The AR service will then use the result to perform further operations such as analytics or finding more information from the internet. These results are then displayed to the user.

It is common that the AR service uses another service for image recognition. For example, many of the above-mentioned apps use Vuforia as the main engine for image recognition. The AR service will have previously specified targets to the Vuforia engine through its API so that the image recognition can find the specified targets. The image recognition can be performed both on device and on the cloud. Performing it on device with an on-device database is not power efficient, while performing the same over the cloud takes longer time. Another example is the Catchoom cloud image recognition service. It allows the AR apps to send requests to their service in the cloud through a RESTful API and responds with the image recognition. The AR app can perform the third operation from the client device after image is recognized—which is looking up on the internet for information as desired and presenting it to the user.

Image recognition services such as Vuforia and Catchoom have several AR apps using their service. This can only be expected to rise the in the future as more such AR apps are created and users of these AR apps increase. Since their services are currently hosted in the cloud, the latency and turnaround time of image recognition is pretty high. For example, it takes a couple of seconds to find information about a wine through Vivino. This will be unacceptable in scenarios where wearables are involved, time-critical annotations are required, and real time movement needs to be accounted for. Therefore, moving the image recognition services from the cloud to the edge can improve the total turnaround time giving users seamless experience.

As mentioned above, current solutions require a couple of seconds to start producing the first annotation or first output to the user. This delay is referred to as the "response time".

This is primarily because of the services hosted in the cloud. For a seamless user experience and to support future time critical AR use cases, the turnaround time requirements are very low. TABLE 2 below summarizes these requirements according to various sources.

TABLE 2

| Turnaround time (round trip time with computations) | Remarks |
| --- | --- |
| <20 ms | For highly seamless experience with wearables. Object identification and at least one annotation is presented as the user moves the device. |
| 25-50 ms | Human sensitive yet seamless experience. |
| 50-100 ms | User is able to slightly observe the gap. Yet this is tolerable and can be considered as a "smooth" experience. |
| 100-500 ms | User has to point and hold the device at an object. User cannot move the device rapidly. |

The image recognition, object tracking, and identification are the most compute intensive part a full AR service. The most well-known image recognition algorithms are SURF, SIFT, FAST, and BRIEF. Services such as Vuforia and Catchoom do not disclose the core image recognition algorithms used and their resource requirements. However, any image recognition algorithm can be implemented to use CPUs as well as FPGAs. The amount of requests encountered by these services can determine the size of CPUs or FPGAs that can be used. For example, Vuforia has more than 300 apps registered and Catchoom has already done 750 million interactions until now, which is expected to become 10 billion by 2025. Therefore, as the amount of requests increase, a system requires higher parallelism in satisfying the incoming requests and therefore entails more resources. These services also use storage for storing the image repository for object matching. This can also be provided at the edge which will enable image recognition and object identification to be done without internet connectivity and directly from the edge. As an advanced scenario, the AR service apps may also use the storage at the edge to store cached data from the internet to provide faster responses to users as soon as the image is recognized. Cached data can also be placed in different layers such as in-memory, persistent memory on NVRAMs or pooled SSD storage.

Third-party service providers (TSPs) may can monetize an AR service at the edge. The edge can host a central image recognition and object identification service which can be used by the AR apps. The AR apps specify the targets through an API and this service can respond with objects as desired when an input request is sent. The apps would pay for their service in the edge.

The edge can host the image recognition services such as Vuforia or Catchoom who would pay for the resources used and may have a separate business model with the apps that use their services. For example, the Catchoom SaaS can be provided from the edge.

Use Case—Vehicle Assistance and Autonomous Driving Operations

Edge compute nodes may be used to assist in autonomous vehicle operation. Example use cases include, but are not limited to navigation, vehicle-to-vehicle (V2V) communication, vehicle-to-infrastructure (V2I) communication, or vehicle-to-everything (V2X) communication. Latency is a factor in vehicle assistance use cases to ensure near real-time response times for autonomous operation.

ETSI MEC is developing a V2X MEC service, in order to facilitate V2X interoperability in a multi-vendor, multi-network and multi-access environment. It describes the V2X-related information flows, required information and operations. The MEC specifications are defining the necessary API with the data model and data format. ETSI MEC is a standardized solution for C-V2X edge cloud deployments, therefore, taking this into account, the MEC030 WI introduces a new MEC service, termed after as a "V2X Information Service" (VIS).

Automotive use cases involve multiple stakeholders: different car makers, OEM (Original Equipment Manufacturer) suppliers, network infrastructure vendors, MEC vendors, application/content providers and other stakeholders.

In further detail, according to requirements in ETSI MEC, multi-access, multi-network and multi-operator scenarios are the reference assumptions motivating the need for MEC normative work on this area, including in the scenarios applicable to V2X services. For instance, some V2X services can be managed by OEMs (the so called "Vehicle OEMs scenario"), and, thus, it is reasonable to consider both single and multi-operator scenarios for such services. Note that V2X services are expected to be provided by different network operators in the same country and/or in different countries.

Similarly, the same applies when we consider the "ITS Operator scenario", that may additionally provide services for different vehicle OEMs. An Intelligent Transportation System (ITS) operator may need to provide a country-wide V2X service, by exploiting different operator networks (deploying different MEC systems), and offering this service to vehicles belonging to different OEMs. Note that also in this case, V2X services are expected to be provided by different network operators in the same country and/or in different countries.

As a consequence, in order to enable all use cases, a VIS service operating in the edge cloud may support C-V2X systems implemented in general scenarios. In particular, these scenarios assume the presence of multiple MEC vendors and the need to enable interoperable data exchange between them.

Moreover, multi-operator interoperability is a consideration for ensuring service continuity for V2X. More specifically, in a typical multi-operator scenario, there may be many scenarios involving a temporary absence of radio coverage (e.g., in roaming situations). Further, in a traditional V2X system the interconnection between Mobile Network Operators (MNOs) is terminated at the remote side, with clear disadvantages in terms of high End-to-End (E2E) latency; on the other hand, thanks to the exploitation of the VIS service (enabling also a "horizontal communication" between MEC systems), the interconnection between MNOs can be realized with low E2E latency.

V2X service continuity needs to be ensured across all the territory including both operators' coverage areas, as well as when leaving the coverage area of one operator and entering the coverage area of the other operator without any service disruption and guaranteeing E2E performance. For that purpose. VIS exposes information on PC5 configuration parameters and manages the multi-operator environment, especially when a UE is out of coverage.

MEC deployment depends on the definition of "edge". Several options are allowed by the MEC standard, in order to provide the required degree of freedom to MNOs, especially when deploying MEC in an NFV environment (in fact, in that case, MEC entities will be instantiated as Virtualized Network Functions (VNFs), thus with high flexibility in terms of deployment for the operator. Thus, in principle, as the edge cloud is exposed everywhere, MEC can be flexibly deployed depending on the use case/vertical segment/information to be processed. Furthermore, some components of the MEC system are better placed if co-located with some elements of the system. As an example, in certain use cases (e.g., enterprise), a MEC app may need to consume a MEC service locally, so it may be worth to deploy a MEC host locally equipped with the needed set of APIs. In other cases, deploying a MEC server in a data center (far from the access network) may not need to host some APIs like the RNI API (which is gathering radio network information from the radio base station). On the other hand, RNI information could be elaborated and made available in Cloud RAN (CRAN) environments at the aggregation point, thus enabling the execution of suitable radio-aware traffic management procedures. In some other cases, a bandwidth management API may make sense to be present both at the access network level and also in more remote locations, in order to properly setup transport network e.g., for Content Delivery Network (CDN)-based services.

Use Case—Internet of Things (IoT)

Internet of things (IoT) devices are in many fields such as factory autonomation, process autonomation, smart grids, smart retail, consumer devices, automotive, home automation, office and commercial use, security, military, and other applications. IoT is heavily reliant on communication response time, compute resources, and storage resources. Latency requirements depend on the application. For instance, in a factory automation setting, a roundtrip latency of 0.25 ms to 10 ms may be required, in a smart grid implementation a roundtrip latency of 3-20 ms may be used, and in a process automation setting 50-100 ms may be used. The network topology used in IoT networks may include any of the technologies described herein, in addition to: a mesh network provided using Bluetooth low energy (BLE) links; a wireless local area network (WLAN) network used to communicate with IoT devices through IEEE 802.11 (Wi-Fi®) links; a cellular network used to communicate with IoT devices through an LTE/LTE-A (4G) or 5G cellular network; or a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

The internet of things (IoT) is expected to be a significant producer and as well consumer of data. IoT network nodes may include a hardware RoT (e.g., using a DICE architecture) that attests node configuration to a peer node that likewise attests the aggregate sub-network and topology to a next layer attestation verifier. This structure roughly matches the nesting and topology dynamics of edge servers, FaaS, mesh and virtual tenant 'slices'; thus, it will be understood that a common, distributed, generalized attestation verification and analysis function can be used that assesses security at a top-level edge-to-edge or sub-divides into regional, local or other partitioning scheme.

IoT components typically include elements/devices from smart city, smart retail, smart vehicles, smart homes, etc. In a sense, the above discussed workloads such as video analytics and AR/VR are also a part of the IoT as the edge device is in theory an IoT device. For example, a face detection workload may be run for a device in a smart city setting, or for checkout in a smart retail shop, or as a part of AR for a private user. Therefore, IoT workloads in general include all the AI workloads in terms of processing a particular data point.

A more specific IoT-related workload is the IoT Gateway. IoT devices are expected to produce trillions of gigabytes of data every day in the near future. All of this data needs to be processed differently at different latencies for varying purposes. This also means that compute capability to process all this data at different locations (to fulfill the varying latency requirements) is required. The edge cloud is an ideal location for performing (a) data pre-processing (bidirectional), such as filtering, changing formats, etc.; (b) Data processing for latency critical use-cases and scenarios with connected components; and (c) Partial data processing and storage.

Data organization and processing is also an operation at the edge cloud. Fundamentally, data organization entities range widely in complexity, from simple key-value stores that are designed for very fast access to data to complex analytics operations. The following are broad classifications of data organization and processing software may be enabled at the edge cloud: (a) NoSQL Key-value stores/caches: store data for very fast lookup and retrieval. Perform no processing on the data (e.g., Aerospike, Redis); (b) NoSQL Column stores: store data for very fast look up and retrieval, perform some basic operations such as range lookups etc. (e.g., HBase, Cassandra); (c) NoSQL Document stores: perform operations such search, and index-based lookups (e.g., MongoDB, Marklogic); (d) NoSQL graph databases: perform specialized operations related to graph traversals. Example: Neo4j; (e) NewSQUSQL databases: perform a vast range of complex database queries; and (f) Analytics software: perform statistical analysis on data from various stores.

Some of the workloads that traditionally have been deployed in cloud or enterprise workloads may end up being deployed as well in edge locations. These include workloads from the following categories:

Low latency or contextualized data distribution: in this case, some of the existing workloads that are deployed in the cloud may be deployed in edge location to provide faster access to data, in a more secure way (no need to traverse multiple security domains), with less jitter in terms of data access (no need to traverse multiple layers—from telco infrastructure to the end server probably hosted in the edge). A first example workload is in-memory data bases such as HANA or Spark-SQL; and data front-ends such as web servers. This use case can be combined with accelerated web browsing n some examples. A second example workload is data mining or analytics on the edge: in this case, existing data mining workloads can be used in edge locations in order to do real-time or post-mortem data analytics. The use cases may involve real-time analytics to take dynamic or adaptive solutions: this could be for example used for adaptive network functions or for dynamic IoT management schemes. The main value proposition of this use case in terms of edge is on latency on real time decision-making. The use cases may also involve pseudo-real-time or post-mortem data processing: this could be used for example to process all the data that IoT devices generate to the edge which not necessarily needs to be stored and processed on the backhaul of the network. The main value proposition of this use case in terms of edge is on the backhaul traffic savings as well as compute distribution.

This edge cloud projection strategy may aid the platform definition by projecting the dimensioning of the edge cloud for different platforms, services offered and number of users. This may have the effect of projecting the edge cloud size (number of nodes) implicated by the different services provided at the edge; projecting the dimensioning of the edge cloud with and without accelerators such as FPGA for different services; and projecting the power requirements of different platforms. A projection model may be utilized for this purpose. For instance, a projection model may perform the projections by analyzing the workload characteristics that represent the respective services/use-cases. For individual workloads, a short description of the workload, assumptions made for modelling and the data and configuration used by the model may be considered by the projection model.

Many of the AI models used for the evaluations are a part of the OpenVINO toolkit, a toolkit for development and deployment of CNN-based deep learning inference. This toolkit provides common software tools and optimization libraries to support heterogeneous execution of AI models across computer vision accelerators such as CPU, GPU, FPGA and Movidius Neural Compute Sticks. The OpenVINO toolkit also includes a set of pre-trained AI models that are optimized to run on the underlying hardware, some of which have been used in the workload evaluation and analysis. Using this toolkit, for instance, video analytics may be performed by using a relevant AI model or a combination of models depending upon the scenario.

Use Case—Detection

IoT: Face Detection ADAS—It is the standard face detection model used for variety of purposes such as observing if passengers are in a vehicle or counting indoor pedestrian traffic. It also finds use in driving auxiliary warning system. For example, it can be used to continuously scan the driver for signs of fatigue and tiredness and alarm the driver with visual and audible alerts, where necessary, to bring their attention back to the road.

IoT: Face Detection—This model is typically used in a retail setting for purposes such as identifying known shoplifters, identifying people doing return fraud, etc. Furthermore, it can be combined or followed up with models that support retail analytics such as: (a) Age and gender recognition (with a model used to detect the age and gender of faces that have been detected. Faces detected from the face detection model are provided as input to this model, which will estimate the age and gender of the person. In the retail domain, it can be used for analytics such as understanding which category of people look and buy what type of items etc. This model can also be used in other domains such as video surveillance); and (b) Head pose estimation (with a model that detects the position of the head of a person). In a retail setting, it can be used to understand what caught the attention of the person. It may also be used in ADAS or video surveillance domains.

IoT: Person Detection—The person detection is used for detecting people with cameras mounted on higher vantage points in both indoor and outdoor environments. This can be used for a variety of purposes such as crowd counting, video surveillance, etc.

IoT: Person, Vehicle, and Bike Detection—This model is used for video analytics from outdoor cameras for purposes such as distinguishing between people, people riding bikes, bikes alone, and vehicles. A variety of lighting conditions in this model improve accuracy in daylight, darkness, and variations in the weather.

Use Cases—Healthcare Industry Applications

Industry applications may be in the healthcare field, manufacturing, retail, or other industries. In healthcare, edge computing may be used to implement various medical appliances through connectivity and analysis. An example use case is tele-surgery, where a physician is able to operate on a patent remotely. Such a use case includes high compute, communication, and storage resources.

In another context, with more deaths and liabilities stemming from non-communicable diseases (e.g., NCDs, cancer and diabetes) it is important to devise regular screening methods for broad populations. Given the twin issue of fewer specialists and more people residing in rural areas compared to urban in many countries, it is important to look for solutions that can scale and address these issues. Artificial Intelligence (AI) based technology has shown tremendous success in terms of quality in screening of NCDs/CDs that many countries in the world have started adopting this technology to augment specialists thereby handle large scale deployment (e.g., UK) & provide access to these services through AI assisted tele-screening in rural areas (e.g., China). With AI assisted (tele) screening, early intervention for large number of NCDs (and CDs) can be greatly enhanced that can otherwise destroy the backbone of any country—namely human resources. Early screening of NCDs/CDs will help provide a better treatment plan and a better quality of life post treatment. And these services could be made available at remote locations in rural places without patients having to travel long distances for screening. These AI assisted disease screening can be based on imaging (X-ray, Ultrasound, Fundus, OCT, PET, MRI, Infrared, CT) and non-imaging modalities (physiological body parameters such as height, weight, BMI, heart rate, ECG, blood pressure, blood sugar, etc.).

Another dimension that is slowly and steadily gaining prominence is the need to migrate to health care from sick care. This necessitates continuous real-time analytics of potentially risk prone persons who can be monitored for early warning signals. This can be achieved through wearable medical devices that can continuously monitor certain physiological parameters in order to alert healthcare service providers with timely inputs. Another usage is continuous real-time analytics of old-age persons who can be monitored for early warning signals. These analytics will also include audio-visual data apart from physiological parameters monitored through wearable devices. Last, is the usage centered around continuous real-time analytics on physiological parameters captured from sick patients who are recovering in-home-care or in-hospital-care. With the recent FDA approval for certain AI based disease diagnostic solutions, it has opened the floodgates for application of AI technology in a highly protected healthcare domain.

Healthcare analytics deployable at the edge may be classified among in three segments for application of AI technology: (a) Disease screening through AI; (b) Multi-modal disease diagnosis through AI for accurate diagnostic quality; and (c) Precision medicine through AI for targeted therapy thereby improving impact of intervention.

In a workflow in the healthcare analytics domain, there are several aspects. Apart from scope to update AI models based on new evidence or ground truth, there is a constant endeavor to ensure that the quality of screening/diagnosis is of utmost importance, namely false negatives should be 0 and false positives tending to 0. This means that the AI engine that can inference also may have the performance to execute incremental model updates (retraining) based on new evidence or ground truth.

Latency of inference is a critical parameter. Performance of the AI engine may be much faster than a specialist, so that the specialist gets timely inputs from AI engine for final diagnosis.

Since many of the diagnostic modalities are based on images, there is need for better image compression without loss of critical disease biomarkers. Additionally, healthcare data is strictly controlled in terms of usage. This necessitates that there is sufficient support for privacy/protection of healthcare data.

AI techniques such as object detection and segmentation offer unique possibilities to help radiologists identify issues faster and more accurately, which can translate to better prioritization of cases, better outcomes for more patients, and reduced monetary costs for hospitals. However, AI for medical imaging is often challenging because the information is often high-resolution and multi-dimensional. Down-sampling images to lower resolutions because of memory constraints can cause misdiagnoses, unless the biomarkers are preserved. Once an AI model is trained to acceptable levels of accuracy, it needs to be incorporated into the imaging modality architecture. Given how large radiology images typically are, it is critical to be able to process these images efficiently without slowing down radiologists' workflows or impacting the accuracy of the models.

For example, a bone-age-prediction model takes inputs from X-ray images of human bones, such as a wrist, along with a patient's gender. The inference model then determines a predicted age from the bone, in order to help identify medical conditions that lead to bone loss. For example, if the predicted age for a younger patient is less than the actual age, the patient could be suffering from malnutrition.

Another example is a lung-segmentation model which identifies the lungs from a CT scan of a patient's chest, and it then creates a segmentation mask around the detected organ. The results can be used to measure size and volume of the lungs or to load organ-specific disease screening models for tuberculosis or pneumothorax detection, for example. In addition, by isolating the lung in the image, a radiologist can have a clearer anatomical view of the organ, free of distraction from other structures.

Use Case—Accelerated Browsing

Accelerated browsing refers to web page related pre-processing at the edge to prepare and send a page or other content to a user device. Examples of accelerated browsing include web page rendering, ad blocking, content evaluation, and the like. Accelerated browsing is processor resource intensive (e.g., using CPU and FPGA resources).

The edge accelerated web is a use case that allows edge cloud services to be used for every smartphone user. Page load time is dominated by the front-end operations more than the server in the normal networks. The browser performs operations such as content evaluation and rendering. This not only consumes time but also power, which is important for power-critical end devices such as mobile phones. By performing these operations at the edge, users can experience a fine browsing experience and as well save the battery power on their devices. Operations may include ad-block, rendering, content evaluation, video transcoding etc.

This use case is not latency bound; however, various requirements may cause the edge server to not delay the processing and thereby slow the web page load time. In particular, an edge server may be adapted to handle large numbers of HTTP requests and deliver a defined QoS for individual requests.

Use Case: Speech Analytics

With language user interface (LUI) gaining ground as a more natural way of interfacing with the user, there will be more speech analytics applications that will touch us all. Chatbots is an example. The following provides examples of speech analytics in the (edge) cloud (server usages).

In an example, two people are conducting a conversation in two different languages. This conversation speech usage involves several speech analytics components, namely voice (or speech) recognition that converts voice to text of one language, machine translation that converts text of one language to text in second language, and speech synthesis that converts text to speech of second language. Relevant requirements include: high quality, real-time performance and low latency.

Speech analytics may be used in a wide variety of user interfaces across several use case domains. For instance, there are several application domains for speech analytics. The application domains include, but not limited to digital assistant, virtual call center, healthcare and (social) media, automotive, and security. In different application domains, there are several possible usages.

As another example, in the digital assistant domain, there are: voice messaging, voice search, voice dialing, voice memo, voice commands, voice navigate, and voice mail.

As another example, in the virtual call center domain, there are: telecom sector, financial sector, retail sector, health sector, transport sector, e-commerce sector, hospitality sector, and other sectors where speech analytics may be used.

As another example, in the healthcare domain, there is medical transcription, medical assistants (e.g., chatbots), medical analytics (e.g., text, charting, etc.), electronic health records with voice recognition, etc.

As another example, in (social) media application domain, there are: voice chat, automatic subtitle generation (e.g., as performed by YOUTUBE®), content discovery (search based on voice input), language translation, insight into media traffic to trigger suitable advertisements (as a possible business avenue), and media summarization.

As another example, in automotive domain, there are voice commands, voice navigate, etc.

As another example, in the security domain, there are voice recognition (e.g., biometric security), voice passwords, voice control, etc.

Even though there are several usages per application domain discussed here, and several application domains for speech analytics, the core components of speech analytics may be used across any number of domains. The core components include: 1) automatic speech recognition (ASR), 2) machine translation (MT), 3) text to speech (TTS), and 4) natural language understanding (NLU) or natural language processing (NLP).

Some of the commonly occurring usages in speech analytics are composed of primitives from speech analytics, namely ASR, MT, TTS, NLP, and Biometrics. These usages may vary in terms of requirements. Some of the common requirements for these usages include throughput (number of concurrent streams that can be processed by a given hardware), latency (in terms of seconds) and quality. Usages can have widely varying requirements with respect to latency, namely conversational speech analytics cannot tolerate more than one-half second end-to-end latency, while sentence transcription can incur delay of about few seconds (2-4 s). All usages have requirements that demand highest quality (for acceptance of speech analytics as an AI aid) and highest throughput (in order to offer a cost-effective solution).

Apart from throughput, latency and quality, there can be requirements relating to model size (translates to vocabulary size) that is expected to range from few MBs to 100 s of MBs (based on current technologies, but likely to grow in size), languages/dialects/accents supported, privacy/security needs of data and mixed modal analytics wherein joint analytics of image/video/audio/speech/text data is performed. In addition, there are requirements pertaining to flexibility versus efficiency that can drive use of accelerators to CPUs, wherein edge cloud might serve special purpose needs like low vocabulary size & low latency and hence benefit from acceleration.

To provide AI-enabled Speech Analytics in contact centers, it is important that solution providers deploy their AI-based solutions on flexible platforms that provide high performance and scalability without driving up monetary or resource costs. An end-to-end deployment of a Virtual Voice Assistant brings together a variety of solution components that include algorithms with deep neural networks, traditional Speech processing, Graph processing, Enterprise software integration etc. An efficient platform architecture for such deployments may offer leading performance across these workload types and adapt for real time latency, instead of throughput. This platform architecture may be provided by a scalable CPU (e.g., Intel® Xeon™ Scalable CPU) used for an AI inference deployment, as performance and scalability benefits may be introduced for AI enabled Speech Analytics workloads without adding complexity to the deployment environment.

Speech Analytics includes technologies such as Continuous Speech Recognition (CSR), Natural Language Processing (NLP), Speech Synthesis, (Text-to-Speech), Voice Biometrics etc. Traditionally Speech Analytics has been applied offline. For example, managers recorded and spot-checked customer interactions: picking out a few conversations, examining them, and then deducing how well agents comply with company guidelines. AI based Speech Analytics allow businesses to respond in real time. Speech recognition, teamed with speech analytics, enables organizations to monitor more, even up to 100% of the conversations. Looking ahead, these assist services can pave way for Bot Assistants that offer self-service to customers in an unconstrained natural language interface, before handing off the call to an experienced agent.

Even though Speech Analytics use-cases closely follow the requirements of conversational interfaces found in consumer devices like Smart Speakers or Mobile-based voice assistants, there are some unique distinctions too. Speech Analytics solutions for Contact centers tend to be very domain-specific and less general-purpose. Most Speech Analytics vendors incorporate the flexibility to customize their solution based on industry domain. Additionally, these solutions need to support multiple regional languages. Thus, the diversity of algorithms deployed can be substantial.

III. Resource Allocation and Deallocation Improvements for Multi-Stakeholder Edge Computing Systems In further examples, advanced methods of resource allocation and deallocation may be extended to a variety of multi-stakeholder edge computing settings.

Edge Heartbeat Examples

One of the considerations in edge deployments is service assurance. Edge computing is unique in that there may be tens or hundreds of thousands of network (or edge) devices (e.g., drones, sensors, user equipments (UEs), or other computing devices) communicating information with an edge service (e.g., a computing service executing on a service coordinating entity). With a large numbers of network devices, failures are bound to occur within edge deployments. For example, sensors may fail at a certain rate, and such device failures may need to be factored in to assess the edge service viability, while the edge service is gathering data from multiple sources including the network devices.

The following heartbeat tracking techniques can be used for managing device connectivity of a plurality of edge nodes or edge devices (e.g., nodes 302, 312, 322) within an edge computing network (e.g., edge cloud 110, and the edge computing system configurations depicted in FIGS. 3 to 22D) in connection with facilitating service assurance, with features of heartbeats, beacons, and tracking. Normally, a "heartbeat" applies to tracking when a device, service or application is down or not responding due to latency issue. A location "beacon" is used when a device, tower, server, etc. broadcasts a location and the recipient can through triangulation or otherwise determine its location. Location "tracking" is applied to devices that share their location information (or obtain it from a third party) such that a peer can create a log of locations visited. The following discussion of a heartbeat service integrates these types of reporting aspects into a more robust version of a heartbeat applicable for edge computing environments.

More specifically, a service coordinating entity (e.g., a Multi-Access Edge Computing (MEC) host, such as implemented according to the MEC architectures depicted and described in FIGS. 75-78) executing the computing service (e.g., edge services and functions depicted and described with relation to FIGS. 7 to 12) can include an edge heartbeat component which is configured to perform one or more of the following functionalities: monitoring and ensuring a sufficient number of edge devices are active and communicating with the computing service; determining where the edge devices are located and tracking such devices (e.g., whether an edge device is turned ON or OFF, whether an edge device is active or inactive in relation to communicating with the computing service, whether an edge device is associated with the computing service based on device location, latency, geo-fencing, and so forth); and providing notifications in connection with managing service assurances for the computing service (e.g., providing a notification when a number of edge nodes that are communicatively coupled to, or actively communicating with, the computing service is below or above a threshold number). These notifications may be provided in the form of messages and messaging exchanges, stored data values, interface actions, and the like.

Figure 23:
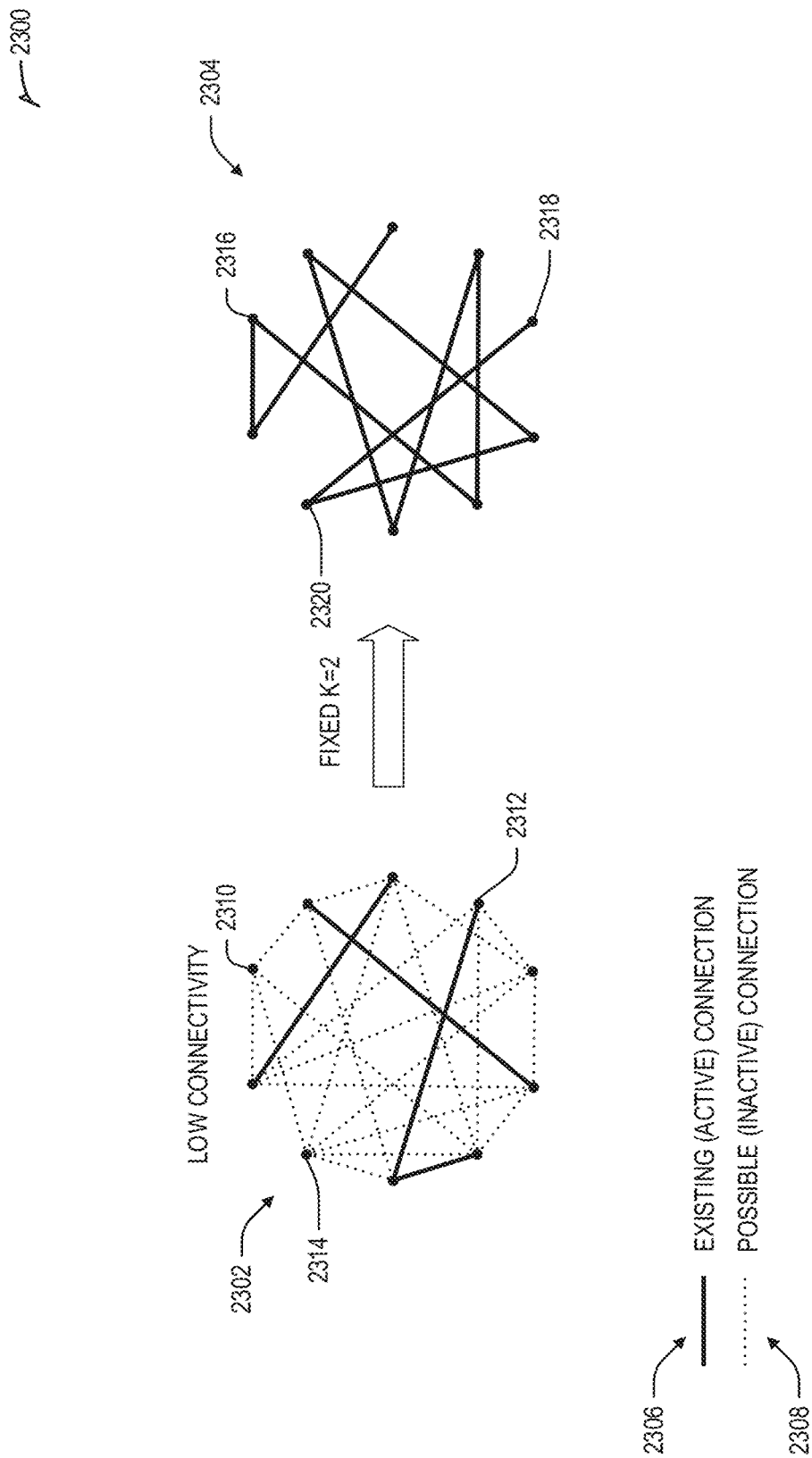
FIG. 23 illustrates a low connectivity cluster of edge nodes and connectivity adjustment based on a notification by an edge heartbeat component.

FIG. 23 illustrates a low connectivity cluster of edge nodes and connectivity adjustment based on a notification by an edge heartbeat component, in accordance with some aspects. Referring to FIG. 23, diagram 2300 illustrates a plurality of edge nodes in a low connectivity configuration 2302. More specifically, the edge nodes (illustrated as dots in FIG. 23) can be coupled to each other as well as to an edge service executing on a service coordinating entity (e.g., a MEC host, which is not illustrated in FIG. 23) via existing (or active) connections 2306. FIG. 23 further illustrates possible (or inactive) connections 2308 between the edge nodes.

In some aspects, an edge heartbeat component (e.g., as illustrated in connection with FIG. 25) is configured to monitor the number of connections between the edge nodes and the edges service as well as the connections between the edge nodes themselves, and generate a notification when the number of connections falls below a connectivity threshold.

FIG. 23 illustrates an example connectivity threshold of K=2, where the connectivity threshold indicates a maximum number of active connections per edge node. The low connectivity configuration 2302 is associated with some edge nodes such as 2310, 2312, 2314 having a single or no active connection between themselves or to an edge service. After an edge heartbeat component notification of low connectivity for the edge service, connectivity is adjusted and the edge nodes transition into a normal connectivity configuration 2304, where respective network nodes such as 2316, 2318, 2320 have at least one or two active connections to the edge service or to another node. However, a generalized attestation capability may supply heartbeat-like liveness and other feedback where heartbeat results have high veracity, security, freshness and so forth.

Figure 24:
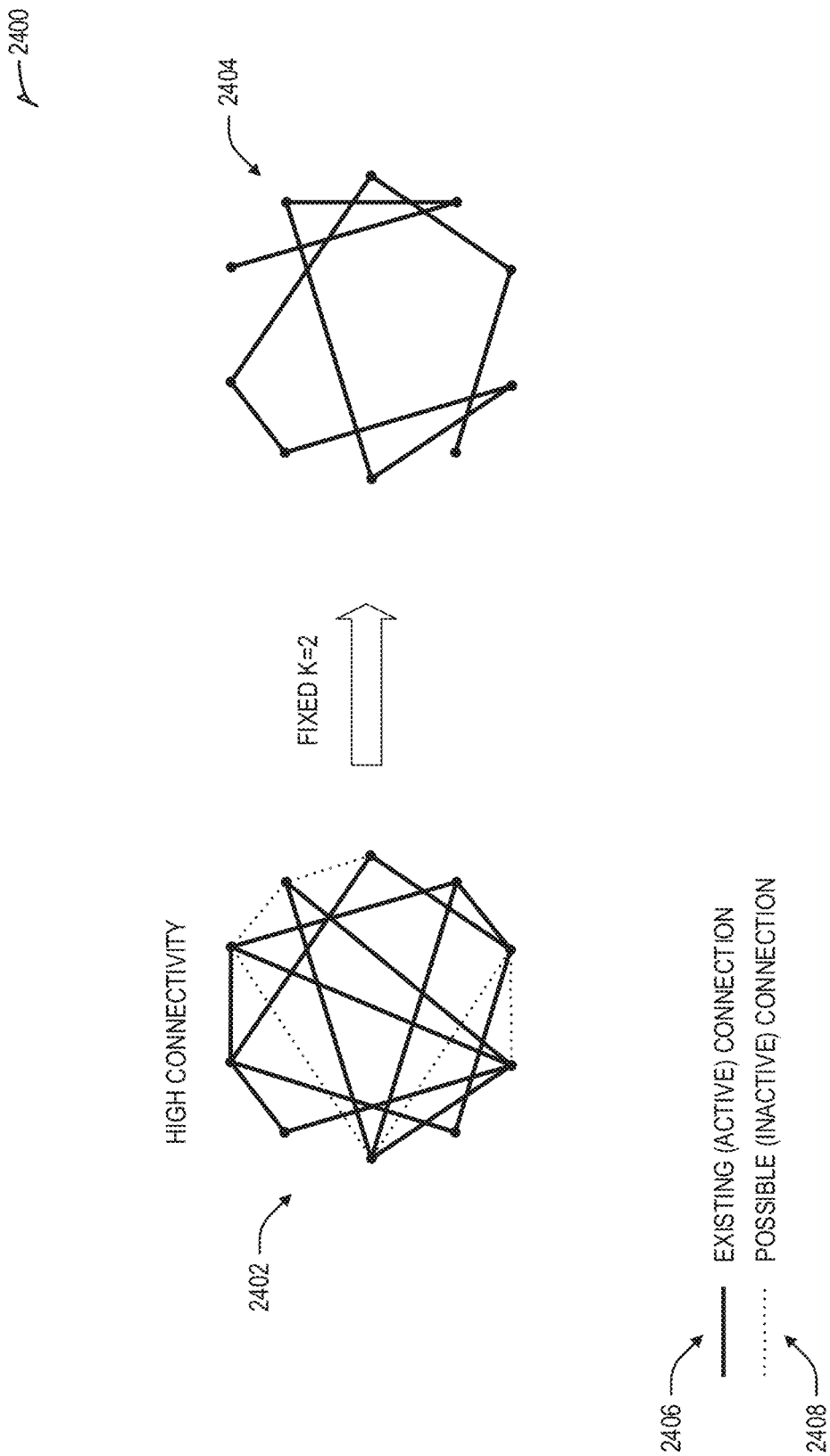
FIG. 24 illustrates a high connectivity cluster of edge nodes and connectivity adjustment based on a notification by an edge heartbeat component.

FIG. 24 illustrates a high connectivity cluster of edge nodes and connectivity adjustment based on a notification by an edge heartbeat component, in accordance with some aspects. Referring to FIG. 24, diagram 2400 illustrates a plurality of edge nodes in a high connectivity configuration 2402. More specifically, the edge nodes such as 2310-2320 (illustrated as dots in FIG. 23) can be coupled to each other as well as to an edge service executing on a service coordinating entity (e.g., a MEC host, which is not illustrated in FIG. 24) via existing (or active) connections 2406. FIG. 24 further illustrates possible (or inactive) connections 2408 between the edge nodes.

In some aspects, the edge heartbeat component (e.g., as illustrated in connection with FIG. 25) is configured to monitor the number of connections (e.g., network operations, logical operations) between the edge nodes and the edges service as well as the connections between the edge nodes themselves, and generate a notification when the number of connections is above a connectivity threshold.

FIG. 24 illustrates an example connectivity threshold of K=2, where the connectivity threshold indicates a maximum number of active connections per edge node. The high connectivity configuration 2402 is associated with some edge nodes having more than one active connections between themselves or to an edge service (not illustrated in FIG. 24). After an edge heartbeat component notification of high connectivity for the edge service, connectivity is adjusted and the edge nodes transition into a normal connectivity configuration 2404, where respective network nodes have at least one or two active connections to the edge service or to another node. In still further examples, such heartbeats may be deployed within clusters (e.g., logical or physical groups or domains) of edge nodes.

Figure 25:
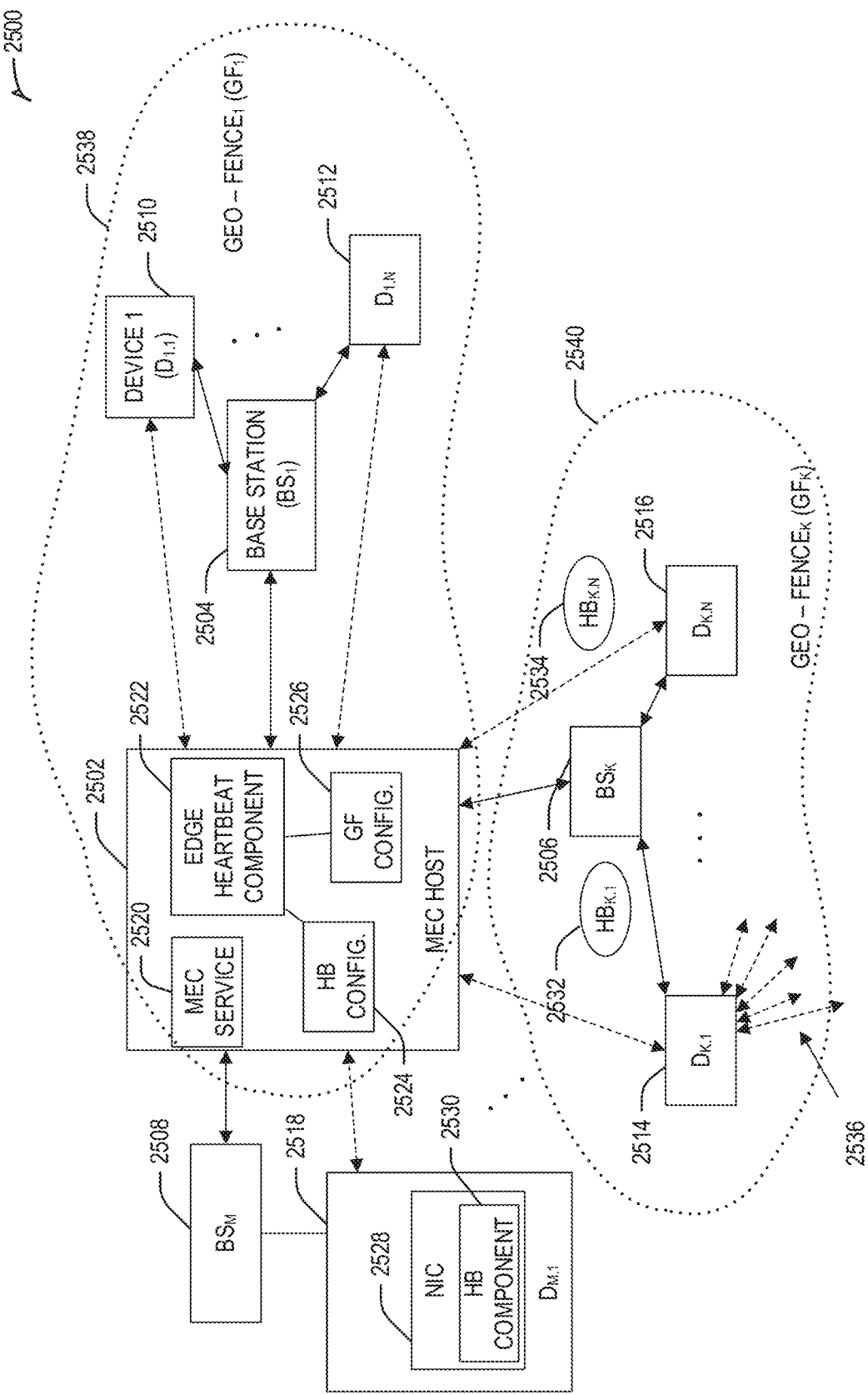
FIG. 25 illustrates an example edge deployment using an edge heartbeat component within an edge host.

FIG. 25 illustrates an example edge deployment 2500 using an edge heartbeat component within an edge host, in accordance with some aspects. Referring to FIG. 25, the edge deployment 2500 includes a service coordinating entity such as a MEC host 2502 coupled to a plurality of base stations 2504, 2506, . . . , 2508. The base stations can be coupled to a plurality of edge devices such as 2510, . . . , 2512, 2514, . . . , 2516, and 2518, respectively. (Although a MEC host is depicted, the concepts are equally applicable to fixed or non-mobile edge computing nodes).

In some examples, the respective edge devices 2510, . . . , 2512, 2514, . . . , 2516, and 2518 may be communicatively coupled to the MEC host 2502 via direct communication links (e.g., the dashed lines illustrated in FIG. 25) or may be communicatively coupled to the MEC host 2502 via the corresponding base stations. In some aspects, the respective edge devices may be coupled to one or more other edge devices that use the MEC service 2520 via a plurality of communication links (e.g., communication links 2536 used by device 2514). In this regard, information, including heartbeat information, can be passed from device to device for communication back to the MEC host 2502 for use by the edge heartbeat component 2522.

In some examples, the MEC host 2502 is executing an edge service, such as the MEC service 2520. The MEC service 2520 can be communicatively coupled and can exchange information with the base stations 2504, 2506, 2508, as well as the edge devices 2510, . . . , 2512, 2514, . . . , 2516, and 2518. The MEC host 2502 further includes an edge heartbeat component 2522, which may comprise suitable circuitry, interfaces, and/or instructions and is configured to perform one or more functionalities discussed herein in connection with connectivity monitoring and connectivity assurance. Such functionalities can include establishing device heartbeat, where the device heartbeat or beacon can include information indicative of device availability for communication with the MEC service 2520 (e.g., whether the device is turned ON and is online/available for communication), information indicative of device location (e.g., location in relation to the base station the device is associated with or in relation to the MEC host 2502), or other device-related information; propagating to base stations (or other devices) the location information received as part of the heartbeat information (e.g., location information with regard to the corresponding base station associated with the device); tracking whether or not edge devices are down (e.g., turned OFF or otherwise unavailable for communication); keeping track of devices that are available (or not available) for communication with the MEC service; implement geo-fencing mechanisms; and so forth.

In some aspects, the MEC host 2502 is configured (e.g., by mobile network operators) to implement heartbeat reporting by a cluster of edge devices (e.g., via the heartbeat configuration information 2524). In an example, respective clusters are configured (e.g., via the heartbeat configuration information 2524) with frequency of heartbeats, heartbeat information specification, and so forth. In some aspects, the edge heartbeat component 2522 is configured with one or more threshold parameters (e.g., threshold K as discussed in connection with FIGS. 23 and 24) for purposes of determining when to trigger a notification (e.g., to a mobile operator) that the MEC service is over- or under-subscribed/used.

After the MEC host 2502 communicates the heartbeat configuration information 2524 to the edge devices, heartbeat information can be periodically reported back to the MEC host. For example, edge devices 2514, . . . , 2516 can report corresponding heartbeat information 2532, . . . , 2534. In some examples, the respective edge devices include one or more hardware and/or software component (e.g., within a network interface card) to implement the heartbeat reporting functionalities, geo-fencing functionalities, and so forth. For example, edge device 2518 includes a network interface card 2528 with a heartbeat component 2530 configured to report heartbeat information as configured by the MEC host 2502.

In some aspects, the edge heartbeat component 2522 within the MEC host 2502 can configure one or more geo-fences using geo-fence configuration information 2526. For example, the edge heartbeat component 2522 can use the geo-fence configuration information 2526 to configure a first geo-fence 2538, which can be associated with a location of the base station 2504, so that only devices within the geo-fence 2538 and associated with base station 2504 can use the MEC service 2520. The edge heartbeat component 2522 can configure additional geo-fences, such as geo-fence 2540, which can be based on location of other edge devices (e.g., base station 2506) and can be used to configure edge devices within the geo-fence to use the MEC service 2520. In some aspects, the geo-fences can be configured based on other criteria, such as proximity to the MEC host 2502, and so forth. In still further examples, an LSM or other security policy can describe geo-fence policies, and a MEC host, tower, base station, or other node with coordinates and geo-fence can serve as an LSM enforcement point.

In further examples, the location can be attested such that the RoT capabilities of the location sensors can establish greater confidence in location coordinates. Thus, if a global navigation (e.g., GPS) coordinate is conditional on a satellite signal where the satellite also contains a RoT key and attestation signal, the attested location coordinate can be reported giving the geo-fence access enforcement mechanism greater reliability and resiliency.

Even though the edge heartbeat component 2522 is illustrated as implemented within the MEC host 2502 the disclosure is not limited in this regard in the edge heartbeat component can be implemented within one or more other edge devices, such as within one or more of the base stations illustrated in FIG. 25.

In some examples, the respective base stations (2504, . . . , 2508) or the MEC host 2502 can be configured to implement heartbeats or beacons to groups of edge devices, including configuration of the frequency of reporting as well as the threshold that can be used for triggering alarms.

In some examples, the edge heartbeat component 2522 can be configured to use the received heartbeat information to track the following information associated with edge devices within the edge deployment 2500: device ID, base station ID (for the base station associated with the identified device), central office (CO) ID (for the CO associated with the identified device), connected device 1D list (e.g., list of IDs of the edge devices that are connected with the identified device), and so forth. In some aspects, the edge heartbeat component 2522 can use one or more Bloom filters (or other software or hardware structures) to implement such tracking mechanism as well as to facilitate performing one or more of the heartbeat processing functionalities in connection with connectivity assessment.

In some examples, the techniques disclosed herein can be applied in an Edge/MEC environment context (e.g., such as implemented according to the MEC/5G architectures depicted and described in FIGS. 75-78) such that a system of edge nodes that spans the gap between an Access Edge and a Cloud Edge ensures there is a path (or multiple paths) from edge to edge. Such functionalities prevent the possibility of a service interruption or resource interruption (e.g., brown-out) in the edge cloud instance (e.g., e.g., edge cloud 110, and the edge computing system configurations depicted in FIGS. 3 to 22D) not being detected proactively.

In some examples, the heartbeat reporting can be configured so that respective devices report heartbeat information periodically, at a pre-determined frequency. In some examples, the respective base station or the MEC host (e.g., the device, or devices, that are configured with an edge heartbeat component) can periodically poll (or request) heartbeat information from respective edge devices in the edge network.

In a further example, a method for a technique for managing device connectivity of a plurality of edge nodes within an edge computing network may be implemented with use of an edge heartbeat component. In some aspects, the method can be performed by an edge heartbeat component (e.g., 2522) of a service coordinating entity (e.g., MEC host 2502) executing an edge service (e.g., MEC service 2520) communicating with a plurality of edge nodes (e.g., 2510, . . . , 2518) within an edge computing network. In a first operation, heartbeat configuration information (e.g., 2524) is encoded for transmission to the plurality of edge nodes, the heartbeat configuration information configuring reporting of device heartbeat information. At a second operation, the device heartbeat information received from the plurality of edge nodes based on the heartbeat configuration information is decoded. At a third operation, a number of edge nodes of the plurality of edge nodes that are connected to the computing service is determined based on the device heartbeat information. At a fourth operation, a notification indicative of device connectivity for the computing service is generated based on the determined number of edge nodes. For example, if it is determined that the number of edge nodes using the edge service is above a threshold number, an alert that can be generated. Other types of alerts or notifications can also be generated based on the received heartbeat information to manage device connectivity within an edge computing network and facilitating service assurance.

A first example method (Example A1) for implementing edge heartbeats is a method for managing device connectivity of a plurality of edge nodes within an edge computing network (e.g., edge cloud 110, and implementing systems and devices, such as implemented on node or device 2200, 2232, 2240, or 2250), the method comprising: by one or more processors of a service coordinating entity executing a computing service communicating with the plurality of edge nodes within the edge computing network: encoding for transmission to the plurality of edge nodes, heartbeat configuration information, the heartbeat configuration information configuring reporting of device heartbeat information; decoding the device heartbeat information received from the plurality of edge nodes based on the heartbeat configuration information; determining a number of edge nodes of the plurality of edge nodes that are connected to the computing service based on the device heartbeat information; and generating a notification indicative of device connectivity for the computing service, based on the determined number of edge nodes.

In a second example (Example A2), the subject matter of Example A1 includes, by the one or more processors of the service coordinating entity: generate the notification when the number of edge nodes that are connected to the computing service is below a threshold number.

In a third example (Example A3), the subject matter of Examples A1-A2 includes, the device heartbeat information including device location information for respective nodes of the plurality of edge nodes.

In a fourth example (Example A4), the subject matter of Example A3 includes, the device location information including location information in relation to the service coordinating entity or in relation to a base station communicatively coupled with the plurality of edge nodes and the service coordinating entity.

In a fifth example (Example A5), the subject matter of Example A4 includes, the heartbeat configuration information configuring a frequency of reporting the device heartbeat information.

In a sixth example (Example A6), the subject matter of Examples A1-A5 includes, the device heartbeat information received from at least one edge node of the plurality of edge nodes including a data packet indicative of transmission time the data packet is transmitted by the at least one edge node.

In a seventh example (Example A7), the subject matter of Example A6 includes, by the one or more processors of the service coordinating entity: determine communication latency between the at least one edge node and the service coordinating entity based on the transmission time and a time the data packet is received by the service coordinating entity; and generate the notification based at least on the determined communication latency.

In an eighth example (Example A8), the subject matter of Examples A3-A7 includes, by the one or more processors of the service coordinating entity: configuring a geo-fence associated with the computing service.

In a ninth example (Example A9), the subject matter of Example A8 includes operations to, by the one or more processors of the service coordinating entity: determine, based on the device heartbeat information, a number of edge nodes of the plurality of edge nodes that are outside of the configured geo-fence; and generate the notification based at least on the determined number of edge nodes that are outside of the configured geo-fence.

In a tenth example (Example A10), the subject matter of Examples A1-A9 includes, the service coordinating entity as a Multi-Access Edge Computing (MEC) host executing the computing service as a MEC application instantiated on a virtualization infrastructure of the service coordinating entity.

In an eleventh example (Example A11), the subject matter of Example A10 includes, the MEC host being configured to operate according to a standard from a European Telecommunications Standards Institute (ETSI) MEC standards family.

In various settings, Examples A1-A11 (and other aspects of this edge heartbeat use case) may be observed or monitored as a result of, an API or specification defining use of the heartbeat; protocols defining or involving use of the heartbeat: and other uses and implementations of the heartbeat with the following examples (e.g., Examples B1-AA11). Examples A1-A11 and other aspects of heartbeats may also be observed or implemented as a result of service operations and service functions (e.g., as invoked or operated in FaaS, or EaaS settings, where such FaaS or EaaS elements are made up of code elements designed to be executed on a compute element in the edge cluster or be serviced by some compute element in communication with the edge cluster that functions to accomplish the objectives and obligations of the SLA or other obligations of the edge cluster). Additionally, the methods of examples A1-A11 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples A1-A11 (and a heartbeat service) may be combined with any of the other Examples herein to configure an edge cluster or edge cloud system, as coordinated or designed by a system orchestrator or architect.

Trackable Data Movement Examples

There are large amounts of dynamicity in edge deployments and, therefore, one of the considerations in such deployments is service assurance and data attestation. Edge computing is unique in that there may be tens or hundreds of thousands of network (or edge) devices (e.g., drones, sensors, user equipments (UEs), or other computing devices) communicating information with an edge service (e.g., a computing service executing on a service coordinating entity, such as discussed above for the edge services and functions depicted and described with relation to FIGS. 7 to 12). With a large numbers of network devices, different types and quantity of information is exchanged between devices at any instance. For example, sensors may continuously send different types of information to the edge. A key challenge that arises is that of trust, namely, how can edge infrastructure handle thousands of devices sending information, while preserving the means to trust a source of data that may flow through several intermediate hops en route to the edge infrastructure.

The techniques disclosed herein can be used for handling data attestation in the edge cloud (e.g., edge cloud 110, and the edge computing system configurations depicted in FIGS. 3 to 22D). More specifically, disclosed techniques can be used for providing edge devices and infrastructure with the hooks required to track a flow of events involving data transfer. For example, this may be provided with a trusted mechanism for sensor A to send data to gateway B to hub C to edge server D, while concurrently handling several other such streams (thus, dynamically moving the workload data to the relevant compute resources).

Figure 26:
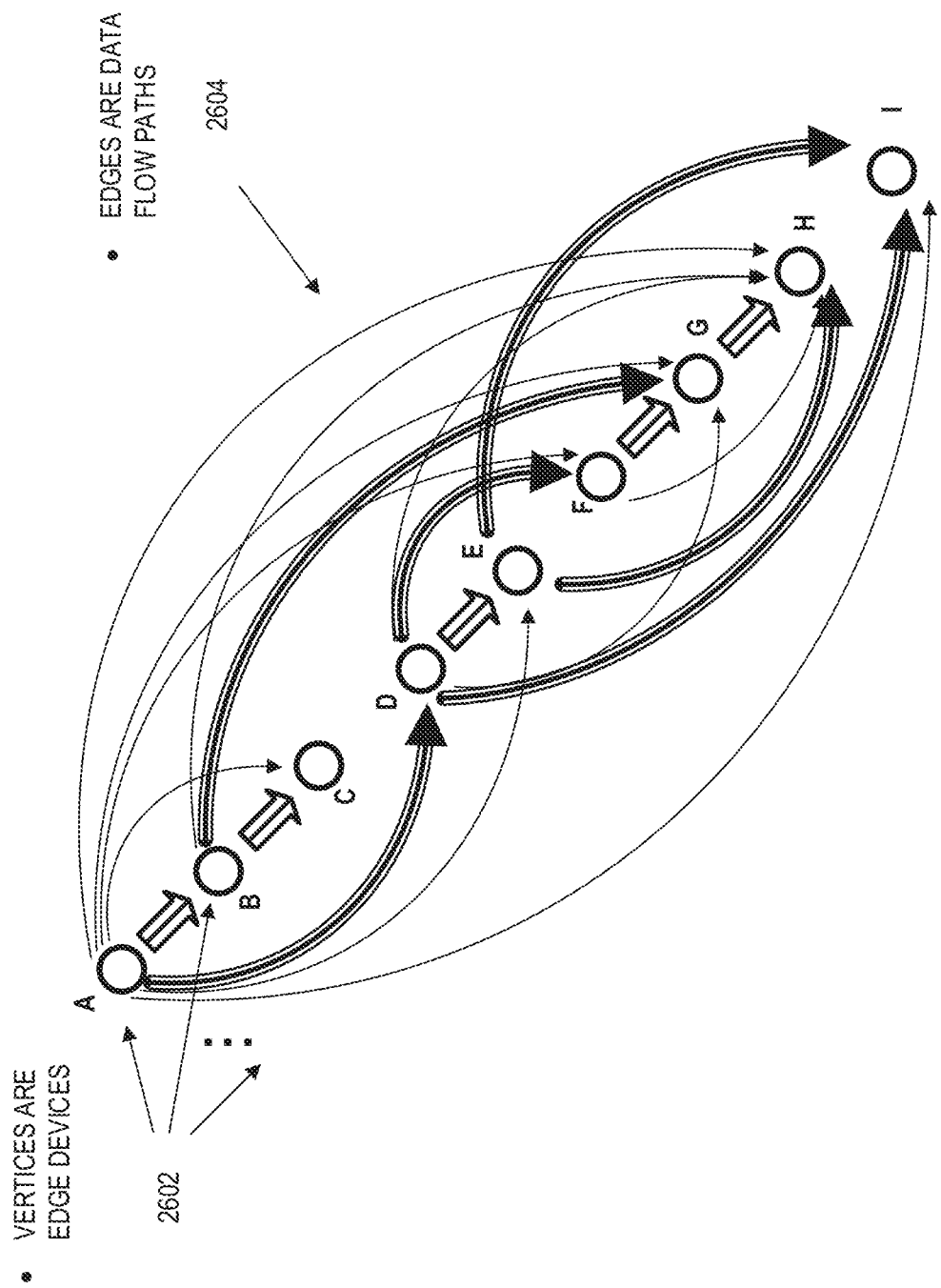
FIG. 26 illustrates an example data flow between edge nodes.

FIG. 26 illustrates an example data flow between edge nodes (e.g., implementations of nodes 302, 312, 322), in accordance with some aspects. Referring to FIG. 26, there is illustrated a data communication exchange between a plurality of edge nodes 2602 in an edge computing network 2600. More specifically, the edge nodes 2602 (which can include edge network devices A-I) exchange data via the data flow paths 2604 (illustrated as edges between the edge nodes 2602).

In some aspects, an edge look-up table may be cached at multiple network destinations within the edge computing network 2600. The edge look-up table (LUT), which can be the same as LUT 2728 in FIG. 27, can include authentication information for respective nodes of the edge nodes 2602. For example, the LUT can list the authorized edge nodes within the edge computing network 2600, authentication credentials for respective nodes of the edge nodes, and other authentication information which can be used for data attestation. In some aspects, the LUT can be provisioned to the edge nodes via a service coordinating entity such as MEC host, as illustrated in FIG. 27 (e.g., implemented according to the MEC architectures depicted and described in FIGS. 75-78).

In some aspects, the LUT can be used as a reference mechanism through which information is attributed to sources at each data communication hop. For example, as data is communicated between edge nodes, the data packet can include edge handle specifying, for example, the edge nodes that the data has traversed. For example, a volume of data may have an edge handle indicating that edge nodes with IDs A→B→C→D have transmitted that packed, and the LUT can be used to determine whether one or more of the edge nodes specified by the edge handle are authorized for the data exchange within the edge computing network 2600. In an example, each node in a flow-path can be an LSM or other security policy enforcement point, especially with use of a flow-directed security policy or security feature.

Upon determining that a node is not authorized or data attestation for the communication exchange indicated by the edge handle has failed, a notification/alert can be generated and communicated within the edge computing network. In further examples, features of information centric networking (ICN) may be involved with or adapted for use within edge computing network 2600 or 2700.

Figure 27:
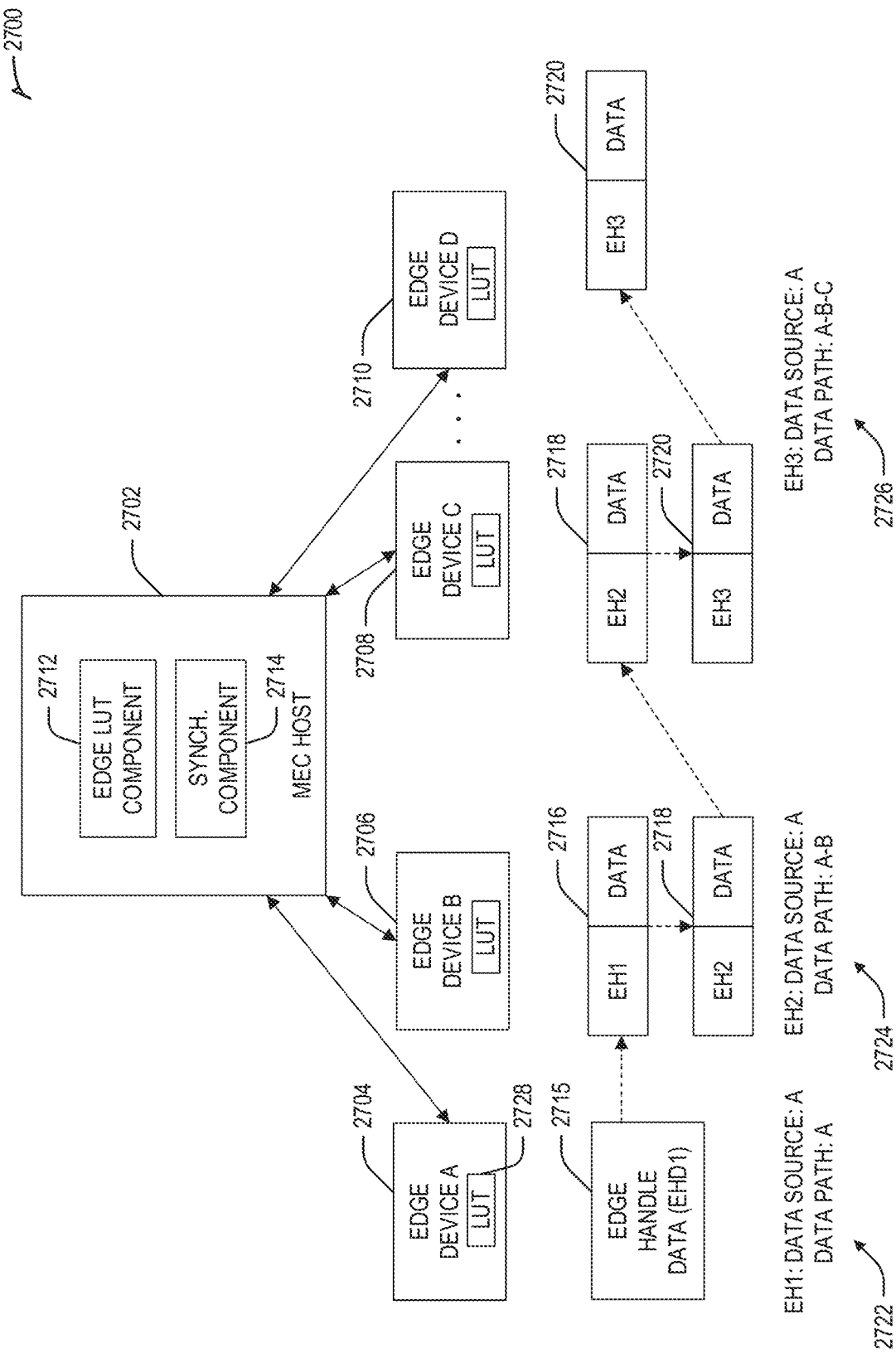
FIG. 27 illustrates techniques for attestation of data within an edge computing network.

FIG. 27 illustrates techniques for attestation of data within an edge computing network, in accordance with some aspects. Referring to FIG. 27, the edge computing network 2700 includes an edge compute host 2702 (e.g., MEC host) coupled to a plurality of edge nodes (or edge devices) 2704, 2706, 2708, . . . , 2710 (e.g., implementations of nodes 302, 312, 322).

In some aspects, the edge computing network 2700 can use mechanisms for trusted flow transmission, such as using hardware or software hooks when data is communicated between the edge nodes, to ensure the data is not tampered with and that participating edge nodes are authorized for the data exchange. In some aspects, at respective network locations (e.g., edge nodes 2704, . . . , 2710) associated with movement of the data (e.g., receiving or transmitting data), including communication between multiple edges or between edge devices, the data payload can be hashed and an optional time stamp can be included. For example, and in some aspects, data packet 2716, which originates from edge node 2704, can be hashed or encoded with a trusted network key (e.g., a trusted key that can be communicated to authorized edge nodes within the edge computing network 2700). As the data packet traverses to other edge devices (e.g., 2706, . . . , 2710), respective edge nodes can decode the data, add additional information (e.g., add source edge device ID, device IDs of edge devices participating in the data flow so far, timestamp information when data is received or transmitted at each hop, and other information to an edge handle appended to a data payload of the data packet), re-encode the data packet, and forwarded to the next device. In this regard, when the data packet arrives to an edge service (e.g., executed by the edge compute host 2702) or a target destination, the receiving edge node at each hop can check where the data packet has come from, when was it received or sent by each device in the data flow path, which device is in the data flow path and whether such device is authorized for communication within the edge computing network 2700, as well as other authorization and authentication processing functions for data attestation. In some aspects, the data (e.g., edge handle) communicated with each data packet can be used for debugging purposes when messages get forwarded.

In some aspects and as illustrated in FIG. 27, edge handles can be added to a data payload to form the data packet, as the packet traverses from an originating (source) edge device to a destination device. For example, if device B receives data that is certified by edge device A, device B can certify itself and includes A as the data source, and packages this information with an edge handle to form a data packet that is transferred to edge device C. Edge device C then certifies a flow from A to B to C, generates an updated edge handle, and forwards the data packet to edge device D.

In some aspects, the process of certification/authentication of edge devices can be based on blockchain technologies or other type of tracking or authentication techniques. In some aspects, a respective edge handle can include the source edge device ID and a data flow path (e.g., device identification information for each device that has participated or is participating in communicating the data packet). In some aspects, a timestamp may also be included for one or more of the indicated devices participating in the data flow path (e.g., the timestamp indicating a time when data is transmitted from or received at the corresponding edge device that is part of the data flow path).

In reference to the specific example in FIG. 27, data packet 2716 originates from, and is generated by, source edge node 2704. Data packet 2716 includes an edge handle 2715 which is appended to the data payload to form the data packet 2716. The edge handle 2715 (or EH) can include information 2722, such as an edge device ID of the originating (source) edge device (e.g., identification of edge device 2704 which is the source device for data packet 2716), as well as device identification of edge devices forming the current data flow path for the data packet. Since the device is the source device, the data path within the edge handle 2715 includes identification information of only node 2704.

After data packet 2716 is generated, the edge node 2704 transmits the data packet to the next device in the communication path, such as edge node 2706. After the packet is received at edge node 2706, the edge node 2706 updates the edge handle 2724 (e.g., to EH2) by updating the data flow path to include identification information for the edge node 2706. For example, the data flow path in edge handle EH2 can indicate "A-B", signifying that the data packet has originated at edge device A (2704) and is received at edge device B (2706). After the edge node 2706 updates the edge handle and generates EH2, EH2 is appended to the data payload to form a new data packet 2718, which is communicated to the subsequent edge device in the data flow path, such as node 2708.

After the packet is received at edge node 2708, the node updates the edge handle 2726 (e.g., to EH3) by updating the data flow path to include identification information of edge device 2708. For example, the data flow path in edge handle EH3 can indicate "A-C", signifying that the data packet has originated at edge node A (2704), it was forwarded by edge node B (2706), and is received at edge node C (2708). After the edge node 2708 updates the edge handle and generates EH3, EH3 is appended to the data payload to form a new data packet 2720, which is communicated to the subsequent edge device in the data flow path, such as device 2710. Further, an auditor, compliance entity, or third party may subscribe to EH values according to a publish-subscribe or other similar distributed messaging system such that the data flow, attestation flow, or other flow graph activity may be monitored, analyzed and inferenced as Edge telemetry or metadata.

In some examples and as mentioned above, as respective edge devices update the edge handle, timestamp information can be included in the edge handle as well. In order to ensure synchronized clock data among the edge devices within the edge computing network 2700, the edge compute host 2702 can be configured with a synchronization component 2714. The synchronization component 2714 may comprise suitable circuitry, interfaces, and/or instructions and is configured to communicate synchronization signals (e.g., via a broadcast message to all edge devices authorized to communicate within the edge computing network 2700) in order to facilitate clock synchronization among the edge devices.

In some examples, the edge compute host 2702 is configured with an edge LUT component 2712. The edge LUT component 2712 may comprise suitable circuitry, interfaces, and/or instructions and is configured to generate and maintain an LUT (e.g., as mentioned in connection with FIG. 26), which LUT (e.g., LUT 2728) can be populated to all edge devices (e.g., via a broadcast message to devices 2704, . . . , 2710) so that the edge devices within the edge computing network 2700 can use such LUT for device authentication and data attestation purposes.

In a further example, a method for implementing a technique for attestation of data may be implemented within an edge computing network. The technique can be performed by one or more processors of a first edge device (e.g., 2706) of a plurality of edge devices within an edge computing network (e.g., 2700). At a first operation, a data packet (e.g., 2716) received from a second edge device (e.g., 2704) of the plurality of edge devices is decoded. The data packet includes a data payload and a first edge handle (e.g., EH1). The first edge handle indicates a source edge device (e.g., device 2704 or A) and a data flow path associated with the data payload. At a second operation, a second edge handle (e.g., EH2) is generated to include the source edge device (e.g., A) and an updated data flow path (e.g., edge device identification for devices 2704 and 2706). In this regard, the updated data flow path in EH2 is based on the data flow path (e.g., the data flow path indicated by EH1, which is only device A) and a device ID of the first edge device (or device B). At a third operation, the second edge handle and the data payload are encoded (e.g., as data packet 2718) for transmission to a third edge device (e.g., 2708) of the plurality of edge devices.

As demonstrated by these examples, many data providers are present within the edge cloud, along with many edge compute services that perform transformation on the data from data providers (e.g., edge services and functions depicted and described with relation to FIGS. 7 to 12). To enable a robust services environment, endpoint devices (and edge nodes) will need access to the transformed data, along with the capability to validate (attest) both the data provider and the edge service which is processing the data.

In an example, data and data transformation attestation is enabled within an edge computing system for the results or usage of edge compute services. For instance, when a data provider sends certified data to the edge service, the edge service can attest that that data is originating from a trusted source. As the edge service applies a transformation (that it can perform and has capabilities or rights to perform), the result of the edge service is certified. As a result, the data resulting from the edge service can be consumed by endpoint devices while validating both the source of data and the transformation of the data.

As a simple example, consider scenario where a camera from a vehicle sends images to a cell tower or other wireless access point, where an edge service performs a low-latency vehicle or object detection operation on the images. The user of this data, when receiving the object detection results, can validate that the image was provided by a trusted camera, and additionally, that the object detection analysis was performed by a trusted entity.

In some situations, it might not be known where the camera or data originated from—because the data may simply appear at an intermediate processing stage/node within the edge computing system. Such processing involves an attestation context as the intermediate node indicates that the data has unknown origins (prior to the current node context). Attestation information therefore may include a combination of endpoints and paths linking endpoints as visual data is transcoded/transformed by multiple hops.

The use of data and data transformation attestation may be enabled through interoperable attestation data, including data specified by standards or specifications. Important to any attestation infrastructure is the ability for verifier(s) to discover the resources that are interacted with (not just directly) but also indirectly (e.g., because each data transformation action may have involved a different set of nodes and transformation logic). The attestations of intermediate actions may be remembered and made available for subsequent queries. For example, data and code "trust" may be represented as a cryptographic hash. A hash tree of attested resources can be used to keep a current "accepted" attestation value of everything that preceded it. A centralized approach would maintain the hash tree updates and replicate query-optimized copies as an "attestation cache"; a distributed approach may utilize a blockchain.

In the context of data and data transformation attestation, a rich dictionary of "attestable things" and properties may be defined. This dictionary listing could be a simple as a set of tag-value pairs where the tag name identifies the attestable thing and the value is its "measurement" (e.g., hash). A predefined listing may include some of these values, while a user community may also define tags for application specific resources that require attestation. For instance, a security camera owned by a stakeholder in an edge computing system may identify metadata about the image (e.g., EXIF), while the camera manufacturer or vendor might issue a certificate containing information about test suites that the camera successfully passes.

The timestamps used for tracking the data may require synchronized clocks, which can be a challenge for distributed systems. However, it may be sufficient for tracking purposes to capture only the sequence of events and not the timing of the events. Blockchain is a way to achieve tracking without timing, because the blockchain imposes an ordering (although it may be possible for the blockchain ordering to differ from the actual ordering, but the use case may not require actual, precise ordering). With use of ordering tracking, the orchestration or workflow plan may be employed as metric because it describes the intended ordering. However, in simpler examples, if the use case focus is for forensic purposes (e.g., to resolve a dispute or to characterize an attack pathology), then using the local platform clock may be sufficient (especially if preconditions are met, such as changes to local clock are recorded in a blockchain, and the data flow to/from the platform is recorded in a blockchain).

A first example method (Example B1) for implementing trackable data movement is a method for data attestation within an edge computing network (e.g., edge cloud 110, and implementing systems and devices, such as implemented on node or device 2200, 2232, 2240, or 2250), the method comprising: by one or more processors of a first edge device of a plurality of edge devices within the edge computing network: decoding a data packet received from a second edge device of the plurality of edge devices, the data packet including a data payload and a first edge handle, the first edge handle indicating a source edge device and a data flow path associated with the data payload; generating a second edge handle to include, the source edge device and an updated data flow path, the updated data flow path based on the data flow path and a device ID of the first edge device; and encoding the second edge handle and the data payload for transmission to a third edge device of the plurality of edge device.

In a second example (Example B2), the subject matter of Example B1 includes, the source edge device initiating communication of the data payload, and the data flow path indicating a subset of the plurality of edge devices used for communicating the data payload.

In a third example (Example B3), the subject matter of Example B2 includes, by the one or more processors of the first edge device: determining a device ID for respective edge devices in the subset of the plurality of edge devices using the data flow path.

In a fourth example (Example B4), the subject matter of Example B3 includes, by the one or more processors of the first edge device: authenticating the subset of the plurality of edge devices that are included in the data flow path based on the determined device IDs and a device authentication look-up table.

In a fifth example (Example B5), the subject matter of Example B4 includes, by the one or more processors of the first edge device: generating a notification when at least one edge device of the subset of the plurality of edge devices fails the authenticating.

In a sixth example (Example B6), the subject matter of Examples B4-B5 includes, by the one or more processors of the first edge device: decoding a device broadcast message from a service coordinating entity within the edge computing network, the device broadcast message updating the device authentication look-up table.

In a seventh example (Example B7), the subject matter of Example B6 includes, the device broadcast message further including at least one authentication key for secure communication between the plurality of edge devices within the edge computing network.

In an eighth example (Example B8), the subject matter of Example B7 includes, the encoding and the decoding being based on the at least one authentication keys.

In a ninth example (Example B9), the subject matter of Examples B6-B8 includes, by the one or more processors of the first edge device: synchronizing a device clock of the first edge device based on a clock synchronization signal within the device broadcast message.

In a tenth example (Example B10), the subject matter of Example B9 includes, by the one or more processors of the first edge device: encoding the second edge handle to further include a timestamp of the first edge device, the timestamp indicative of a time the data payload is transmitted to the third edge device.

In an eleventh example (Example B11), the subject matter of Examples B6-B10 includes, a configuration where the service coordinating entity is a Multi-Access Edge Computing (MEC) host executing the computing service as a MEC application instantiated on a virtualization infrastructure of the service coordinating entity.

In a twelfth example (Example B12), the subject matter of Example B11 includes, a configuration where the MEC host is configured to operate according to a standard from a European Telecommunications Standards Institute (ETSI) MEC standards family.

In a thirteenth example (Example B13), the subject matter of Examples B1-B12 includes, a configuration to enable a result of an edge service within the edge computing network to be attestable based on a verifiable attestation of a source of data provided to the edge service and a result of the data produced by the edge service.

In various settings, Examples B1-B13 (and other aspects of this trackable data movement use case) may be observed or monitored as a result of, an API or specification defining use of the data tracking configuration; protocols defining or involving use of the data tracking configuration; and other uses and implementations of trackable data within an edge computing environment. Examples B1-B13 and other aspects of data tracking also be observed or implemented from service operations and service functions (e.g., as invoked or operated from data operations in FaaS or EaaS settings). Additionally, the methods of examples B1-B13 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples B1-B13 (and other features of trackable data movement management) may be combined with any of the other Examples herein to configure an edge cluster or edge cloud system, as coordinated or designed by a system orchestrator or architect.

Globally shared/Subscribeable Distributed Edge Queue Examples

Various forms of processing queues may be used within an edge computing platform (e.g., edge cloud 110, and the edge computing system configurations depicted in FIGS. 3 to 22D) to coordinate and organize the orchestration and service operations discussed herein. Various types of computing systems provide queues to store jobs or function to be executed. The concept of queues may be extended for use in a distributed edge computing platform, to operate a global (e.g., multi-edge-system) set of queues shared among multiple edge locations (e.g., base stations or other edge gateway nodes 312, edge aggregation nodes 322, etc.).

In an example, individual queues are kept consistent across the different edge nodes, but a job definition (function or service to be executed, payload, and potentially data) is stored at the edge location where the request was submitted. Then, once a service request or function is requested by an edge device, the orchestrator in the edge location where the device is connected will add (on an ongoing basis) to the queue the job to be executed, along with the meta-data to be used (e.g., a job definition, submission edge node etc.). The different orchestration entities running at the respective edge locations may pick a job to be executed in the local edge node. Once the job is performed, the job (service or FaaS) is removed from the queue (on an ongoing basis), and the data and job definition can be moved if needed and executed.

The use of a shared or subscribeable edge queue may assist with the notion of workload balancing within a distributed environment. A structured method may be envisioned for use of the queue, where the details of a local queue are only locally known to the corresponding orchestrator (e.g., a MEC orchestrator, MEO) and only the queue size is exchanged among the orchestrators (e.g., MEOs) at time intervals. With this information, an objective may be attempted to reduce the occurrences of queue overflows (and equivalently, job "drops").

Various device implementation examples of a subscribeable and distributed edge queue may be provided within service orchestration and execution systems, as deployed in any number of edge computing hardware, circuitry, node, or system arrangements (e.g., edge cloud 110, and the edge computing system configurations depicted in FIGS. 3 to 22D). Various method examples may include adding, coordinating, and removing information from the globally accessible queue, and executing jobs (one or more services, service actions, workflows, etc.) according to a coordinated use of the queue. Accordingly, a method executed in various processing circuitry of edge computing system nodes may include deploying and using a shared queue within the edge computing system to coordinate an orchestrated execution of jobs and functions among the nodes.

In various settings, a globally shared or subscribeable queue may be observed or monitored as a result of, an API or specification defining use of the data tracking configuration; observation by traffic analysis within a network; and other uses and implementations of the queue and queue data within an edge computing environment. The globally shared or subscribeable queue may also be invoked, observed, or implemented as a result of service operations and service functions in the edge computing system (e.g., to support sharing among services in FaaS or EaaS settings). Thus, features of the preceding examples (and other features of distributed queues) may be combined with any of the other Examples herein to configure an edge cluster or edge cloud system, as coordinated or designed by a system orchestrator or architect.

Automatic Edge Service Distribution Examples

As suggested by the many examples above, an edge cloud architecture is composed of multiple edges (e.g., small cells, cell towers, or different points of aggregations) that may be grouped in different edge collaborative clusters. For example, they may be defined by the infrastructure owner. Some of the other systems and techniques described herein throughout discuss ways of defining, discovering, and security grouping of resources to achieve various goals. The systems and methods discussed below may provide service distribution for these groups. The set of attributes that may be in common (e.g., across group members) is a way to describe grouping semantics. A discovery process may query attributes of a group to compare overlap with a set of interesting attributes as a way to determine collaboration relevance. Attributes may be captured as a set of interoperable, semantically rich tags, in an example. The tag namespace may be extensible, and a Collaboration Orchestration may be used to detect tags that are semantically the same, although technically different. Tags may also have values (e.g., CODEC may be a tag and its value may list the supported CODEC algorithms).

The attribute tagging architecture may be scalable for a multi-tenant collaborative edge architecture (e.g., edge cloud 110, and the edge computing system configurations depicted in FIGS. 3 to 22D). The attribute tagging architecture may be implemented using hardware to provide low latency and efficiency, which may be required in order to provide quick turnaround and improve total cost of ownership (e.g., as few resources as possible used only when they are really needed). The hardware-based implementation may also provide, when in edge cloud solutions placed in the base station, high compute and acceleration density in a limited space, with power and thermal restrictions. Existing solutions that may suit in traditional data centers do not suit in such environments.

The grouping architecture may extend existing platforms (or create new ones) where the accelerated functions or function requests are directly handled by the platform. Thus, no software may be required. This may result in less maintenance (a consideration in edge systems where many (e.g., 100K+) base stations are deployed), more compute effective density (e.g., better TCO), or better response time by accelerating the request processing from clients. Further, such approaches may provide one mechanism to bring (e.g., move, coordinate, orchestrate) the compute resources to the workload data, as the workload data is also brought (e.g., moved, coordinated, orchestrated) to the compute resources.

Edge cloud architectures are emerging as one of the potential areas where edge networks and data center architectures may have an opportunity to enable new use cases that have not been possible until now. In this context, as depicted, one of the relevant use cases for Telecommunication Service Providers (TSPs) and Cloud Service Providers (CSP) is to expose Function As a Service (FaaS) (e.g., process image and return objects) to the applications running in the edge devices (e.g., smartphones or IoT) to accelerate their workloads and applications. In this context, Acceleration Functions as a Service (similar to FaaS where functions are implemented and executed in an accelerator) may be used, as described below.

As discussed above in the overview of edge cloud deployments, in order to expose low latency FaaS and AFaaS (1-10 ms latency) accelerators and compute are placed in the base station (including in MEC platform arrangements). However, one of the main challenges to place processors and Accelerators in the base station to implement scalable edge cloud FaaS and AFaaS are: (1) physical space restriction; (2) low latency and scalable scheduling solutions to process client requests/functions; (3) high effective compute density and acceleration (compute and acceleration used for real compute and not by system software stack).

The systems and methods described herein include a new type of MEC platform architecture (which may be applied to current systems and architecture) that allows CPE (customer premise equipment), small cells, or cell towers to redirect the execution of a particular service to other edges in the edge architecture that are underutilized while maintaining the QoS or SLA for that service.

Figure 28:
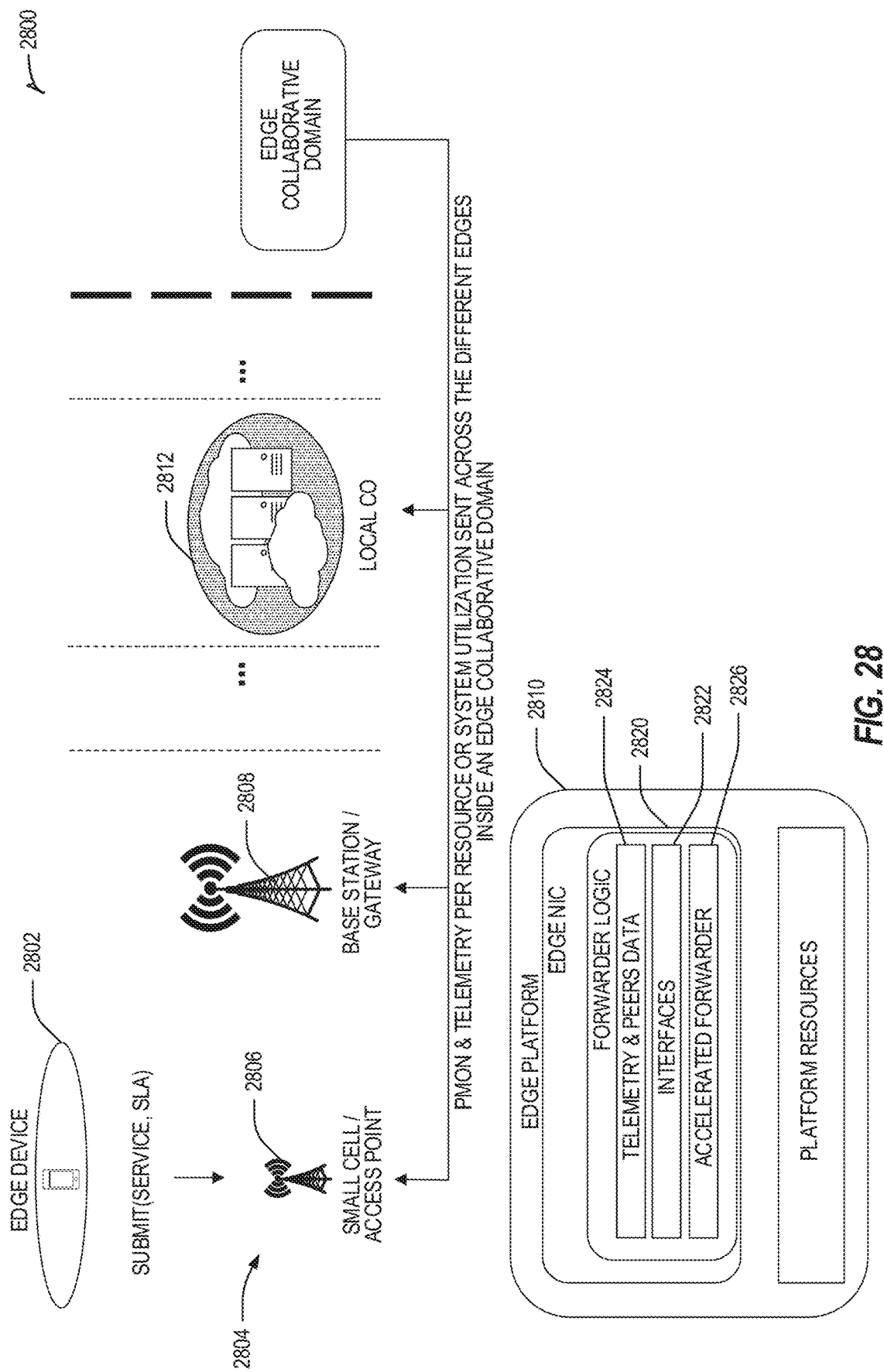
FIG. 28 illustrates a system diagram showing an architecture for edge service distribution.

Referring to FIG. 28, an edge architecture is composed of multiple edges (e.g., small cells, cell towers or different points of aggregations) that are grouped in different edge collaborative clusters (e.g., which may be defined by the infrastructure owner). Each individual of the cluster may broadcast to the other peers (e.g., in intervals which are configurable). The broadcast may include current utilization or future needs of different type of resources (e.g., storage, memory etc.).

When a particular edge location receives a request from an edge device 2802 (e.g., a smartphone or car) to execute a given service with a particular Service Level Agreement (for example in terms of deadlines and resource requirements) the particular edge location may decide to forward the request to another edge location. The decision to forward may be based on one or more of the following factors (non-exclusive).

Another edge location may execute that service given the other location's distance from the current edge (e.g., in latency) and available resources. A utilization or predicted utilization in the current edge. For example, an edge location may include a small ML or DL training compute element to be used to learn and predict requests coming to it. In an example, selecting other locations may be done using different schemes (e.g., round robin, less utilized edges, monetary or resource cost consideration, etc.). The architecture may include programmable logic devices (e.g., implemented in a FPGA), which is responsible to pick the forwarder, and which may be implemented by each infrastructure owner.

The forwarding edge architecture may include use of a set of new service and business cases that are not available with current technologies. The forwarding edge architecture may apply to a large variety of segments and workloads. FIG. 20, for example, shows some of the examples that may apply to the forwarding edge architecture.

FIG. 28 more specifically illustrates a system diagram with an edge computing architecture 2800 for edge service distribution. As shown in FIG. 28, the architecture 2800 may include and execute instructions to implement functions (e.g., implemented via logic or code) at individual edge locations 2804 (e.g., from customer premise equipment, small cells such as 2806, cell towers such as 2808, and the different aggregation points such as a local central office 2812). The instructions may be provided in an edge gateway or platform 2810 for an entity, which may be implemented via an intelligent NIC 2820 (also known as a "smart NIC") or any other type of network card. These functions may include elements, such as those described below. In an example, the functions may be applied using a tag or tags, such as interoperable, semantically rich tags, which may also have values.

The functions may include a set of new out of band interfaces 2822 that allow the infrastructure owner to register, to a particular edge, one or more (or all) different edge peers that belong to the same collaborative edge cluster. In an example, an edge may belong to multiple edge clusters.

The functions may include data including a type of telemetry and resource utilization data 2824 that is to be broadcasted to edge peer clusters. Telemetry may be different at each of the edge clusters. The functions may include the frequency that the edge is to broadcast the telemetry and resource utilization data 2824 to the edge collaborative clusters to which it belongs. This telemetry may be specific to (or shared among) respective owners, tenants, or services.

The functions may include a bit-stream (or the form in which an acceleration algorithm 2826 is implemented) that is responsible to select the different edge or edges in the different registered clusters (if any) of the edge. The registered clusters may correspond to edges where a service request is present. This bit-stream may have access to the telemetry data table to make such decision.

The functions may include a telemetry data structure which is responsible for storing data coming from different edge peers. In an example, the data maybe structured into different edge collaborative clusters. The functions may use machine learning on the type of service submissions arriving at a particular edge to predict that edge's future utilization. This machine learning technique may be implemented in programmable logic devices as well.

The functions may be responsible for processing requests coming from individual or multiple edge users, tenants, and owners. The requests may come with the service to be executed or the SLA and resource requirements. The request may be scheduled by the bit-stream aforementioned. In an example, the distribution telemetry data may be used to collect telemetry data and resource utilization configured by the infrastructure owner and broadcast that data to the different clusters to which it is registered.

In a further example, a method for edge service distribution may include the following operations. The method includes a first operation to receive a request at a first edge location belonging to an edge cluster. The method includes a second operation to select a second edge location of the edge cluster. Selecting the second edge location may include using a tag of the second edge location, the tag indicating available resources and membership of the second edge location in the edge cluster.

The method includes a third operation to determine, at the first edge location, that the request is executable at the second edge location of the edge cluster based on available resources of the second edge location. In an example, determining that the request is executable at the second edge location includes determining that executing the request at the second edge location requires fewer computing resources or requires less time than executing the request at the first edge location (e.g., it is more efficient to execute the request at the second edge location than the first edge location). The efficiency may be based on a predicted utilization of the first edge location for a time period or based on a distance from the second edge location to the first edge location. The efficiency may be determined using a machine learning element to predict requests coming to the first edge location.

The method provides a fourth operation to forward the request to the second edge location for execution. The method may further include receiving, at the first edge location, telemetry and resource utilization data from the second edge location.

A first example method (Example C1) for implementing edge service distribution is a method performed using processing circuitry (e.g., processing circuitry of node or device 2200, 2232, 2240, or 2250), the method comprising: receiving a request at a first edge location belonging to an edge cluster; determining, at the first edge location, that the request is executable at a second edge location of the edge cluster based on available resources of the second edge location; and forwarding the request to the second edge location for execution.

In a second example (Example C2), the subject matter of Example C1 includes, determining that the request is executable at the second edge location by determining that executing the request at the second edge location requires fewer computing resources or requires less time than executing the request at the first edge location.

In a third example (Example C3), the subject matter of Example C2 includes, determining that executing the request at the second edge location requires fewer computing resources or requires less time is based on a predicted utilization of the first edge location for a time period.

In a fourth example (Example C4), the subject matter of Examples C2-C3 includes, determining that executing the request at the second edge location requires fewer computing resources or requires less time is based on a distance from the second edge location to the first edge location.

In a fifth example (Example C5), the subject matter of Examples C2-C4 includes, determining that executing the request at the second edge location requires fewer computing resources or requires less time includes using a machine learning element to predict requests coming to the first edge location, where the machine learning element is trained based on historical requests.

In a sixth example (Example C6), the subject matter of Examples C1-C5 includes, selecting the second edge location using a tag of the second edge location, the tag indicating available resources and membership of the second edge location in the edge cluster.

In a seventh example (Example C7), the subject matter of Examples C1-C6 includes, receiving, at the first edge location, telemetry and resource utilization data from the second edge location.

In various settings, Examples C1-C7 (and other aspects of automatic edge service distribution) may be observed or monitored as a result of, an API or specification defining use of the service distribution; protocols defining or involving use of the service distribution; and other uses and implementations of services within an edge computing environment. Examples C1-C7 and other aspects of edge service distribution may also be observed or implemented as a result of coordinated service operations and service functions (e.g., to enable coordinated services to be as invoked or operated in FaaS or EaaS settings). Additionally, the methods of examples C1-C7 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples C1-C7 (and other features of automatic edge service distribution) may be combined with any of the other Examples herein to configure an edge cluster or edge cloud system, as coordinated or designed by a system orchestrator or architect.

Acceleration Execution and Definition Examples

In an example, edge computing scenarios may be adapted to consider and operate acceleration for services and hardware within a distributed computing environment. In conventional settings, acceleration is typically applied within local machines with fixed function-to-accelerator mappings. For instance, with conventional approaches, a certain service workload may invoke a certain accelerator; when this workload needs to migrate or transition to another location (based on changes in network access, to meet new latency conditions, or otherwise), the workload may need to be re-parsed and potentially re-analyzed.

The following adaptation of an edge cloud architecture (e.g., adaptation of edge cloud 110, and the edge computing system configurations depicted in FIGS. 3 to 22D) enables the coordination of different acceleration functions on different hosts (e.g., edge computing nodes). Rather than treating acceleration workloads in serial, a parallel distribution approach is used to "divide and conquer" the workload and the function operations. This parallel distribution approach may be applied during use of the same or multiple forms of acceleration hardware (e.g., FPGAs, GPU arrays, AI accelerators) and the same or multiple types of workloads and invoked functions.

Acceleration distribution may be used where a client device wants to execute an acceleration function upon a workload providing a large chunk of data (e.g., 10 GB, or some significantly sized amount for the type of device or network). If this chunk of data supports parallel processing—where the data can be executed or analyzed with multiple accelerators in parallel—then acceleration distribution may be used to distribute and collect the results of the acceleration from among multiple processing nodes. The following acceleration distribution approach also may be used where a client device wants to execute a large number of functions (e.g., more than 100 functions at one time) which can be executed in parallel, in order to fulfill the workload in a more efficient or timely manner. The client device sends the data and the workload data to be executed with a given SLA and given resource cost. The workload is distributed, coordinated, and collected in response, from among multiple processing nodes—each of which offers different flavors or permutations of acceleration.

Figure 29:
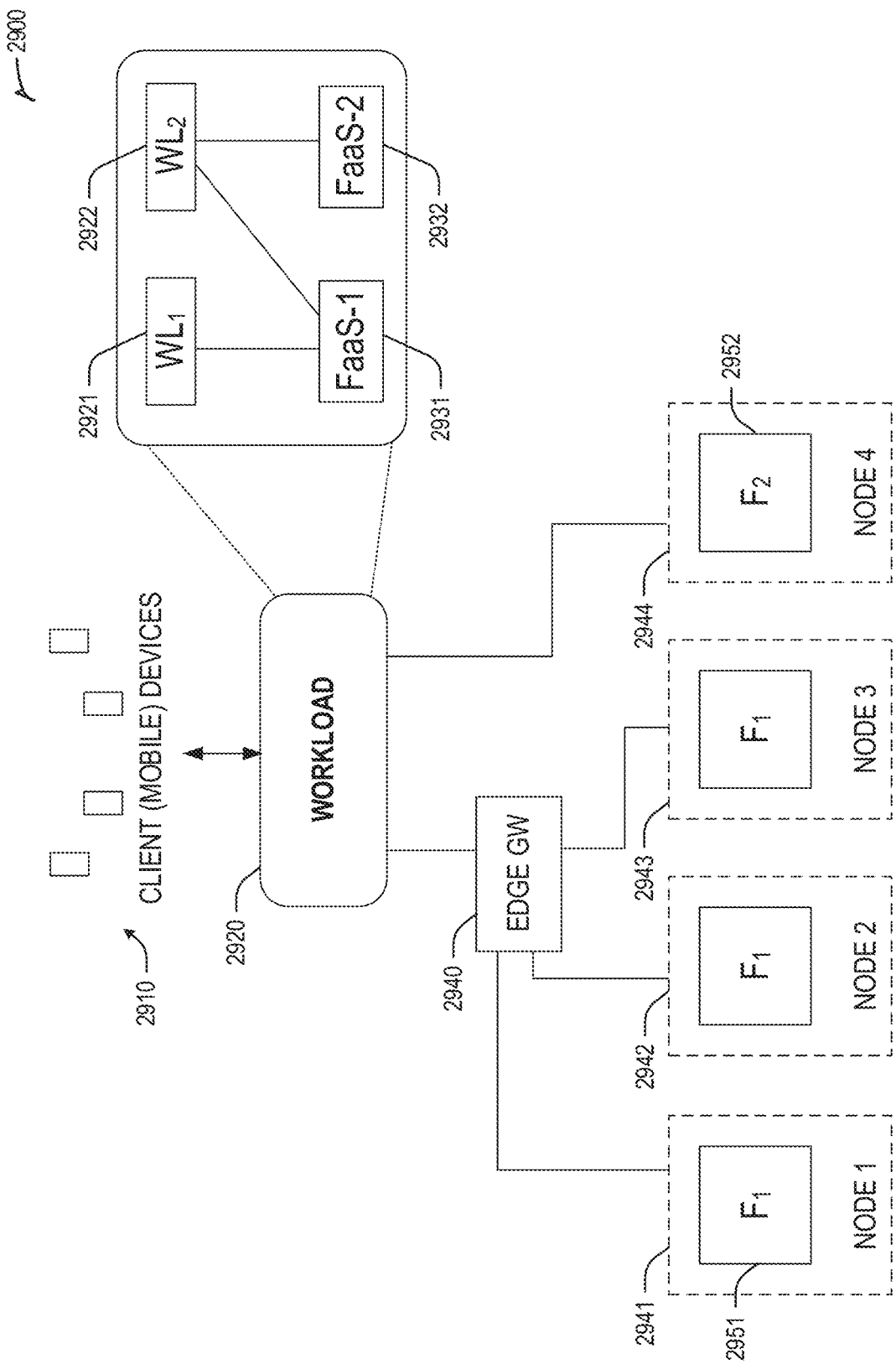
FIG. 29 illustrates a scenario for acceleration of data in parallel for an edge computing system.

FIG. 29 illustrates an architecture for acceleration of data in parallel within an edge computing system 2900. Although not depicted in this system, a Flavor gateway may exist that is used to identify a particular flavor configuration and obtain an attestation of the respective flavor services, FaaS, or other members, and provide an aggregate attestation result (e.g., a "flavor attestation"). In further scenarios, a workload orchestrator may require flavor attestation as a pre-requisite to scheduling the workload on a particular flavor grouping; and in further scenarios, the workload can be also accelerated in a parallel edge arrangement.

In a first example, a workload set 2920 (operating under an SLA or other service approach) is provided for processing within the edge cloud by one or more client mobile devices 2910 (e.g., as a result of a service being executed by the edge computing system 2900 as offered to client mobile devices 2910). This workload set 2920 may invoke one or more acceleration functions for execution by the edge cloud. For instance, the workload set 2920 may include a first workload 2921 and a second workload 2922. The acceleration needed to process the first workload 2921 may invoke a first function-as-a-service (FaaS-1) 2931; the acceleration needed to process the second workload 2922 may invoke the first function-as-a-service in addition to a second function-as-a-service (FaaS-2) 2932.

The workload set 2920 is distributed among N processing nodes in parallel—as the N processing nodes include the same or different combinations of acceleration hardware. For instance, suppose that a first node 2941 includes acceleration hardware (e.g., an FPGA) to support execution of a first function 2951, while a second node 2942 and a third node 2943 includes the same acceleration hardware. As a result, a request to invoke the first function, such as by the first function-as-a-service 2931, may be fulfilled by execution of the workload with the first function among nodes 2941, 2942, 2943, whereas another function may be executed at node 2942.

In an example, the distribution of the workload among the processing nodes may be coordinated by an edge gateway 2940, an orchestrator (not shown), or another intermediate edge cloud node. For example, the edge gateway 2940 may be responsible to decide to how many accelerators the data needs to be distributed to (or, decide the functions invoked by the accelerators), select the nodes or accelerators on the nodes, and send the data to the selected nodes and accelerators. When the accelerators complete processing of the data and return the data, the edge gateway 2940 may apply a reduction clause (e.g., sum all the results) or perform other processing. In addition to providing the payload, the client device 2910 may also specify the function (or functions) and reduction clause to apply; or, the edge gateway 2940 may automatically identify the function(s) and reduction clause. The workload may be distributed independent of the edge gateway 2940, such as with a portion of the workload (a second function 2952) that is distributed to another node 2944.

In further examples, orchestration and coordination of a distributed workload among multiple accelerators may include aspects of load balancing, mobile access prediction, or use of telemetry, using the other techniques discussed herein. The orchestration and coordination of a distributed workload among multiple accelerators may also be based on SLA/SLO criteria and objectives, as accelerators are selected to most likely satisfy the SLA/SLO based on current or predicted execution states.

Additionally, in the environment of FIG. 29, a NIC can be an LSM or other security policy enforcement point. For example, a NIC can prevent a node from accessing a network if it is not configured properly, contains a virus, or hasn't performed a required action. This is similar to industry NAC (Network Access Control) use cases. Additionally, in such settings, an orchestrator can provision an LSM or other security policy to a NIC, as the NIC can allow remediation traffic while simultaneously blocking normal activity.

In various edge system configurations, acceleration features may be further enhanced through the use of data-abstracted acceleration workload descriptions. These acceleration workload descriptions may be enabled within the edge infrastructure through the use of a uniform workload definition, defined in a high-level format such as XML. Such acceleration workload descriptions may be utilized to enable uniform access to accelerated resources, and an enhanced usage of acceleration throughout different nodes in the edge compute ecosystem.

In an example, as endpoint devices move among the different edge access points of the infrastructure, the devices can submit workload definitions to the edge access point to invoke acceleration. Such workload definition may include: a definition of the workload; the data payload; an indication of the relevant SLA/SLO for the workload, resource cost, and other parameters. The receiving edge access point (an edge compute node) will select the proper accelerator, convert the workload into the specific bit-stream definition (compatible with the accelerator), and execute the workload.

An acceleration description approach may enable edge computing systems to utilize definition benefits being provided within standardized IoT frameworks (e.g., Open Connectivity Foundation (OCF), OLE Process Control (OPC), Thing-Thing) where a sensor/actuator/controller node is described using a common information model and data model (metadata). The actions of discovering, interacting and getting results are also captured by the data model in the form of an interface definition. In this manner, an edge infrastructure with acceleration resources could be similarly abstracted. This provides a form of "hierarchical service layers" where a top layer presents a data model abstraction of layers underneath. However, unlike IoT framework abstraction, these acceleration definitions provide a "service hosting" abstraction. Service hosting differs from "service provider" abstraction (e.g., as is used with discovery approaches such as UPNP) because the service or function to be invoked is not specified; rather the acceleration definition provides a description of hosting environment attributes and constraints.

Finally, the use of acceleration workload descriptions may be extended to enable use of "trusted" hosting environments where the security hardening properties of the environment are also exposed for discovery and consideration. This enables the use of attestation in the edge compute environment, such as from the selection of trusted (attested) acceleration resources.

A first example method (Example D1) for implementing data-abstracted acceleration is a method performed using processing circuitry (e.g., processing circuitry of node or device 2200, 2232, 2240, or 2250), the method comprising: receiving, at an edge gateway node, a workload which invokes acceleration functions; distributing, from the edge gateway node to respective edge compute nodes, data of the workload for parallel execution by acceleration functions of the respective edge compute nodes; and collecting, at the edge gateway node, results of the distributed execution by the acceleration functions.

In a second example (Example D2), the subject matter of Example D1 includes, a same type of acceleration function being used by the acceleration functions of the respective edge compute nodes.

In a third example (Example D3), the subject matter of Example D2 includes, the workload additionally invoking execution by a second type of acceleration function at least one other edge compute node.

In a fourth example (Example D4), the subject matter of Examples D1-D3 includes, the acceleration functions of the respective edge compute nodes being executed by at least one of: FPGA, ASIC, GPU array, A accelerator, transcoding accelerator, or cryptography accelerator hardware.

In a fifth example (Example D5), the subject matter of Examples D1-14 includes, the workload being a workload set that includes a first workload to invoke a first function-as-a-service and a second workload to invoke a second function-as-a-service, the first and second function-as-a-service being offered among the respective edge computing nodes.

In a sixth example (Example D6), the subject matter of Examples D1-D5 includes, the workload being received from an edge client node.

In a seventh example (Example D7), the subject matter of Example D6 includes, the edge client node specifying the workload to be executed according to a given SLA and given cost.

In an eighth example (Example D8), the subject matter of Examples D6-D7 includes, providing, from the edge gateway node to the edge client node, the collected results of the distributed execution by the acceleration functions.

In a ninth example (Example D9), the subject matter of Examples D1-D8 includes, a configuration where acceleration functions within the edge computing system are indicated within respective acceleration workload descriptions.

In various settings, Examples D1-D9 (and other aspects of acceleration usage) may be observed or monitored as a result of, defined application programming interfaces or interface specifications; uses of protocols or definitions to invoke, receive, or control acceleration; and other uses and implementations of acceleration within an edge computing environment. Examples D1-D9 and other aspects of acceleration management may also be observed or implemented as a result of coordinated service operations and service functions (e.g., as acceleration resources are invoked or operated in services within FaaS or EaaS settings). Additionally, the methods of examples D1-D9 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples D1-D9 (and other features of acceleration management) may be combined with any of the other Examples herein to configure an edge cluster or edge cloud system, as coordinated or designed by a system orchestrator or architect.

Edge Device NIC Processing Examples

As mentioned elsewhere, edge computing refers to processing workloads closer to users, such as in base stations, cell towers, etc. In an environment with many Internet of Things (IoT) devices—such as smart cities, smart transportation, etc.—artificial intelligence (AI) inferencing will become an increasingly important workload. In such inferencing workloads, an orchestrator (e.g., an edge gateway) may forward the inferencing requests to different service providers or instances to perform the inference. Thus, the edge orchestrator will often choose a platform to direct the request and send the request to that platform. The selected platform (e.g., the service running in that platform) receives and processes the request to produce a result that the platform returns. Here, the orchestrator provides end-to-end load balancing and tracking of requests. The edge use-cases, however, often require time critical processing resulting in very low latency processing and inferencing tolerances. Therefore, load balancing may be sub-optimal for such time sensitive tasks, leading to a greater total cost of ownership (TCO) as the hardware may be oversized to meet the service level agreement (SLA), or SLAs will be missed. This scenario may be exacerbated when there are variabilities in inferencing latencies.

To address the real-time inferencing needs of edge workloads, a hardware-assisted technique may be used in an edge computing system (e.g., edge cloud 110, and the edge computing system configurations depicted in FIGS. 3 to 22D) to complement orchestrator load balancing schemes via a smart network interface controller (NIC). Specifically, these intelligent NICs are AI Service aware. NICs of the platform are notified of the AI services that are running in the platform and the memory regions that correspond to the "input" for the AI service. AI Services and their input memory buffers are registered at the NIC during the start of the service and are maintained in a light-weight data structure (e.g., table). Further, a synchronization protocol between the platform NICs, switch, and the orchestrator may be used to identify AI service aware NICs on platforms. This information may be used to build a global view of which services or models are deployed in which platform. With an AI aware NIC, when platform intelligent NICs receive a request, the NIC may directly put the request into the service provider or model's input memory buffer for quicker processing. Moreover, with an interface to measure the size of the input memory buffer, the AI aware NIC may also determine how much of input is yet to be processed by the service.

The capabilities noted above lead to several techniques. For example, an orchestrator may query platform NICs to identify the current input load on a service in order to improve load balancing. Also, if a receiving platform has multiple instances of AI models running—such as from different vendors or service providers—and if a request may be mapped to any of them (e.g., with respect to security or accepted vendors), the orchestrator may simply forward the request to the platform and the intelligent NIC may select an appropriate (e.g., the best matching) service provider for that request based on the input memory buffer state. This enables a hierarchical orchestration that relieves the orchestrator of micro-management while saving time.

In MEC settings, when it comes to an inferencing task, the nature of which is known to the MEC orchestrator (MEO), the MEO may choose to delegate the task to the MEC/edge host which has already performed inferencing of the same nature/problem/category (e.g., face recognition). This way, the inferencing results will be more reliable, as they will originate from a host which is already a "deep learner" of the task.

The AI aware, or smart, NIC may be used with rack switches. For example, rack switches may be able to obtain a listing of services running in the platforms hosted by the rack. These switches may use the listing to identify platforms to send requests based on querying the platform NICs to obtain service states or continuously tracking where requests are forwarded and returned.

In an example, when platform NICs receive a request, they may forward the request to other platforms running the requested service or model if the local memory buffers are full or heavy. This feature transparently enables dynamic load balancing without orchestrator involvement. In an example, the platform NIC that accepts the request may notify the orchestrator about the request being transferred.

In an example, intelligent NICs may use system telemetry to predict how long it will take to process a request, for example, based on the current input buffer size. This prediction may then be used to determine which of several platforms the request may be forwarded to, for example, decrease overall processing latency.

AI aware NICs provide several benefits to standard NICs in the scenarios described above. For example, orchestration and load balancing overhead is reduced. This may be important as this overhead may become significant due to increasing IoT devices and services deployed at the edge.

Figure 30:
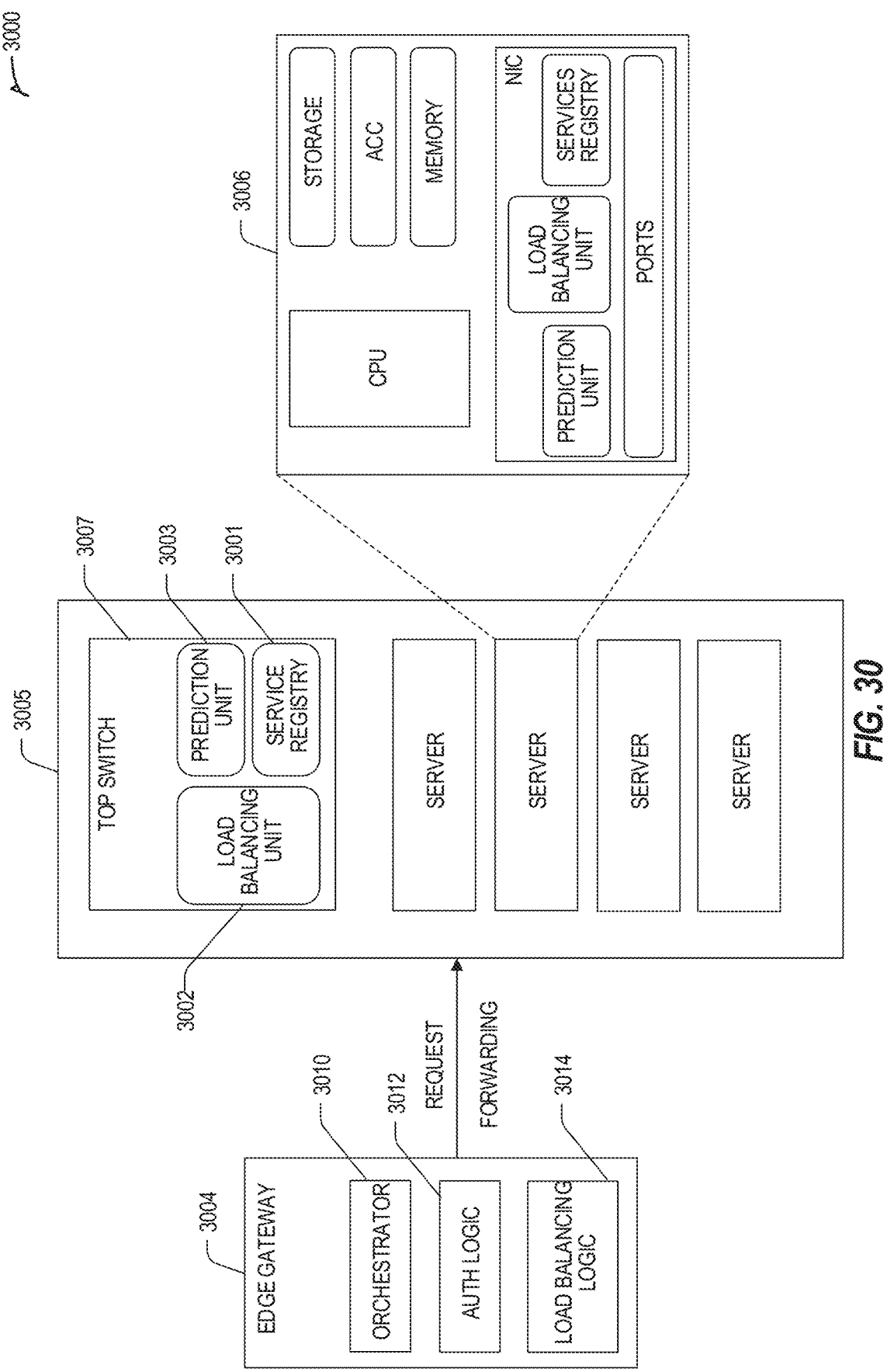
FIG. 30 illustrates an example of an architecture that includes components for improved edge cloud inference processing.

FIG. 30 illustrates an example of an edge computing architecture 3000 that includes components for improved edge cloud inference processing. As illustrated, an edge gateway 3004 communicates with a server rack 3005. The edge gateway 3004 may include an orchestrator 3010 configured to orchestrate operations or configurations among server nodes (such as server rack 3005), and may be configured to run authentication logic 3012 and a load balancing logic 3014 to assist such operations or configurations. The server rack 3005 includes a top switch 3007 (e.g., a rack back plane or intra-rack switch fabric) and one or more servers (e.g., blades) such as server 3006. The top switch 3007 includes three components that also exist in an intelligent NIC of the server 3006: a services registry 3001, a load balancing component 3002, and a prediction component 3003. In other examples, the switch 3007 may be located at other (not top) locations.

The service registry 3001 is circuitry arranged to maintain a mapping of services running in the current node when on the server 3006 and other nodes (e.g., in the rack 3005). The service registry 3001 includes an interface (not shown) through which a platform on the server 3006 may register and deregister AI service for the server 3006. The registration and deregistration may be initiated by the orchestrator 3010 (e.g., on the edge gateway 3004), local daemons on the platform that are part of the orchestrator 3010, watchdog local daemons in the platform, or the AI service itself, among others. In an example, the service registry 3001 is arranged to initiate or receive a broadcast from other service registries (e.g., on NICs from other nodes) to update the service mappings.

The load balancing component 3002 is circuitry arranged to receive an input to an A service and transmit that input into the input memory buffer of the corresponding service. The load balancing component 3002 is arranged to determine whether to add the received input into the memory buffer of the AI service, or transfer to another instance of the AI service on another node. This determination may be based on policies such as the status of the current memory buffer or inputs from the prediction component 3003. In an example, the load balancing component 3002 is arranged to respond to queries from orchestrator 3010 on the current status of the input memory buffer.

The prediction component 3003 is circuitry arranged to use system telemetry and optionally machine learning to understand and predict when an input may be processed by the AI Service. To this end, the prediction component 3003 is arranged to monitor the input memory buffer status. This is provided as input to a machine learning system to provide approximate estimates of processing times. These outputs may be used by the load balancing component 3002 when deciding whether an input to a service must be accepted or forwarded to another node. In further examples, meta-data from other edge nodes may be used to perform better prediction. For instance, recent requests that are executed by services and flows may be used to provide and improve a global view for the prediction scheme. Further, a forwarder component of a NIC (or other forwarding functionality) can be an LSM or other security policy enforcement point, where security policies restrict forwarding behavior to slow down or 'shape' an outbreak pathology.

In further examples, application of orchestration within an edge computing system may be facilitated by advanced forms of logic and programming within networking devices and network adaptors, to enable software programmed control for network adaptors and various forms of physical function offload. For instance, such networking devices and adaptors may include an upgrade or change mechanism to receive programming from a network operator, based on changes or upgrades made to VNF configurations, Platform network equipment, or other network operation aspects.

In an example, such programming may be provided with the use of software-programmed single root input/output virtualization (SR-IOV). SR-IOV may provide a mechanism to modify of Virtual Functions and Physical Functions that enable various edge computing orchestration activities (e.g., discussed throughout this document) to be coordinated with network operations. Because the communication mechanism between those virtual and physical functions is device dependent, the use of SR-IOV on respective network equipment enables the customization of network processing within specific devices and edge compute and networking arrangements.

SR-IOV control of applicable network hardware may be standardized or coordinated to enable new control features within a NIC, switch, or other networking hardware. Such control may be conducted on-the-fly, for example, by the orchestrator 3010. Further, the use of SR-IOV controls and changes may enable new multi-tenant VNF scenarios, such as where VNF requires a critical configuration to be implemented on the network equipment (e.g., NIC). Such a configuration change may be needed in a scenario where a virtual function is less privileged, and a physical function needs to be invoked to ensure proper service operations.

Various device examples of SR-IOV control may be provided within networking hardware, as deployed in any number of edge computing hardware, circuitry, node, or system arrangements. Various method examples may include performing orchestration within an edge computing system based on networking function changes, including changes among virtual and physical network functions, based on SR-IOV software changes to networking hardware.

A first example method (Example E1) for implementing edge device NIC processing is a method performed using processing circuitry (e.g., of node or device 2200, 2232, 2240, or 2250), the method comprising: receiving, at a host facing interface of a network interface controller (NIC) of a node in an edge computing system, a registration of an artificial intelligence (AI) service available on the node, the registration including a memory area for input to the service; receiving, at a network facing interface of the NIC, a request for the AI service at the NIC; and placing the input data from the request into the memory area.

In a second example (Example E2), the subject matter of Example E1 includes, placing the input data from the request into the memory area by invoking the AI service.

In a third example (Example E3), the subject matter of Examples E1-E2 includes, requesting, by the NIC, a catalog of services from another NIC in another node; and recording, by the NIC, another instance of the AI service at a second node.

In a fourth example (Example E4), the subject matter of Example E3 includes, receiving, by the NIC at a network facing interface, a second request for the AI service; and forwarding the second request to the second node for processing.

In a fifth example (Example E5), the subject matter of Example E4 includes, the second request being forwarded to the second node based on a predicted completion time of the request on the second node.

In a sixth example (Example E6), the subject matter of Examples E1-E5 includes, a configuration where orchestration within the edge computing system is implemented using networking function changes caused by single root input/output virtualization (SR-IOV) within a network interface device, the networking function changes including changes among virtual and physical network functions.

In other examples, the techniques discussed above for SR-IOV (including any of Examples E1-E6) may be applied in a multiple-root IOV setting (MR-IOV).

In various settings, Examples E1-E6 (and other aspects of NIC processing) may be observed or monitored as a result of, defined application programming interfaces, interface, or hardware specifications; uses of protocols or definitions to invoke, receive, or control IOV or NIC operations; uses of services and service interfaces; and other uses and implementations of IOV and NICs within an edge computing environment. Additionally, the methods of Examples E1-E6 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples E1-E6 (and other features of intelligent NIC processing) may be combined with any of the other Examples herein to configure an edge cluster or edge cloud system, as coordinated or designed by a system orchestrator such as 3010 or architect.

Global Service Page Table Examples

One of the challenges in a distributed architecture where data is being posted distributed across multiple edge locations for a particular services or tenant owning different services is how to manage the rights that these set of services has to particular data sets. These set of data sets maybe stored in what is known as data lake (e.g., a large store of structured and unstructured data). In an example, a new hardware method uses a page table concept to allow efficient and low latency data distribution (in memory) and access to devices.

Existing solutions are based on software stacks for distributed storage. In this case the software stack performs translation access from services to virtual address space to physical location and checks the permissions that those services have for that particular data set. Scalability is a major limitation of the using the software stack. Similar issues arise with services for tenants and devices.

The edge computing systems described herein (e.g., edge cloud 110, and the edge computing system configurations depicted in FIGS. 3 to 22D) are expanded with an implementation of an edge page table. The edge page table is used to track what services have access to what data, how virtual addresses from the service are mapped to physical address, and what the permissions are for an address or data. In an example, the page table may enable a service may be instantiated or migrated across multiple edge locations. The edge page table may improve security or tenant isolation on endpoint devices (including by protecting different areas of the page table using tenant, service or user-based data encryption). Further, the edge page table may be offered on a "global" or system-wide/multi-system basis, to improve performance of tenant-specific resource context switching.

Figure 31:
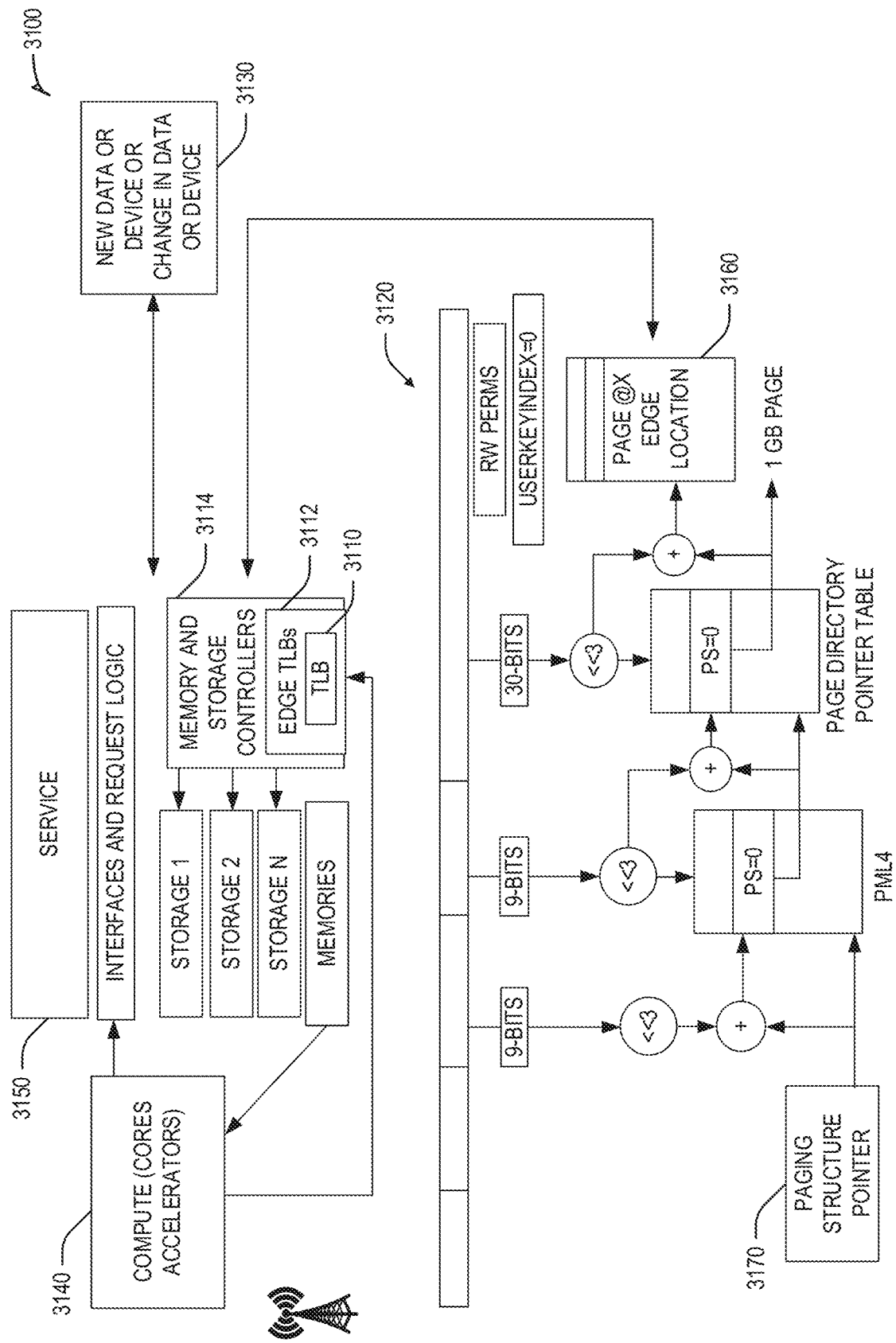
FIG. 31 illustrates a system diagram for implementing an edge service page table.

FIG. 31 illustrates a system 3100 for implementing an edge service page table 3120. In some examples, the edge service page table 3120 may be used with the edge cloud 110 to manage memory pages 3160 across different edge nodes and services of the edge cloud 110 (e.g., including devices 3130), via memory and storage controllers 3114. Such memory pages may be of varying or set sizes (e.g., 1 GB). For example, the compute device 2200 or the edge computing device 2250 may store data, services, or other resources for use by edge devices in the edge cloud 110, and the data, services, or other resources may be managed using a system-wide ("global") service page table. The global service page table may be stored on the compute device 2200 or the edge computing device 2250 and at other locations in the edge cloud 110 (or, at a compute resource such as the edge resource node 1240, such as implemented in a distributed database accessible to the core data center 1250). In an example, the global service page table may be stored at a device of the core data center 1250 or a device of the edge cloud 110 (e.g., a server of a cloud data center).

Page tables 3120 are used at platform or CPU level to identify the rights of applications to access to certain memory pages (e.g., 3160). A page table (or similar structure) may be used in the edge context to track what edge resources or services are accessible to a given user or tenant. Each edge location may have a tree-based structure with the following hierarchy (e.g., starting with pointer 3170). The root of the tree==>list of services==>list of providers==>list for tenants or devices that have privileges to execute services. In further examples, the list of providers can include configuration options for hardening the workload that are available to the provider. (For example, VM, secure (e.g., SGX) enclave, VM+Enclave, Container, Container+Enclave, VMM, VMM+Enclave, OS, FPGA, FPGA+AFU, etc.). Further, the workload combinations that include Intel software guard extensions (SGX) or like technologies (e.g., other trusted execution or trusted computing technologies applicable to ×86, ARM, or other architectures) could use the hardened security environment to check and enforce the expected combination. Various adaptation or modification of the trusted execution, CPU, or platform hardware may be utilized to enable management of the address spaces.

In an example, the tree for tracking the pages may be a virtual tree that is managed by a hardware entity (e.g., a FPGA). When a tenant wants to execute a Service A from a given Edge Service Provider the tenant may navigate through the tree hierarchy until reaching the leaf that contains the permissions that the given tenant resource, device, storage, unit of compute, or unit of comms/network is located. In an example, there is a service that is a front end to the tenant resource, which may include the resource (e.g., it may include a type of metadata, such as available SLA etc.). In the case of a translation lookaside buffer (TLB 3110) lookup miss in any of the three layers, (similar to processes for PT), a page walk may be performed to target the increasingly centralized repository (such as with the central office or core of the network) to retrieve the particular permissions of that service for that user (e.g., for service 3150).

In an example, resource allocations may be performed as well. Using the page table as an example, having a page table may include three things: (1) a differentiation between legitimate and illegitimate addresses (e.g., validity fault vs. segmentation error), (2) an access control (e.g., R/W and other bits like PKEYs), and (3) a materialization or generation of resources available when needed (e.g., handling a fault). All three have analogs in the resource management side, for example, (1) a service may be denied certain resources and allowed potential access to others, (2) a service may be given varying fractions of a resource it may indeed have access to, so the navigation of this multilevel walk can also be a control point, and (3) a service may only be given resources when it actually needs them.

This approach differs from a centralized directory approach (such as LDAP) in that tenant access privileges may be cached hierarchically according to a scheme that places a root cache at a core data center and multiple copies at the base-station or on-premise edge nodes as well as points in between.

The tenant SLA/SLO and orchestration context may be used to proactively warm the caches based on expected location, collaborations, or workloads. Frequent hits to the cache keep the cached content 'warm' for subsequent requests.

The endpoint device, host, or service may participate in the caching scheme using local storage resources. For example, local access requests need not leave the local platform (which may involve network latency). In an example, access context may be cached within the set of resources allocated to a particular tenant. For example, if the platform supports memory encryption (e.g., Intel® MKTME™), the encryption user key resource may be used to contain keys otherwise cached by the TLB caches 3112. Other tenant-specific resource isolation schemes may be applied a per-platform or per-service basis. For example, persistent storage, function acceleration, CPU allocation, memory partitioning, virtualization, peripheral affinity, or IoT device network partitioning may have tenant-specific partitioning capabilities.

Changes to access policy, such as revocation of a key or adding permissions to access an additional resource are potentially susceptible to privilege escalations or denial of service due to cached context becoming stale. The system 3100 uses a publish-subscribe or an information centric networking (ICN) configuration to allow updates to the resource to be applied uniformly to all cached copies simultaneously based on the policy that caches become subscribers to the tenant specific context topic. In an example, warm caches subscribe with high QoS requirements to ensure timely updates for resource access requests that occur locally.

When new data or a new device 3130 is added to the edge data-lake, a particular access restriction to edge services (e.g., service 3150, operating with compute 3140) may be applied. This information may be multicasted to the edge or edges participating in the same data-lake of data or devices. Changes on existing data or devices may be multicasted to another edge or other edges sharing the data or devices. In an example, a particular edge location (e.g., @X location in system 3100) may be assigned to data or a function hosted within a particular edge device. The Edge TLB 3110 may check whether a corresponding service 3150 has rights to access the device or data or location within the edge device.

FIG. 32 illustrates an implementation of edge global service page table 3210. The edge global service page table 3210 illustrates virtual addresses 3212 and corresponding physical addresses 3214. The physical addresses 3214 of edge global service page table 3210 may include an edge device and a physical address in memory on that particular edge device.

The edge global service page table 3210 includes both local and remote memory addresses. When the edge global service page table 3210 indicates that the memory address is not local (e.g., to the edge device operating a service or hosting the tenant), the edge global service page table 3210 may send a read to a remote network interface to obtain remote memory access at the remote device. In response to the remote memory access being granted, the device may be given a location of the physical address or write access. In further examples, if a remote node is down, the system may include a replica of that service to implement resiliency (based on the data included in the page table), as the request is sent to the other replica, otherwise an error is generated to the SW stack.

In an example, other attributes may be considered during remote access, such as security requirements by the device. In this example, sending back to the original platform may require sending in a secured manner. Another example attribute may require adding extra data to the request, such as referring to authentication information in the remote memory (e.g., when the remote memory data is secure). An access policy may have metadata with a characteristic that indicates how much bandwidth to allocate or how much latency is needed. When the remote data is returned to the local node, those characteristics may be required.

In a further example, a method for implementing an edge global service page table may be implemented according to the following operations (e.g., such as implemented on or by node or device 2200, 2232, 2240, or 2250). The method includes a first operation to maintain an edge global service page table configured to map virtual addresses 3212 to physical addresses 3214 on a plurality of edge nodes. The method includes a second operation to receive a request for access to a virtual memory address maintained in the edge global service page table. In an example the virtual memory address 3212 corresponds to an edge service. The method includes a third operation to identify a physical address 3214 and an edge node associated with the virtual memory address 3212. In an example, the edge node is a remote edge node from a local node initiating the request. The method concludes with an operation to provide access to a resource corresponding to the physical address 3214 on the edge node. In an example, the resource may include data stored at the physical address on the edge node, a service operating at the physical address 3214 on the edge node, or a location of the physical address 3214 on the edge node.

A first example (Example F1) for implementing an edge service page table is a device, comprising: processing circuitry; and memory including instructions embodied thereon, wherein the instructions, when executed by the processing circuitry, configure the processing circuitry to perform operations for managing resources on edge devices comprising: maintaining an edge global service page table configured to map virtual addresses to physical addresses on a plurality of edge nodes: receiving a request for access to a resource at a virtual memory address maintained in the edge global service page table; identifying a physical address and a corresponding edge node associated with the virtual memory address; providing access to the resource stored at the physical address.

In a second example (Example F2), the subject matter of Example F1 includes, providing access to the resource by sending information including the physical address and the corresponding edge node to a requesting device or service.

In a third example (Example F3), the subject matter of Examples F1-F2 includes, providing access to the resource by facilitating a copy or transfer of the resource to a requesting edge node from the corresponding edge node.

In a fourth example (Example F4), the subject matter of Examples F1-F3 includes, prior to providing access to the resource, the instructions configure the processing circuitry to perform an operation comprising determining whether a requesting device has authorization to access the resource by checking the edge global service page table.

In a fifth example (Example F5), the subject matter of Examples F1-F4 includes, wherein the device is an edge node of the plurality of edge nodes, and wherein the edge global service page table is stored locally on the edge node.

In a sixth example (Example F6), the subject matter of Examples F1-F5 includes, wherein providing access to the resource includes sending a read to a remote network interface to obtain remote memory access at the corresponding edge node.

In a seventh example (Example F7), the subject matter of Examples F1-F6 includes, wherein providing access to the resource includes respecting a security requirement of the resource, the corresponding edge node, or a requesting device.

In various settings, Examples F1-F7 (and other aspects of a global page table) may be observed or monitored as a result of, defined application programming interfaces, or interface specifications; uses of protocols or definitions to invoke or modify the page table; and other uses and implementations of page table across multiple devices within an edge computing environment. Examples F1-F7 and other aspects of this global page configuration may also be observed or implemented as a result of service operations and service functions (e.g., to share pages and data structures in FaaS, or EaaS settings). Additionally, the methods of examples F1-F7 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples F1-F7 (and other features of global page configuration and use) may be combined with any of the other Examples herein to configure an edge cluster or edge cloud system, as coordinated or designed by a system orchestrator or architect.

Broadcasting Resource Borrower Examples

Edge cloud infrastructures are being created in multiple ways. Some edge cloud locations, such as central offices, may have enough resources to host orchestration at respective edge cloud locations. While some other edge cloud locations such as street cabinets may have remote orchestration with local resource manager. Such group of edge clouds can be efficiently managed with innovate methods as opposed to traditional orchestration and resource management as done in the cloud today. The edge cloud is characterized by high ingestion of service requests with time varying requirements.

Co-allocation of resources physically present in different locations is a well-known concept. Schemes are usually based on on-demand allocations or static allocations based on simple criteria. Plain co-allocation of resources for a particular service may be too expensive for the edge cloud. Instead, the systems and methods described herein configure groups of edge clouds to be used efficiently to improve overall service allocations and throughput. For example, a respective edge cloud may have an orchestration instance that manages a set of computing resources. Groups of edge clouds may be configured as orchestration clusters.

The following techniques, provided in an edge computing system (e.g., edge cloud 110, and the edge computing system configurations depicted in FIGS. 3 to 22D) include examples of how to use groups of edges to manage a set of computing resources. For instance, a respective edge cloud has a small orchestration instance that manages a set of computing resources. Groups of edge clouds may be configured as orchestration clusters. Once resources are available, an edge may automatically advertise those resources to edge orchestration peers in the cluster. Edge orchestration peers may request other resource managers/orchestrators to reserve some or all of their resources for a particular amount of time. A resource manager may broadcast that a resource is no longer available for that period of time.

The orchestration may be provided using a provider-to-provider model or a provider-to-service/customer model. In the provider-to-provider (P/P) model, the orchestrator may request resources from another peer based on factors such as increasing load, predicted increase in load for a certain time, etc. In the provider-to-service/customer (P/S) model, a service may ask its orchestrator to find additional resources or to start another instance of the service which may be satisfied by the orchestrator through resource borrowing. These techniques may increase service availability, improves TCO with efficient resource utilization, or offers flexibility in terms of which resources may be offered and not offered at a particular edge or device. In either a P/P or P/S model, or other similar models, a dimension of a cost may be considered, as resources may be shared or exposed at a given cost.

In an example, the ETSI MEC standard may be modified to include a scope of locality of a given service to be used. The reservation of resources, for example for a fixed, such as a pre-agreed, amount of time may be used to modify the standard.

Figure 33:
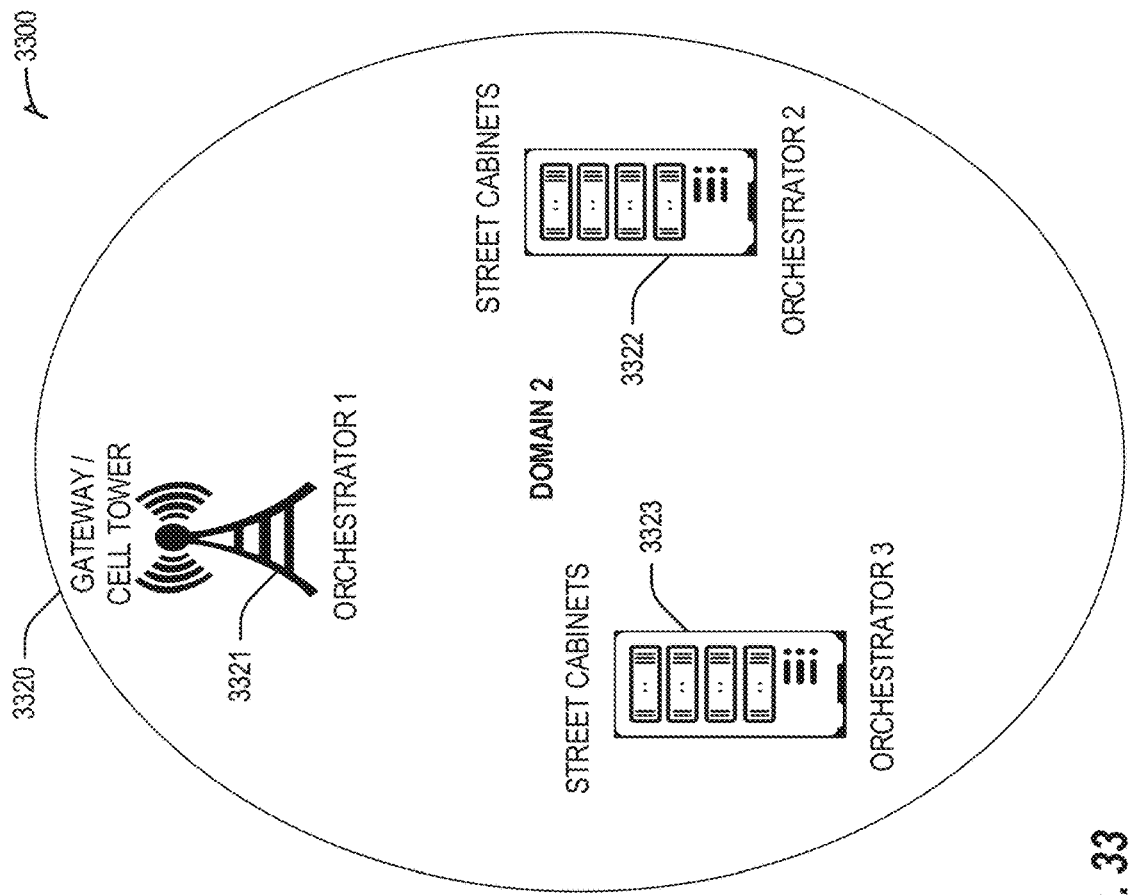
FIG. 33 illustrates a system diagram showing domain separation of orchestrators in different edge cloud locations.
Figure 33:
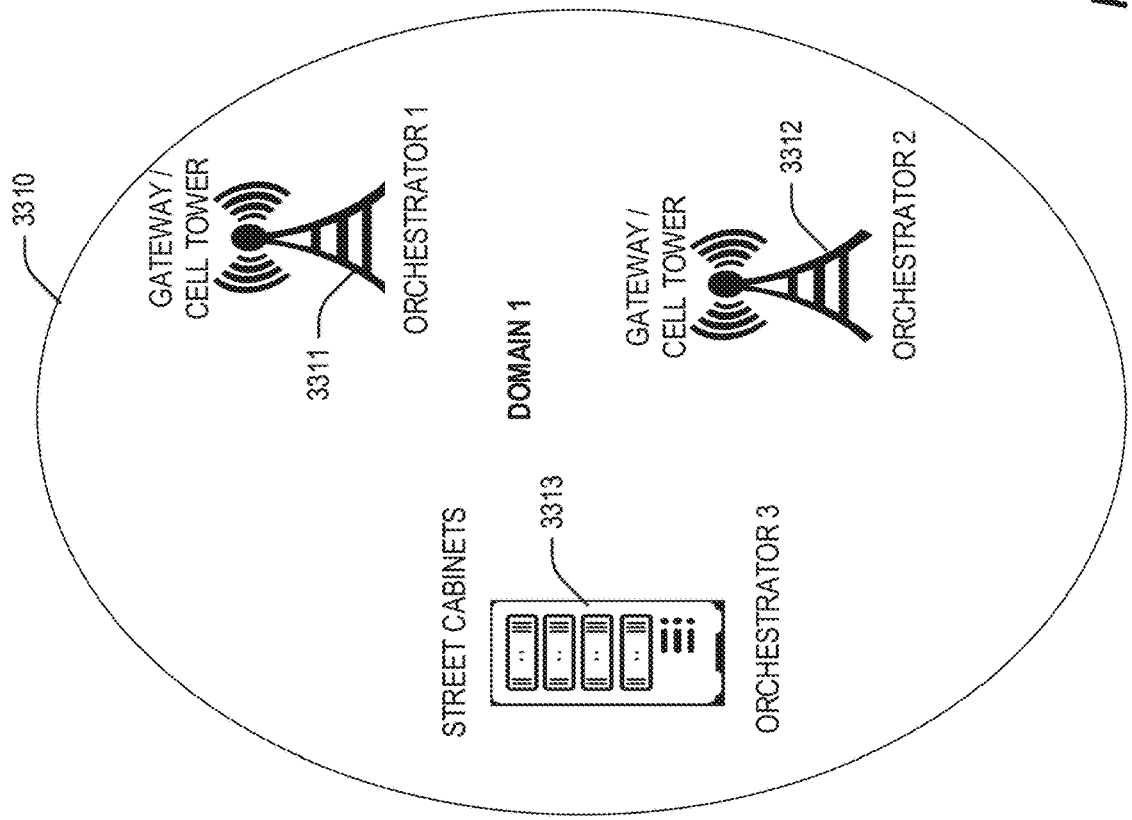

FIG. 33 illustrates a system 3300 showing domain separation of orchestrators in different edge cloud locations. The system diagram 3300 includes two different edge cloud locations, with each edge within the different edge clouds (edges 3311, 3312, 3313 within cluster 3310, and edges 3321, 3322, 3323 within cluster 3320) having an instance of an orchestrator. The edge cloud locations are also depicted in the system diagram 3300 as being formed in each of two different clusters 3310, 3320.

Figure 34:
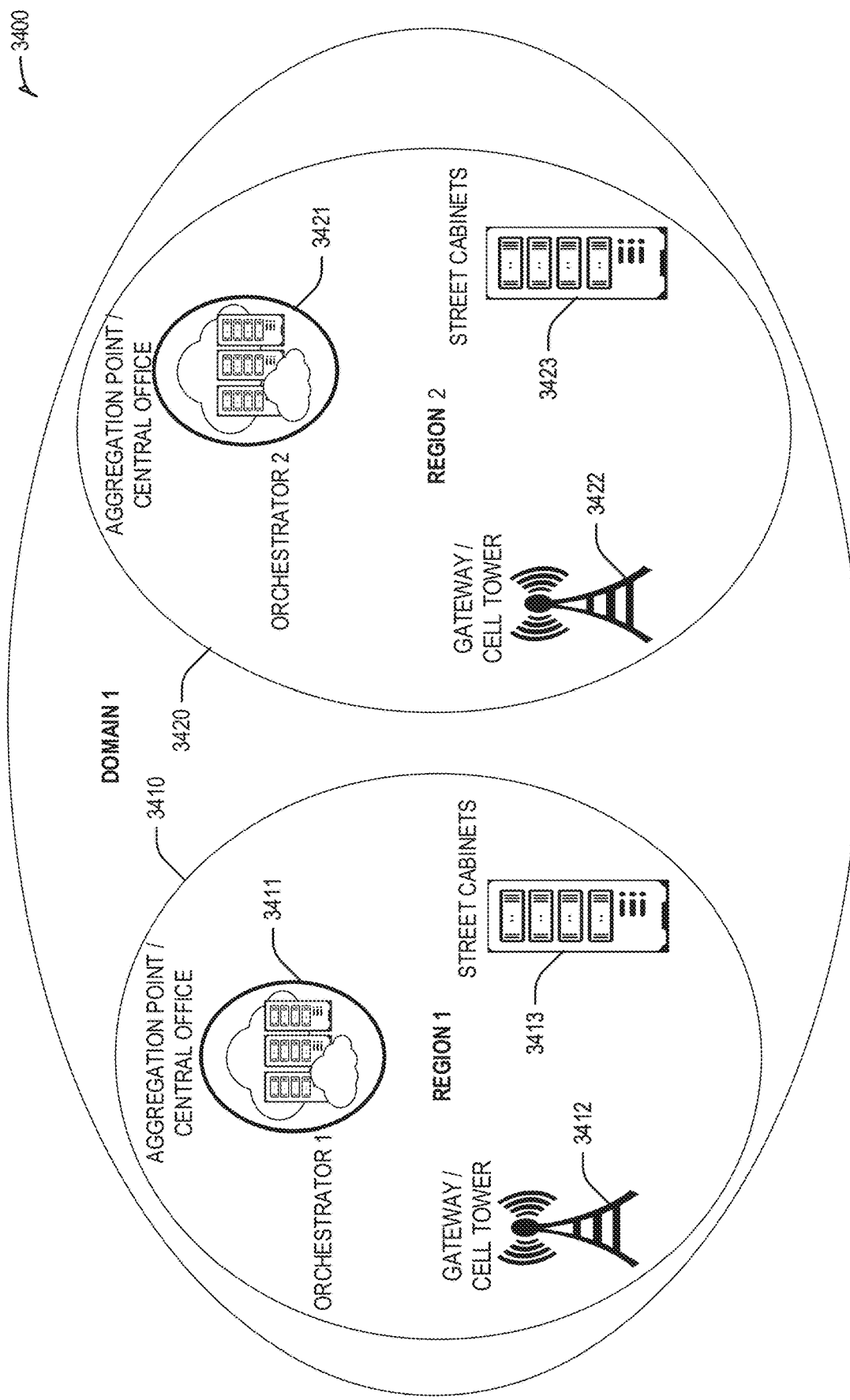
FIG. 34 illustrates a system diagram showing edge cloud orchestrators managing a region of edge clouds.

FIG. 34 illustrates a system 3400 showing edge cloud orchestrators managing a region of edge clouds. The system diagram 3400, in contrast to the system diagram 3300, shows an orchestration scheme where multiple edge locations in a region (e.g., locations 3411, 3412, 3413 in region 1 3410, and locations 3421, 3422, 3423 in region 2 3420) are managed by a remote orchestrator (e.g., in the central office). The two regions 3410, 3420 shown in the system diagram 3400 together may form a cluster, such as to allow for resources to be borrowed across the regions. Each region may have a single orchestrator (e.g., 3411, 3421), rather than each edge location having its own orchestrator. Clusters may be created based on multiple factors, such as edge location locality (zoning) or edge cloud type (for example all street cabinets may be in one cluster while cell towers in another). Regional security policies can be supplied dynamically to a domain context where an acceptable multi-region policy can be determined for a domain context. For instance, the union of region 1 and region 2 (e.g., in domain 1) could ensure the least common access is granted. Accordingly, such arrangements support dynamic formation of domain contexts (as well as static formations).

Figure 35:
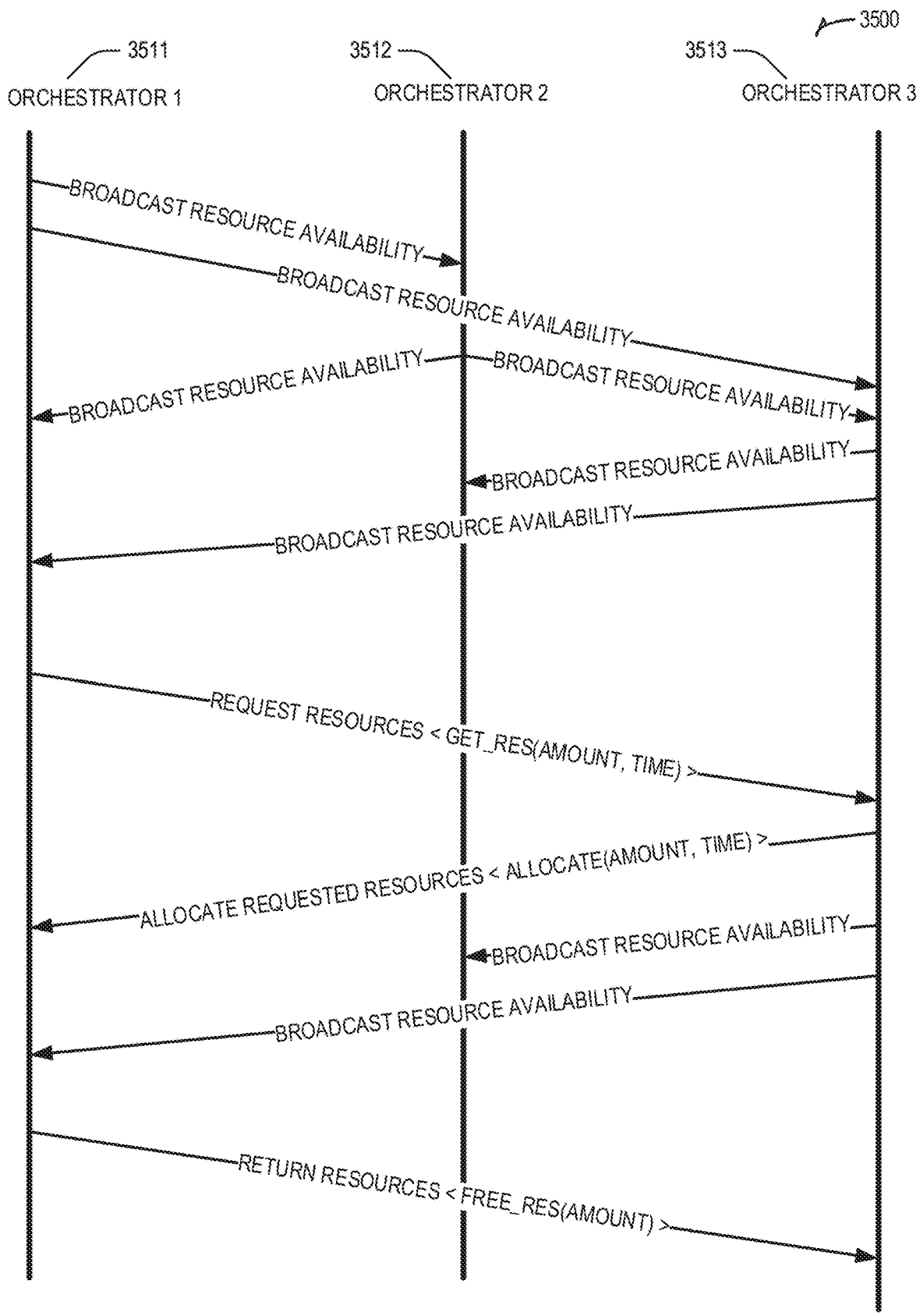
FIG. 35 illustrates a flow diagram between three different orchestrators for showing examples resource broadcasting and borrowing.

FIG. 35 illustrates a flow diagram 3500 between three different orchestrators for showing examples resource broadcasting and borrowing. In an example, the three orchestrators of flow diagram 3500 may belong to different edge locations (e.g., the regions of FIG. 34). The orchestrators may be used for broadcasting resource availability, requesting or allocating resources, or updating resource availability through broadcasts and then releasing borrowed resources. It will be understood that other variations and sequences of operations may be applied within this framework.

For example, orchestrator 1 (3511) in FIG. 35 is shown broadcasting resource availability to both orchestrator 2 (3512) and orchestrator 3 (3513), which in turn broadcast their availability to the other orchestrators. Resources may be requested, allocated, and returned among the orchestrators. Resource availability may be rebroadcast after allocation or request, and again after return. An orchestrator may reserve resources on behalf of devices within the orchestrator's region when requested, for example for an edge location within the orchestrator's region. In further examples, the execution of the orchestration sequence may be modeled or simulated.

In an example, an edge orchestrator such as 3511, 3512, 3513 may, in addition to facilitating borrowing-lending of computing resources, implement group-wide admission control policies. As resources become reserved away, the orchestrator may compensate by implementing admission control policies such that new bursts of requests may be traffic shaped (or some denied service), such as when accepting new clients would add jitter or violate existing SLA guarantees.

Orchestration clusters may perform forward usage prediction in order to determine how much resource borrowing may be performed as resource borrowing is modulated. For example, an edge server may accept additional flows because the edge server has CPU head room. However, the edge server may need to reserve capacity from a high-performance storage pool to swap out less critical or currently sleeping memory hogs to retain sufficient memory or storage headroom to proceed. To do this effectively (and not thrash), the orchestrators 3511, 3512, 3514 may anticipate how much memory they may need to free up and how much IO bandwidth they need for the requisite swap. In an example, to arrive at these metrics, orchestrators 3511, 3512, 3514 may use models that are able to predict these demands based on workload types or characteristics. Further, the orchestrators 3511, 3512, 3514 can negotiate policies for most efficient provisioning of LSMs to enforcement points.

Services may register with these edge orchestrators 3511, 3512, 3514. Services may also register model parameters, which the orchestrators 3511, 3512, 3514 may use along with edge telemetry to assess how much to borrow or release, and for how long.

Given that different edge clouds may have different energy and thermal properties, an edge orchestrator such as 3511, 3512, or 3514 may choose to reduce activity in the edge cloud and free up resources for DC thermal headroom. These services may be run on borrowed resources.

In a further example, a method for broadcasting resources may implement an orchestration technique in an edge region (e.g., within portions of edge cloud 110, and implementing systems and devices, such as implemented on or by node or device 2200, 2232, 2240, or 2250) using the following operations or variations thereof.

The method includes a first operation to run an orchestrator 3511 to interact with other orchestrators 3512, 3513, with the orchestrator 3511 coordinating resources among edge nodes within a region corresponding to the orchestrator 3511. In an example, the orchestrator 3511 and the other orchestrators 3512, 3513 are members of a cluster. The cluster may be selected based on proximity of edges within regions corresponding to the orchestrator and the other orchestrators. In another example, the cluster may be selected based on edge device type (e.g., coordinating street cabinets with street cabinets and cell towers with cell towers).

The method further includes a second operation to identify a request for a resource unavailable within the region. This operation may include determining that available resources within the region are below a threshold. This operation may include receiving the request from a service of a node within the region.

The method further includes a third operation to coordinate with the other orchestrators to request the resource. The method further includes a fourth operation to receive an allocation of the resource from one of the other orchestrators.

In further examples, the method may include broadcasting, from the orchestrator 3511 to the other orchestrators 3512, 3513, available resources within the region. In an example, the method may include returning the resource by sending an indication to the one of the other orchestrators 3512, 3513, when use of the resource is complete within the region. Other changes or resource release/tear down actions may occur after returning the resource.

A first example method (Example G1) for implementing resource broadcasting is a method performed using processing circuitry (e.g., of node or device 2200, 2232, 2240, or 2250), the method comprising: running an orchestrator to interact with other orchestrators, the orchestrator coordinating resources among edge nodes within a region corresponding to the orchestrator; identifying a request for a resource unavailable within the region; coordinating with the other orchestrators to request the resource; and receiving an allocation of the resource from one of the other orchestrators.

In a second example (Example G2), the subject matter of Example G1 includes, wherein identifying the request for the resource includes determining that available resources within the region are below a threshold.

In a third example (Example G3), the subject matter of Examples G1-G2 includes, wherein identifying the request for the resource includes receiving the request from a service of a node within the region.

In a fourth example (Example G4), the subject matter of Examples G1-G3 includes, wherein the orchestrator and the other orchestrators are members of a cluster.

In a fifth example (Example G5), the subject matter of Example G4 includes, wherein the cluster is selected based on proximity of edges within regions corresponding to the orchestrator and the other orchestrators.

In a sixth example (Example G6), the subject matter of Examples G4-G5 includes, wherein the cluster is selected based on edge device type.

In a seventh example (Example G7), the subject matter of Examples G1-G6 includes, broadcasting, from the orchestrator to the other orchestrators, available resources within the region.

In an eighth example (Example G8), the subject matter of Examples G1-G7 includes, returning the resource by sending an indication to the one of the other orchestrators when use of the resource is complete within the region.

In various settings, Examples G1-G8 (and other aspects of broadcasting resource borrower information) may be observed or monitored as a result of, defined application programming interfaces, or interface specifications; uses of protocols or definitions to invoke, receive, or control resource operations; edge software stack configurations and libraries; and other uses and implementations of resource information tracked by orchestrator entities within an edge computing cluster or environment. Examples G1-G8 and other aspects of these resource borrowing operations may also be observed or implemented as a result of service operations and service functions (e.g., to share or orchestrate resources in FaaS or EaaS settings). Additionally, the methods of examples G1-G8 may be provided as implemented instructions (e.g., with a machine-readable medium which performs the method when the instructions are executed) or implemented hardware configurations (e.g., with an apparatus that includes a configuration to perform or accomplish the method). Thus, features of Examples G1-G8 (and other features of resource management) may be combined with any of the other Examples herein to configure an edge cluster or edge cloud system, as coordinated or designed by a system orchestrator or architect.

Data Aggregation Policy Examples

Edge cloud infrastructures may be used to store data from multiple sources. The data may be collected and optionally combined at an edge device. Sharing data resources in edge locations may give rise to tenant or user privacy issues. The following example systems and methods address these and other issues in the data supply chain of an edge computing system (e.g., edge cloud 110, and the edge computing system configurations depicted in FIGS. 3 to 22D), particularly those related to privacy by allowing for aggregation of data. Data aggregation or processing at an edge device is useful for conserving power at low power devices (e.g., IoT devices) or for providing computing for sensors without compute power or without compute capabilities.

The following examples are relevant to aggregating many types of data at an edge device. Devices, such as IoT devices, cars, drones, mobile phones, sensors, and the like produce data, often for particular purposes. This data may be useful beyond its immediate purpose, but collection, maintenance, and evaluation of the data may be difficult on the devices.

For instance, a mobile device (e.g., autonomous car, drone, phone, etc.) may collect a lot of sensor data but may have limited compute power to process the sensor data. The mobile device may collect the data for a specific task (e.g., to keep the car on the road). The data may then become useless to the mobile device, such as after a task has been fulfilled (e.g., when the car has passed a crossing, it may delete sensor data about the crossing). The edge processing node (e.g., base station, small cell etc.) has more compute power and may receive data from multiple devices, including these mobile devices.

An edge device may combine sensor data from multiple devices. For example, the edge device may receive data from a plurality of devices of a similar type (e.g., a car) and aggregate that data. In another example, different devices may provide data that is aggregated at the edge device. For example, an edge device may use aggregated data to create a 3D model of an area by combining video shootings from multiple cameras (e.g., in different cars or drones). The aggregation of data may avoid issues with individual device data (e.g., when one car observes a slippage on a wheel, it may be an error of measurement). Using aggregated data, for example, several cars may observe a slippage at the same location, which indicates that the road is slippery at that location.

Figure 36:
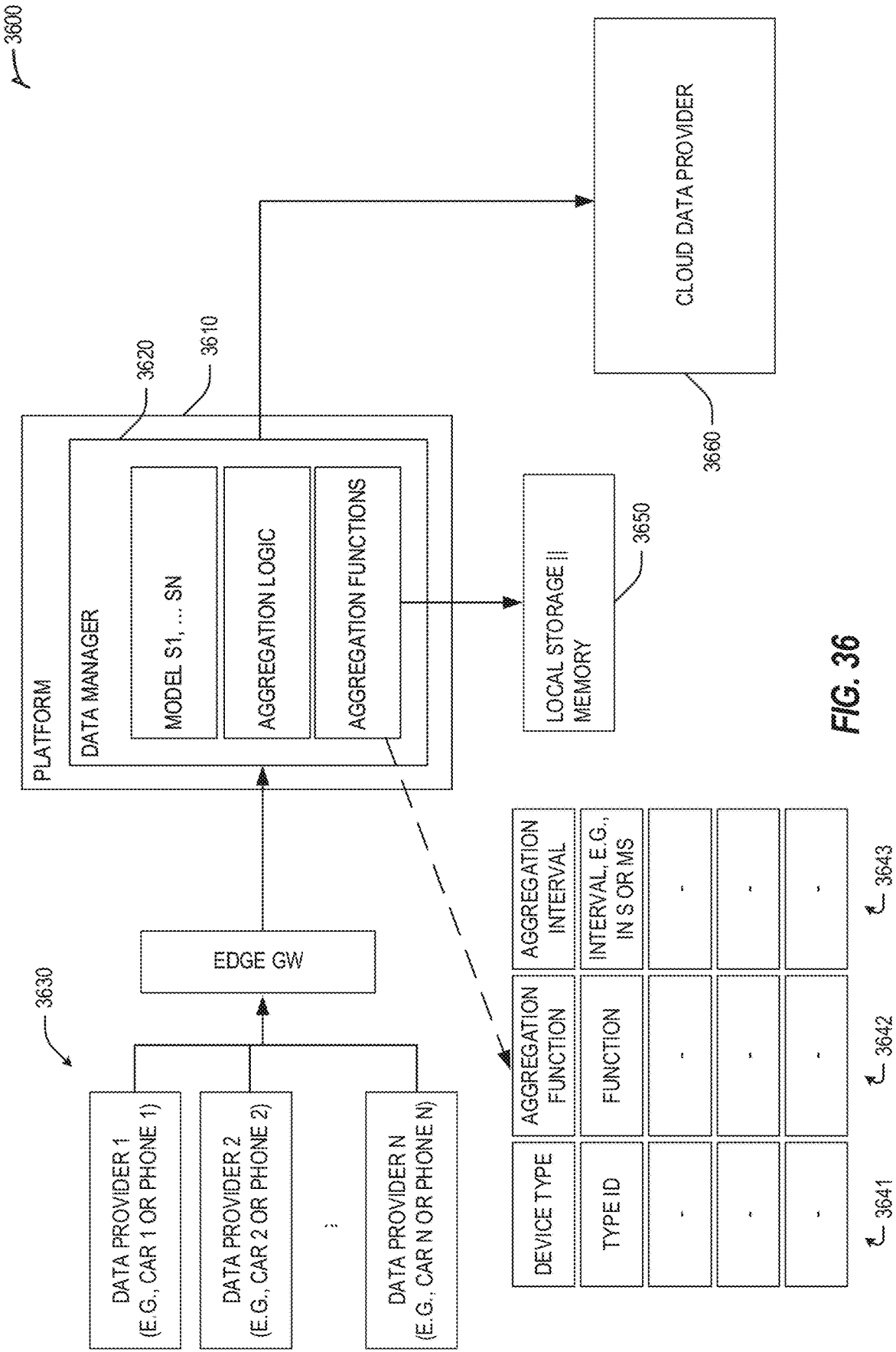
FIG. 36 illustrates a system diagram of an architecture for aggregating data at an edge device.

FIG. 36 illustrates a diagram of a system 3600 including an architecture for aggregating data at an edge device in accordance with some examples.

The system 3600 includes different elements of an edge architecture used to aggregate data from data provider devices 3630. The system 3600 includes a platform 3610 having instructions (e.g., implementing algorithms, logic, etc.) responsible for storing and registering aggregation functions, for example within a data manager component 3620. The registration interface allows for registration of a transformation function. A transformation function may include a type of device 3641 or sensor to which the function applies (e.g., a sensor type may include a temperature measured at a car).

The system 3600 may include the aggregation function itself 3642. For example, given a list of data sets from the edge device, the aggregation function 3642 may perform a computation and generate a single value to be stored or sent to the cloud data provider 3660.

The system 3600 may include an interval of aggregation 3643. This interval 3643 indicates how many units of time the aggregator has available to store data for that device type id before performing the computation (e.g., over a time interval, such as a second, a minute, etc.). In another example, the interval of aggregation may include a number of times data is received instead of or in addition to a time unit.

The system 3600 includes an interface that is used by the devices 3630 to send data to the aggregator. The aggregation logic may be responsible to implement interfaces (e.g., the interface used by the devices to send data to the aggregator or the interface with the cloud data provider). Aggregation functions can be local storage memory enforcement points where a local storage memory 3650 contains or provides a security policy for protecting/obfuscating privacy sensitive content using aggregation. (Thus, even if the user did not request aggregation, the local storage memory 3650 can apply aggregation to protect privacy).

The computing context (e.g., context such as sensor type, historical trend data of the same source or comparable sources, data source comparison values, or other values that may indicate a sense of trust) may be used to determine trust of the data received. For example, data that is supplied by a sensor that is "close" to the data being sensed may be more reliable or trustworthy than data from a sensor less "close." Being "close" in this context may be a physical property, or may be a connectedness property (e.g., whether the sensor is verified to a system producing the data that is being measured by the sensor). The "closeness" to the function interpreting the data may also be a consideration in trustworthiness. The relative "closeness" of locality implies the data is more trustable than if it arrived from some place with "far" locality. In further examples, the concept of closeness may be expanded such that the distance is dependent on the type of provider (e.g., providers associated with a first organization have the distance computed with a first metric, such as 1 mile=1 mile, whereas providers associated with a second organization have the distance computed with a second metric, such as 1 mile=2 miles).

The edge device may evaluate data locality as part of a trust test. When the data is kept but is communicated back to remote nodes, the data may be treated as being less trusted. When local computation results in aggregation (e.g., for telemetry) the node may regard it as being of high integrity value. In this example, a peer node may lower its value based on its own locality test and trust semantics (e.g., trustworthiness of the first node).

In a further example, a method for aggregating data at an edge device may include the following operations (e.g., implemented by systems and devices in edge cloud 110, such as implemented on or by node or device 2200, 2232, 2240, or 2250).

The method includes a first operation to receive, at an edge node, data from a plurality of mobile devices.

The method includes a second operation to aggregate the received data using aggregation logic of the edge node. In an example, the data may be aggregated over an interval, such as a time interval, until a specified amount of data is received (e.g., a number of transmissions or packets), or until data from a specified number of devices is received.

The method includes a third operation to generate a value based on the aggregated data and an aggregation function at the edge node.

The method includes a fourth operation to send the value to a cloud device. In an example, the value may be used to verify later received data. In another example, the value may be used to create a detailed map of an area. In yet another example, the value may be used to verify functioning of a mobile device. In still another example, the value may be used to generate usage data, provide feedback, or in security settings.

The method includes a fifth operation to determine a trustworthiness level of the received data. The trustworthiness may be output along with the value. In an example, aggregation of the data may include factoring in the trustworthiness of the received data, for example the value may be determined based on the trustworthiness.

A further example method (Example H1) for implementing and using a multi-edge data aggregation policy is a method performed using processing circuitry (e.g., of node or device 2200, 2232, 2240, or 2250), the method comprising: receiving, at an edge node, data from a plurality of mobile devices; aggregating the received data using aggregation logic of the edge node; generating a value based on the aggregated data and an aggregation function at the edge node; and sending the value to a cloud device.

In a second example (Example H2), the subject matter of Example H1 includes, aggregating the received data by aggregating the received data over an interval.

In a third example (Example H3), the subject matter of Example H2 includes, a configuration where the interval includes a time interval, a specified amount of data to be received, or a specified number of devices from which to receive the data.

In a fourth example (Example H4), the subject matter of Examples H1-H3 includes, a configuration where the value is used to verify later received data.

In a fifth example (Example H5), the subject matter of Examples H1-H4 includes, a configuration where the value is used to create a detailed map of an area.

In a sixth example (Example H6), the subject matter of Examples H1-H5 includes, a configuration where the value is used to verify functioning of a mobile device.

In a seventh example (Example H7), the subject matter of Examples H1-H6 includes, a configuration where the value is used to generate usage data, provide feedback, or in security settings.

In an eighth example (Example H8), the subject matter of Examples H1-H7 includes, determining a trustworthiness level of the received data.

In a ninth example (Example H9), the subject matter of Example H8 includes, outputting the value by outputting the trustworthiness level.

In a tenth example (Example H10), the subject matter of Examples H1-H9 includes, aggregating the received data by using the trustworthiness of the received data.

In various settings, Examples H1-H10 (and other aspects of a data aggregation policy) may be observed or monitored as a result of, defined application programming interfaces, or interface specifications; uses of protocols or definitions to invoke, receive, or control resource operations; and other uses and implementations of policies, logic, and maps (including as communicated via data transfers) within an edge computing environment. The data aggregation policy as expressed in Examples H1-H10 may also be implemented after or as part of operations conducted within a service (e.g., implemented or accomplished as part of FaaS or EaaS). Additionally, the methods of examples H1-H10 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples H1-H10 (and other features of data aggregation) may be combined with any of the other Examples herein to configure an edge cluster or edge cloud system, as coordinated or designed by a system orchestrator or architect.

Guaranteeing Premium Services with Resource Fencing Examples

Edge computing often involves physically locating modular computing pools, as positioned at the edge of a network. This is generally done to support divergent usages that are sensitive to latency when, for example, processing real time data streams. Edge computing installations are expanding to support a variety of use cases, such as smart cities, augmented or virtual reality, assisted or autonomous driving, factory automation, and threat detection, among others. Some emerging uses includes supporting computation or data intensive applications, such as event triggered distributed functions. Proximity to base stations or network routers for devices producing the data is an important factor in expeditious processing. In some examples, these edge installations include pools of memory or storage resources to achieve real-time computation while performing high levels of summarization (e.g., aggregation) or filtering for further processing in backend clouds.

Edge architectures generally involve the distribution installation of many devices. Building out such a network may be capital intensive. An element considered in next generation base stations and central offices is reducing the capital expenditures (CAPEX) without losing on key performance indicators (KPIs) for premium services. To achieve this end, multiple high-resource demanding services, such as AR/VR, may be collocated alongside high service level agreement (SLA) or revenue critical work, such as cellular virtual network functions (VNFs) that support the core business of an operator.

To support revenue critical premium services, operator hardware must be able to absorb incoming traffic for value-processing while monitoring and managing the computational resources assigned to the important workloads so that quality objectives are not compromised. Traditionally, resources will be reserved for premium services in order to guarantee quality of service (QoS). These reserved resources are not available for other work in order to guarantee their availability. However, this leads to fragmentation and high resource costs because the non-premium services also require similar resources (e.g., high bandwidth, power, etc.) even if they are less mission critical. Thus, hardware platforms tend to include many redundant resources that are underutilized. Segregating critical operations in this way does not just increase cost and reduce efficiency, it also reduces the elasticity of edge clouds and limits their ability to absorb the rapid growth in new services, usage models, and revenue opportunities in edge cloud ecosystems.

To reiterate, exclusive reservations to premium services increase the need for installing large numbers of resources in edge data centers, as the non-premium services also have similar resource requirements. Load balancing is generally required to continuously differentiate between similar computations, including for hardware-accelerated operations, according to whether they are in service of a premium client or not. Thus, load balancing generally adds latency and additional transport operations. Therefore, guaranteeing QoS in this way comes at increased total cost of ownership (TCO) and capex while also subjecting the edge data center to fragmentation overheads. Putting resources into silos (e.g., siloing) also reduces the flexibility to dedicate available infrastructure to new emerging growth opportunities that may be either at the premium or ordinary QoS.

To address these issues, an elastic approach is used, where resources are pooled, and available resource pools are shared among premium and non-premium (e.g., ordinary) work. The pooled resources are shifted to higher priority work dynamically and seamlessly as the need arises, leaving the resources free to handle the remaining work otherwise. Further, in some examples, pooled resources may be pooled within an edge server or multiple edges creating a cluster.

Such pooled resource management provides a graduated QoS in which services enjoy fair access to resources until SLA violations are predicted for premium services. When an SLA disruption is detected or predicted, resources may be swiftly reassigned to maintain the SLA of critical services.

This approach differs from deadline-driven scheduling because KPIs for premium services are not always present as deadlines. For example, the fifth generation cellular (5G) line rate needs are distributed across multiple VNFs. Also, typical deadline scheduling procedures operate on one system or resource at a time. These procedures may be too-little, too-late, especially in environments where 99-percentile latency is much harder to bring down by mitigating latencies one operation at a time in an end-to-end chain that spans multiple—often in the hundreds—different components in chained interactions.

In an example applicable in an edge computing system (e.g., edge cloud 110, and the edge computing system configurations depicted in FIGS. 3 to 22D), hardware monitors in an edge gateway are used to observe the VNF behavior. That is, first class premium services that cannot be allowed be resourced starved. When the experience performance degradation due to some resource congestion (e.g., memory, compute, etc.), the edge gateway is configured to automatically reallocate resources from other, non-critical, services until the needed performance level is achieved in servicing the VNFs, for example.

These techniques operate to reduce end-to-end latencies in computing that is time-coordinated, for example, with the use of HW-based auto-timestamping. Thus, operations that are distributed across multiple base-station and central office (CO) environments and require high SLA compliance—for example, in multi-point surveillance, telemedicine, real-time mobile coordination in mobile offices, etc.—may be accelerated just-in-time under burst arrivals, without overprovisioning siloed capacities. Accordingly, TCO and CAPEX may be reduced by avoiding exclusive reservations for different services and enable swift reflows of resource assignments among services when SLA violations become probable. Also, because the resource monitoring and reallocation is implemented as hardware extensions to the edge gateway, software-level overheads are completely avoided. In fact, many software-level resource monitoring and reallocation attempts would not allow the services to be completed on time. Additionally, in the edge cloud scenario, the SLA and QoS agreements are dynamic and unpredictable in nature. For example, different QoS levels may be required for specific services at a different point of time in the day, and also between different sub-functions that are traversed in service chains. Similarly, the QoS agreements may also change frequently. In such situations, the exclusive reservations generally will be remapped by a software-level orchestrator, and in many cases, admin intervention may be required. This increases maintenance and validation costs.

Figure 37:
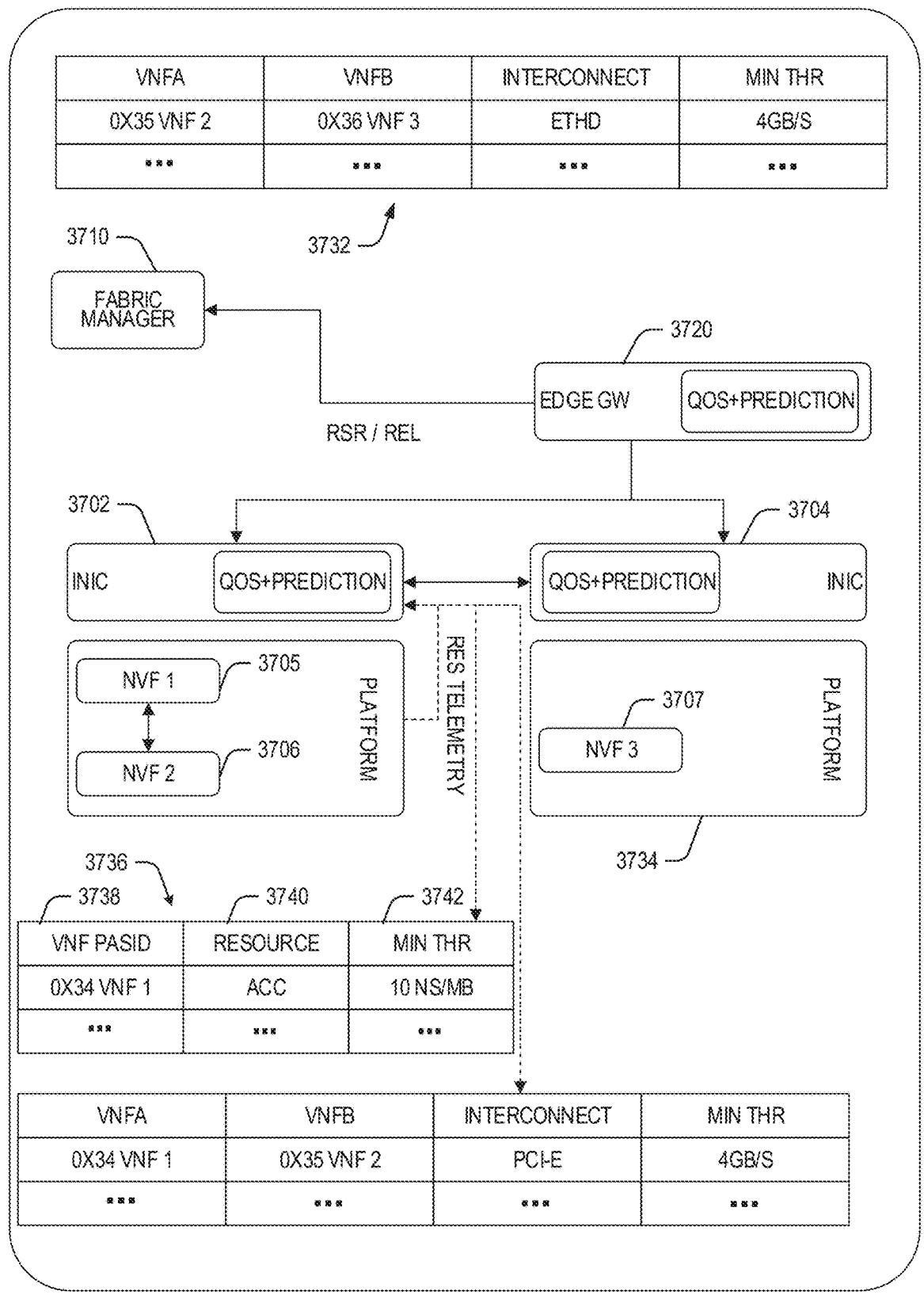
FIG. 37 illustrates an example of an edge gateway architecture.

FIG. 37 illustrates an example of an edge gateway architecture 3700 (e.g., providing an implementation of edge cloud 110). An edge gateway 3720 may operate as an extension to the edge architecture at a base station or central office. The QoS prediction circuitry (e.g., implemented via a microcontroller in the platform, or via other circuitry) is added to the edge gateway 3720, and the intelligent network controllers 3702 and 3704 (iNICs) in the edge computing platforms (e.g., edge computing platform 3732, 3734). Other illustrated elements include a fabric manager 3710, various applications—such as VNFs 3705, 3706, and 3707—and various configuration tables such as table 3736.

The QoS prediction circuitry is configured to expose an interface for a VNF resource. In an example, the VNF is identified by a process address space identifier (PASID) 3738. The QoS prediction circuitry is configured to expose an interface for a minimum bandwidth needed for communicating with the VNFs. These interfaces provide information to the QoS prediction circuitry about which resources are required by running VNFs as well as operating parameters for the VNF to the resource 3740. The QoS prediction circuitry is configured to use this information to track whether each VNF has sufficient platform resources to meet its (e.g., varying) KPI targets 3742.

The QoS prediction circuitry is configured to progressively reserve resources when approaching a utilization threshold (e.g.: 70%) on behalf of high priority VNFs. The QoS prediction circuitry is configured to release resources once utilization declines below a second threshold (e.g., 60%) from above, for hysteresis.

The resources considered by the QoS prediction circuitry may be both platform resource (e.g., memory, CPU cycles, power, etc.) or interconnect resources (e.g., available NIC or switch bandwidths). When the stress is low, the QoS prediction circuitry will effectively support a high level of sharing.

The edge gateway 3703 is similarly extended with the QoS prediction circuitry, which also exposes interfaces for registering how much platform minimum bandwidth is needed to communicate, by VNFs (PASIDs) in different platforms. The QoS prediction circuitry in the edge gateway 3703 is also configured to track the bandwidth utilization, and the latencies, on a continuous basis. As with the counterpart QoS+Prediction logic in the platform, that in the edge gateway 3720 also reserves or releases fabric credits, based on a utilization threshold. The actions of reserving and releasing them are illustrated in FIG. 37 as Rsr/Rel. It will be understood, however, that the throughput values and other properties provided in FIG. 37 are provided for purposes of illustration, as other values will be utilized in respective deployments.

In an example, the QoS prediction circuitry includes a hardware-based (e.g., field programmable gate array (FPGA)) analysis and prediction based on incoming request rates into each VNF. Information is propagated to platforms which use it to raise or lower aggressiveness in the reservations.

A first example method (Example I1) for implementing guaranteed premium services efficiently in edge infrastructures (e.g., edge cloud 110, and implementing systems and devices, such as implemented on or by node or device 2200, 2232, 2240, or 2250) includes a method performed using processing circuitry, the method comprising: creating a resource pool in an edge node; measuring, by a quality control circuit in an intelligent network controller (iNIC) of the edge node, per-service request rates; determining, by the quality control circuit, a likely resource need for a critical service beyond resource allocation to the service; and reallocate resources from the resource pool to the critical service to meet the likely resource need.

In a second example (Example I2), the subject matter of Example I1 includes, a configuration where the edge node is an edge gateway.

In a third example (Example I3), the subject matter of Example I2 includes, a configuration where the service is running on a platform served by the edge gateway.

In a fourth example (Example I4), the subject matter of Examples I1-I3 includes, a configuration where the quality control circuit is a field programmable gate array.

In various settings, Examples I1-I4 (and other aspects of premium service operations) may be observed or monitored as a result of, defined application programming interfaces, or interface specifications; uses of protocols or definitions to invoke or modify the premium services; and other uses and implementations of resource fencing or other resource allocation for services within an edge computing environment. Examples I1-I4 and other aspects of these premium service techniques may also be observed or implemented as a result of other service operations and service functions (e.g., to reallocate resources used in services offered in FaaS or EaaS settings). Additionally, the methods of examples I1-I4 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples I1-I4 (and other features of resource fencing and resource allocation) may be combined with any of the other Examples herein to configure an edge cluster or edge cloud system, as coordinated or designed by a system orchestrator or architect.

Pre-Provisioned Handoff Examples

Edge cloud computing systems are often deployed to perform real-time (e.g., latency sensitive) work without overcommitting resources (e.g., central processing units (CPUs), graphics processing units (GPUs), volatile working memory, non-volatile storage, etc.) for computation or for communication (e.g., high bandwidth links). Edge clouds often attempt to limit excessive resource allocation to workloads for multiple reasons. In particular, unlike large scale data center clouds, edge computing infrastructure tends to be distributed over wide geographical areas. As a result, there are generally few resources at the edge to provision the machines and power that may be needed in order to perform various operations at scale and in real-time.

Another example of an issue that may arise in edge clouds involves the time it takes to distribute data. That is, distributing data takes time, and the time it takes to do so is subject to unpredictable swings in the amount of network intensive activities that may arise. Requestors for edge services may range from human beings to robotic devices to vehicles, often in transit from one physical location to another to another while receiving edge services. Serving the needs of such dynamic and transient entities may require executing the services with minimal network hops. This may be accomplished by moving the processing performed on behalf of a requestor to a point (e.g., edge node in the edge cloud) physically closest to the communication end point used by the requestor. Thus, here, an edge service may be expected to move from one base station (BS1) at one time, to a different base station (BS2) at a different time. Practically, this move may be from one micro-datacenter close to BS1 to another micro-datacenter close to BS2, when the communication end point for its mobile requestor transitions from being in BS1's coverage area to that of BS2.

Moving workloads from one physical edge node to another to keep up with moving clients (e.g., service requestors) may involve several logistical hurdles. For example, the process of moving an edge service generally includes transferring the state associated with that edge service from one host in one location to another host in another location. The actual service instance and its session may be terminated (e.g., exited, shut down, etc.) at the first host and initiated (e.g., started, booted, etc.) at the second host using the transferred state. This process is usually presented to the requestor as a continuous service that is moving physical locations—although the requestor may not be able to determine that the physical location is actually moving. The illusion of a continuous service may be dispelled if there is a sufficiently large interruption in the service execution while the associated state is being moved from the previous host to the next host.

As application sophistication continues to increase, the volume of information transferred as session state also increases. Thus, it may become more challenging to maintain the predictable and low latencies for executing a given application at different computation points in the edge infrastructure as the requestors move from one point to another. Increasingly, in an end-to-end interaction (e.g., real-time communication)—which is common in examples such as a mobile video surveillance apparatus interacting with a mobile video analytics platform)—latency growth at both ends of the interaction needs to be bounded, even as intermediary base stations may change at each end, in order to satisfy the operating expectations of the service.

Several approaches have been tried to address these issues. Some solutions—such as in visual or immersive applications like cloud gaming, augmented reality (AR) or virtual reality (VR)—accomplish the illusion of seamless high-quality experiences in real-time by using purpose-built platforms and solution delivery points. For example, content data networks (CDNs), such as those used to deliver streaming video services, generally use well-resourced consumer premises edge (CPE) servers to imbed high volume processing capabilities in the near edge. With this design, such services rarely have to move their computation or data hosts even as the base stations to which a subscriber is attached change. Further, even when services must move, the movement is performed through well-provisioned data-center scale resources.

CDN-like solutions with CPE-based processing, however, are often not generalizable to many emerging services in which the providers lack the ability to create and maintain large amounts of infrastructure in their own near-edge datacenters. To address this concern, data transfers for service migration may be performed in tandem with the motion of the requestors. Here, a model-based prediction technique may be used for session (e.g., service state) migration. For example, the model may compute the likelihood that a particular requestor will move from a current base station with which the requestor is communicating to one or more potential next base stations. Additionally, the applicable service information considered for migration may include, service state, the service operation itself, service data, or potentially user sessions.

In an example applicable in an edge computing system (e.g., edge cloud 110, and the edge computing system configurations depicted in FIGS. 3 to 22D) the model may identify the most likely next base station based on the current trajectory (e.g., direction, speed, continuity of motion, etc.) of the requestor. In an example, the prediction may identify more than one possible target base station. Here, the model may further identify the most likely subsequent (e.g., next-to-next) base station, or stations, as well. In an example, the model may operate by identifying a most likely sequence of base stations that the requestor will travel through based on a prior history of requestor motion, search queries performed by the requestor, or actual routes that have been established by the requestor (e.g., using a mapping or navigation service).

In an example, the model predicts the most likely moments when the requestor may transit between the identified base stations. Based on these predictions, the data may be marshalled for moving the service session from one point of proximity to the requestor to respective second or subsequent points of proximity. In an example, the data is transmitted (e.g., streamed, multicast, etc.) ahead of the actual movement of the requestor. This pre-sending of data, effectuated just-in-time, reduces the actual amount of data that must occur when the predicted trajectory is followed by the requestor. In this fashion, appropriate workload and service data can be moved to the compute resources, even as compute resources are moved to the data locations.

In an example, the model is configured to evaluate a negative probability. Here, the negative probability is the probability that a previously predicted sequence of base stations will not be followed by the requestor. This prediction enables the freeing of resources because data that is sent ahead to base station to which the requestor is not likely to attach no longer needs to be buffered at that base station. This may occur when, for example, the trajectory being followed by a requestor moves away from that which was previously predicted in a manner that strongly suggests a change of intent with respect to the path of travel for the requestor.

The predictive model provides a mechanism whereby service state data may be moved at an early stage to provide additional time to transfer the complex data. Thus, the latency of sending data may be effectively hidden to the requestor. Such a predictive model also naturally adapts to changing patterns of requestor movement. For example, when there is a digression on a freeway due to an accident or congestion, the model reacts to such an observation to dynamically change the prediction to a different route that a vehicle is most likely to embrace. In addition to reducing or eliminating data transfer latencies, the predictive model creates the possibility for the infrastructure to pre-orchestrate (e.g., pre-provision) resources that meet or exceed the needs of a requestor ahead of the time that the service needs to be instantiated. In this process, it creates opportunities for dynamic optimization. For example, the model may enable pre-allocation of an accelerator at a predicted next node in a sequence of nodes and pre-program the accelerator to avoid initialization latency.

Figure 38:
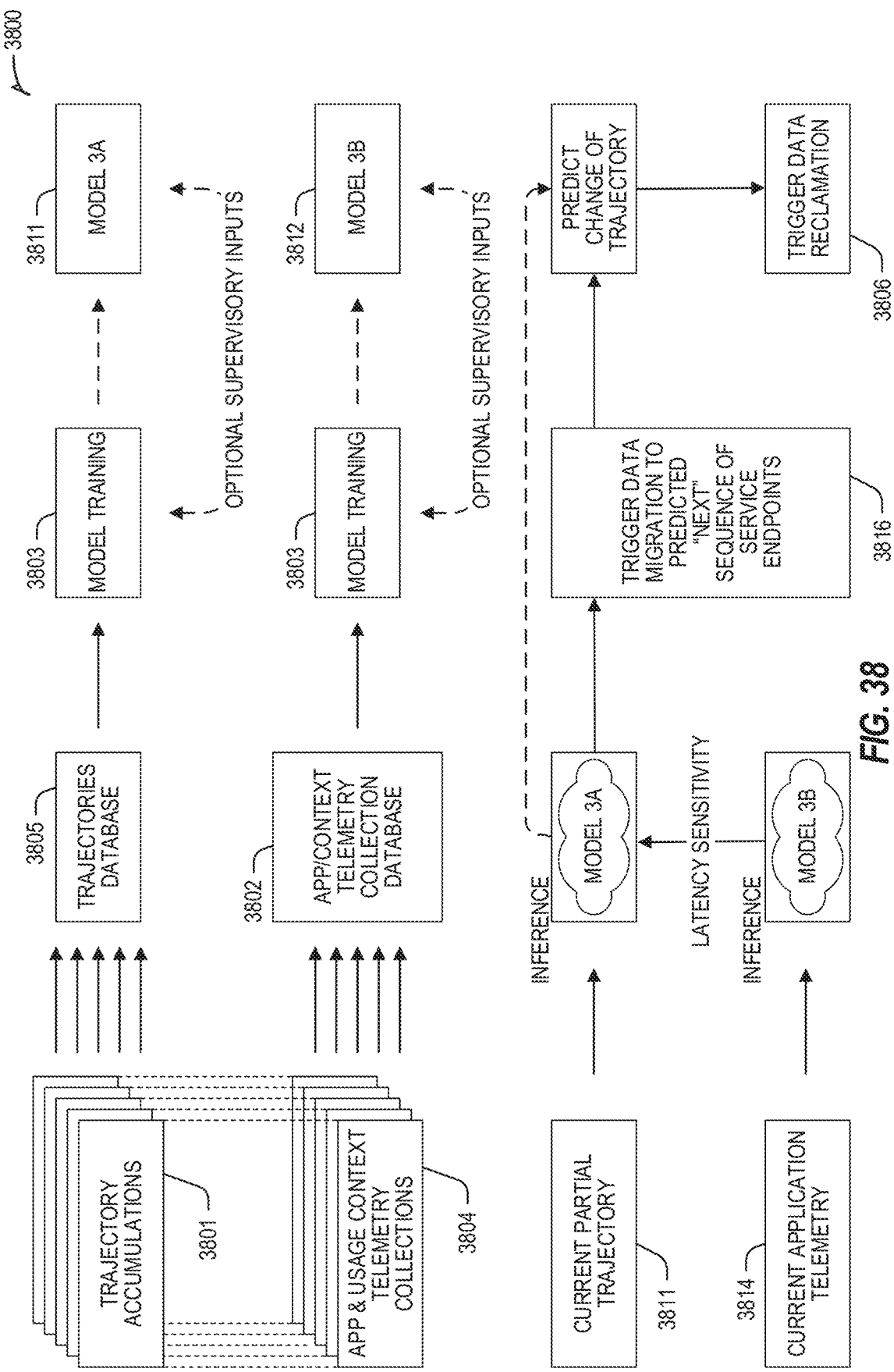
FIG. 38 illustrates an example of training and using a machine learning system for pre-provisioned hand-offs.

FIG. 38 illustrates an example of training and using a machine learning system 3800 for pre-provisioned handoffs. The illustrated system 3800 includes the following components: a trajectory capture and association subsystem, a trajectory accumulator 3801, a context, service, and user database 3802, a trajectories database 3805, a training subsystem 3803, a telemetry subsystem 3804, operating in the context of a prediction and execution subsystem.

The trajectory accumulator 3801 is configured to compute distance vectors between the requestor's device and the base station with which the requestor interacts. These vectors are recorded with the identity of the base station and a time stamp. The trajectory accumulator 3801 is configured to compute a trajectory vector that encodes the path being traveled by the requestor device as it enters or leaves various base stations. In an example, average velocities taken by the device along its path are also recorded (e.g., along with the computed trajectory vector). This information is saved in an edge database. In an example, the data may be cached in the device itself. The capture of this information may be based on device actions or use of a device proxy in the edge cloud. The accuracy of this information need not be very precise (e.g., fine grained) since it is used primarily for predictions and the consequence of inaccurate predictions are often simply a loss of some efficiency.

The trajectories database 3805 is configured to store the trajectories computed or collected by the trajectory accumulator 3801. The database 3805 may be configured to augment the stored trajectories with context attributes in database 3802, such as the user (e.g., a human user), the service or application for which the trajectory was collected, or various meaningful contexts that may be defined flexibly. An example of a context may be a name for a route—such as "My Shopping Trip", "Route from home to work", etc. The contexts may be optionally supplied by a user, programmatically encoded by a requestor application (e.g., a navigation application), etc.

The training subsystem 3803 is configured to provide training, evaluation, and continuous improvement to the underlying predictive model. This may be accomplished via directed, undirected, or semidirected machine learning techniques. As trajectory information and context data is collected and cross-connected, the frequent and infrequent route sequences for a given user, and the common (e.g., shared) paths followed by many users, may be evaluated and used for training the predictive model. This data may also be used by the training subsystem 3803 to improve a previously trained and predictive model, by recording which predictions fail to hold true more than some threshold percent of time. The training may, in general, be unsupervised; however, directed (e.g., supervised) or semi-directed corrections or improvements to training may also be used. For example, a system may exclude various trajectories that are known to a human as being anomalous (e.g., John Anderson followed an unusual trajectory just to skip a portion of a road that has some ongoing emergency activity). Model training nodes can be an LSM enforcement point where high-risk trajectories can be filtered from the training model so that they are not subject to model manipulation (e.g., in an opt-out manner).

The result of above training is a model, illustrated in FIG. 38 as model 3A 3811. The model 3A produces trajectory predictions based on currently observed trajectory. Thus, for example, the model 3A may first predict a maximum likelihood end destination based on a current observed trajectory followed by the most likely forward trajectory based on predicted end destination and current observed trajectory.

The telemetry subsystem 3804 is configured to collect and store telemetry metrics such as application latency or data intensity. Applications may be sensitive in varying degrees to the amount of data that must be transferred from one base station to the next. If the amount of data that needs to be transferred is very small, it is not particularly helpful to employ a lot of effort in training a prediction model or keeping it current. This sensitivity may vary from application to application. For example, a voice phone call may be largely insensitive to state transfers between base stations because the amount of information to be transferred is small and a small jitter may not much affect the perceived quality of the phone call. However, a high-resolution live video presentation may be particularly sensitive. These application latency sensitivity and data intensity factors may be captured as telemetry information to be used in conjunction with prediction of sequences of base stations to be encountered on each projected trajectory.

In an example, telemetry data collected in relation to a given application and its usage contexts may be used to populate the database 3802 or used to generate an historical data pool. In an example, this data pool may provide data for the training subsystem 3803 to generate a second predictive model (illustrated as model 3B 3812). This second model predicts when it is advisable to pre-send an application's data to a compute node proximal to one or more next base stations predicted by model 3A.

A prediction and execution subsystem 3816 is configured to invoke the models (e.g., the two trained models 3A and 3B) to predict respectively the destinations on the forward path from a given current trajectory 3811 (e.g., using model 3A) and the latency sensitivity of an application given the current telemetry 3814 (e.g., using model 3B). Based on the outputs of these models 3A and 3B, the prediction and execution subsystem 3816 is configured to start data migration proactively to future compute nodes to which a given application (e.g., service) will be migrated. In an example, as the trajectory continues to be updated, the model 3A may now predict that a future path previously predicted is no longer as projected before. In an example, the prediction and execution subsystem includes a reclamation component 3806. The reclamation component 3806 is configured to communicate with forward nodes that data previously proactively migrated to the node to which the service will no longer migrate may be deleted, or data and resources otherwise reclaimed. This enables the reclaimed resources to be deployed for other needs.

A first example method (Example J1) for managing handoffs and secure storage is a method performed using processing circuitry (e.g., such as implemented on or by node or device 2200, 2232, 2240, or 2250), the method comprising: obtaining location movement information for a requestor device, the requestor device being connected to an edge computing service operating via a first base station of a mobile wireless network; generating, with a prediction model, an estimated location prediction of the requestor device among one or more other base stations of the mobile wireless network, the one or more other base stations capable of operating the edge computing service; and identifying and forwarding data of the edge computing service from the first base station to the one or more other base stations, using the estimated location prediction of the requestor device.

In a second example (Example J2), the subject matter of Example J1 includes, a configuration where the data of the edge computing service is service state data, wherein the service state data is provided to the one or more other base stations before actual movement of the requestor device.

In a third example (Example J3), the subject matter of Examples J1-J2 includes, a configuration where the prediction model is trained to infer the estimated location prediction based on movement trajectory of the requestor device, prior history associated with the requestor device or the edge computing service, or mapped routes associated with the requestor device or the mobile wireless network.

In a fourth example (Example J4), the subject matter of Examples J1-J3 includes, the estimated location prediction including a predicted sequence of movement among the one or more other base stations.

In a fifth example (Example J5), the subject matter of Example J4 includes, the estimated location prediction being based on a negative probability, the negative probability being a probability that the predicted sequence of movement among the one or more other base stations will not be followed by the requestor device.

In a sixth example (Example J6), the subject matter of Example J5 includes, resources being freed among the one or more other base stations based on the negative probability.

In a seventh example (Example J7), the subject matter of Examples J1-J6 includes, the estimated location prediction indicating a predicted time for movement of the requestor device among the one or more other base stations, and wherein the identifying and forwarding of the data occurs based on the predicted time for movement of the requestor device.

In an eighth example (Example J8), the subject matter of Examples J1-J7 includes, the identifying and forwarding of the data of the edge computing service being used to pre-program accelerator circuitry located among the one or more other base stations, in advance of movement of the requestor device.

In a ninth example (Example J9), the subject matter of Examples J1-J8 includes, a configuration where the prediction model is a machine learning model that is trained based on trajectory vectors, the trajectory vectors being associated with training data from requesting devices and servicing base stations.

In a tenth example (Example J10), the subject matter of Examples J1-J9 includes, the location movement information including telemetry information produced from usage of the edge computing service operating via the first base station.

In various settings, Examples J1-J10 (and other aspects of data or service handoffs) may be observed or monitored as a result of, defined application programming interfaces, or interface specifications; uses of communication protocols, messages, or definitions to invoke, receive, or control handoff operations; and other uses and implementations of policies and logic for handoff within an edge computing environment. In further examples, Examples J1-J10 may involve the capture, use, or manipulation of contextual data for the data or service handoffs. Examples J1-J10 and other aspects of these handoff management techniques may also be observed or implemented as a result of service operations and service functions (e.g., to perform handoff and resource allocation among services in in FaaS or EaaS settings). Additionally, the methods of examples J1-J10 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples J1-J10 (and other features of handoff and resource allocation) may be combined with any of the other Examples herein to configure an edge cluster or edge cloud system, as coordinated or designed by a system orchestrator or architect.

Automatic Data Replication Examples

Within edge computing environments, various requirements and expectations exist for service resilience, availability, and overall reliability. For instance, video analytics is one of the top workloads that is anticipated to run within the edge cloud, and some projected requirements are planned that ensure a 99% level of resiliency or reliability of data processing for a particular stream of video.

In general, resiliency and reliability can be achieved in cloud computing settings through service replication and centralization. For example, multiple instances of a service may be set up in the same cloud data center using backup services or services that are to be instantiated when a certain reliability level is not met. There may also be backup services or data aggregators made in other cloud locations which are all managed by a central service orchestrator. In edge cloud infrastructures, however, different types and size of data centers will exist in disparate locations—from single node to multi rack servers. Additionally, in many edge cloud deployments (including in MEC deployments), the use of cloud computing service management may not be suitable as many types of edge nodes are made available in distributed locations. Therefore, the edge cloud infrastructures need their own way of ensuring this reliability using its unique properties.

In a distributed edge cloud processing scenario, resources for services may be widely available within the edge computing environment; however, individual edge nodes or service coordinators may not know to know how and when to run the services, or which locations to run the services. Further, when service migration does occur from one node to another, there may be an interruption and a loss of context. The following addresses these issues and enables improvements to the reliability and resilience of services in an edge computing environment.

With the following techniques, applicable in an edge computing system (e.g., edge cloud 110, and the edge computing system configurations depicted in FIGS. 3 to 22D) resiliency can be obtained by replicating service data across edge computing nodes. Rather than replicating or duplicating a service, the data being used and/or produced by the service may be replicated in real-time, and used when needed in a backup service scenario. Replication, depending upon operational needs, may comprise of all the data being used or currently relevant, or some data subset or part necessary for service delivery or service resilience. For instance, a replication process may begin with a small amount of replication, followed by an assessment of need, and then greater replication if needed.

Reliability through this form of replication may be accomplished in one of two ways: (a) Replicate the data across multiple edges; or (b) Replicate the data to be processed down to the pipeline of edge nodes (e.g., street cabinets→cell tower→central office). A protocol to implement data replication with either approach can be implemented in the edge computing platform, or with the use of intelligent NICs or other programmed networking hardware. This use of data replication avoids replication of services on the same edge location which may be expensive (or subject to performance tradeoffs); further, by replicating the data, the replicated data and any resulting backup service may be flexibly re-allocated or adapted based on communication and computation loads. Further, this data replication may consider that respective edge locations may have a different level of trust or reliability factor based on historical data and the capacity to make data persistent.

In an example of replication across multiple edge nodes, a central edge orchestrator can spawn a service at an edge location (e.g., location A) and spawn a minimum replicator service on another edge location (e.g., location B) where minimal resources are used to only replicate the data handled (such as a video feed). The actual service is not run. The data is stored in location B for a moving time window before being discarded. Location B will take up the data and act when a message is received from the location A or the orchestrator for spawning a service.

The replication of data across the pipeline of edge nodes may involve selection of upstream locations for replication, even at the expense of latency. For example, a street cabinet may be the closest low latency edge host for a video stream, the cell tower is the next in pipeline, followed by the central office. The data from the edge hosts may be replicated in the next edge location in the pipeline (e.g., replicated from the cell tower to the central office) in order to ensure this reliability. In case of a problem on the primary servers, the next edge node available in the pipeline can take over. Such pipeline-based replication may assist with edge computing nodes of limited resources or constraints (such as power constraints by solar powered equipment) and be controlled by a combination of hardware and software.

Figure 39:
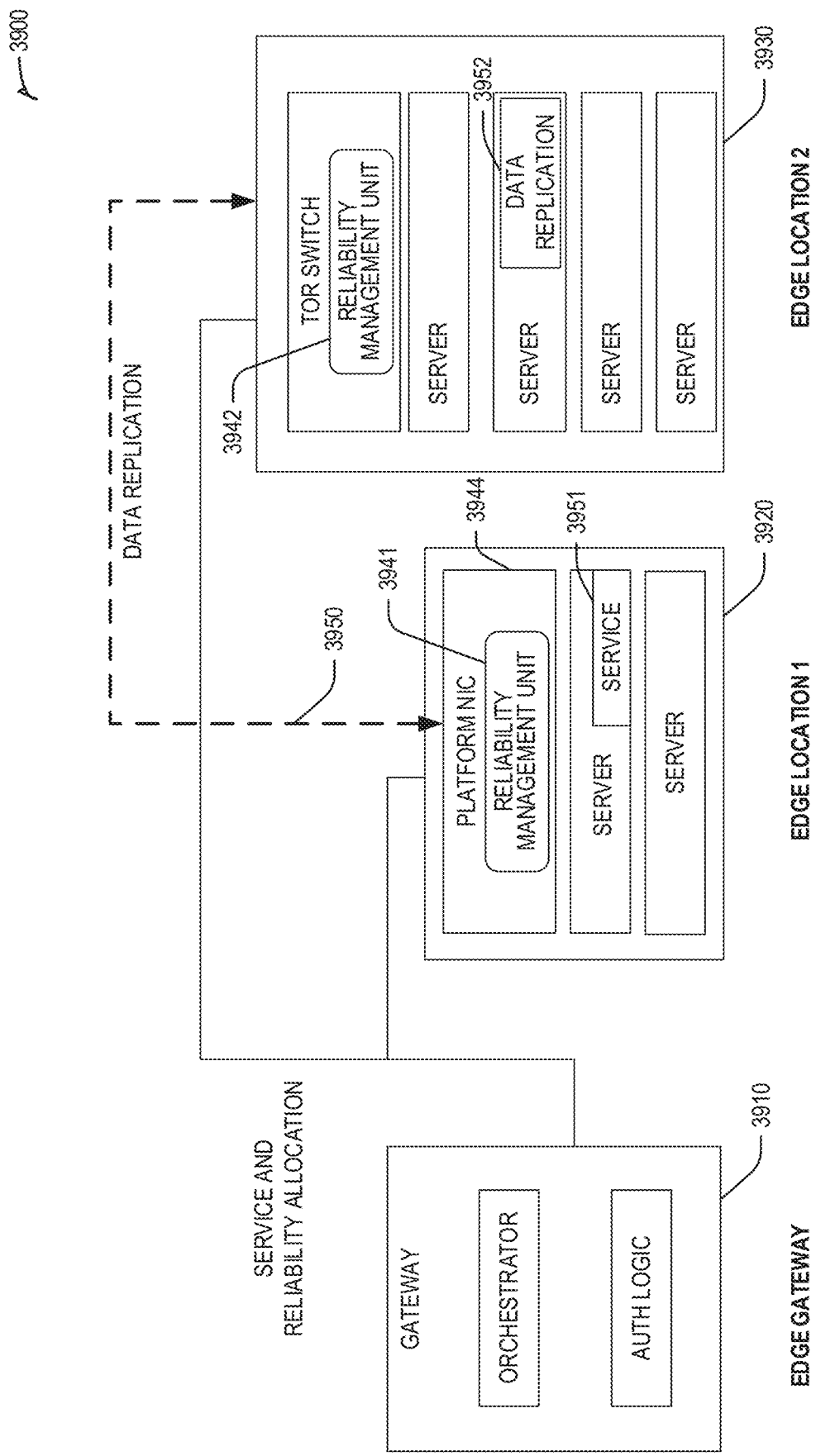
FIG. 39 illustrates an example of automatic service replication among edge computing nodes.

FIG. 39 illustrates an example of how data replication across multiple edges can be realized, within the context of an edge computing service deployment 3900. Multiple servers and nodes are shown, as would be applicable for the execution of multiple flavors of services among multiple tenants or entities. In the context shown, FIG. 39 illustrates a service with data replication being conducted between two different edge locations (edge location 1 3920, edge location 2 3930) as allocated and controlled by an orchestrator (operating on edge gateway 3910). When locations for execution of the service are identified (service 3951), the orchestrator spawns a data replication service (service 3952). The reliability management component (3941, 3942) at each edge node location is then responsible for: forwarding the data to the appropriate data replication service (with data replication 3950); and sending messages to activate a service duplication or start up a backup service in the case of predicted disruption or overloading to the service.

The data replication service (service 3952) executes at the second edge location 3930 and is actively managed by the reliability management component (RMU) 3941. The data replication service 3952 replicates data for use by a backup service (on the same sever, or on another server of the second edge location 3930); the backup service does not do anything until needed, but continues to receive data. In this fashion, data is replicated in a way without needing to replicate service operations, even while the services can be started to an appropriate state when required. The data replication service 3952 may be defined as a service that is only collecting data in moving window timeframe so that important data is replicated, and the service can be respawned as required during a failover or load problem. In further examples, the RMU 3941 may decide dynamically how much and what data needs to be replicated; and performing such dynamic replication for more than one service at a time.

The RMU 3941 is responsible for actively sending data to the backup service(s) and predicting any service irregularity or disruption. Such prediction may be based on various factors such as information from other monitoring components, a machine learning algorithm that is used to track service patterns, external situation monitoring sensors, interfacing with the application, collected telemetry values, etc. The RMU component 3941 is also responsible for receiving messages from other RMUs and acting upon the request such as spinning up the backup service, etc. Further, the RMU 3941 may be responsible for tracking connectivity, which plays an important role as part of overall reliability or capability available at an edge location to make data persistent.

The RMU 3941 can be implemented as a component of a ToR (Top of Rack) Switch (in the case of edge locations where rack servers can be deployed) or a Platform NIC (in the case of single or multi server edge installations). The RMU 3941 may also be implemented within other hardware components (server sled, circuitry, etc.)

It may be not necessary to allocate the data replication service on a server instance at an edge computing location. In further examples, the data replication service may be directly executed within a platform NIC 3944 or TOR switch of a rack. For instance, the RMU 3941 may store or persist data as long as needed by a moving time window, and when time window is done for batch of frames, the frames are discarded. This enables a real-time response, so that if a service failure occurs, a current state data is immediately available, and a backup service can be quickly spun up with this current state data.

A first example method (Example K1) for implementing automatic data replication (e.g., among edge cloud 110) is a method performed using processing circuitry (such as implemented on or by node or device 2200, 2232, 2240, or 2250), the method comprising: capturing data of a service operating at a server instance of a first edge computing node, the data relating to data being consumed or produced by the service; replicating the data of the service from the first edge computing node to a server instance of a second edge computing node, the server instance of the second edge computing node having a backup instance of the service in a non-executing state; upon identification of a reliability issue at the first edge computing node, instructing the backup instance of the service on the second edge computing node to enter an executing state, wherein the executing state utilizes the replicated data.

In a second example (Example K2), the subject matter of Example K1 includes, wherein the operations of the method are performed by a reliability management component operating at the first edge computing node.

In a third example (Example K3), the subject matter of Example K2 includes, wherein the reliability management component is under the control of an orchestrator operating at an edge computing gateway.

In a fourth example (Example K4), the subject matter of Example K3 includes, wherein a second reliability management component at the second edge computing node operates to receive the replicated data.

In a fifth example (Example K5), the subject matter of Examples K2-K4 includes, wherein the reliability management component is operated by circuitry of a network interface card or a switch that provides communications with the first edge computing node.

In a sixth example (Example K6), the subject matter of Examples K2-K5 includes, wherein operations for control of the service on the second edge computing node are performed by a second reliability management component operating at the second edge computing node, and wherein the second reliability management component is used to provide the data to the backup instance of the service and to control the executing state of the backup instance of the service.

In a seventh example (Example K7), the subject matter of Examples K1-K6 includes, wherein the replicated data is maintained based on a time window.

In an eighth example (Example K8), the subject matter of Examples K1-K7 includes, wherein the first edge computing node and the second edge computing nodes are network peers in a layer of a distributed edge computing system.

In a ninth example (Example K9), the subject matter of Examples K1-K8 includes, wherein the first edge computing node and the second edge computing nodes are located at different layers of a computing pipeline within a distributed edge computing system.

In a tenth example (Example K10), the subject matter of Examples K1-K9 includes, the reliability management component determining what data to replicate dynamically, and dynamically performing replication among a plurality of services.

In various settings, Examples K1-K10 (and other aspects of automatic data replication) may be observed or monitored as a result of, defined application programming interfaces, or interface specifications; uses of communication protocols, messages, or definitions to invoke, receive, or control data replication operations; node disconnection states; and other uses and implementations of policies and logic for data replication within an edge computing environment. Examples K1-K10 and other aspects of these data replication may also be observed or implemented as a result of service operations and service functions (e.g., to replicate data among multiple services in FaaS or EaaS settings). Additionally, the methods of examples K1-K10 may be provided in the edge computing system as implemented instructions (e.g., with a machine-readable medium which performs the method when the instructions are executed) or as implemented hardware configurations (e.g., with an apparatus that includes a configuration to perform or accomplish the method).

Customer Premise Equipment-Based Execution Forwarding Examples

In a further example, customer premise equipment may enable a distributed (but coordinated) telemetry architecture where edge platforms publish and utilize telemetry for edge services in a certified, trusted way. Edge tenants of an edge computing system (e.g., edge cloud 110, and the edge computing system configurations depicted in FIGS. 3 to 22D) may access, discover, or add monitors to their services distributed across the architecture. The tenants may validate how and when telemetry is generated. The telemetry described below is edge-aware and coordinated.

The term Telecommunication Service Providers (TSPs) is used as comprehensive of all vendors that can offer connectivity and content, for example, cable service providers, telephone/mobile service providers, internet service providers, MEC, etc. and spanning content delivery network (CDN) providers like Netflix who may deliver their services without actually owning the wires and routers. These providers are different from Cloud Service Providers (CSPs) like Google, Amazon, etc., who may provide a defined amount of computational or software services to their customers. CSP services may be paid for by the customer or supported by advertising. Today many TSPs wish to offer value added services at the edge to build upon their core capabilities as information streamers. However, conventional TSP infrastructure lacks the elasticity and scale of computing resources that are the core competency of the CSPs. Thus, the TSPs cannot sustain sufficient computational load and serve primarily as pipes between the customer and the CSPs.

Typically, the pipe between a TSP and a CSP-based computational infrastructure is not scalable. The pipe is limited by costly backhaul bandwidth and it is expensive to overhaul the end to end communication infrastructure because it may crisscross many geographical regions where connectivity is limited because of physical, legal, or other barriers, or where communication links are a shared resource with limited bandwidth allocation available to each participant. TSPs cannot easily or inexpensively locate computation intensive services they may want to offer by provisioning computing resources from CSPs. This poses a problem for TSPs because the computation intensive services may be inseparable from data-intensive services they are ready to offer.

Further, even where communication between the edge and the cloud is not a significant issue, a TSP may be unwilling to partner with a CSP, for economic, business, or customer-control reasons because they do not want to become relegated to being in the role of a secondary service provider (e.g., just a bit mover). This is partly because the TSPs see that it is bandwidth and latency efficient to deliver services by building upon location proximity of not just the edge-based infrastructure but also that of application/consumer data and context. TSPs may be motivated by the value that their proximity to the user represents particularly in a fast-growing economic sector and may want to own a larger share of the consumer base.

To achieve a CSP-coequal role, TSPs may have to build a CSP-like ability to scale compute elastically on demand or pay premium rates to someone else (e.g., CSPs). Both CSPs and TSPs may adapt pricing and rates depending on the demand, and are more capable to utilize selling or bidding policies. CSPs may use co-location facilities to move their services closer to a TSP's customer base and thus marginalize the TSP role even further. The systems and techniques discussed herein allow TSPs to combine their communication competencies with match compute competencies of CSPs.

Colocation (CoLo) services may deliver low latency access to cloud-based services by placing data centers at bases of cell towers and other proximal locations. Cloud providers may also create their own edge presence through CDN services and customer premise equipment (CPE) services. Conversely, CDN content may be delivered by vendor owned special purpose data centers located near the edge, but with control and administrative planes implemented in public clouds.

TSPs may either contract with edge compute infrastructure providers, push computations into infrastructures they provision at cloud service providers, or build their own compute rich data centers at/near the edge to achieve datacenter economics and cloud agility alongside value added services adjacent to their communication core strengths in network function virtualization (NFV), software-defined networking (SDN), and CDN services. Monetary or resource costs of such computations may be mapped to profiles of respective users, to be dependent on the actual current cost (or a bidding procedure as discussed above).

Prior approaches do not provide TSPs with the ability to participate as first class partners to build upon their unique technical advantage of being already proximal to the edge without having to create their own separate computing infrastructure. This results in TSPs providing the plumbing rather than value added data services. Smaller TSPs must either take on an increased investment risk to build and maintain rich computational capabilities or give up a portion of their revenue to pay the CoLo infrastructure providers.

TSPs compose computational infrastructure from virtual machines or secure containers hosted at home and small business customers with orchestration from base station or CPE infrastructure. TSPs use wireless routers or other communication intermediaries under their direct control to overlay a private network over which the TSPs may stitch together the needed dynamic and resilient computation plane for scheduling computations in lieu of investing in TSP owned computers at a Colo service provider. The systems and techniques provide remote data transmission (RDT) provisions and secure partitions in hardware, including embedded points of control such as baseboard management engines, to provide TSPs with the means to obtain reliable and protected co-tenancy and reduce the chance of sudden loss of computational capacity not in their physical control.

This approach has the benefit of creating a cooperative ecosystem that is highly scalable and elastic without requiring TSPs to invest in continuously expanding computation cycles just to keep pace with multitude of data-proximity and bandwidth intensive opportunities. A multipolar market is created that is not dominated by hegemonic first tier cloud service providers that may otherwise easily limit TSPs and third-party service providers to a peripheral role. The edge is shaped based on highly extensible and computationally elastic infrastructure that piggybacks on the growing proliferation of computational devices in homes, small businesses, and mobile equipment like that on-board vehicles. Owners may pledge varying amounts of computation to a pool that can be used by TSPs and services that may be bridged to the providers by the agency of the TSPs.

CSPs, as used herein, are defined as vendors that purvey infrastructure-as-a-service (IaaS), platform-as-a-service (PaaS), software-as-a-service (SaaS), function-as-a-service (FaaS), and similar offerings to their customers whether customers or advertising pays for the various anything-as-a-service (X-aaS) offerings. In some cases, TSP and CSP may be the same enterprise when a CSP creates their own communication services in some markets, but the systems and techniques discussed herein are not impeded if the pipe between a TSP and a CSP based computational infrastructure is not scalable with the growth of the compute demand that is needed at the edge due to low latency and high bandwidth assets in the last mile between customer and the TSP.

TSPs may have trust relationships with their customers. Often these relationships or services are anchored by a hardware element such as a subscriber identity module (SIM) card, a router that is securely integrated into the customer's home/business network, etc. As a result of this trust relationship, a TSP may be able to install a secure, trusted software module in those devices and into customer devices.

TSPs may install trusted software modules in anchor point devices and, with customer's opt-in agreement, may also install additional modules in devices belonging to a customer. Thus, for example, an internet service provider (ISP) (the TSP) that is bringing wired/wireless services into Jack and Alice's home may, with Jack's and Alice's opt-in agreement, also get an "ISP-partition" software component on Jack's home computer and Alice's smart phone. Such software components are vetted and certified as privacy and security preserving and well-behaved by appropriate third parties such as government or consumer interest groups. These components work with a "light-weight" orchestrator of the TSP located in the customer premise device or equipment and which are fully integrated into the hardware root of trust described above. Such light-weight orchestrators provide for fractional, metered, and isolated use of computational capacity at customer premises by the TSP. They also allow the TSP to aggregate or pool the dynamically varying compute capacity across the TSP's customer base.

Thus, for example, Bob and Joanna, who are two other customers that have also opted-in for the use of fractional, metered, and isolated use of their devices by the ISP, join Jack and Alice in having similarly made their devices available by the ISP. The TSP (e.g., ISP) now has the ability to draw from a pool of compute cycles from Jack, Alice, Bob, Joanna, and so on. Since the TSP has a very large number of customers and customers typically keep growing the number of compute devices (e.g., by virtue of greater spread of IoT/Smart device, etc.), the aggregate dynamic compute cycles available to the TSP forms a customer-side cloud that is built without any major resource outlay by the TSP. The TSP is also prevented from having to negotiate an expensive deal with a competitor CSP.

One TSP, such as the ISP, may join with another TSP to get an even wider dynamic pool for such aggregation and flexibility. The TSP incentivizes this participation or cooperative pooling of compute capacity by offering new services, discounting the price paid by customers for its services, offering other capabilities on a sliding scale, etc. Note that the TSP control device, such as a TSP managed router, is available to the TSP on a continuous basis. The control (e.g., hub) may be used primarily for routing and protocol processing. This limited compute capability is nevertheless almost always on and is sufficient for orchestrating the fractional computing power that the TSP may tap into from the customer's compute resources networked through the hub into the TSP's domain.

While the customer owns their devices and may take them offline at any time, a quality of service (QoS) definition or overall SLA may be negotiated between the customer and the TSP and enforced by the software component to allow the TSP a varying but very high amount of predictability over the availability of these devices at some minimum time granularity (e.g., the device will not be taken offline without a minimum shutdown period of 1 second, 2 seconds, etc.). The QoS agreement may not be met at every device. For example, a mobile device may become unreachable at various points in time. However, the TSP has a statistical measure (e.g., a probability distribution, etc.) for devices at various customers premises that are likely to be available and reachable for a minimum period of time.

Figure 40:
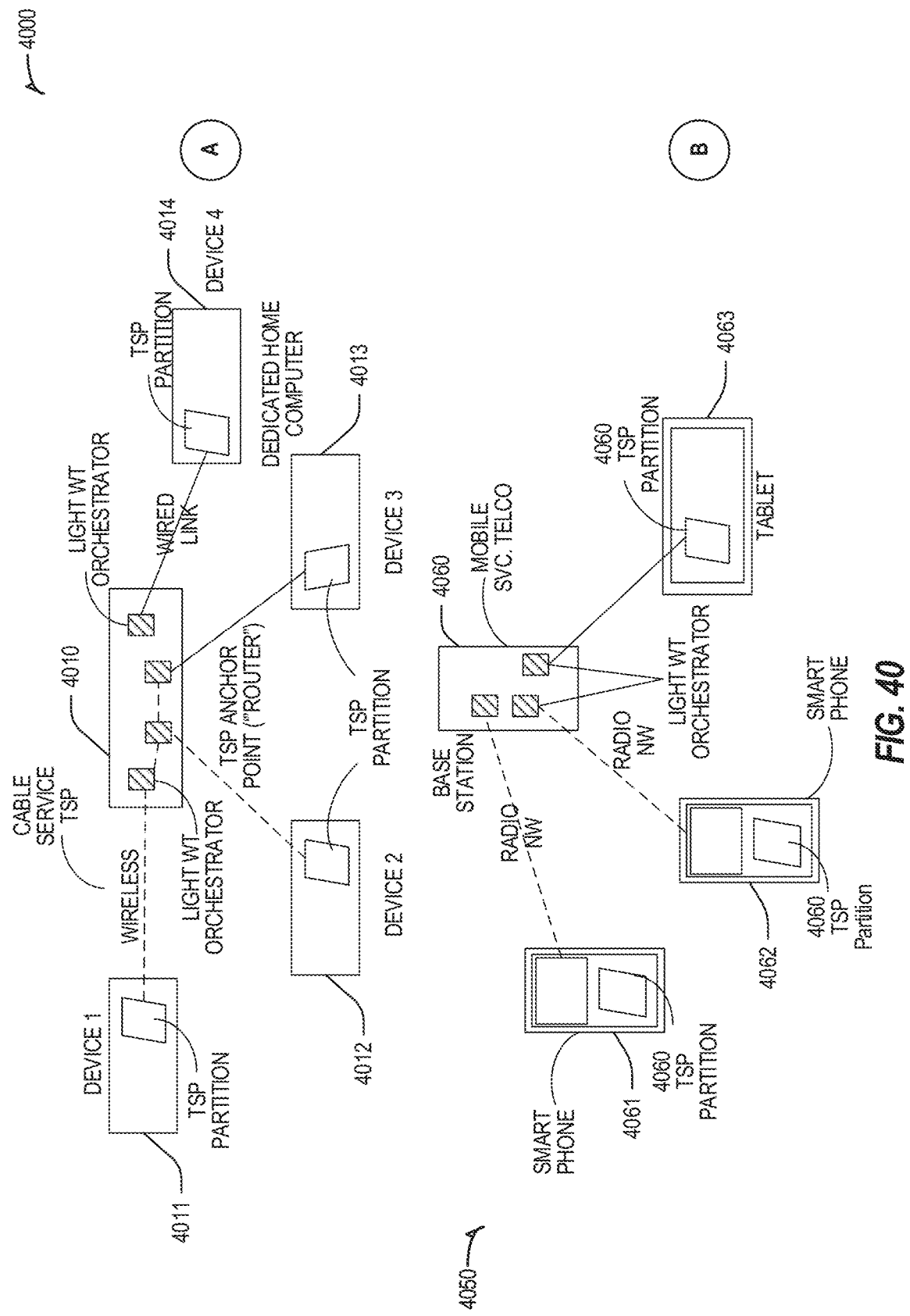
FIG. 40 illustrates a block diagram of example broadband-based and wireless-based system for customer-premise equipment (CPE) based execution forwarding.

In FIG. 40, Portion A illustrates a block diagram of an example broadband-based system 4000 for CPE-based execution forwarding. Portion A depicts a typical modem-based broadband service, in which logical computing partitions 4010 are created at homes and small businesses (from Devices 1-4 4011, 4012, 4013, 4014) in coordination with a local load QoS policy arrangement.

FIG. 40, Portion B further illustrates a block diagram of an example wireless-based system 4050 for CPE based execution forwarding. Portion B shows creation of similar partitions 4060 for computing capabilities on mobile/wireless connected hosts 4061, 4062, 4063 that are in contact with base stations/cell towers or limited edge stations of a telecommunications provider.

Figure 41:
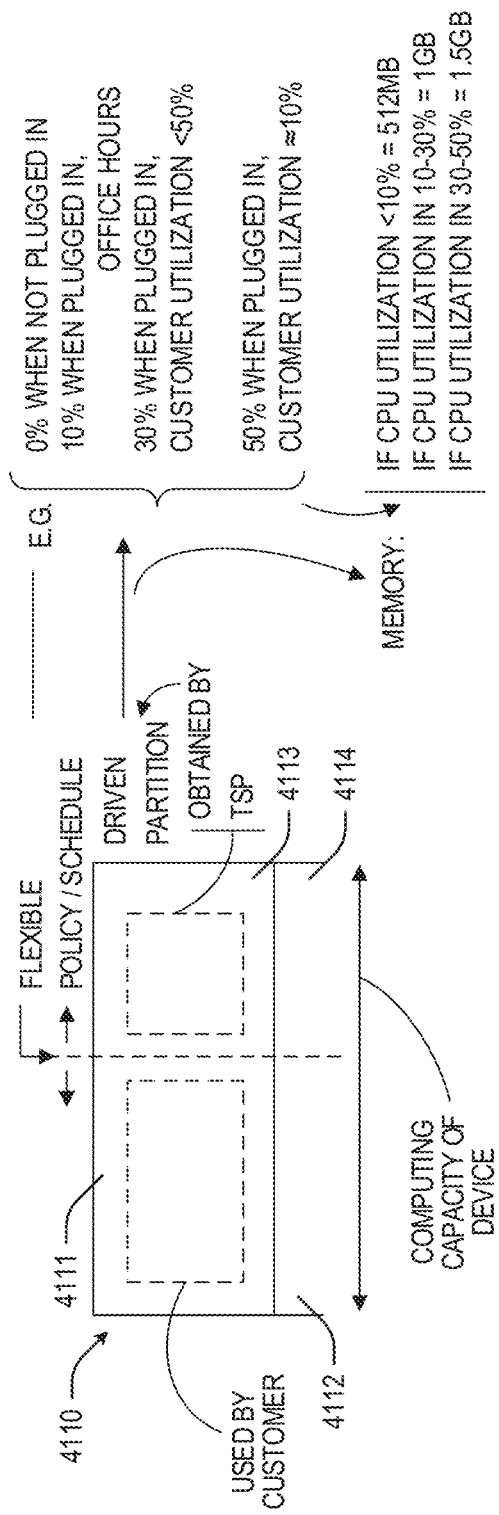
FIG. 41 illustrates a block diagram of an example system for CPE based execution forwarding.

FIG. 41 illustrates a flow diagram 4100 of an example technique for policy driven approach for achieving predictable usage and apportioning of compute capacity for CPE-based execution forwarding (including a list of non-limiting examples of memory and CPU usage). FIG. 41 illustrates a table/policy driven approach for achieving predictable means of apportioning computing capacity to the TSP or to third parties that need such computing capacity and are brokered by the TSPs. This figure shows, for example, a flexible policy or schedule driven allocation 4110 of four different amounts of compute capacity 4111, 4112, 4113,

4114 on a customer device (devices to a TSP, and their corresponding levels of memory partitioning given to the TSP). However, other amounts (or, the usage of same amounts) may also exist.

Figure 42:
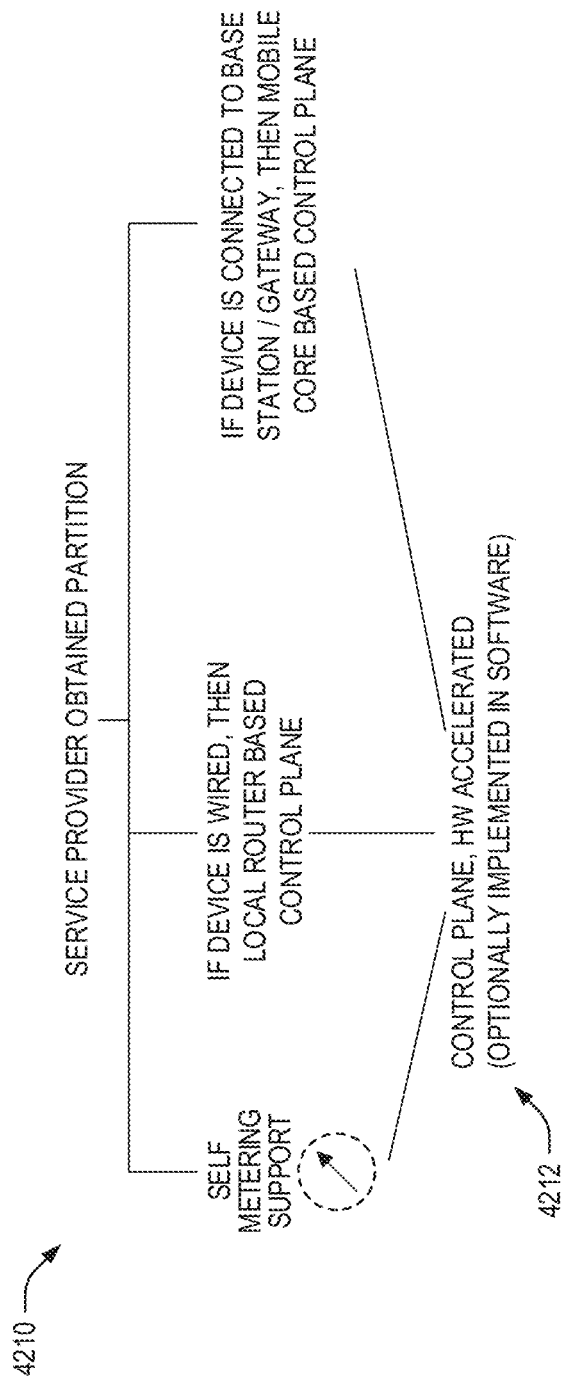
FIG. 42 illustrates a flow of an example technique for policy driven approach for achieving predictable means of apportioning compute capacity for CPE based execution forwarding.

FIG. 42 illustrates a flow diagram 4200 of an example technique for obtaining telemetry and compute capacity for CPE-based execution forwarding, for supporting an accelerated control plane 4212. FIG. 42 illustrates support (e.g., in hardware, software, etc.) for fine grained telemetry and compute capacity being obtained by the TSP, based on various rules or support features 4210.

Using the control point that a TSP has in a customer collection of devices and using the telemetry and the time of day policies negotiated with the customer depicted in FIG. 41 and FIG. 42, the TSP allocates various slices of compute as shown in Portions A and B of FIG. 40.

The TSP may implement additional controls within the proxy components that are activated in customer devices by which the customer or the system software on the customer devices may assert temporary suspension of the negotiated agreement. For example, a customer may need all available power or all available bandwidth at various times in which case the customer may deny the TSP the slice of their infrastructure temporarily. This is comprehended in the business arrangement that the customer and the TSP have negotiated and enforced/incentivized by telemetry and logging that are transparently available to the customer and the TSP.

Hardware may provide secure points of control on the customer devices to the TSP's proxy components. Such control may be in the form of specific capabilities integrated into various levels of the hardware to support enclaves and other provisions to create resource provisions on the CPE. This allows logical partitioning of customer device capabilities for flexible aggregation into an overlay compute network that is isolated from customer. These secure points of control also protect the customer from potential intrusion into the remainder of the customer's device capacity that is not pledged to the TSP including hard-isolating any access to a storage or memory of the CPE. Thus, secure multi-tenancy is provided by a combination of hypervisor/OS based capabilities that are supported by hardware-based integrity and isolation features. In principle this is similar to the isolation that a CSP implements in the data center for multi-tenant sharing of CSP infrastructure.

In some examples, the TSP may employ this computational capacity obtained from their less reliably available customers (e.g., homes, mobile customers, etc.) primarily to run short bursts of computing workloads, such as those needed for FaaS, while scheduling the capacity obtained from 24×7 available hardware (e.g., computers that are so designated by small/medium enterprises as being always-on, home/business based application servers, file servers, web servers, etc.) available for peer to peer computation offloads.

In an example, a customer may agree to attach an external device (e.g., computing stick, etc.) to a router owned by the TSP to create a multi-customer cloud that is always available at the edge with little impact to the user aside from the small power draw of the external device. This allows the TSP to create its own CoLo service without actually having to partner with CoLo providers. The CoLo capability is significantly more scalable because it grows with the customer base and is upgradeable as the TSP may determine at any point. For example, the TSP may selectively advance to a next generation of computers in compute sticks in parts of the network that the TSP sees an uneven growth of demand over time. In such cases, the TSP may even act as a local CSP for the customer for a negligible additional price.

The TSP may implement greedy scheduling of new computing tasks at such customer-based compute containers backed that by a worst-case backstop. That worst case backstop may be created as a limited amount of computing capability at various base stations to which those tasks may be sent that are interrupted when customer compute devices go offline. Alternatively, those tasks may be sent to backend clouds where the TSPs may provision some capacity for such worst-case offloading.

Any of these aspects of execution forwarding may be applied in a MEC environment, to enable more efficient ad-hoc distributed computing operations and a form of "tethering". As a result, a device registered to a given TSP will be able to offer processing capabilities on demand, thus, even expanding MEC service coverage in expectation of bill discounts. As a result, the concept of a "MEC system" may be expanded significantly with use of such execution forwarding.

A first example method (Example L1) for implementing execution forwarding in an edge computing system (e.g., edge cloud 110, and implementing systems and devices) is a method performed using processing circuitry (implemented on or by node or device 2200, 2232, 2240, or 2250), the method comprising: receiving an approval response to a request for computing resources from a device communicatively coupled to a service provider of an edge network; creating a secure software execution component on the device upon receipt of the approval; identifying a workload to be performed by the service provider; transmitting the workload for execution on the secure software execution component; and transmitting results of the execution to a node of the service provider.

In a second example (Example L2), the subject matter of Example L1 includes, adding the secure software execution component to a pool of software execution components; segmenting the workload into work units; and transmitting the work units to respective software execution components of the pool of software execution components, wherein transmitting the workload for execution on the secure software execution component includes transmitting a first work unit of the work units to the secure software execution component.

In a third example (Example L3), the subject matter of Examples L1-L2 includes, calculating a value for execution of the workload using the secure software execution component; and crediting a user account corresponding with the device with the value.

In a fourth example (Example L4), the subject matter of Examples L1-L3 includes, identify a service provided by the service provider and offered in the request for computing resources; and enabling the service on the device upon execution of the workload.

In a fifth example (Example L5), the subject matter of Examples L1-L4 includes, identifying a time window during which the secure software execution component is available for executing workloads; and transmitting the workload to the secure software execution component during the time window.

In a sixth example (Example L6), the subject matter of Examples L1-L5 includes, wherein the device is communicatively coupled to the service provider via a cellular base station connected to the edge network.

In a seventh example (Example L7), the subject matter of Examples L1-L6 includes, wherein the device is communicatively coupled to the service provider via a network router connected to the edge network.

In various settings, Examples L1-L7 (and other aspects of execution forwarding) may be observed or monitored as a result of, defined application programming interfaces, or interface specifications; uses of communication protocols, telemetry formats, messages, or definitions to invoke, receive, or control forwarding operations; and other uses and implementations of policies and logic for execution forwarding within an edge computing environment (including services within an FaaS or EaaS architecture). Additionally, the methods of examples L1-L7 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples L1-L7 (and other features of execution forwarding and execution management) may be combined with any of the other Examples herein to configure an edge cluster or edge cloud system, as coordinated or designed by a system orchestrator or architect.

IV. Security and Privacy Improvements for Multi-Stakeholder Edge Computing Systems In further examples, advanced methods of security and privacy procedures may be extended to a variety of multi-stakeholder edge computing settings.

Security Policies and Adaptation in Multi-Tenancy Edge Settings

In the context of computer system multi-tenancy, isolation may be selected as a security and privacy approach, to entirely separate one tenant's data from another. However, in distributed and resource-constrained edge computing environments, strict isolation may not be feasible. The following security and privacy approaches consider more dynamic approaches and configurations, to implement new forms of access control, security policies, and security management in an edge computing system (e.g., edge cloud 110, and the edge computing system configurations depicted in FIGS. 3 to 22D).

In particular, the edge computing environments discussed herein may consider security aspects and workload similarities that might drive tenant security groupings or changes in the security groupings during deployment, redeployment or additions of nodes into clusters, groups, or other configurations. These changes may dynamically happen within the same nodes and be interleaved with trusted workloads operating on same node as lesser secure workloads, with the creation of parallel security clusters and groups to increase throughput.

As one example, the approaches below for minimizing side-channel risk and resolving conflicts of interest between tenants provides a technique where a security policy establishes criteria for managing risk due to the potential for side-channel analysis. Tenants that are dramatically at odds (e.g., motivated or at risk to spy on each other) are separated from each other with more and stronger isolation techniques, while other tenants who are mildly at odds or known to be friendly, but do not have a need to know each others' information, require moderate isolation capabilities. These different levels of precautions and the groups established from such precautions may be driven by a dynamic, adaptive security policy.

As a further example, various forms of security policies may be dynamically created and implemented within an edge computing setting, to control security operations and how an edge computing system resources are used and deployed. Evaluating security based on a conflict of interest may produce one type of security policy. Evaluating security based on multi-level security classifications (e.g., top secret, classified, unclassified) may produce another type of security policy. These evaluations may be extended in edge computing settings to produce dynamic security policies that also consider on integrity vs. confidentiality, type enforcement, and the like.

Multi-tenant isolation may provide one of the strongest (and most rigid) of all the security policies but it does not anticipate the potential for collaboration. The existence of other data workers is hidden. Multi-user operating systems often work in this fashion-a user may perceive that they have the processors or computing resources available for exclusive use, when in reality they're shared—time sliced—across multiple users. A multi-level security policy removes this inflexibility by defining criteria when sharing is acceptable (whereas a strict multi-tenancy policy does not anticipate sharing at all).

In an example, loadable security modules or other security components may be provided in a variety of forms in an edge computing system. Such loadable security modules enable the management, provisioning, distribution, and application of a dynamic security policy and other security and privacy features. For instance, the use of a dynamic security policy in the edge computing environments discussed herein enables a wider range of sharing and collaboration use cases than simple multi-tenancy, especially as finer grained "slices" of resources are kept together and coordinated per tenant, application, or service. Once these groups or clusters of resources are identified, then other security policies and use cases that support greater sharing and collaboration may be deployed. Further, in a secured and trusted environment, even these fine slices of resources can be managed to allow inter-slice interactions in a controlled way. Other forms of security isolation, access control, and privacy management may be enabled through loadable security modules and resulting flavors, slices, permissions, and other forms of groupings.

In the following examples, security policies and considerations may involve the definition and use of a "domain" or a similar security context that captures the cluster (group) tenants or entities who are authorized to share resources or to interact in some fashion. These domains may be dynamically adapted, with the deployment, redeployment, or additions of nodes or node resources. These domains may enable a workload to interoperate on the same or related nodes, and enable resource usage that is interleaved with both trusted workloads operating on same node as lesser secure workloads. Likewise, these domains may enable parallel groups to be created (to enable workloads to be distributed to multiple locations) to increase throughput.

Multi-Domain Trust Establishment with Access Restrictions Examples

Edge computing involves multiple operators, suppliers, service providers, tenants and hosting environments, which may be referred to as edge ecosystem stakeholders. Each stakeholder has a self-interested motivation for participating in the edge ecosystem. Sometimes self-interest is synergistic and common across multiple stakeholders. At other times, self-interest may reveal competitive, adversarial or conflict-of-interest relationships.

Multi-tenant access policies are typically focused on finding isolated (e.g., non-overlapping) tenant-specific resources. Such practices often give the illusion the tenant has exclusive access to on edge resources. This, however, may be incorrect, resulting in resource contention between tenants, leading to poor resource utilization on the edge node. Further, a workload may be composed of multiple vendor elements-such as a virtualized evolved packet core (vEPC) application coordinating different vendor virtual network functions (VNFs) for control plane, data plane, and billing or monitoring services. In such a scenario, which is becoming increasingly common edge nodes, the different vendor VNFs may have a common self-interest enabling resource sharing that is thwarted by tenant resource exclusivity policies. That is, resource exclusivity, or the illusion of resource exclusivity, doesn't enable rich collaborative interactions.

To enable rich collaboration in an edge computing system (e.g., edge cloud 110, and the edge computing system configurations depicted in FIGS. 3 to 22D), domains (e.g., clusters of edge nodes) may be established where self-interested access policies are defined relative to the domain's perspective and interest. Here, a peer or competing domain may represent a different access policy. These domains evaluate access rights according to the respective domain perspectives to find the overlapping set of resources available for collaborative interaction. In an example, edge node resources have attestable identities that are expressed in terms of the domain responsible for the resource (e.g., the resource's owner). In an example, resources have access rights expressed in terms of other domain specific resources and the resources' defined access policy. Here, the intersection of pair-wise domain policies identifies the scope of allowable access.

Via these domains, individual domains or a third party may correctly and independently calculate the scope of allowable access without relying on a centralized trusted third party. Thus, stake-holders may implement trust or orchestration for a subset of the edge community. For example, a carrier in country-A may have a subscriber base while carrier in country-B may have a different subscriber base. These subscriber bases are domains. In the edge cloud ecosystem, any stakeholder may have a subscriber base that they manage, hence any stakeholder may be a domain. When a tenant-A from domain-A wants to interact with a tenant-B from domain-B, the domain and resource access policy define the rules of interaction based on possibly ad-hoc, domain-domain federation of trust, or, the parameters by which tenant-A and tenant-B are authorized to interact. Federated trust parameters use additional access restrictions over resources. Additionally, the granularity of access may be more constrained than intra-domain accesses. For example, access may identify specific files or workflows or other resources that may be accessed or may place tighter limits on the timeframe in which access is permitted.

Figure 43:
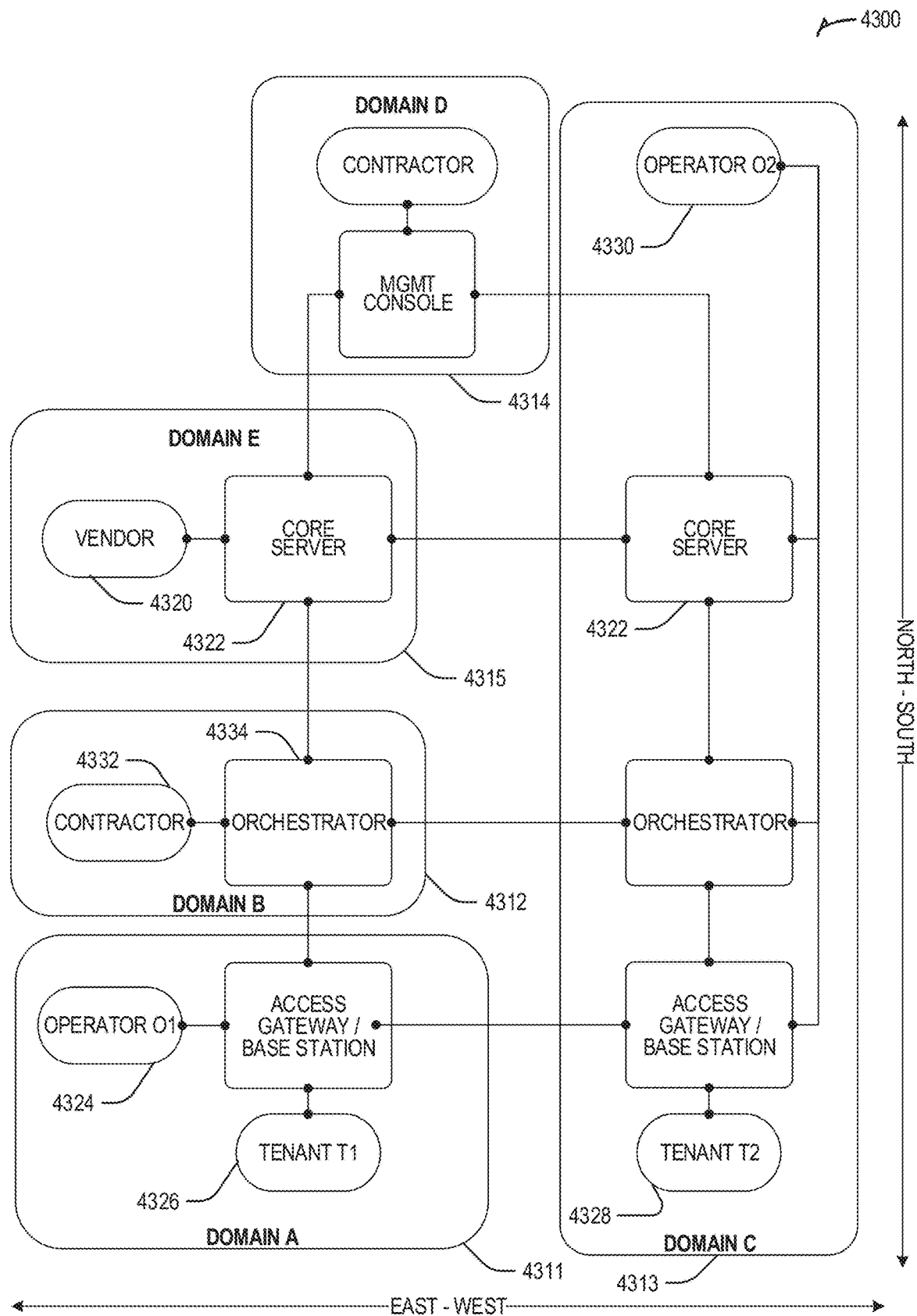
FIG. 43 illustrates an example of an edge ecosystem domain architecture.

FIG. 43 illustrates an example of an edge ecosystem domain architecture 4300. FIG. 43 shows the example edge deployment to include five domains in respective "clusters" arranged in domains, Domain A-Domain E 4311, 4312, 4313, 4314, 4315. Here, the clusters have a recognized domain owner and one or more edge services. In an example, one or more clusters manage tenant or subscriber relationships to enforce a service level agreement (SLA) or other performance contract that describes the level of service being delivered. Such a management cluster may be responsible for implementing the SLA via secondary (e.g., subordinate) relationships using a SLO or similar agreement between clusters as needed to implement objectives of the SLA.

As illustrated, the ovals identify the owner entity (such as vendor 4320) while rectangles indicate the service provided (such as core server 4322) in Domain E 4315. Each of Domain A-Domain E 4311, 4312, 4313, 4314, 4315 may have the same, similar, or different owner entities or services as any of the other of Domain A-Domain E 4311, 4312, 4313, 4314, 4315, which may perform a similar role or function as other owner entities or services. Tenants are a special class of owner that may not require a separate cluster designation. This may occur because the SLA generally represents agreed upon behaviors when the tenant is given access to the hosting cluster. For example, as illustrated, tenant T1 4326 is authorized to be a member of Domain A 4311 (e.g., after being vetted by operator O1 4324) and the tenant T2 4328 is authorized to be a member of Domain B 4312 (e.g., after being vetted by operator O2 4330). The relationship between tenant and operator in a common cluster may be described as a "shared domain" context. Further, some of these ownerships or relationships may have some associated time validity (aka expiration data). This is important because some properties may not be persistent, and some elements may not be updated depending on the connectivity.

Other stakeholders are owners of respective clusters. For example, a contractor 4332 may be the owner of Domain B 4312 containing an orchestration service 4334. A vendor 4320 may be the owner of Domain E 4315 containing a core server 4322—for example, the vendor 4320 may own core server 4322 hardware and be responsible for firmware update processing while the contractor in Domain D 4314 may own other maintenance tasks. Further still, the operator O1 4324 in Domain A 4311 may own supplying power to the core server 4322, etc. Hence, domain context may be overlapping for a given service or resource. However, overlapping context may not be synonymous to shared domain context.

In further examples, north-south interactions (e.g., as shown within Domain C 4313) can be controlled by LSM and security policies for intra-domain traffic as well as inter-domain traffic. Intra-domain tenants may require isolation/sharing that differs from an inter-domain isolation/sharing policy. LSMs may be tiered for domain specific and tenant specific policies. Additionally, gateways, firewalls, switches, routers, and other "middle boxes" can be enforcement points for LSM and security policies. In still further examples, each domain may apply a different—domain specific LSM—that could have the possibility for restricted or blocked access.

Figure 44:
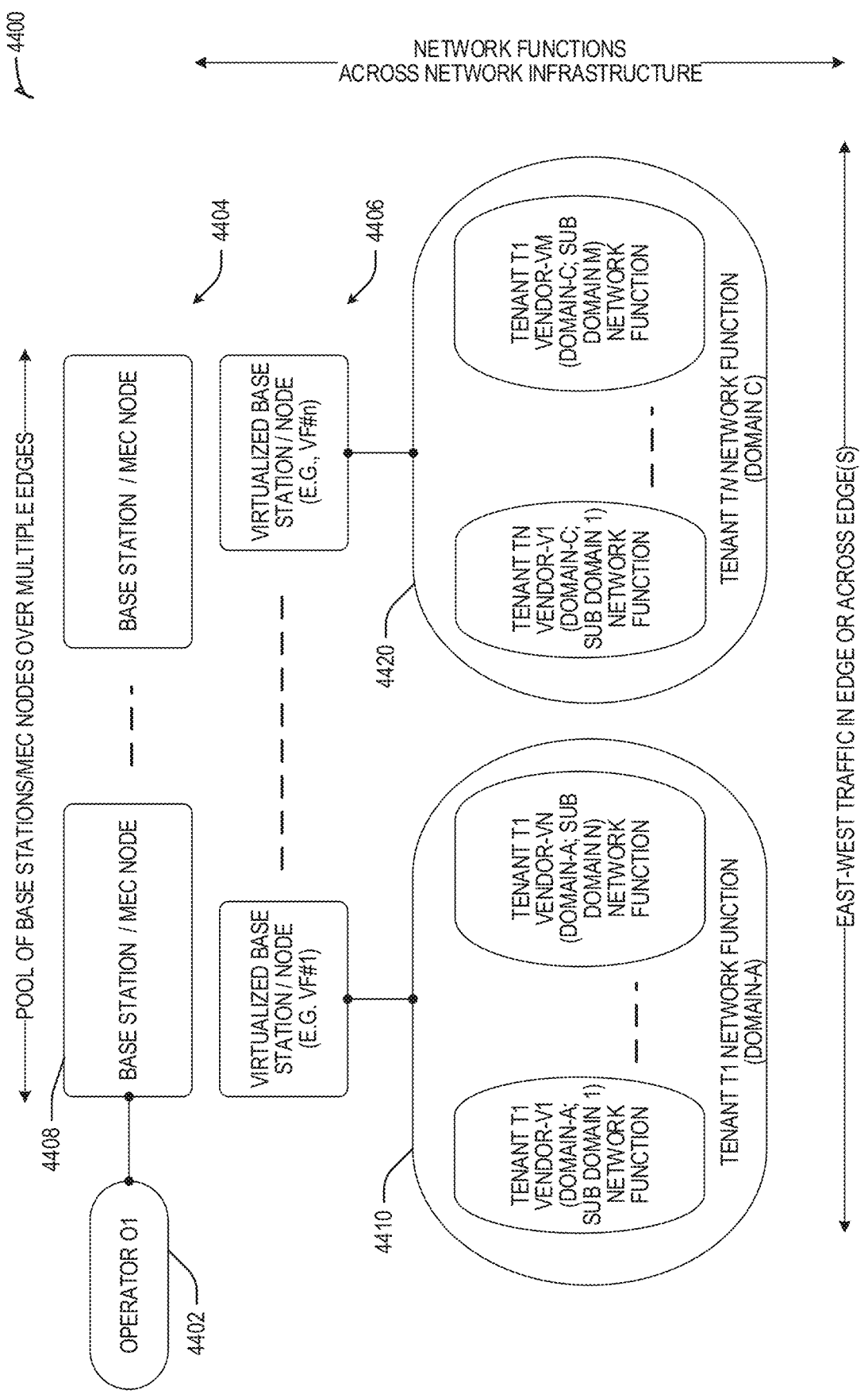
FIG. 44 illustrates an example of model for a virtualized multi-domain.

FIG. 44 illustrates an example of a model for a virtualized multi-domain communication architecture 4400. A scenario is illustrated for multi-tenant traffic that does not get backhauled to a backend, but instead involves transferring traffic edge-to-edge (e.g., from domain 4410 to 4420) in a secure and trustworthy manner. Specifically, East-West multi-tenant subscriber traffic on the edge and edge-to-edge roaming is shown. The physical base station, or a pool of base stations 4404, with next generation central office compute and accelerator racks offers multiple virtualized base stations (vBS) 4406 for Layer 1, Layer 2, or Layer 3 traffic in addition to the enterprise and network functions. Here, a tenant (e.g., operator 4402) may run one or more VNFs, which are further composed of one or more VNF components (VNFCs). In an example, VNFCs may be from a different independent software vendor (ISV) who may use domain context or an access control sharing policy within each of the other VNFCs from within the domain of a tenant. In an example, the VNFCs may share domain context with other tenants as enabled by the access control policies and SLAs.

In the context of FIG. 44, an MEC node 4408 or Operator access component 4402 may provide another LSM enforcement point. This node 4408 may restrict access to resource pools, MEC infrastructure, proxies, or other technology. Additionally, in this context, a Domain controller context may be provided from any technology that hosts network functions. A Domain specific LSM may be applied to any tenant workload that crosses the domain boundary (such as crossing the VF #1 boundary). Intra-domain, inter-tenant interactions may be controlled by a second LSM that is limited in scope.

Owners, subscribers, tenants, vendors, contractors, operators, etc., may be qualified (e.g., uniquely identified within the system) by their domain affiliation (e.g., domain.owner). Resources, services, functions etc. may be similarly qualified (e.g., domain.resource). The fully qualified domain affiliation may be used to disambiguate stakeholder trust context. For example, a domain may form a trust policy that identifies the set of resources, firmware, software, vendors, suppliers, contractors etc. that are trusted to perform or provide a set of functions or services (until any expiration of the rights or properties).

In an example, the policy may be realized in the form of an access policy that grants access or rights to domain resources as a condition of authentication, authorization, or attestation by a peer domain entity. In an example, the access policy may have the form:
  <peer_domain>.<peer_owner_or_resource>:
  <local_domain>.<local_owner_or_resource>.<allowed_rights_or_access>

In an example, in an East-West multi-domain virtualized model, the policy may take the form of:
  <peer_domain>.<peer-sub-domain>.<peer_owner_or_resource>:
  <local_domain>.<local_owner_or_resource>.<allowed_rights_or_access>

Trust establishment may be accomplished when the peer entity authenticates to the local entity regarding its trustworthiness properties, identity, capabilities, or configuration. In an example, a VNF authenticates itself to the local entity. However, in an example, all VNFCs authenticate into the parent VNF. Here, the trust of VNFCs is delegated within the parent or owning VNF.

In an example, domain identity may be self-sovereign such that a centralized organization (e.g., a certificate authority, government or financial institution) that all stakeholders trust may not exist. In an example, self-sovereign identity conforms to the World Wide Web Consortium (W3C) decentralized identification (DID) definition.

In an example, access may be mutually calculated between domains by finding an intersection of allowed rights and access. This may be accomplished according to the following example (although other syntaxes are possible):

Domain B forms an access policy describing Domain A access:
  <Domain_A>.<Owner_O1>.<Rsrc_R1>
  : has access to:
  <Domain_B>.<Owner_O2>.<Rsrc_R2>
  :with:
  <permissions: P1, P2>

Sub-Domain 1 and Sub-Domain 1 within the same Domain A forms an access policy describing Domain C access:
  <Domain_A>.<Sub-Domain 1>.<Owner_O1>.<Rsrc_R1>
  : has access to:
  <Domain_C>.<Sub-Domain 3>.<Owner_O2>.<Rsrc_R2>
  :with:
  <permissions: P1, P2>

Similarly, Domain A forms a policy describing Domain B access:
  <Domain_B>.<Owner_O2>.<Rsrc_R2>
  :is accessible by:
  <Domain_A>.<Owner_O1>.<Rsrc_R1>
  :with:
  <permissions: P2, P3>

Evaluation reveals P2 as the intersecting permission. Both Domains A and B arrive at the same conclusion.

It will be understood that the present techniques for multi-domain trust establishment may be applicable in other variations. For instance, these techniques may apply to multi-tenant traffic that does not get backhauled to the backend, and to policy transfers that need to happen edge-to-edge in a secure and trustworthy manner. Accordingly, such techniques may be applied for east-west multi-tenant (operator) subscriber traffic on the edge, and as part of edge-to-edge roaming.

A first example method (Example M 1) for multi-domain trust establishment in an edge computing environment (e.g., edge cloud 110, and implementing systems and devices) is a method performed using processing circuitry (implemented on or by node or device 2200, 2232, 2240, or 2250), the method comprising: receiving, at an edge computing node of a first cluster of an edge computing environment, a request for access to a particular resource of the first cluster, the request originating from an edge computing node of a second cluster of the edge computing environment, wherein the first and second clusters respectively define a scope of access to resources within the respective clusters; identifying, from the scope of access to resources within the first and second clusters, access rights to the particular resource; and enabling the access to the particular resource of the first cluster, according to the identified access rights to the particular resource.

In a second example (Example M2), the subject matter of Example M1 includes, the clusters being controlled by respective tenants on the edge computing node.

In a third example (Example M3), the subject matter of Example M2 includes, the respective tenants being network operators.

In a fourth example (Example M4), the subject matter of Examples M1-M3 includes, the workload being composed of multiple applications coordinating the use of multiple functions, to achieve multiple services.

In a fifth example (Example M5), the subject matter of Examples M1-M4 includes, the clusters being associated with a respective service level agreement (SLA) to define a level of service to deliver from resources within the respective clusters.

In a sixth example (Example M6), the subject matter of Examples M1-M5 includes, identifying, based on the access rights to the particular resource, a secondary relationship within the edge computing environment, to fulfill the request for access to a particular resource.

In a seventh example (Example M7), the subject matter of Examples M1-M6 includes, a respective cluster defining relationships for respective tenants or subscribers, for respective services accessible by the respective tenants or subscribers.

In an eighth example (Example M8), the subject matter of Examples M1-M7 includes, the identified access rights to the particular resource being identified from an intersection of allowed rights and allowed access to a corresponding resource type as provided by the first cluster and the second cluster.

In various settings, Examples M1-M8 (and other aspects of multi-domain trust establishment) may be observed or monitored as a result of, defined application programming interfaces, or interface specifications; uses of communication protocols, message formats or definitions; and other uses and implementations of policies and logic for access control and trust mechanisms within an edge computing environment. Examples M1-M8 and other aspects of these trust and security management techniques may also be observed or implemented as a result of service operations and service functions (e.g., to implement security enhancements for services operating in FaaS or EaaS settings). Additionally, the methods of examples M1-M8 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples M1-M8 (and other features of trust and security management techniques) may be combined with any of the other Examples herein to configure an edge cluster or edge cloud system, as coordinated or designed by a system orchestrator or architect.

Secure Data Sharing Between Devices Examples

In an example, edge computing scenarios (e.g., edge cloud 110, and the edge computing system configurations depicted in FIGS. 3 to 22D) may incorporate temporal pairing for devices to enable various forms of secure data sharing exchanges. Secure data sharing exchanges occur in many combinations, such as in the following scenarios: end devices (e.g., client devices) belong to or are associated with a same tenant and agree to connect, and authentication happens via an edge cloud environment to establish and conduct secure communications. In this scenario, the edge base station (or other comparable edge node) creates a temporal private key for symmetric encryption. Using an asymmetric secure connection, the temporal private key is sent to the devices, to enable the devices to securely read and write to a buffer location on the edge base station using the symmetric key. With use of the symmetric key, secure access can be provided to memory, storage, functions, and other resources of the edge base station, which are accessible by the respective devices. Such an approach may be widely applicable to device-to-device and node-to-node communication settings, such as among vehicles of the same company (e.g., for maps or firmware updates) for V2V and V2X communications, etc.

Figure 45:
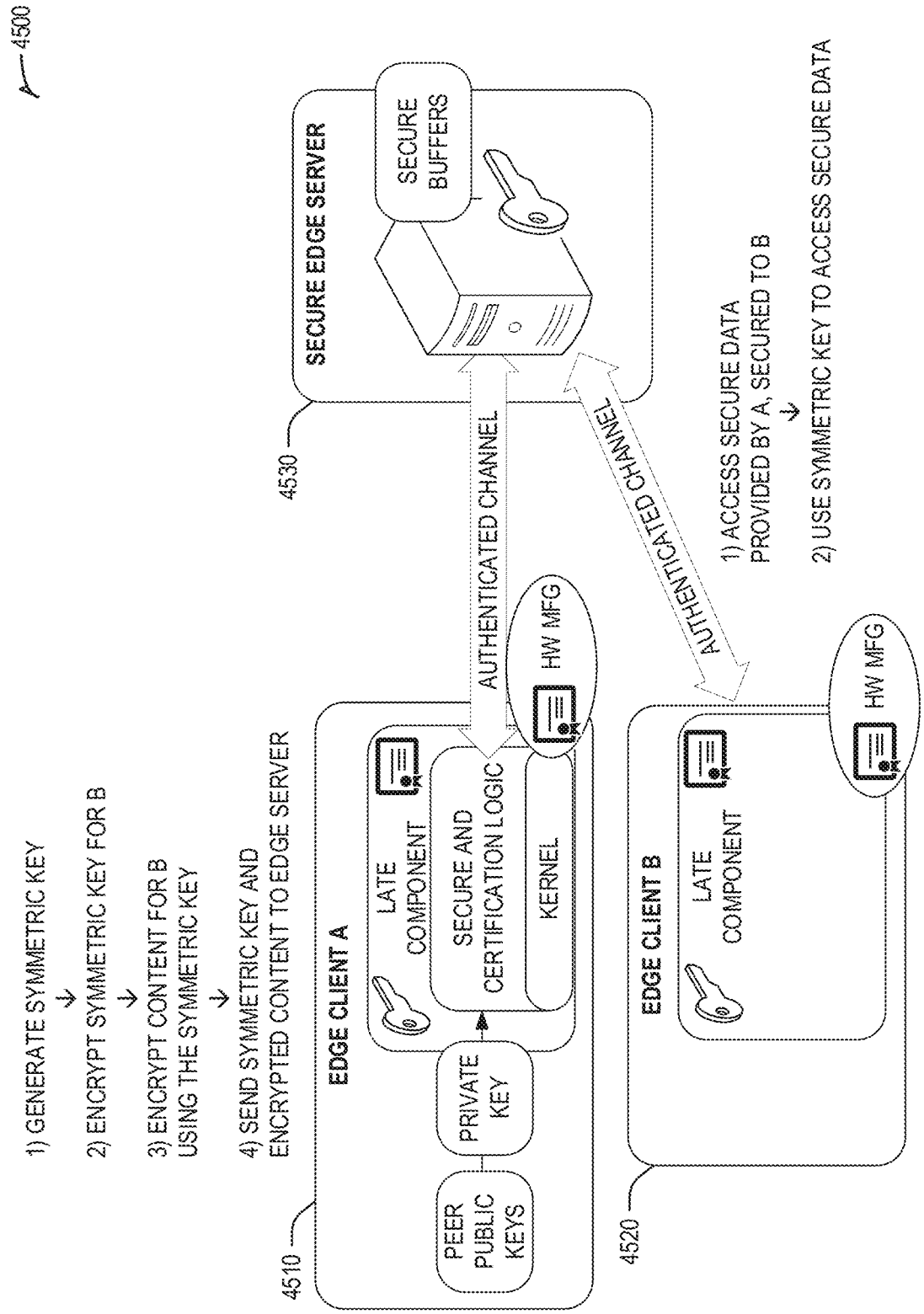
FIG. 45 illustrates a scenario for secure data sharing among edge computing nodes.

In an example, an architecture for secure data sharing enables both edge clients and edge platforms to conduct a dynamically secure and asynchronous exchange of data. FIG. 45 illustrates a scenario for enabling secure data operations 4500, among edge client A 4510, edge client B 4520, and a secure edge server 4530. In this scenario, the edge clients 4510, 4520 are extended with the following elements.

As shown, a sequence of key security operations may be performed (although other sequences or variation of operations may be possible). First, the edge clients 4510, 4520 include a configuration (e.g., instructions, software, firmware, implemented logic) to possess and handle a set of public certificates for other edge client(s) (such as the opposite client 4510, 4520) with whom the client wants to share data. This feature may track Client ID or Organization ID (e.g., in case multiple devices share the same private key), and a Public certificate. This data may include, or be associated, with some temporality characteristic (e.g., to expire if not accessed within N units of time).

Second, the edge clients 4510, 4520 include a configuration that allows the respective client to request to share securely a particular data set with a particular entity. The interface may include or track a Client ID, and the Payload to be shared. Once this function is called (e.g., at the edge client A 4510) the following operations are performed: (1) Generate a Symmetric Key; (2) Encrypt a Symmetric Key for B (edge client B 4520); Encrypt content for B using the symmetric key; Send the Symmetric Key and the Encrypted Content to the connected edge server (e.g., edge server 4530, which may be a base station).

Third, the edge clients 4510, 4520 include a configuration function that allows the respective client to request if there is any data stored in the edge server (e.g., edge server 4530) for this particular client. The function will connect in a secure way to the edge server and provide the ID for the client. The function will also retrieve the list of data sets published by other peers, and use the private key to retrieve the data and unencrypt the data set.

The edge server (e.g., edge server 4530) includes a secured piece of memory (secured via Intel® SGX™, ARM® TrustZone™, or similar secure storage/enclave technology) where the data provided by the originating edge client is stored. The edge server further includes instructions that are capable to operate in a role similar to the originating edge client, to further communicate the information to the final destination (e.g., edge client B 4520). In this fashion, the overall end-to-end secure data exchange can be enabled through the sequence of edge device-to-base station-to-device communications, all within authenticated and secure channels.

Tenants often do not care about packet and communication security as its own goal (as tenants primarily care about services and service outcomes). In further examples, any of the security mechanisms discussed herein may be used to provide secure access to X-aaS where X is a security-related service or function that is hosted by a MEC or other edge compute node. Hosting security functions within edge environments potentially introduces circularity issues; for example, TLS-aaS may imply the need to use TLS to protect access to the TLS-aaS host, then perform the requested TLS function inside the TLS tunnel.

The security mechanisms and approaches may integrate with many forms of higher-level security service abstractions provided within an edge system, such as Crypto-as-a-Service. To support such security mechanisms and security X-as-a-service abstractions, the edge computing system may expose or access a discoverable list of functions to be accessed, which are associated with a set of meta-data to define the level of reliability, trust, a list of certificate authority trusting entities, and the like. The operation of such security X-aaS components may be structured to enforce multi-tenant isolation and reduce the risk of side channels between tenants while the security X-aaS operates.

Secure hardware mechanisms may be used in an edge compute environment to not only provide crypto-primitives, but also to support relevant crypto-services (e.g., TLS-aaS, DTLS-aaS), fully programmable to the characteristics of the available hardware and deployment. Security features such as Intel® SGX™ can be used to improve security for D/TLS-aaS by hosting these workloads in an enclave/domain, and exposing a network interface for use. Further, tunneling and hop-by-hop protection may be applied to enable a caller to fully apply D/TLS to protect the request/response to the X-aaS interaction. This may be offered through security tunneling as a service where OSCORE may be the service and TLS protects access to the node; or a configuration where a node exposes a smartcard/TPM interface for performing general purpose encrypt/decrypt over a TLS/OSCORE tunnel.

In further examples, secure technologies (e.g., Intel MKTME™) could be used to create "shared tenant contexts" such that a new key (e.g., MKTME key) is negotiated (e.g., using Diffie-Hellman) that is known to both (multiple) tenants. The shared key is used to create a different memory encryption context that houses the shared data. Workload applications may thus treat the "shared" data as less or more trusted because it is shared by other tenants. Processing nodes (e.g., cell tower) may supply the sharing context such as shared memory, shared storage device, shared networking addresses for multi-cast etc.

Additionally, in further examples, trust in peer endpoints may be leveraged from endpoints having prior trust context with the edge infrastructure. The infrastructure may dynamically create a domain in which resources and users can be added to facilitate ad-hoc collaboration or federation.

A first example method (Example N1) for implementing secure data sharing between devices in an edge computing environment (e.g., in edge cloud 110, and implementing systems and devices) is a method performed using processing circuitry (e.g., implemented on or by node or device 2200, 2232, 2240, or 2250), the method comprising: generating, at a first edge node, a symmetric key for encryption of content to be communicated to a second edge node; encrypting, at the first edge node, the symmetric key; encrypting, at a first edge node, the content to be communicated to the second edge node, using the symmetric key; communicating, to an edge node server via a secure encrypted channel, the encrypted symmetric key and the encrypted content to be communicated, wherein the encrypted symmetric key and the encrypted content to be communicated are subsequently obtained from the edge node server by the second edge node.

In a second example (Example N2), the subject matter of Example N1 includes, the encrypted symmetric key and the encrypted content to be communicated being obtained from a secure storage of the edge node server by the second edge node.

In a third example (Example N3), the subject matter of Example N2 includes, the encrypted symmetric key and the encrypted content to be communicated being obtained from the edge node server by the second edge node by accessing the secure storage, and using the symmetric key to decrypt the encrypted content.

In a fourth example (Example N4), the subject matter of Examples N2-N3 includes, a configuration where the secure storage is a secure enclave or secure buffer maintained by the edge node server.

In a fifth example (Example N5), the subject matter of Examples N1-N4 includes, a configuration where the edge node server is a base station, and where the first edge node and the second edge node are endpoint client devices.

In a sixth example (Example N6), the subject matter of Examples N1-N5 includes, the encrypted symmetric key and the encrypted content to be communicated being obtained from the edge node server by the second edge node using asynchronous communication sessions.

In a seventh example (Example N7), the subject matter of Examples N1-N6 includes, the operations of generating the symmetric key and encrypting the symmetric key and the content to be communicated being performed at the first edge node using hardware certified by a trusted party.

In an eighth example (Example N8), the subject matter of Example N7 includes, the operations of decrypting the encrypted symmetric key and the encrypted content being performed at the second edge node using hardware certified by the trusted party.

In a ninth example (Example N9), the subject matter of Examples N7-N8 includes, a configuration where the trusted party is a hardware manufacturer.

In a tenth example (Example N10), the subject matter of Examples N1-N9 includes, a configuration where the first edge node maintains a set of public certificates for edge nodes to share content with, the set of public certificates including a public certificate from the second edge node.

In an eleventh example (Example N11), the subject matter of Examples N1-N10 includes, use of a security-as-a-service function within the edge computing system to generate and establish trusted cryptographic operations.

In various settings, Examples N1-N11 (and other aspects of secure data sharing) may be observed or monitored as a result of, defined application programming interfaces, or interface specifications; uses of communication protocols, message formats or definitions; and other uses and implementations of policies and logic for secure data sharing within an edge computing environment. Examples N1-N11 and other aspects of these data sharing configurations may also be observed or implemented as a result of service operations and service functions (e.g., to share data among services or service users in FaaS or EaaS settings). Additionally, the methods of examples N1-N11 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples N1-N11 (and other features of secure data sharing and related operations) may be combined with any of the other Examples herein to configure an edge cluster or edge cloud system, as coordinated or designed by a system orchestrator or architect.

Group Secure Communication Examples

One of the challenges in a distributed architecture is how to process and secure communications between collaborating devices on a distributed edge architecture that may be accessed by tenants at any time with respect to the services the tenants have in a distributed edge architecture where workloads and devices may move dynamically throughout the edge.

Information security and privacy today are obtained on a point-to-point basis, in which devices or services establish an end-to-end secure channel, as represented in the following common situations: a laptop or smartphone establishes a virtual private network (VPN) session with a domain controller, a browser on a personal machine (e.g., a smartphone, a laptop, etc.) establishes a hypertext transfer protocol secure (https) session with a website (e.g., Google, Bing, etc.), a smart phone connects to a base station, etc. Many types of communication, on the other hand, are "web-like" group communications such as a meeting. Each person in a meeting is on his/her own private channel at a low level (e.g., their phone connection, their network stack, etc.) and it is the "application" or the "solution" (e.g., web conferencing application, etc.) that implements a group communication experience.

In many other communications (e.g., communication between a smart phone and another smart phone, an end-to-end communication session, etc.), the set of peer-to-peer endpoints between whom communication occurs is not fixed. For example, John may travel on a train and use his smartphone to browse a website and as the train moves the secure channel between John and his carrier may cross many different base stations.

With mobility being provided in edge computing scenarios (e.g., edge cloud 110, and implementing systems and devices), the need to set up secure communication channels arises frequently. While the predominant usages of network channels in edge communications have not experienced significant bottlenecks due to this need, newer emerging usages are likely to experience performance and scalability challenges. One contributing cause is a growing importance that attaches to information security as data volumes grow and data is viewed increasingly as an asset that cannot be compromised. A second contributor is the continuous upward trend in proximity based, ad-hoc, and automated collaboration that is becoming possible.

In many cases, multiple entities and services may need to collaborate to achieve a common goal; and it is highly desirable to bypass the need to create and teardown the many point-to-point virtual secure channels between collaborating/communicating entities (e.g., devices, computers, switches, hubs, etc.). Further, not every device may be able to perform encryption/decryption using specialized hardware; and as the number of participants increase and the encryption keys used in peer-to-peer communications within the group grow in tandem, each device is forced to encrypt/decrypt each message that respectively leaves it or reaches it from each member of the group. The following approaches provide a scalable alternative to conventional point-to-point and application enabled group communication.

Conventional solutions for secure group communications may include acceleration devices or pre-provisioned communication secrets that are maintained by a single entity. However, not every device includes an acceleration device or pre-provisioned communication secrets and not all communication services providers are a telecommunication provider entity. Thus, conventional solutions may be inefficient and may not function when non-conforming devices (e.g., no accelerator or pre-provisioned secret, etc.) and other service providers (e.g., not a telecommunications provider, etc.) are involved in the communication. Dedicated hardware may be impractical for end devices like phones or tablets. Further, while specialized hardware may be implemented in base stations, customer premise equipment (CPEs), etc., throughput does not grow with the growth in devices that communicate or in the numbers of new applications that are designed.

Traditionally security is a point-to-point concept when implemented in settings in use prior to the emergence of distributed edge computing. For example, a mobile device X may establish a secure session with a base station and, as it moves between base stations, there may be a handover of its end to end session from one base station to another. In an example, multiple entities and services may need to collaborate to achieve a common goal. The parties involved in the collaboration may establish a common security credential for the purposes of the collaboration. The common security credential may also be simultaneously active across multiple base stations.

The systems and techniques discussed herein improve group communication in an edge computing system (e.g., edge cloud 110, and the edge computing system configurations depicted in FIGS. 3 to 22D) by enabling creation of a signed group credential (and associated key material) on an ad-hoc, dynamic basis in an edge compute scenario for a cluster of edge computing nodes. This allows all members of a communicating group to use that common key as a session encryption key, similar to a key used in point to point data encryption. However, this common key spans the group session.

At any time in the communicating group, there is a group leader, and that group leader, if it needs to exit the group session, randomly selects and advertises a replacement group leader. Protocols for consensus and elections in distributed systems may be used to provide resilient selection of a group leader in the event that a current group leader becomes disconnected—that is an exception (e.g., rare) condition and therefore the need to handle it does not introduce a performance concern. However, as an optimization in the rare case of loss of a group leader, the group may fall back to traditional peer-to-peer encryption scheme for the (rarely) affected group session.

Further optimizations may include for example, the use of peer-to-peer transport encryption keys until the size of the group has reached a policy determined dynamic threshold. Certain categories of sessions may not be moved to group keys, based on information system security criteria. For example, communications that transit between geographies that are subject to data localization requirements may enforce different encryption strengths per geo-region, and therefore may not transition to group key protocol. This provides low overhead, agility, and scalability particularly in communications that may be layered over multicast/broadcast channel protocols.

The following systems and methods provide a dynamic secure communication architecture that allows devices coordinating in the completion of a task to communicate securely amongst their group while allowing the edge architecture roles to shift around the infrastructure based on the needs of the group members. Private communications are maintained for non-group communications preventing the non-group communications from being intercepted by another group member.

Figure 46:
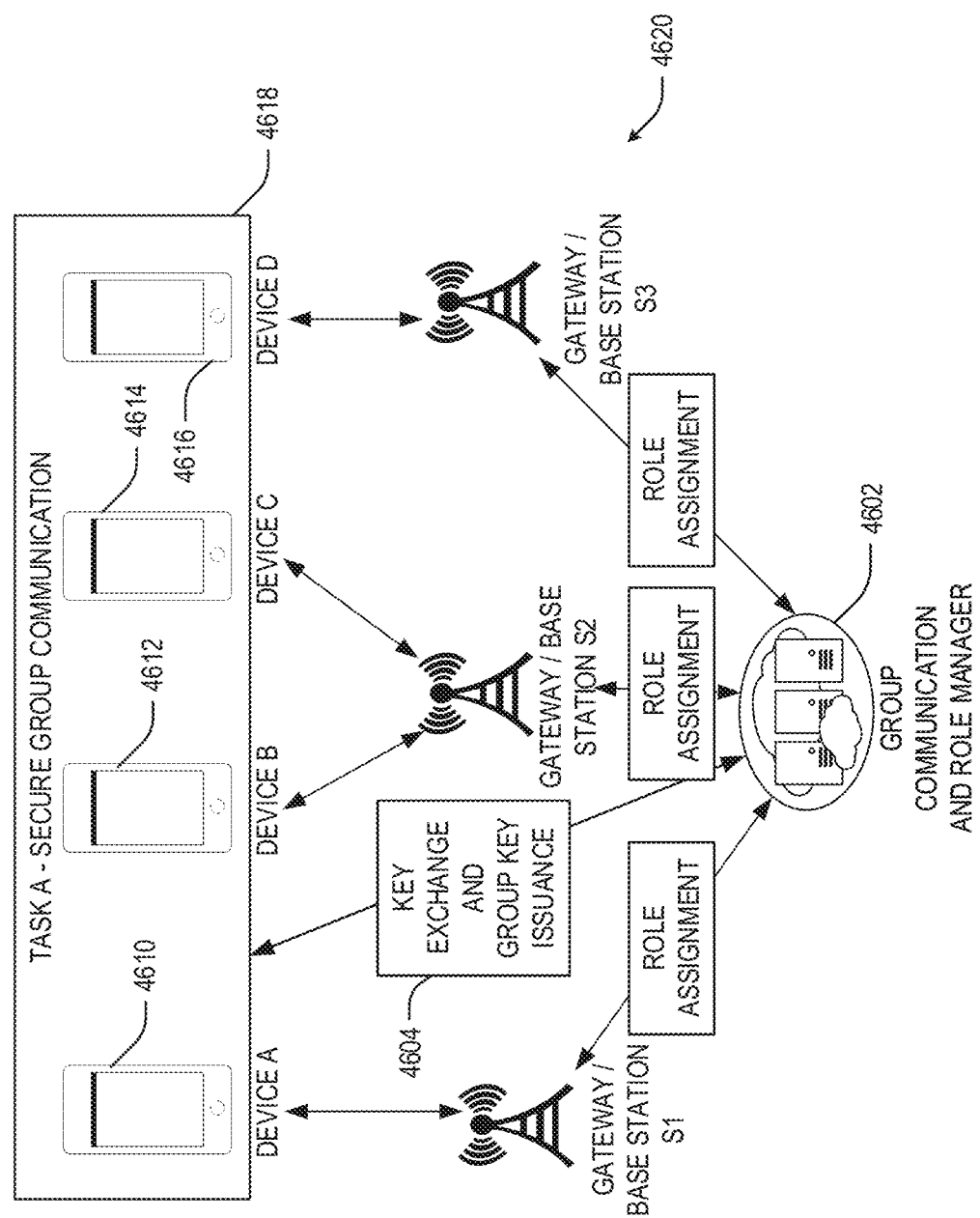
FIG. 46 is a block diagram of an example of a system for group secure communications at the edge.

FIG. 46 is a block diagram of an example of a system 4600 for group secure communications at the edge. Devices A 4610, B 4612, C 4614, and D 4616 (e.g., edge computing devices referenced in FIGS. 3 to 22D) may be working to complete a common task (e.g., task A 4618, etc.). The devices 4610-4616 may be serviced by differing base stations 4620; for example, A 4610 may be in a coverage area of base station S1, B 4612 and C 4614 may be in a coverage area of base station S2, and D 4616 may be in a coverage area of base station S3. Rather than providing an application service specific hub (e.g., a collaboration bridge, etc.), a just-in-time created security credential is generated by group communication and role manager 4602 to allow for real-time communication of information among all parties working to complete a task. In these and other examples, a role manager can be an LSM enforcement point for example where a Role-Based Access Control (RBAC) policy is applied.

In an example, the security credential may be valid only for the particular group session. Thus, all other communications of the respective devices outside the group session are private while communications within the group session are shared and secure. This may provide the ability to create an ad-hoc multicasting group at the edge that is mobile and therefore seamlessly moves over a virtual bus that spans different physical networks at different points in time.

In an example, the group may use a group signing scheme such as Direct Anonymous Attestation (DAA), Enhanced Privacy Identifier (EPID), or post quantum safe group schemes such as Post-Quantum EPID to authenticate message exchange between group members or to facilitate group key exchange 4604 of a shared symmetric key or pair-wise shared symmetric keys. The group appoints a master node (e.g., orchestrator, etc.) that manages group membership, joins members to the group using a group key generation method, and issues group certificates that may be used to authenticate signatures formed using the various private keys of the members. Symmetric key exchange protocols such as signed Diffie-Hellman (DH) may be used to establish symmetric keys dynamically where the group signing key authenticates DH messages (e.g., using Sigma protocol, etc.).

Real-time or "just-in-time" intra-group secure communication may be achieved by staging the key exchange operations prior to "real-time" or "just-in-time" operation. The orchestrator coordinates when RT and JIT collaborative workloads will execute in this mode by scheduling the group collaboration service to run on behalf of each member then the orchestrator signals the group collaboration services to transition to RT or JIT mode. The orchestrator knows when the key exchange operations are completed because it directly performs them or delegates performance to a key exchange management service.

If member nodes are mobile and roam to a different base station, roaming context may include the group signing key of the member and group symmetric keys. Group symmetric keys may expire frequently requiring periodic re-issuance. Content protected using a first symmetric key may be in transit when a second symmetric key is negotiated. The expiration period may include an overlapping time window where content encrypted with the first symmetric key may be decrypted and re-encrypted using the second symmetric key. Key expiry may be communicated dynamically through network broadcasts to group members using a group context dedicated for key management traffic. Additionally, key expiry may be communicated using a ticket or token structure that includes the time/date of expiration and is signed by the group leader/orchestrator/key manager service (e.g., using Kerberos, etc.).

Orchestration, group leader, and key management services may also roam between base stations. This is facilitated by updating service discovery registries with new service location information. Proactive roaming information predicts where the services will be located based on application context information. This data informs roaming management controllers as to which service discovery information to register.

A first example method (Example O1) for implementing group secure communications in an edge computing system (e.g., edge cloud 110, and implementing systems and devices) is a method performed using processing circuitry (as implemented on or by node or device 2200, 2232, 2240, or 2250), the method comprising: identifying initiation of a group communication session at an edge node, for a group defined from a cluster of edge computing nodes; determining a set of group members participating in the group communication session; generating a secure group communication channel for the group communication session; and transmitting a key to members of the set of group members to be used in facilitating secure communications using the secure group communication channel.

In a second example (Example O2), the subject matter of Example O1 includes, determining a role associated with a task to be completed by the set of group members using the communication channel; identifying a base station set for the set of group members, wherein the base station set includes base stations providing services to the set of group members; and activating the role on one or more members of the base station set.

In a third example (Example O3), the subject matter of Examples O1-O2 includes, the role being selected from a group consisting of: orchestrator, group leader, or key manager.

In a fourth example (Example O4), the subject matter of Examples O1-O3 includes, generating the secure communication channel by performing a key exchange with respective members of the set of group members, wherein the key is transmitted to the members upon successful completion of the key exchange.

In a fifth example (Example O5), the subject matter of Examples O1-O4 includes, determining that the group communication session has ended; revoking the key; and destroying the secure group communication channel.

In a sixth example (Example O6), the subject matter of Examples O1-O5 includes, identifying initiation of the group communication session by receiving an indication of initiation of a collaborative workload.

In a seventh example (Example O7), the subject matter of Example O6 includes, determining the set of group members participating the group communication session by receiving an indication of one or more nodes designated for collaborating in the collaborative workload.

In an eighth example (Example O8), the subject matter of Examples O1-O7 includes, the group including membership from any number of entities in an edge computing system.

In various settings, Examples O1-O8 (and other aspects of secure group communications) may be observed or monitored as a result of, defined application programming interfaces, or interface specifications; uses of communication protocols, message formats or definitions; and other uses and implementations of policies and logic for defining groups and conducting group communications within an edge computing environment. Examples O1-O8 and other aspects of these secure communications techniques may also be observed or implemented as a result of service operations and service functions (e.g., to communicate data for services initiated or provided in FaaS or EaaS settings). Additionally, the methods of examples O1-O8 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples O1-O8 (and other management and configuration of secure communication) may be combined with any of the other Examples herein to configure an edge cluster or edge cloud system, as coordinated or designed by a system orchestrator or architect.

Minimizing Side-Channel Risk Examples

Tenants known to have conflicts-of-interest may be at a higher risk of engaging in side-channel attacks on each other. One example preventative approach is to classify tenants according to their interests then perform analysis to find conflicts. Tenant hosting environments may be structured based on the found conflicts to separate highly conflicting tenants on different nodes (which may include, for example additionally using traditional tenant isolation techniques).

Edge services may be available for multi-tenant support, which may result in opportunities for a tenant to stage side-channel attacks. Using smarter deployment of services may reduce side-channel attack risk by, for example, defining service classes where tenants known to have reason to compete with or otherwise have conflicts of interest with other tenants are held to different service classes (e.g., use different nodes). In an example applicable in an edge computing system (e.g., edge cloud 110, and the edge computing system configurations depicted in FIGS. 3 to 22D), an orchestrator, service providers, and servers may be partitioned along service class boundaries (for example, in addition to normal tenant isolation) to avoid the potential for tenants with conflicts-of-interest to be co-located on an edge.

Conflict of interest management may be used in edge environments as a service that collects privacy preserving information about workloads and tenants and then evaluates it according to conflict of interest security models. Workloads and tenants found to be in conflict may inform orchestration such that conflicting workloads are hosted with greater isolation. The conflict of interest service may be itself hosted in a trusted execution environment to protect privacy of tenants and their interests. Any network, platform, or workload behavioral (e.g., state transitions) telemetry that is collected for this purpose may also be subject to privacy protections and may be performed from within a trusted execution environment (TEE).

Since side channel attacks are not easy to mount and may be made very difficult by introducing uncertainty in the channel (e.g., cache, memory, signaling methods, etc.), the infrastructure described herein may optionally introduce various sources of perturbations when conflict analysis may not be possible due to unknown properties of the parties. That is, if for some reason, conflict analysis is inconclusive, then the infrastructure may introduce random perturbations that make it difficult to carry out a possible, though rare, side channel attack. Further, such perturbations may be added in resources which are known that are not affecting performance of applications. (For instance, if memory channel 1 is not being utilized at all, this channel may be used as perturbation. Usage of such channels, however, may be considered relative to monetary or resource costs in terms of power and other resources).

An edge ecosystem may include tenants or stakeholders who have conflicts-of-interest. By employing conflict analysis over edge/MEC resources as part of orchestration the edge may detect (and may prevent) scenarios involving improper activity. Additionally, conflict-analysis may be offered as a service (CAaaS) to tenants who want to be aware of which other tenants are most likely to pose a threat—and therefore may be in the market for stronger mitigation solutions.

Figure 47:
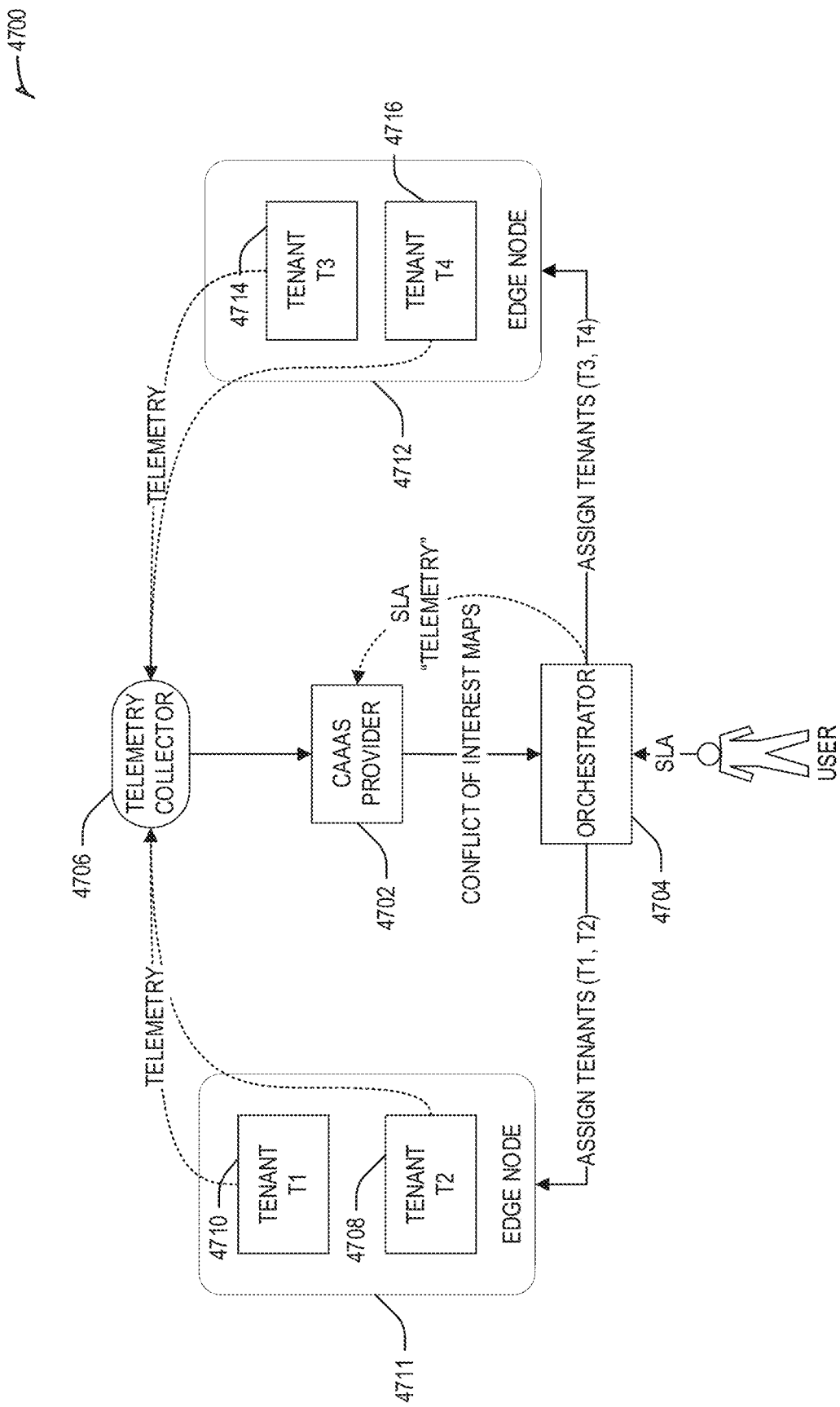
FIG. 47 illustrates a system diagram showing an overview of an edge system containing a Conflict-Analysis-as-a-Service (CAaaS) provider.

FIG. 47 illustrates a system diagram showing an overview of an edge system 4700 containing a Conflict-Analysis-as-a-Service (CAaaS) provider 4702. Tenants known to have conflicts-of-interest may be at higher risk of engaging in side-channel attacks on each other. Classifying tenants according to their interests then doing analysis to identify possible conflicts of interest may be used within an edge architecture to implement a conflict of interest service.

In an example, the CAaaS service provider 4702 may inform edge orchestration (e.g., an orchestrator 4704) to make smarter workload scheduling assignments that are sensitive to tenant conflicts, among these tenant instances 4708, 4710, 4714, 4716 in edge nodes 4711, 4712. Tenant hosting environments normally are expected to have tenant isolation capabilities. For example, an orchestrator may require edge node attestation that reports which tenant isolation technologies are available (e.g., SGX, Virtualization, TrustZone, FPGA, etc.). However, these tenants still share may resources (e.g., CPU cores, caches, PCIe buses, etc.). Tenants found to have a high degree of conflicting interests may require additional isolation to minimize the possibility of side channel exploits. For example, the orchestrator may schedule conflicting tenants to run on physically different edge nodes (for example, in addition to applying localized tenant isolation technology). In FIG. 47, tenant T1 4710 and tenant T3 4714 have a high conflict of interest while T1 4710 and T2 4708 have a low conflict of interest. T1 4710 and T3 4714 workloads are scheduled to run on different edge nodes while T1 4710 and T2 4708 workloads may be scheduled locally.

In an example, a "privacy filter" may be implemented between the collector and the CAaaS Provider. In an example, the actual telemetry data is never sent, but instead externally observable workload behavioral trends are sent. Tenant containers may include VMs, processes, workload images etc. CAaaS may provide the privacy to tenants. For example, data is not exposed outside the CAaaS other than optionally a conflict of interest maps, which may include only restrictions (e.g., not T1 4710 with T3 4714 on a node), without additional detail.

In an example, CAaaS may be applied around network metadata that is not protected by the tenant workloads (e.g., IP headers, IP QoS, tunnel/TLS negotiating parameters, etc.).

In further examples, a telemetry collector 4706 may be an LSM enforcement point that adjust telemetry filters according to a security or privacy policy. LSM policies can be Tenant specific, Domain specific or Edge infrastructure specific. Likewise, in the context of FIG. 47, the orchestrator 4704 may negotiate LSM policy/user level agreements and may provision LSMs according to other enforcement points such as telemetry collectors and tenant hosting environments.

Figure 48:
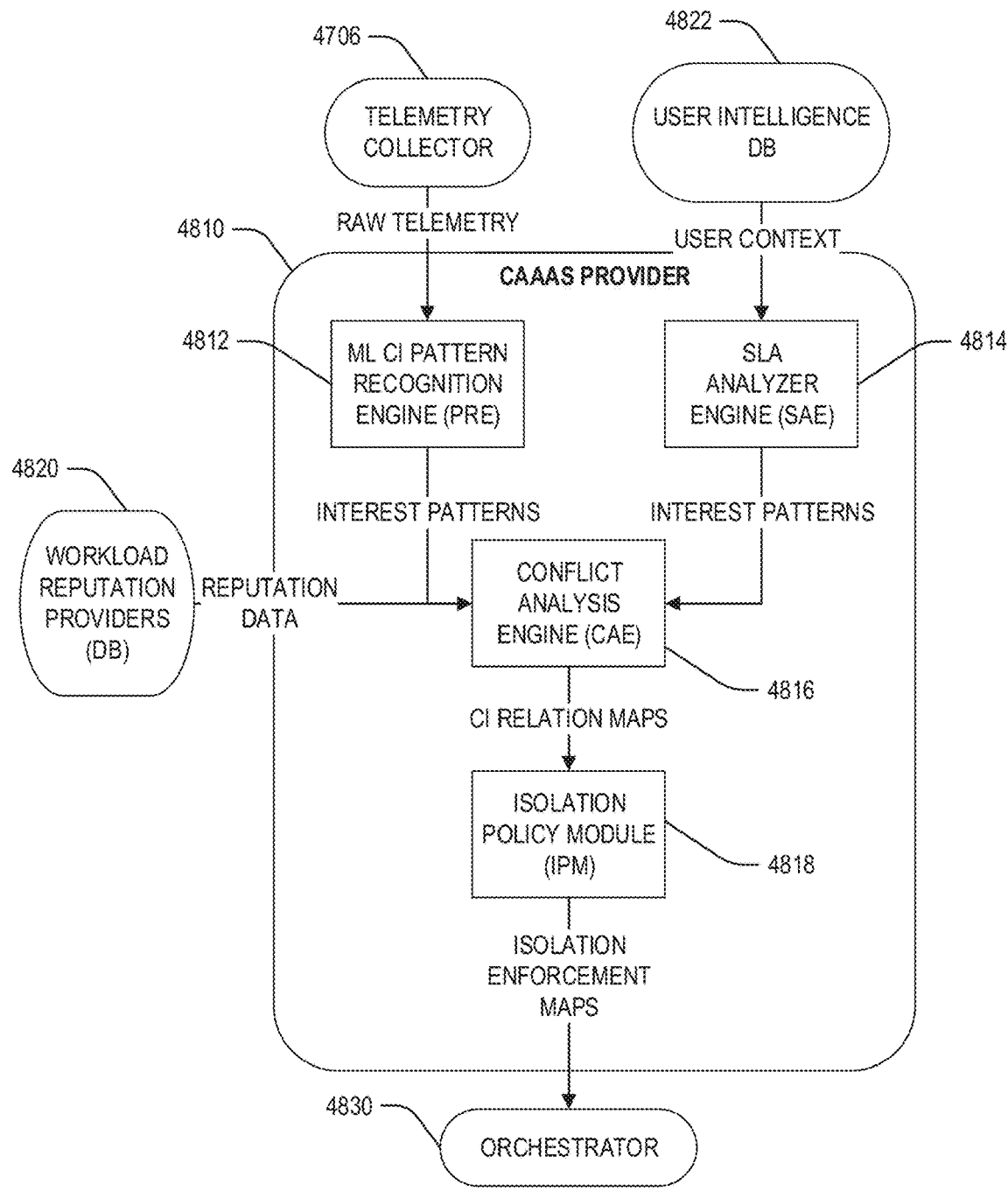
FIG. 48 illustrates a system diagram showing CAaaS provider components.

FIG. 48 illustrates a system 4800 showing CAaaS provider components. The CAaaS provider 4810 performs several operations that construct a wall based on a conflict of interest enforcement map. These maps are in turn consumed by orchestrators such as 4830 that apply them to workload scheduling processes (e.g., which implement relevant code, logic, or algorithms). The components of a CAaaS provider 4810 may include components described below.

A machine learning pattern recognition engine 4812 collects raw telemetry from a telemetry collection concentrator. The pattern recognition engine 4812 analyzes the raw telemetry using a machine learning classifier that was trained to identify potential conflict of interest intelligence artifacts. An artifact may include any type of information that is be used to either identify an entity principal (e.g., the user, people in the user's connection network, organizations, groups, citizenships, affiliations or business ventures associated with the user) or an entity property (e.g., data, context, transactions, metadata or other information that is used to connect principals). The ML or DL classifier produces interest patterns that show the relationships between principals and properties.

For example, given 6 principals (e.g., as identified by company affiliation): Company A to Company F; and 5 properties, such as companies in a particular field, companies with a history of litigation, companies that have more than a specified number of employees, or the like, the relationships linking principals to properties may be represented by a matrix:

| R | a b c d e |
|---|---|
| 1 | − + + + + |
| 2 | + 0 − − − |
| 3 | + − − − 0 |
| 4 | 0 − − 0 − |
| 5 | + − − − − |
| 6 | 0 + − 0 + | where a (+) signifies a favorable association, (−) signifies an adversarial association and (0) signifies a neutral association. Other scaled or numerical values which represent variation or levels of association and relationships may also be tracked.

Additional analysis for placement of edge nodes may include type of legislations that maybe applied based on the tenant origin or where the actual edge location is basically placed. For example, two types of considerations include:

1. Physical location of the platform. The pattern recognition engine 4812 may use geolocation in order to identify potential rules applied in the current country. In an example, an edge node may be moving.
2. Origin of the tenant running the service. Similarly, to the edge location, a tenant may have a policy based on a location, such as a country, which may go along with the tenant regardless of his position.

In an example, rules that maybe imposed by (1) and (2) may as well depend on the partners analyzed by the pattern recognition engine 4812. For example, a privacy or security policy might apply only if a particular bus is shared with multiple tenants.

The interest patterns may be consumed by the conflict analysis engine 4816 (CAE). A CAE can be an LSM enforcement point especially where the LSM supplies a conflict of interest policy.

Another system component is a service level agreement (SLA) analyzer engine 4814 (SAE). The SAE accepts SLA inputs (e.g., user context from user intelligence 4822) from the respective tenants potentially scheduled by the orchestrators using CAaaS provider. The SAE performs a similar function to the pattern recognition engine 4812 in that the SAE may scan SLAs looking for principals and properties that may be cross-correlated. The SAE may not need to use a ML or DL classifier since it is able to parse the SLA structure and understand the semantics of workload processing. In another example, the SAE may not be privy to actual workload data and algorithmic contents due to privacy considerations. The CAaaS system may provide tenant incentives that allow deeper analysis of workload images for building a more accurate interest pattern. The SAE may utilize a ML or DL classifier for workload analysis. Interest patterns are delivered to the CAE for further processing.

One aspect that SAE may use to improve correlation or classification is to correlate different characteristics inherent to the resources being utilized by the workload itself. Different CPU and platform resources may have different levels of isolation or security characteristics which may be used by SAE in order to improve the classification or data filtering. Classification may include using:

1. Platform security and multi-tenant cryptography, which may include features such as secure enclaves or memory encryption that may completely remove potential conflicts. In other examples, the SAE has to validate which of these features are actually utilized by the particular workload in order to certify that the system is conflict free (or conflict limited).
2. Resource isolation may change the conflict of interest mapping. In resource isolation, different resources or platform features may change perspective of a particular SLA. For example, SAE may check whether resources are hardware partitioned per tenant or whether they are not going to be shared across multiple tenants.

In an example, the goal of analysis (1) and (2) is to see whether the SLA may be broken or could be improved for different combinations of platform or CPU features.

In an example, a component includes a workload reputation provider 4820. As workloads become distributed and communicate more among their respective sub-components, a fair amount of additional information can be learned by observing their I/O behavior. For example, a networking workload like vPGW with multiple FaaS's for control, data, and management planes and, inter-communicating between those FaaS's to deliver a holistic function. In an example, network service providers or ISVs may develop a database of workload reputation profiles at the provider 4820 (e.g., based on non-private data). Such data is now increasingly used for multiple business purposes—market intelligence, pricing products, hiring, etc. In one example, similar information about workload reputation may be used as input into the CAaaS provider 4810 to assist in more determinant and effective outcomes.

An additional system component includes a conflict analysis engine 4816 (CAE). The CAE 4816 applies weights to "fuzzy" interest patterns when needed to further improve conflict relationships. A business-oriented conflict relationship may determine that business competitors have proportional conflicts of interest. For example, the following chart shows 5 shops and 4 lines of business with the corresponding market share information. In other examples, these may be any regulatory defined parameter (geo-specific regulations like the European Union General Data Protection Regulation (GDPR)), mutually distrusting organizations (e.g., banks, casinos, auditing firms, etc.), known conflicts, or the like.

| Shops | e-Card | e-Stock | e-Chat | e-Purchase |
|---|---|---|---|---|
| eshop1.com | 0.21 | −1 | −1 | 0.47 |
| eshop2.com | 0.03 | 0.08 | 0.24 | −1 |
| eshop3.com | 0.75 | 0.00 | 0.35 | 0.16 |
| eshop4.com | −1 | 0.90 | 0.35 | 0.31 |
| eshop5.com | 0.01 | 0.02 | 0.05 | 0.06 |

A weighting factor may be applied such that conflicts need not be specific to line of business but rather expressed in terms of business-to-business relationships.

| | | | | | |
|---|---|---|---|---|---|
| eshop1 | 0.00 | 0.00 | 0.49 | 0.20 | 0.00 |
| eshop2 | 0.00 | 0.00 | 0.15 | 0.15 | 0.00 |
| eshop3 | 0.40 | 0.15 | 0.00 | 0.29 | 0.00 |
| eshop4 | 0.20 | 0.15 | 0.29 | 0.00 | 0.00 |
| eshop5 | 0.00 | 0.00 | 0.00 | 0.00 | 0.00 |
| | eshop1 | eshop2 | eshop3 | eshop4 | eshop5 |

This relation may be turned into a binary relation by applying a threshold for when conflict of interest is thought to be significant. For example, if a 40% market share threshold was selected, then only eshop1 and eshop3 would be recognized as having significant conflict of interest. The conflict relationship results may be known as CI Relation Maps that may be input to an isolation policy module 4818 (IPM).

An IPM component may be used with a CI Maps to inform an isolation enforcement policy (e.g., a "Chinese wall" enforcement policy) called an enforcement map. The enforcement map may include a 4-tuple that relates a set of principals (P), a set of objects (O), a matrix N relating P to O and a level of access denoted by R where R(Pi, Oj) is the access rights granted. For example, access may be described in terms of RESTful API access (Create, Read, Update, Delete, Notify) or file access permissions (read, write, execute) or simply binary access. Additionally, access may be described in terms of co-location zones where Zone 0 means no isolation is needed. Zone 1 means process isolation is needed, Zone 2 means virtual machine, Zone 3 secure enclave (such as provided by Intel® SGX secure enclaves), and Zone 4 physical isolation. The enforcement map is delivered to the Orchestrator 4830 or other entity in Edge ecosystem tasked with enforcing tenant isolation and access.

For example, an access map may be given to an OAuth Server that generates an access token that may be used across multiple services that may process a workload. The access token may contain a representation of principals and their respective access rights or isolation zones (or a combination of these). In an example, an OAuth token contains the identity of the principal that authenticated to the OAuth server. The identity is used by the resource server to consult a local access control policy that contains the level access appropriate for the principal at that server. The IPM may modify the semantics of OAuth tokens to include orchestration guidance information. The IPM is supplied to the OAuth server when the principal authenticates and obtains an OAuth token. The principal may then request orchestration services supplying a workload and the OAuth token. The orchestrator parses the token to find the IPM contents.

A second principal performs a similar set of operations as the first principal. The orchestrator observes the IPM policies for principal P1 and for principal P2 when the IPM policies reveal conflict of interest. The orchestrator schedules them appropriately on respective service hosts. The token may be forwarded with the workload to the hosting service where it may contain additional access control rights (such as r-w-x) for resources associated with the host server.

In a further example, a method for minimizing side-channel risk may implement a technique resolving conflicts of interest between tenants (e.g., tenant instances as implemented on or by node or device 2200, 2232, 2240, or 2250). The technique includes a first operation to receive, at a processor performing conflict analysis as a service (CAaaS), telemetry information, from a telemetry collector, for a plurality of edge nodes. In an example, the telemetry information includes externally observable workload behavioral trends without private information.

The technique includes a second operation to generate, using the processor performing the CAaaS, an access map using the telemetry information. Generating the access map may use the processor to implement a conflict analysis engine to compare interest patterns from user data, the telemetry information, and reputation data of the tenants to generate the map.

In an example, the access map is generated based on user context such as properties of service-level agreements (SLAs). In another example, the access map is generated based on an output from a machine learning pattern recognition engine using the telemetry information as an input. The access map may include multiple levels of conflicts and associated isolation requirements. The access map may include rights restrictions for at least one of RESTful API access, file access permissions, or binary access. The access map may include isolation levels including at least one of no isolation, process isolation, virtual machine, enclave, or physical isolation.

The technique includes a third operation to provide the access map to an orchestrator to assign tenants among the plurality of edge nodes according to the access map. In an example, the orchestrator is configured to schedule conflicting tenants to run on physically different edge nodes of the plurality of edge nodes.

A first example method (Example P1) for implementing a system configuration for minimizing side-channel risk in an edge computing system (e.g., edge cloud 110, as among edge services and functions depicted and described with relation to FIGS. 7 to 12) is performed using processing circuitry (e.g., as implemented on or by node or device 2200, 2232, 2240, or 2250), the method comprising: receiving, at a processor performing conflict analysis as a service (CAaaS), telemetry information, from a telemetry collector, for a plurality of edge nodes; generating, using the processor performing the CAaaS, an access map using the telemetry information; and providing the access map to an orchestrator to assign tenants among the plurality of edge nodes according to the access map.

In a second example (Example P2), the subject matter of Example P1 includes, a configuration where the access map is generated based on user context including properties defined in service-level agreements (SLAs).

In a third example (Example P3), the subject matter of Examples P1-P2 includes, a configuration where the access map is generated based on an output from a machine learning pattern recognition engine using the telemetry information as an input.

In a fourth example (Example P4), the subject matter of Examples P1-P3 includes, the processor implementing a conflict analysis engine to compare interest patterns from user data, the telemetry information, and reputation data of the tenants to generate the map.

In a fifth example (Example P5), the subject matter of Examples P1-P4 includes, the orchestrator being configured to schedule conflicting tenants to run on physically different edge nodes of the plurality of edge nodes.

In a sixth example (Example P6), the subject matter of Examples P1-P5 includes, a configuration where the access map includes multiple levels of conflicts and associated isolation requirements.

In a seventh example (Example P7), the subject matter of Examples P1-P6 includes, the telemetry information including externally observable workload behavioral trends without private information.

In an eighth example (Example P8), the subject matter of Examples P1-P7 includes, a configuration where the access map includes rights restrictions for at least one of RESTful API access, file access permissions, or binary access.

In a ninth example (Example P9), the subject matter of Examples P1-P8 includes, a configuration where the access map includes isolation levels including at least one of no isolation, process isolation, virtual machine, enclave, or physical isolation.

In various settings, Examples P1-P9 (and other aspects of conflict analysis and orchestration access management) may be observed or monitored as a result of, uses and monitoring for communication protocols, message formats or definitions; orchestration configurations; and other uses and implementations of policies and logic for access control, isolation, and trust mechanisms within an edge computing environment. Examples P1-P9 and other aspects of these access management techniques may also be observed or implemented as a result of service operations and service functions (e.g., to implement security isolation and policies in FaaS, or EaaS settings). Additionally, the methods of examples P1-P9 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples P1-P9 (and other features of conflict analysis and security policy implementation) may be combined with any of the other Examples herein to configure an edge cluster or edge cloud system, as coordinated or designed by a system orchestrator or architect.

Implicit Attestation Examples

Performance agreements, such as service level agreements (SLAs) or tenant SLAs often include an assumption upon which requirements are made-which may include legal or financial implications—regarding how services are supplied or how tenant (e.g., subscriber) data will be protected. Multi-stakeholder edge environments (e.g., edge cloud 110, and the edge computing system configurations depicted in FIGS. 3 to 22D) may have several, and evenly remotely associated, interested parties. Implicit attestation may be used by edge stakeholders to attest to these and other relevant service provider SLA terms.

Implicit attestation, in the following examples, may be accomplished by using a Device Identifier Composition Engine (DICE) architecture. Here, for example, workload specific signing keys may be derived that include the SLA terms in an attestation profile. The DICE signing key derivation may be particularly useful to enable edge deployments to scale in capability as well as in multi-tenant hosting. A third-party verifiable assertion of a service completion per the SLA may become an important element in these multi-party interactions, such as billing, network monitoring, quality of service (QoS) evaluations, etc.

To implement an implicit attestation with an SLA profile, a workload may be executed in a tenant enclave, container, or other tenant isolated environment, which may be implemented on a trusted computing base (TCB) or other trusted computing hardware arrangement. The hosting environment may derive a workload specific attestation key. Part of this derivation includes computing a compound device identity (CDI). In an example, the CD calculation includes an expected trustworthiness parameter taken from an SLA. For example, an edge consortium and testing facility may examine hosting platforms for security, safety, or privacy protection capabilities and issue a compliance statement based on the examination. An SLA may require a specified level of compliance or that the level of compliance requires proof or verification as part of workload execution. When the workload executes in a tenant environment, the tenant environment may request a workload specific attestation key from the root-of-trust (ROT) or TCB layer. The RoT or TCB computes the key for a next layer n where n identifies the tenant environment hosting the workload. In an example, the layer n CDI is computed by hashing a current TCB context (CTC) with the compliance certificate identified by the SLA. The attestation key is used to sign the workload results (and, potentially the telemetry from the execution), thereby implicitly attesting the compliance status of the workload execution.

Figure 49:
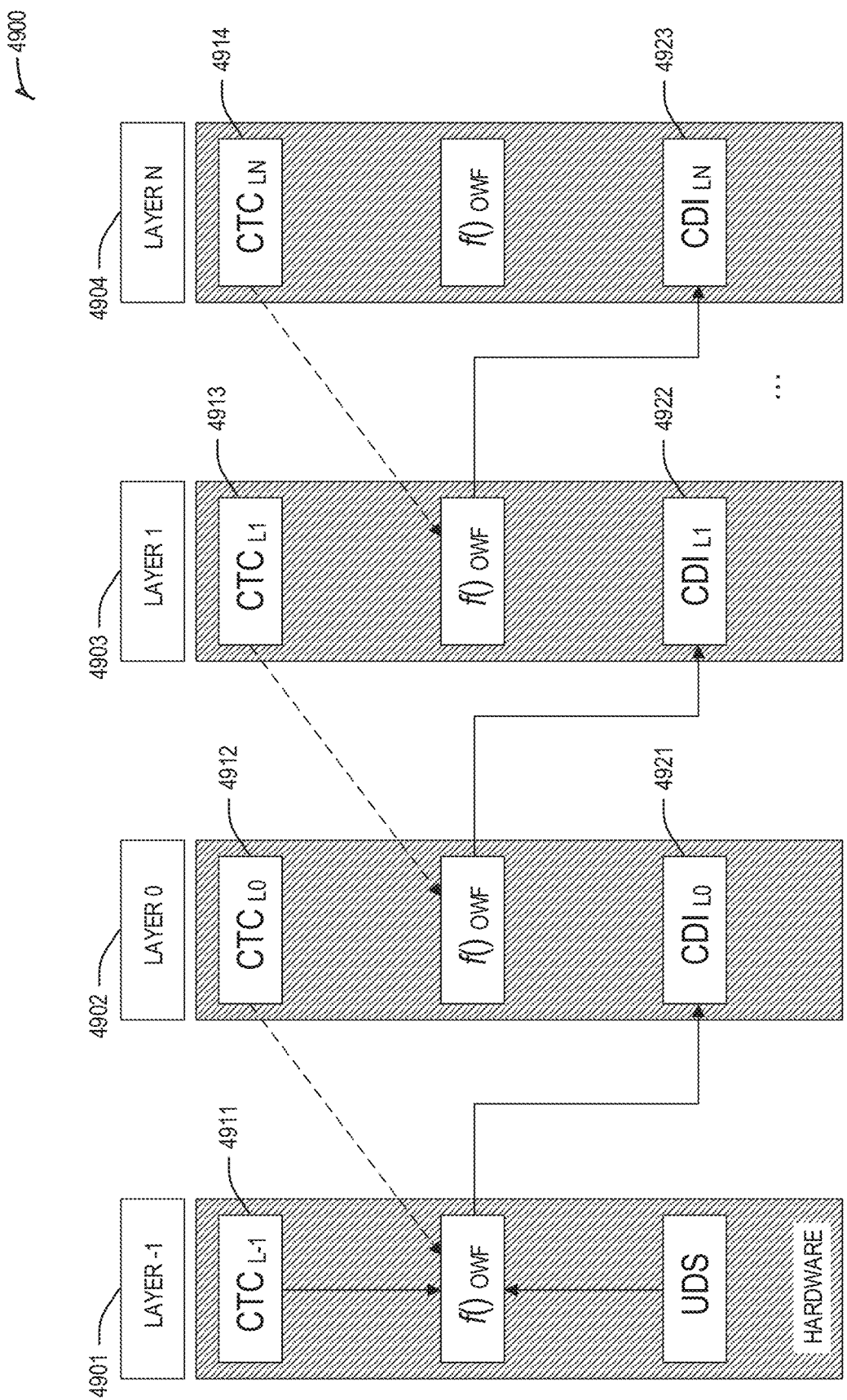
FIG. 49 illustrates an example of an architecture with a Device Identifier Composition Engine (DICE) layering and compound device identity (CDT) computation.
Figure 50:
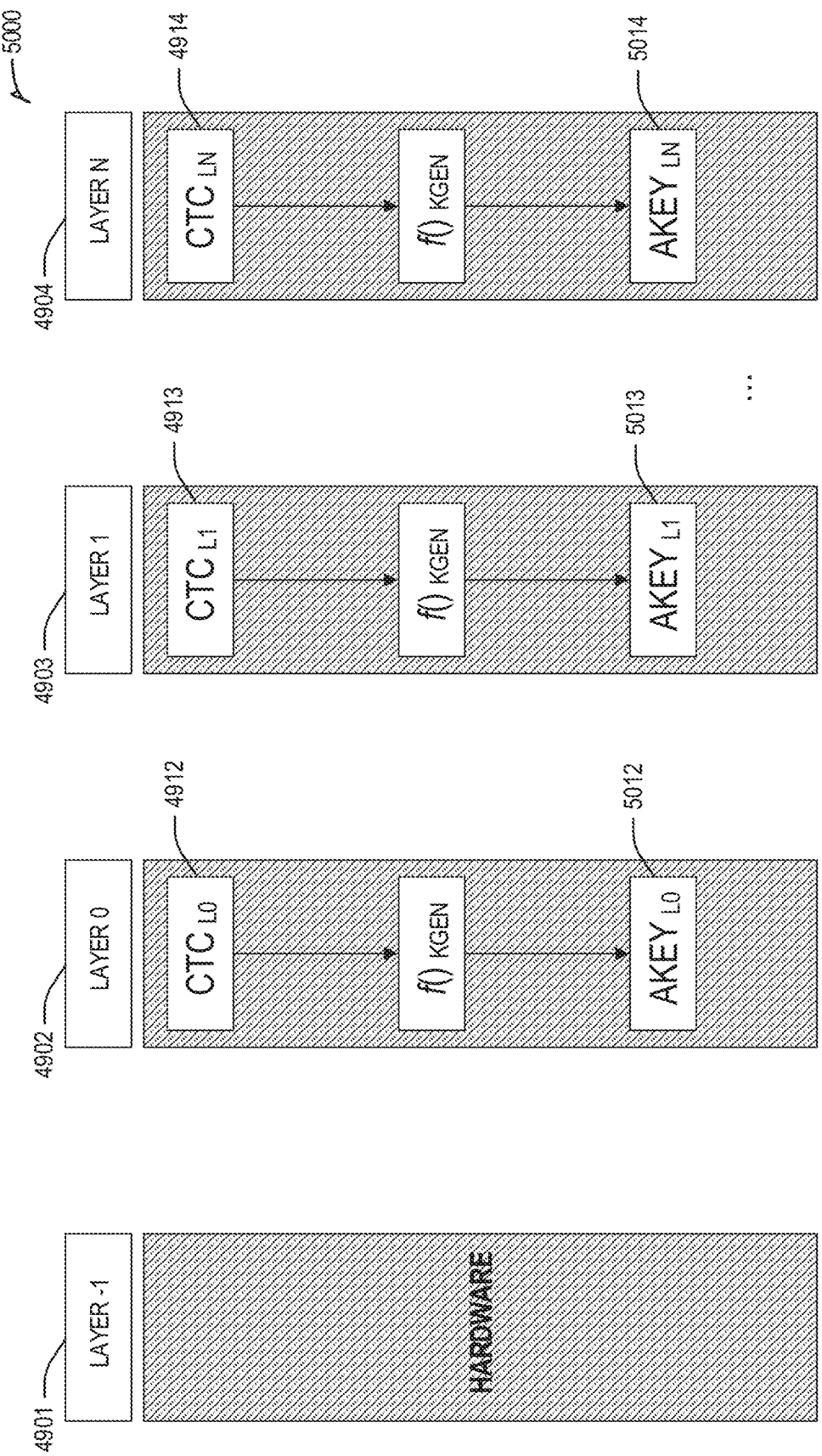
FIG. 50 illustrates an example of an architecture with DICE layering using asymmetric key generation.

FIG. 49 illustrates an example of CDI computation 4900 with respect to DICE layers 4901, 4902, 4903, 4904. As illustrated, a layer's CTC 4911, 4912, 4913, 4914 is computed by an attesting layer and returned as a CDI 4921, 4922, 4923. This is contrasted to FIG. 50, depicting computation 5000 in which an asymmetric key 5012, 5013, 5014 is computed for the CTC 4911, 4912, 4913, 4914 by each layer. In FIG. 50, there is no cross-layer validation of the CTC.

Figure 51:
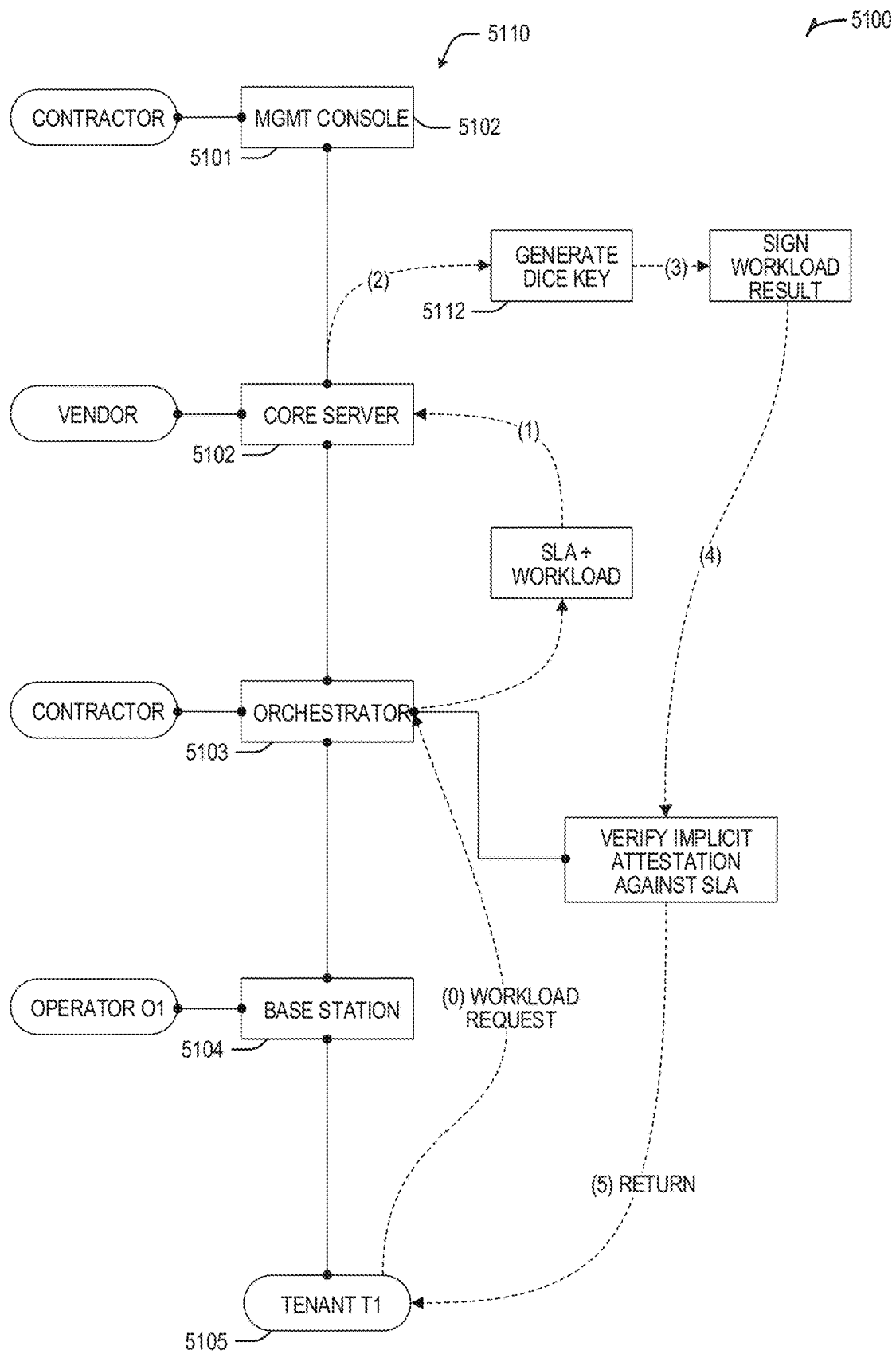
FIG. 51 illustrates an example of a flow for implicit attestation of SLA parameters using DICE layering to generate workload specific attestation keys.

FIG. 51 illustrates a data flow 5100 through edge computing entities 5110 (e.g., console 5101, core server 5102, orchestrator 5103, base station 5104, tenant 5105) that are using implicit attestation of SLA parameters using DICE layering to generate a workload specific attestation key. Within FIG. 51, specific data flow operations are depicted; but it will be understood that other variations and sequences of operations may be applied within this framework. In an example, the core server 5102 or the base station 5104 may include general processors or other system-on-a-chip (SoC) components. In an example, these entities may also include accelerator hardware. In an example, the accelerators are installed directly on the platform (e.g., SoC, mother board, etc.) or accessible via a platform bus (e.g., add in a peripheral component interconnect express (PCIe) card for crypto, AI, field programmable gate array (FPGA) etc.).

In the context of FIG. 51, the DICE key 5112 may provide an LSM enforcement point. DICE key generation can include LSM context such that only an LSM specific key will exist. If the LSM changes the node is incapable of participating with other nodes expecting the LSM specific key. Additionally, orchestrators (such orchestrator 5103) can provision attestation LSMs to attestation verifiers, and Attestation verifier operates as an LSM enforcement point, whether tied to a DICE-LSM key or other key. For instance, an LSM can describe acceptable or unacceptable attestation values.

In some scenarios, specific attributes of the SLA may be secret or obscured. If SLA values are not to be revealed by the workload itself, then the workload should not reveal it has an SLA of, for instance, thirty gigabits (Gbps) of the input-output (I/O) Ethernet bandwidth. In such a scenario, the signed SLA may provide a normalized value with respect to the registered SLA. For example, the normalized value merely indicates that the SLA was satisfied, rather than reporting the metrics or measurements that led to the determination that the SLA was satisfied. In an example, the normalized value may indicate the metric in a way that does not reveal the metric. Thus, for example, the normalized value may be a percent of the SLA value, such as showing that the SLA is satisfied with 110% (e.g., 35 Gbps) or 90% (e.g., 28 Gbps).

In deployment scenarios where the tenant workload is executing on compute core(s) together with one or more accelerator slices, virtual functions, or physical functions, the workload specific attestation key derivation may include specific SLA parameters of the accelerators or functions. For instance, for a smart network interface controller (SmartNIC), the SLA parameters may include throughput delivered, number of virtual queues, number of security associations, etc. For an, artificial intelligence (A) accelerator, the SLA parameters may include model storage size, execution units, or dedicated runtime memory among others. In such cases the CDI may be derived using the accelerator specific parameters.

The implicit attestation described herein may be particularly useful for SLA parameters that are common or apply across a broad set of use cases. This usefulness results because any change to the parameters invalidates the attestation key, requiring re-deployment or re-onboarding of the device or service. Thus, if a component service provider (CSP) requires an operator to run a security protocol (e.g., Cerberus), then access to the tenant environment would be denied unless an attacker could also break the DICE key without modifying the platform, all while achieving the SLA requirements.

In still further examples, the implicit attestation examples may be applied for different domains or types of trust, or for the use of different levels of required trust. As a result, many scenarios of attestation may be applied for data or derivative properties.

A first example method (Example Q1) for implementing implicit attestation of edge nodes (e.g., in edge cloud 110, and among implementing systems and devices) is a method performed using processing circuitry (e.g., implemented on or by node or device 2200, 2232, 2240, or 2250), the method comprising: obtaining an execution context for a tenant workload environment that is defined by a service level agreement (SLA) parameter; obtaining an attestation key for the execution context; computing a component device identity (CDI) using the tenant workload environment and the attestation key; performing a workload in the tenant workload environment to produce a result the result including a performance metric of the SLA parameter; signing the result with the CDI; and sending the signed result to a requestor of the workload.

In a second example (Example Q2), the subject matter of Example Q1 includes, the CDI being computed at a layer different than a layer performing the workload.

In a third example (Example Q3), the subject matter of Examples Q1-Q2 includes, the performance metric being normalized to prevent the SLA parameter from being discerned by a recipient.

In a fourth example (Example Q4), the subject matter of Examples Q1-Q3 includes, a configuration where the tenant workload environment is a trusted computing base (TCB).

In various settings, Examples Q1-Q4 (and other aspects of implicit attestation and execution management) may be observed or monitored as a result of, defined application programming interfaces, or interface specifications; specific edge configurations and workloads; and other uses and implementations of policies and logic for implicit attestation within an edge computing environment. Examples Q1-Q4 and other aspects of implicit attestation and execution management may also be observed or implemented as a result of coordinated service operations and service functions (e.g., to provide attestation or management of services in FaaS or EaaS settings). Additionally, the methods of examples Q1-Q4 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples Q1-Q4 (and other features of attestation and execution management) may be combined with any of the other Examples herein to configure an edge cluster or edge cloud system, as coordinated or designed by a system orchestrator or architect.

Attestation Edge Name Services Examples

Edge cloud infrastructures may be used to scale attestation data across the globe. Previous approaches for attestation have been based on software solutions and discovering mechanisms which are exposed by various software stacks. One limitation with these previous approaches is that when low latency discovery and resource selection mechanisms are needed, some accelerated or infrastructure acceleration schemes are required. The following techniques, applicable in an edge computing system (e.g., edge cloud 110, and the edge computing system configurations depicted in FIGS. 3 to 22D), provide a name-based access to discover resources or provide SLAs. These resources or SLAs may be registered to each of the hierarchical domains to receive callbacks when changes happen in a level of the architecture. The respective tiers and resource properties may be certified by a group of edges using blockchain, in an example.

Edge attestation is used to determine the best ways to discover and trust service deployments within edge architectures. Edge Attestation Name Service (EANS) techniques may be used to build a global view of where thousands of service providers and dependent resources may be located (e.g., topographically, geographically, or lexographically, such as for ICNs). Location information may be used to help predict expected access latency. In various examples, the respective services may be associated with different level of attestation or trust depending on how the different entities of the edge validate or provide a value of trust to each service. Further, such services may be associated with entities that are globally trusted to provide a level of attestation to services.

The following techniques provide a registration service, resembling a Domain Name Service (DNS), but as configured to be applied to edge architectures. For example, a set of distributed ledgers are responsible to deploy monitoring and attestation software elements in the respective distributed edges. These monitoring elements may be used to track services, such as when a particular service is executed.

Figure 52:
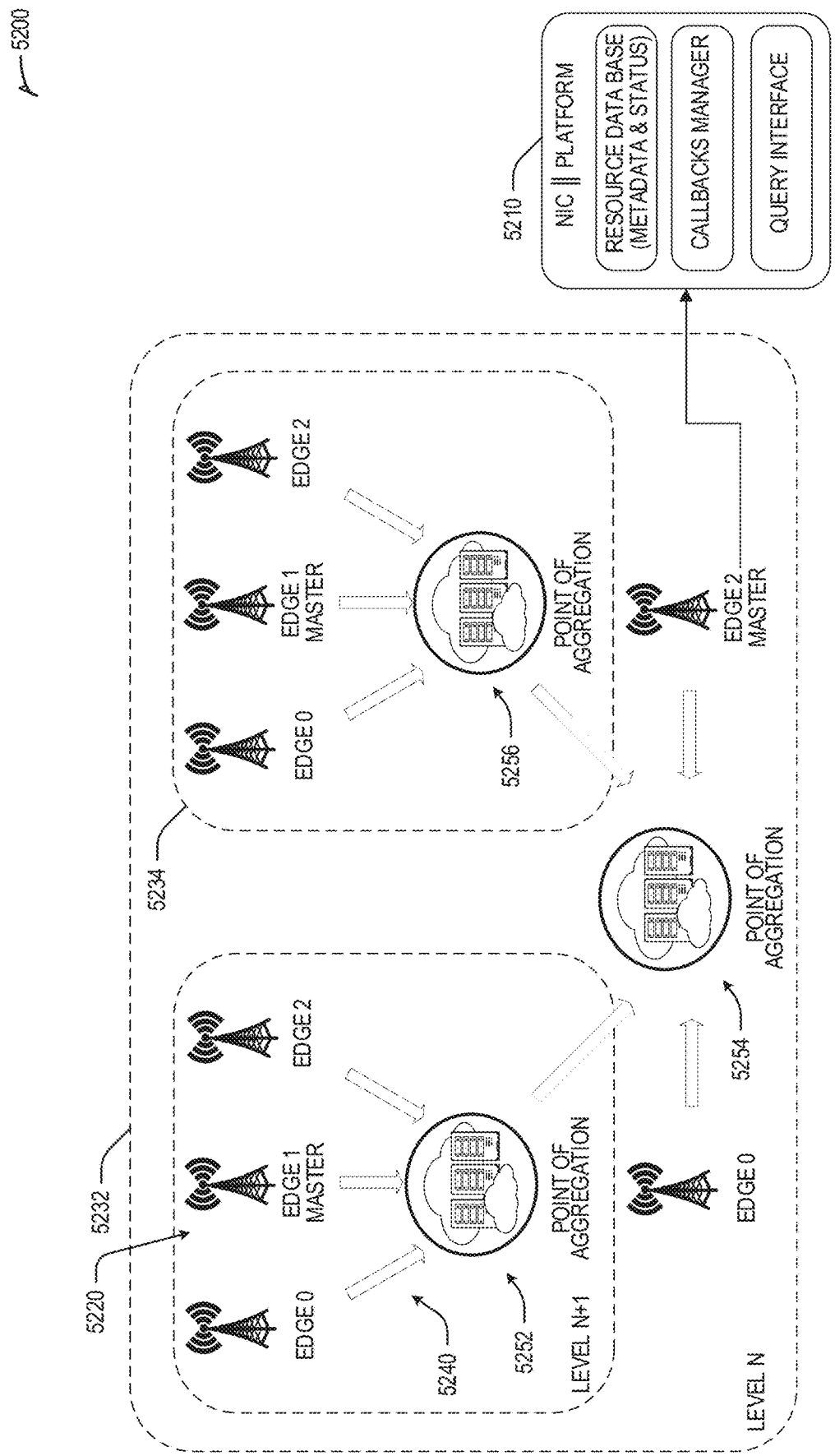
FIG. 52 illustrates a system providing an Edge Attestation Name Service (EANS) architecture.

FIG. 52 illustrates a system providing an Edge Attestation Name Service (EANS) architecture 5200. The EANS architecture 5200 is shown in FIG. 52 with example nodes 5220, levels 5232, 5234, connections 5240, and aggregation points 5252, 5254, 5256, but the EANS may be used with other architectures, setups, or components as well (including any of the nodes 302, 312, 322, and other system implementations discussed from the system configurations depicted in FIGS. 3 to 22D).

The EANS architecture 5200 may describe nodes, EANS providers, devices, etc. For example, a Master EANS node may be a starting point for vetting the trust of subordinate EANS nodes. This hierarchy may be used to support dynamic or elastic deployment of an EANS system.

The EANS may provide a set of distributed ledger services to monitor and attest hardware or software computing resources accessible via edge access networks or edge core networks. EANS providers may be responsible for tracking each service that executes within an edge network. Information tracked may include individual or particular sets of computational resources, firmware or software deployed to or executing on computational resources, workloads with a particular set of SLAs or their location, tenant (e.g., subscriber) identities (e.g., cryptographic keys used to authenticate) or their location, intrinsic trustworthiness attributes that are ascribed to tracked resources, other policy restrictions, or the like.

The EANS monitoring elements may be responsible for certification or propagation of monitored information to a hierarchical information system. For example, a system organized hierarchically following the edge architecture's north-south hierarchy. In an example, a device or edge system (e.g., platform 5210) that wants to execute something in the edge system architecture may make a specific query for a particular service, which may be provided by a particular service provider under particular circumstances, and optionally validate the actual expected performance and service quality attested by the overall edge system. The specific query may include an EANS address or name.

In an example, the EANS architecture 5200 may include more information than just directory infrastructure type information (e.g., the information may also include attestable claims). For example, the EANS architecture 5200 may include data such as telemetry, resources, IP addresses, or the like. This information may be passed in response to a query or selected information may be passed, for example, according to parameters of the query.

In an example, virtual domains may be created dynamically, for example within a hierarchy. In another example, virtual domains may use different topologies other than the hierarchy shown in FIG. 52. The virtual domains may include a set of trusted entities which are responsible to attest or validate any resource data that is changed at the domain (e.g., new resource, change on status, etc.). When new data is attested, then the data may be propagated to a master EANS which is responsible for performing callbacks to peers in case of subscription to the current domain. In another example, the master EANS may update a local repository of meta-data.

In an example, data or attributes contained in the repository may be attested data. In another example, the data may be known to be correct and may be compared to attested data to determine its validity and relevance.

A further technique for EANS architecture support may include the following operations. The technique includes a first operation to receive, for example at a master edge device, a query, from a device, for information about a service in an edge architecture. The technique includes a second operation to, in response to the query, access (for example at the master edge device) Edge Attestation Name Services (EANS) data in a repository.

The technique includes a third operation to send, for example to the device from the master edge device, a response to the query, the response including attestation data for the service and at least one of an address or a name of an edge device providing the service. The response may include certification or propagation of monitored information for the service. The response may include location information for the edge device providing the service (e.g., for latency). The location information may include the address or may include additional information (e.g., a shortest path time). In an example, the attestation data is stored in the repository at the master edge device.

In an example, the device and the master edge device share a level within the edge architecture. In an example, the edge device providing the service is in a different virtual domain than the master edge device within the edge architecture. In this example, the operation may include identifying a second master edge device on a lower level of the edge architecture. The technique may further include receiving the attestation data for the service and the at least one of the address or the name from the second master edge device.

A first example method (Example R1) for implementing edge attestation name services (e.g., in edge cloud 110, and implementing systems and devices) is a method performed using processing circuitry (e.g., implemented on or by node or device 2200, 2232, 2240, or 2250), the method comprising: receiving, at a master edge device, a query, from a device, for information about a service in an edge architecture; in response to the query, accessing, at the master edge device, Edge Attestation Name Services (EANS) data in a repository: and sending, to the device, a response to the query, the response including attestation data for the service and at least one of an address or a name of an edge device providing the service.

In a second example (Example R2), the subject matter of Example R1 includes, a configuration where the device and the master edge device share a level within the edge architecture.

In a third example (Example R3), the subject matter of Examples R1-R2 includes, a configuration where the edge device providing the service is in a different virtual domain than the master edge device within the edge architecture.

In a fourth example (Example R4), the subject matter of Example R3 includes, accessing the EANS data by identifying a second master edge device on a lower level of the edge architecture and further comprising receiving the attestation data for the service and the at least one of the address or the name from the second master edge device.

In a fifth example (Example R5), the subject matter of Examples R1-R4 includes, the response including certification or propagation of monitored information for the service.

In a sixth example (Example R6), the subject matter of Examples R1-R5 includes, the response including location information for the edge device providing the service.

In a seventh example (Example R7), the subject matter of Examples R1-R6 includes, a configuration where the attestation data is stored in the repository at the master edge device.

In various settings, Examples R1-R7 (and other aspects of attestation name services) may be observed or monitored as a result of, defined application programming interfaces, or interface specifications; uses of communication protocols, message formats or definitions; and other uses and implementations of policies and logic for attestation and trust mechanisms within an edge computing environment. Examples R1-R7 and other aspects of these attestation service techniques may also be observed or implemented as a result of service operations and service functions (e.g., to support naming and addressing within services in FaaS or EaaS settings). Additionally, the methods of examples R1-R7 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples R1-R7 (and other features of attestation services and attestation data management) may be combined with any of the other Examples herein to configure an edge cluster or edge cloud system, as coordinated or designed by a system orchestrator or architect.

Attestation-Aware SLAs Using Acceleration

One of the challenges in a distributed architecture (e.g., edge cloud 110, and the edge computing system configurations depicted in FIGS. 3 to 22D) is how to perform administrative tasks such as attestation and service level agreement tasks on varying hardware that may have limited resources. For example, a field programmable gate array (FPGA) may be configured to perform a specific processing task and may not include traditional processing components to perform administrative tasks efficiently. However, the FPGA may be in the best position to perform the administrative tasks. The following configurations and techniques provide the FPGA with instruction sets (e.g., via an instruction set architecture (ISA), etc.) needed to perform the administrative tasks locally with increased efficiency.

SLAs and Attestation procedures in edge settings (e.g., within the edge services and functions depicted and described with relation to FIGS. 7 to 12) may be non-static dynamic functions or more generally, "code" that must be executed to define the actual constraints which then need to be satisfied. For a general-purpose processor (e.g., central processing unit (CPU)), this may not be an issue because executing code is what a CPU is designed to do. Usually, executing a policy representation is a small fraction of the overall time it takes to perform the function that is governed by the policy. However, an FPGA may be configured for a specific processing task and SLA and Attestation overhead may burden the FPGA and reduce efficiency. To combat the issue of SLA and Attestation tasks overburdening the FPGA a micro instruction set architecture (ISA) emulator may be implemented to simulate a CPU and thus perform any SLA or attestation process in the emulator (e.g., a very constrained but general-purpose instruction execution unit) for performing a reasonable set of currying functions that represent SLA evaluation and attestation protocols. A tiny ISA is sufficient to offload the SLA tasks from the main processing flow of the FPGA.

Figure 53:
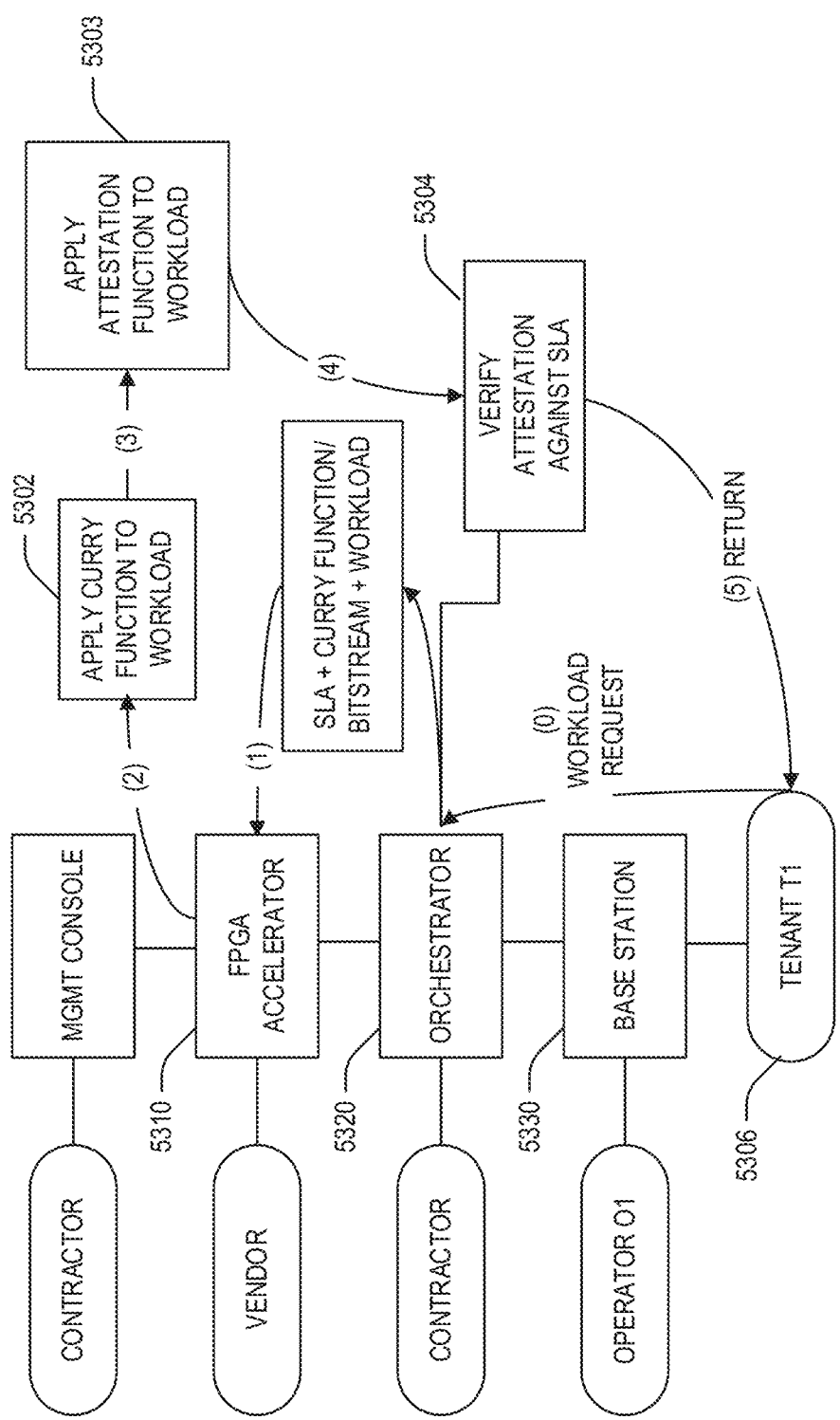
FIG. 53 illustrates a system diagram for an edge architecture showing an accelerator that accepts a curry function (e.g., a bitstream) and a workload.

FIG. 53 illustrates a system 5300 for an edge architecture, including a Field Programmable Gate Array (FPGA) accelerator 5310 that accepts a curry function (e.g., represented by a bitstream) as well as a workload that executes using the bitstream and a service level agreement (SLA) that describes attestation requirements. In other examples, other types of hardware accelerators may be utilized with these techniques.

In an example process sequence, a tenant 5306 may request a workload from an orchestrator 5320 (e.g., via a base station 5330 or other edge node) at process (0). The orchestrator 5320 may supply an SLA, curry function(s), and a workload at process (1). The FPGA 5310 may install bitstreams/curry functions and may process the workload 5302 at process (2). The FPGA 5310 may apply an attestation curry function that, for example, signs the workload 5303 at process (3). In an example, the FPGA 5310 may have an out of band connection that goes into a trusted server that may validate the bitstream. This may be beneficial in situations where the FPGA 5310 cannot validate the bit stream itself. The orchestrator 5320 verifies attestation 5304 according to SLA requirements at process (4). A workload result is returned to the tenant 5306 at process (5). In further examples, the entity that validates the SLA may be an orchestrator 5320 or another management entity. This may happen in situations where multiple orchestrators belong to the same edge appliance (and the edge appliance is partitioned for multiple tenants). In other examples, the process sequence and the sequence or type of operations may be varied.

The FPGA 5310 can be an LSM enforcement point by obtaining an LSM that describes acceptable or unacceptable curry functions; workload context; or tenant context. Likewise, an orchestrator 5320 could provision LSMs dynamically to LSM enforcement points.

In an example, the attestation function may be embedded in the FPGA 5310 or may be dynamically loaded as a bitstream. If the attestation function is loaded dynamically, a layering architecture (e.g., Device Identifier Composition Engine (DICE), etc.) could be applied to dynamically extend the trust that pre-exists as embedded layers in the FPGA 5310. If the embedded layer is layer 1 then the dynamic attestation bitstream may be linked in as layer 2. A layer 2 attestation key may be generated. The curry function/bitstream may be dynamically added as layer 3. The layer 2 attestation component may hash the layer 3 bitstream as part of the layer 2 device id (e.g., composite device identifier (CDI), etc.) computation. Layer 2 may compute an attestation key and sign the layer 3 results that are passed to layer 2. Alternatively, layer 3 might compute an attestation key and sign the results directly.

There is a possibility that for some reason the FPGA 5310 does not have enough information to perform the attestation. In such a case, the architecture may be expanded by having an out of band secured connection to a trusted server that may perform the attestation and provide the result to the curry function (e.g., delegated curry functions, etc.). Thus, the attestation key may be protected using protection techniques known only to the attestation bitstream provider. The layer 3 bitstream provider may not wish to incorporate attestation functions because this may involve added licensing fees.

SLAs may function like applets or curry functions that provide processing instructions to the FPGA 5310 (e.g., run this bitstream within these parameters and output the result, etc.). The attestation-aware SLA may check an attestation manifest. The SLA may install a bitstream image and may need access to the image. The SLA may be used to describe to the embedded layer 1 system how to accommodate the curry functions for attestation and workload processing. Each bitstream may include or be associated with a UUID, in order to ensure an attested bitstream or binary refers to a unique instance and can be always referenced.

The way in which the SLA is used to accommodate the curry functions may itself contribute to the attestable assertions. For example, the layer 1 CDI may include a hash of the SLA that is then supplied to layer 2. Thus, the FPGA 5310 may be provided with functionality to perform attestation and SLA related tasks without the need for general purpose processing functionality.

In further examples, attestation data includes a timestamp that can be used to attest when the attestation is performed. This may include use of a time stamp that is concatenated to a random number, to ensure that the attestation was not faked or re-used from the past.

A first example (Example S1) for implementing attestation-aware SLAs in an edge computing environment (e.g., edge cloud 110, and implementing systems and devices) is a method performed using processing circuitry (e.g., implemented on or by node or device 2200, 2232, 2240, or 2250), the method comprising: receiving a service level agreement (SLA), bitstream, and workload from an orchestrator node of an edge network; applying the bitstream to the workload to produce an output; applying an attestation function to the workload; sending a verification request to the orchestrator based on the application of the attestation function to the workload; and transmitting the output to a tenant node based on receipt of a positive verification response from the orchestrator.

In a second example (Example S2), the subject matter of Example S includes, signing the workload using the attestation function.

In a third example (Example S3), the subject matter of Examples S1-S2 includes, wherein the bitstream is a curry function.

In a fourth example (Example S4), the subject matter of Examples S1-S3 includes, wherein the attestation function is embedded in a field programmable gate array.

In a fifth example (Example S5), the subject matter of Examples S1-S4 includes, wherein the attestation function is dynamically loaded as a bitstream and uses a layer architecture in a field programmable gate array.

In various settings, Examples S1-S5 (and other aspects of attestation-aware SLAs) may be observed or monitored as a result of, defined application programming interfaces, or interface specifications; uses of communication protocols, message formats or definitions; and other uses and implementations of policies and logic for attestation functions within an edge computing environment. Examples S1-S5 and other aspects of SLA attestation may also be observed or implemented as a result of service operations and service functions which use the SLA (e.g., for services implementing or utilizing the SLA in FaaS, or EaaS settings). Additionally, the methods of examples S1-S5 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples S1-S5 (and other features of attestation service agreements), separately or in combination with the previous implicit attestation or attestation edge name service features, may be combined with any of the other Examples herein to configure an edge cluster or edge cloud system, as coordinated or designed by a system orchestrator or architect.

Efficient Deep Learning Analysis for Network Security Examples

As edge computing systems (e.g., edge cloud 110, and the edge computing system configurations depicted in FIGS. 3 to 22D) are deployed to consume and deliver traffic, it quickly becomes infeasible to send all traffic to centralized AI compute locations (such as deep learning (DL) inference servers) for analysis. However, within edge computing systems which provide compute to support network operations, there is a great need to perform security analytics upon the ongoing network operations, such as with use of context-based edge network security analytics. New DL and AI mechanisms are expected to be available in such network settings help detect advanced persistent threats, malware, DDoS, and similar attacks. These mechanisms are expected to be a fundamental operational security mechanism for network operators, but thus far have been limited to centralized server processing settings.

In an example, network security analytics and monitoring are deployable within an edge computing system as part of a packet processing pipeline from a data plane development kit (DPDK) or on a NIC, or a combination of these (e.g., in a partial offload model). For instance, a packet processing pipeline can be dynamically provisioned with a set of DL network models to process the network traffic and telemetry that is collected directly from that packet processing pipeline. Such telemetry may be referenced against the HW packet processing performed by the network card or other network equipment.

Existing approaches often rely on providing flow telemetry metadata to an analytics system using IPFIX, followed by a network management system making higher level decisions to cause some reconfiguration (using NETconf or similar tools). The use of network security analytics and monitoring via a packet processing pipeline keeps the processing 'tap' (e.g., observation point) within the edge platform packet pipeline, but moves the A model building, training, and inferencing into capabilities of the local smart-NIC/Local platform. This improved approach allows multiple AI/ML models to run simultaneously on the local platform without shipping data back to a centralized source.

The network security analytics and monitoring models can be used to detect patterns/anomalies on selected traffic (e.g., using unsupervised learning), and automatically adapt platform resources for flow patterns using a reinforcement method (e.g., MDP, Q-Learning) or a pre-configured reward function. The corrective actions normally performed by analytics systems/management system and netconf (or similar tools) may be dynamically carried out by the AI/ML models based on a preconfigured policy which selects what actions can be taken on the platform, based on each learning model layer (L3-L7), VNF type, interface type, and the like. For instance, an applicable policy may be represented as a new set of policy-based rules for ML local analysis, in a similar fashion as policy-based routing (PBR) definitions.

With use of this monitoring and training approach, learned knowledge from within the edge computing system can dynamically propagate across peers. Such an approach may have significant benefits in a multi-tenancy model, including with use of a model that is trained per-tenant. This approach may be integrated with other security features such as IDS/IPS for anomaly detection (to deal with untrainable DL components), and advanced rules to decide what traffic can or cannot be analyzed (e.g., based on available NIC algorithms).

Various forms of training (including adversarial training, or hierarchical learning) may be scheduled or coordinated in order to train the models. In further examples, a localized task-specific telemetry collection architecture may be utilized for network security analysis. In this architecture, respective tasks can be trained distinctly, and the trained template can be leveraged for multiple instances of the same task—in a similar manner as provisioning a SW update. Aspects of such training may be related or separated by tenant, taking into account that a system may be partitioned. Such considerations may enable different learning schemes to be applied to different tenants or partition owners.

In still further examples, sequences of tasks can be trained separately and applied at different layers in the compute fabric. However, in cases that the system is not stable enough to understand ground truth or to obtain useful training data from individual tasks, some specific combinations of tasks may be utilized.

Accordingly, in various examples, various method and devices may utilize AI (ML/DL) models for network security analytics and monitoring, to deploy such models upon data of a packet processing pipeline within the network equipment of respective nodes of the edge computing system.

In various settings, the previous deep learning and analysis examples may be observed or monitored as a result of, defined application programming interfaces, or interface specifications; uses of communication protocols, message formats or definitions; and other uses and implementations of policies and logic for network security within an edge computing environment.

V. Orchestration/Service Level Management for Multi-Stakeholder Edge Computing Systems In further examples, orchestration and service level management may be extended to a variety of multi-stakeholder edge computing settings.

Multi-Tenant Power Management Based on Dynamic Criteria Examples

Any number of the edge-cloud architectures adapted herein (e.g., edge cloud 110, and the edge computing system configurations depicted in FIGS. 3 to 22D) may be adapted to enable FaaS by TSPs or CSPs for access by applications running at the endpoint devices (e.g., smartphones or IoT devices). These FaaS may be used to accelerate edge-application workloads. In various examples, Acceleration FaaS (AFaaS)—an FaaS implementation where functions are implemented and executed in a hardware accelerator—may be used to further improve edge FaaS capability.

To enable low-latency FaaS and AFaaS, accelerators and compute (e.g., processors) may be located at the base station or gateway layer (e.g., a mobile edge computing (MEC) node in layer 1420, to achieve between 1-5 ms latency) or located in the central office (e.g., at core network layer 1460, to achieve between 6-7 ms latency). Although running FaaS and AFaaS from the edge node has a latency advantage, it may be difficult to allocate edge node hardware for this purpose. This difficulty may arise from one or more of the following: physical space restrictions; a lack of low latency and scalable scheduling solutions to process tenant requests (e.g., functions); missing highly effective compute density and acceleration (e.g., compute and acceleration used for FaaS or AFaaS and not by the system software stack); or absent automatic power management and billing policies at different level of granularities. Of these issues, power management is an important aspect in the design and billing for edge cloud architectures. Given power restrictions under which base stations and the central office generally operate, providers (e.g., operators) need dynamic and intelligent per tenant power management to ameliorate costs of deploying and operating edge architectures.

To address multi-tenant power management for FaaS and AFaaS, hardware support for per instance, or per tenant, power management is added to edge nodes. Such hardware support for power management policy avoids software-based power-management that may increase latency, or rob compute cycles from space constrained edge nodes or the like (e.g., base stations). Instead, the hardware-based policy management extends existing platforms or rack designs such that accelerated functions or function requests are directly handled by the hardware platform. Because software is not required, this solution involves less maintenance (e.g., software configuration or updates), which may be important for large device counts in deployment; more effective compute density, which may lead to a better total cost of ownership; automatic power scaling; metering and billing based on a multi-tenant architecture; or accelerated power and billing response time.

To implement tenant power management in the edge architecture, a set of extensions and protocols may be used. These extensions or protocols may be added to a gateway-which may be placed in the base station, in the central office, in the data center, or in any other type of edge appliance or node—that operates with the base station/access point to expose interfaces to tenants that are configured by tenants. The configuration may include setting a power budget (e.g., in terms of watts or in terms of money). The configuration may include setting a power policy over time, such as a specific power state (e.g., no less than X watts), a range of power states, a performance-to-watt minimum, etc. In an example, power can have different costs over time.

In an example, the gateway includes an automatic load balancer for tenant requests. The load balancer is sensitive to the tenant configuration for power budgeting to execute FaaS or AFaaS. Thus, if the power budget configuration specifies a low-performance requirement with a low power budget, the load balancer will prefer a low-power compute element over a high-power compute element. In an example, the gateway also includes interfaces to orchestrator components (e.g., cluster head nodes) to manage Service/AFaaS/FaaS, billing, or other configurable elements.

In addition to the gateway, rack and platform power management may be employed. Here, the rack or platform expose interfaces to configure how much power is allocated per tenant. To avoid performance glass jaws (e.g., unexpected failure or performance degradation), the platform provides automatic service degradation prediction or monitoring per service, FaaS, or AFaaS. In an example, degradation, or the prediction thereof, is communicated to the orchestration layers.

Figure 54:
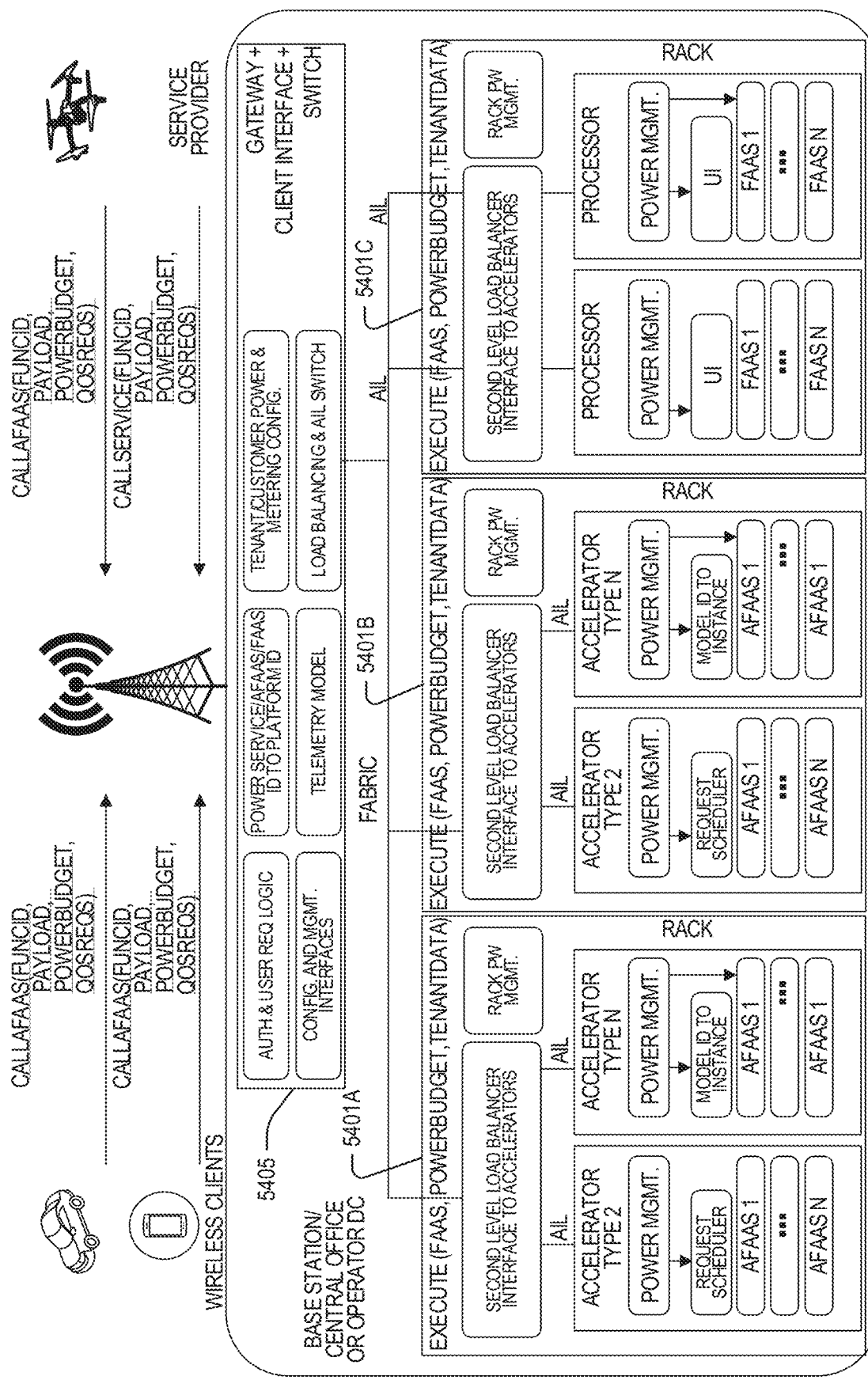
FIG. 54 illustrates a system for a dynamic SLA and billing criteria based multi-tenant edge cloud power management.

FIG. 54 illustrates a system for a dynamic SLA and billing criteria based multi-tenant edge cloud power management (e.g., to implement edge services and functions such as those depicted and described with relation to FIGS. 7 to 12). As illustrated, the gateway 5405 provides access (e.g., with authentication and billing) to the tenants via an interface. The interface is configured to enable tenants to discover or directly access a set of AFaaS or FaaS exposed by the base station 5410 without going through a software stack. The gateway 5405 includes circuitry to determine what hardware platforms are able (e.g., has the resources) the FaaS, AFaaS, or other service requested by the tenant.

In an example, the gateway 5405 is configured to perform load balancing—e.g., using telemetry coming from the different compute and acceleration elements—among the different requests coming from the tenants. In an example, the load balancing is based on execution power requirements as configured by the tenant. In an example, the load balancing is based on a power budget associated to the tenant. In an example, the load balancing is based on power or performance available on the different resources of the edge node (e.g., base station 5410). In an example, the load balancing is based on power requirements associated to the service. In an example, if performance degradation over expectations is detected or predicted the system software stack may be notified via, for example an interrupt.

In an example, tenant requests include a payload and identification of a service (e.g., function) to be executed. In an example, the request also includes an SLA. In an example, the gateway 5405 is configured to select one of several available accelerators or compute elements (e.g., processors) to execute a tenant request (e.g., based on the available edge computing hardware arrangements discussed with reference to FIGS. 19-21C).

As illustrated in FIG. 54, the gateway 5405 is included in a base station 5410. The gateway 5405 includes circuitry configured to authenticate tenants (e.g., user workloads) and track usage (e.g., for billing purposes) among multiple rack execution instances 5401A. 5401B, 5401C (e.g., instances of a server rack depicted in FIG. 22D)). The gateway tracking component is configured to authenticate a request and transmit the authenticated request (e.g., via an out-of-band fabric) to the central office. This transmission includes information that may be used by the central office to charge the tenant based on usage of a service given, for example, a tenant specified SLA level. The tracking component is configured to monitor resource use and conform such use to a tenant configured budget, whether defined in terms of time, power, money, etc. Thus, for example, when power is consumed by a tenant instance, the tracking component reduces the budget accordingly to the cost of the power at the particular point of time.

In an example, the gateway 5405 includes resource management circuitry (among other features for switching, providing a client interface, and other depicted functions). The resource management circuitry is configured to track what platforms—such as other nodes, racks, blades, processors, or hardware accelerators (e.g., within instances 5401A, 5401B, 5401C)—offer the set of FaaS or AFaaS. The resource management circuitry is configured to track how much power is currently available for these platforms, or resources within the platforms. In an example, the resource management circuitry is configured to detect and maintain performance metrics or other meta-data (e.g., for use by the scheduler).

The gateway 5405, as illustrated, includes a management interface that is configured to expose interfaces to the system software stack, such as orchestrators. These interfaces enable the software stack to configure or manage gateway 5405 operations, or platform operations via the gateway 5405. As noted elsewhere, the configuration may include setting cost of power at a point in time, power data per customer or tenant limits, policies, etc. In an example, the interfaces enable the software stack to telemetry or usage of the platform services.

The gateway 5405 includes telemetry circuitry. The telemetry circuitry is configured to track the execution of the services. In an example, this tracking includes tracking the level compute or accelerator utilization. The telemetry circuitry may include an interface to expose this information to the system software stack. In an example, the telemetry circuitry is configured to implement a telemetry model. This model accepts the telemetry data as input and detects or predicts service degradation due to, for example, the number of requests being received by the gateway 5405. In an example, the telemetry circuitry is configured to notify the tenant interface to reject requests based on the current available power or power characteristics. In an example, this rejection may also be based on a service or function type. Further, other forms of data may be provided by other base stations (e.g., load data, etc.) and used by the model to predict further degradation.

The gateway 5405 includes a memory (not shown, but implementable according to the memory components discussed with reference to FIGS. 21A-22D). The memory is configured to store requests, including payload, status, meta data, etc. In an example, the memory is accessed by the accelerators or compute elements via an interface that includes a "fetch the description" and "fetch the payload" calls.

The gateway 5405 includes a switch that implements the load balancer. The switch is configured to accept authenticated requests and dispatch the authenticated request to an accelerator or compute component. To make the dispatch selection, the switch is configured to use information provided by the telemetry circuitry. In an example, the switch may also factor one or more of the following into the dispatch decision: the power requirements associated to the current request, the budget available to the associated tenant, the current cost of the power, the available platform resources suitable to execute the service, available power and the capabilities exposed to provide the power requirements for the execution (e.g., power phases, power max-min, etc.), among others.

In an example, the gateway 5405 and the different processors or accelerators in the base station 5410 are connected via secure, high-speed links or interconnects. In an example, platforms hosting the processors or the accelerators include request circuitry configured to accept requests sent by the gateway 5405. The request circuitry is configured to control the power requirements provided by the tenant and provide the result from the service execution.

An example data flow for these components may include the following. A request arrives to the gateway 5405. In this example, the request includes: a payload, a function_ID, a tenant_ID, service parameters, SLA or quality-of-service (QoS) requirements (e.g., latency deadlines), authentication, and power requirements. In an example, the power requirements include one or more of max-min power, power phases, max-min cost of the execution based on power use.

Once received, the authentication circuitry authenticates the request. If the authentication passes, the request is stored in the gateway 5405 memory. Further, a new entry is created in a table that tracks all requests accepted by the gateway 5405. The table is also configured to track the status corresponding to the requests. The status may include such this as where the request is stored in the memory, status, or what platform is executing the function.

Once the authentication is passed, the authenticated request is transmitted to the switch for load balancing. Here, the switch identifies what platforms of the base station 5410 expose instances of the requested function and selects one of them based on one or more of the following criteria: if AFaaS is invoked, select one of the accelerators that has at least one of those accelerated functions available—it may implement a round robin selection if there are multiple accelerators exposing access to them; if FaaS is invoked, select one of the processors providing access to such function with less load. In either case, the scheduler uses the power criteria to determine what resource is selected. If multiple accelerators provide the AFaaS or multiple processors provide the FaaS, the switch selects the one that satisfies the provided SLA/QoS.

The switch then transmits the request to the selected platform. The switch transmits the request ID and a pointer to the gateway 5405 memory containing the description of the function. In an example, the platform accesses a function definition from the memory to perform the service execution. Once the function is finished it will callback the gateway 5405 with the pointer to the memory position where the result is stored.

The gateway 5405 sends the response back to the tenant and contacts the central office system with the corresponding execution in order to perform billing, or other tracking. The gateway 5405 then releases the allocated entries associated to the corresponding request.

SLAs may involve negotiation where a tenant is given several choices based on time window and power cost. In further examples, a SLA Orchestrator may compute options based on several factors (e.g., time to schedule workload, time to execute, time to report results, power cost per watt per host per time-of-day, power cost based on CPU efficiency envelope—especially as power cost per cycle may not be linear as GHz changes). The tenant is given a number of "quotes" or options based on the various adjustable parameters in workload scheduling. The tenant (or a person associated with the tenant) then selects a quote and commits to the SLA, while the SLA orchestrator may retain history of tenant choices to make smarter quotes in future SLA negotiations.

A first example method (Example T1) for multi-tenant edge cloud power management (e.g., for edge cloud 110, and implementing systems and devices) is a method performed using processing circuitry (e.g., implemented on or by node or device 2200, 2232, 2240, or 2250), the method comprising: receiving, at a gateway, a request from a tenant, the gateway connected to hardware platforms of a node via a switch fabric; receiving, at the gateway, a power configuration for the request from the tenant; selecting a hardware platform from the hardware platforms to complete the request; and dispatching the request to the hardware platform.

In a second example (Example T2), the subject matter of Example T1 includes, the gateway including an authenticator circuitry, and wherein receiving the request from the tenant includes authenticating the request.

In a third example (Example T3), the subject matter of Examples T1-T2 includes, selecting the hardware platform from the hardware platforms which includes load balancing requests across the hardware platform via a switch of the gateway.

In a fourth example (Example T4), the subject matter of Example T3 includes, the switch incorporating data from a telemetry circuit of the gateway to determine which of the several platforms is available to service the request.

In a fifth example (Example T5), the subject matter of Examples T1-T4 includes, the power configuration including at least one of a maximum-minimum power range, a maximum power consumption, or a maximum monetary value based on power consumption.

In a sixth example (Example T6), the subject matter of Examples T1-T5 includes, the request including a service level agreement (SLA) requirement, and wherein selecting the hardware platform includes using the SLA requirement to select the hardware platform.

In various settings, Examples T1-T6 (and other aspects of multi-tenant power or resource usage management) may be observed or monitored as a result of, defined application programming interfaces, or interface specifications; uses of message formats, telemetry data, or definitions; and other uses and implementations of policies and logic for resource usage monitoring and management within an edge computing environment. Examples T1-T6 and other aspects of these power management techniques may also be observed or implemented as a result of service operations and service functions (e.g., to allocate and operate resources invoked by services in in FaaS, or EaaS settings). Additionally, the methods of examples T1-T6 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples T1-T6 (and other features of power and resource usage control) may be combined with any of the other Examples herein to configure an edge cluster or edge cloud system, as coordinated or designed by a system orchestrator or architect.

Multi-Tenant High Throughput Biometry Examples

Figure 55:
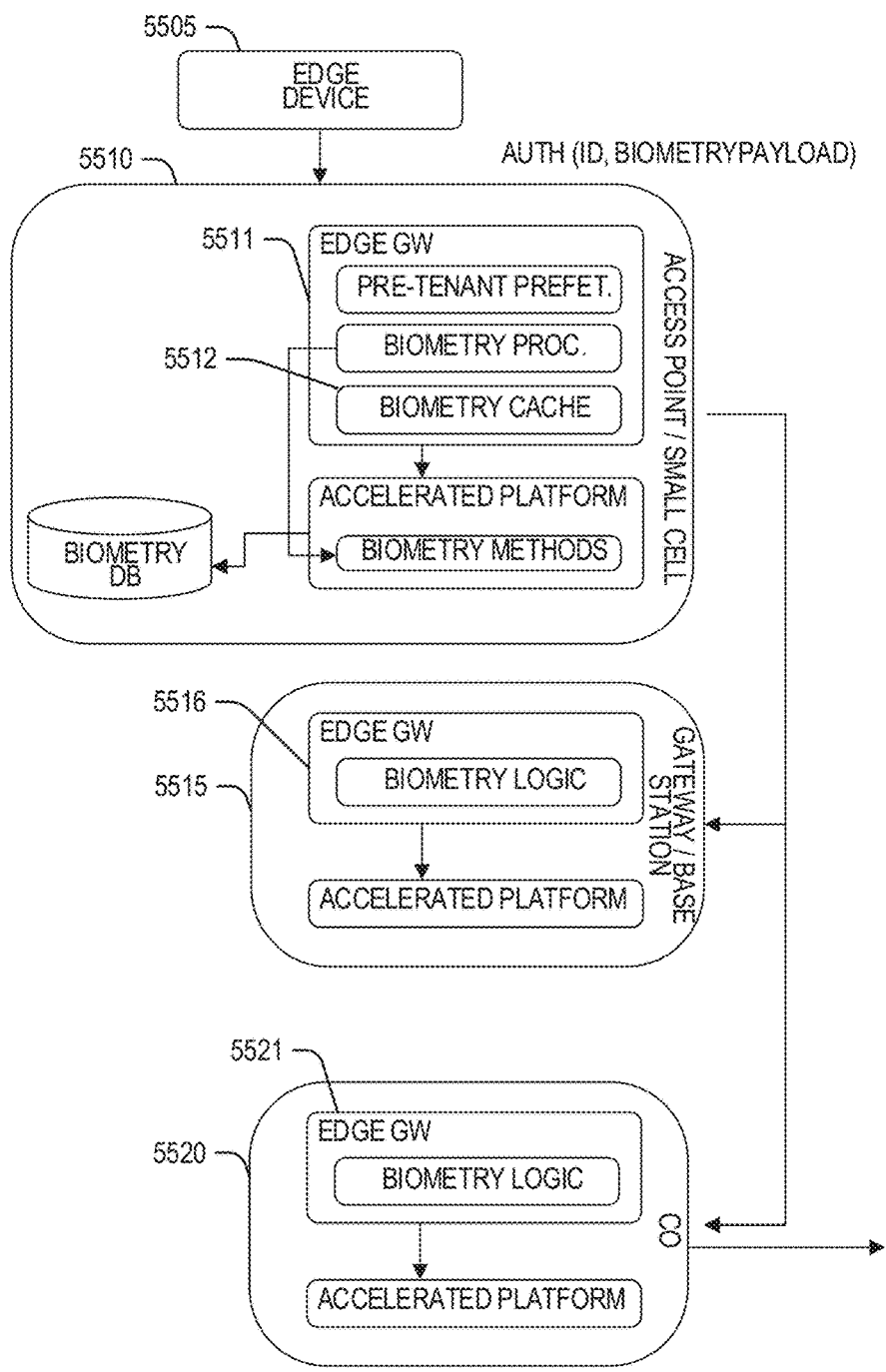
FIG. 55 illustrates an example of a biometric hierarchical architecture.

FIG. 55 illustrates example use cases of biometric processing in an edge cloud architecture (e.g., edge cloud 110, and the edge computing system configurations depicted in FIGS. 3 to 22D). As related elsewhere, edge computing offers several advantages, such as the ability to serve and respond to multiple applications (e.g., object tracking, video surveillance, connected cars, etc.) in real time and the ability to meet ultra-low latency requirements for these applications. One such application, or use case, is biometry. Biometry is a use case that will enable new business models. The distributed and accelerated components at the edge, and related low-latency use cases, are also important to achieve a scalable architecture for biometric verifications. An added consideration for biometry, however, is ensuring that only the "right" (e.g., vetted, approved, authorized, etc.) edge actors are used for these often security critical applications.

An edge computing architecture scenario that may be employed involves an operator that controls the end-to-end infrastructure, including networking and compute. In this scenario the operator uses its own platforms to run its services and potentially share (e.g., rent) spare platforms to third parties. This is attractive from the operators' perspective. However, service providers may have concerns about security, privacy, quality of service (QoS), or intellectual property (IP) protection.

In an example, three levels of edge divisions may occur. First, the operator controlling the infrastructure may divide the compute components into multiple partitions, any of which may be rented to another operator. This model may be prevalent in areas where small operators are using infrastructure from larger operators. Second, the infrastructure operator may divide allocated partitions into three logical partitions (e.g., level 1) of the same type: a partition available to be rented or third party service providers; a partition to execute network functions (e.g., virtual broadband network gateway (vBNG) or virtual evolved packet core (vEPC)); and a partition meant to host services that the operator is providing to its costumers (e.g., user equipment (UE) subscribed to the operator).

In an example, a lower-level (e.g., level 2 or sub-level) partition also may be divided into multiple partitions, again some available for third parties (e.g., renting to others). In an example, these partitions are managed and virtually owned by the service provider. At the same time, this partition may be divided in two partitions; one for running cloud service provider (CSP) workloads. This may, for example, enable a third party to rent the partition and expose its own services for use by others (e.g., a level three application).

For biometry, the trust issues regarding edge-cloud hardware have led to a preference to keep biometry workloads on a device making the measurement (e.g., a mobile phone or secure door lock), or to run the workload in a cloud controlled by the biometry vendor. A drawback to these approaches includes a user-centric limitation. That is, a device is generally limited to authenticating a fixed number of users for which the device stores the biometric data. Having the data in to the cloud also has limitations. For example, security may be a concern as data traverses several networks until arriving to the cloud data center location. Also, latency may be a concern as data is sent to the cloud, processed, and response generated. Additionally, reliability may be an issue as network connections provide a point of failure in addition to the service itself.

In the edge cloud environment (e.g., within edge cloud 110, and implementing systems and devices), additional concerns may evolve. For example, many biometry techniques require a priori knowledge of biometric data and do not address sharing storage and biometric hardware resources with others (e.g., other tenants). These techniques were not designed for hierarchal architectures with the particularities of the edge cloud computing architectures. They do not assume restrictions on the platform upon which they are executed and do not considered hierarchal architectures. In the context of an edge cloud architecture, the more work moved to the end-device, the greater the restrictions on storage space, power, and compute for the workload. Further, these techniques generally do not assume end-to-end physical security requirements. In the case of edge cloud, base stations may be deployed in places where physical surveillance may not be guaranteed. Additionally, these techniques generally do not employ end-to-end hardware acceleration or effectively manage storage in a multi-tier architecture. These factors may be critical when total cost of ownership (TCO) reduction is sought. That is, unless the multitier architecture is addressed, it will be difficult to ensure that resources are devoted for effective computing.

To address these issues of biometry in the context of an edge cloud architecture, a hierarchical biometry authentication architecture may be used that may automatically and securely manage biometry user data in the edge, similar to a content data network (CDN). This may include a new model of data access that may be used by the three levels of edge control—e.g., only tenants, tenants and CSPs hosting tenants, tenants and CSP hosting tenants and operators hosting CSPS. The architecture may include tenant customizable hardware acceleration for biometry authentication workloads at the different levels of the edge hierarchy.

In an example, the edge tiers (e.g., central office, base station, etc.) include one or more biometric memories or accelerated biometric hardware that is used by one or more tenants. This architecture may include several components, such as interfaces that enable a tenant to: register or remove biometric data; or register processing bit-streams in an intelligent network interface controller (e.g., iNIC) to process biometric authentication requests coming from edge devices.

The architecture may also include instructions (e.g., logic or code implemented in circuitry) to manage security keys. In an example, the security keys are registered via an out-of-band mechanism. The instructions are configured to authenticate requests coming from edge devices to ensure that the workload is performed by the right actor at any of the three levels described above.

The architecture may also include a controller that implements, on a per-tenant basis, instructions to manage biometric user data and manage the transfer of the biometric user data between levels of a hierarchical cache (e.g., from a base station repository to a central office repository). These biometric data management policies may be based on tenant criteria (e.g., where data is stored, a trusted level of hardware security, etc.). In an example, the biometric data is hosted at the core of the operator network and the rest of the tiers in the hierarchy act as intermediate caching tiers. The closer to the edge device, the less caching capacity is likely, resulting in a greater effect observed from implementing proper biometric data caching policies to reduce latencies. Further, as discussed above, such biometry data may include a type of timestamp or expiration data that may be used to automatically inactivate, evict, or delete telemetry data.

The architecture may also include a fabric (e.g., intranetworking circuitry) to connect rack elements to elements at other levels of the hierarchy. This may be in conjunction with reliability circuitry to replicate data automatically to different storage pools, power domains, or elements of the rack to satisfy tenant requirements managed by the fabric infrastructure.

In an example, the iNIC may include biometric scheduling circuitry to process edge requests to authenticate a given user. This may be complemented by validation that the requesting entity has rights to perform an authentication request. Such biometric authentication may include accessing a biometry data cache to obtain biometric reference data from the edge user subject to authentication. In an example, if the authentication cannot be performed (e.g., in case of failure), the request may be routed to a higher-level in the hierarchy.

Running the authentication biometric bit-stream in the iNIC using biometry data received from the user and the reference biometry data at the edge-cloud may result in accurate and fast biometry. That is, this solution may result in an ultra-low latency edge collective, seamless location edge device collectives, better system TCO—e.g., by using compute for non-biometry requests without incurring system stack overheads. These benefits result in scalable, secure, automated and customized solutions for biometric workloads.

FIG. 55 illustrates an example of a biometric hierarchical architecture 5500. As illustrated, the architecture 5500 includes an edge device 5505, a small cell 5510, a base station 5515, and a central office 5520 (CO) (depicted in the context of a telco deployment, but equally applicable to other network contexts). Note that the small cell 5510, the base station 5515, and the CO 5520 respectively include an edge gateway (5511, 5516, 5521). This edge gateway 5511, 5516, 5521 exposes an interface to validate that a given biometry payload corresponds to a user identification (ID). The edge gateway 5511, 5516, 5521 may also include a cache 5512 that checks whether biometry data for a particular user ID is cached. In an example, the cache 5512 is organized and sized per tenant. Thus, in an example, a respective tenant may reserve more or less cache to match expected biometry throughput or capacity requirements.

In an example, the edge gateway (5511, 5516, 5521) includes circuitry to enable tenants to register bit-streams to manage what biometry data is cached at the edge at each point of time. This circuitry may be configured to pre-fetch biometry data from lower hierarchies of the architecture 5500. Here, the highest level is the CO 5520 and the levels decrease towards the edge device 5505.

The edge gateway (5511, 5516, 5521) may include an access circuitry to access the cache in response to an authentication request. In an example, the cache access is managed, such that, in case of a cache hit, the biometry data is retrieved from a local disk. In an example, the biometry data is provided to biometry authentication facilities (e.g., hardware or services) along with a biometry payload. These facilities may then perform the authentication and send the result back to edge device 5505. In an example, if the biometry data is not cached locally, the circuitry forwards the request up to a next level (e.g., from the base station 5515 to the CO 5520). This forward message may be responded to with a response that indicates whether authentication was successful, as well as the biometry data, used for the authentication, to cache locally for future authentications. In an example, if the authentication request is cascaded to the CO 5520 (or equivalent top-level in the hierarchy), the request may be addressed via a cloud service.

Each point where a biometry payload is processed could be an LSM enforcement point. This may enable use of security policies that protect user privacy to follow the privacy sensitive contents throughout the Edge infrastructure.

In an example, the edge gateway components noted above may be implemented in an iNIC. Thus, the iNIC includes circuitry to manage biometry data and the corresponding authentication. This authentication may be partitioned between tenants, for example, to ensure biometric data security for the authentication between such parties. Here, the iNIC has interfaces to enable an owner ID (e.g., tenant software) to register or de-register processing bit-streams in the iNIC to process the different biometry supported techniques. As part of this process, the iNIC is configured to register or de-register secure keys used to authenticate edge authors, which in turn may authenticate edge users. Thus, the iNIC is configured to validate incoming requests, to store data securely in the pooled storage or memory, and to send data to upper or lower tiers in a secure manner. In an example, the iNIC circuitry that manages security keys includes an out-of-band registration pathway.

In an example, the edge gateway components include a pooled storage controller. The pooled storage controller is configured to manage how biometry user files are stored in the pooled storage and to implement a hierarchical cache structure. In an example, the hierarchical cache structure is based on data labeling, such as hot, warm, and cold data. In an example, the pooled storage controller includes two interfaces. A first interface enables inline registration and deregistration of bit-streams per a marker—such as owner ID and potentially per different address range or set of files—that specifies how files or data associated to a particular address range are promoted or demoted in the hierarchy.

The bit-streams themselves may receive various pieces of information used to govern the promotion or demotion of data within the cache hierarchy. For example, the bit stream may operate on telemetry information for the platform and potentially to the resources associated to the particular owner ID or list of ranges. In an example, the bit streams may operate on performance information, such as input-output operations per second (IOPS), associated to a particular owner ID or a list of ranges. In an example, the bit streams may operate on information that indicates that certain data or files are being accessed and in what mode.

A second storage controller interface is configured to enable higher tiers of the hierarchy to demote files or data associated from the tier+1 to the current tier. This interface is implemented such that circuitry checks whether the current owner ID has enough space for caching the requested data. If there is not enough space, the circuitry is configured to add more resources. If there are not more resources available, the circuitry is configured to escalate the error—e.g., to a management entity or an orchestrator. If there is room (e.g., enough resources) the interface circuitry then migrates the data from corresponding tier+1 to the current tier.

In a similar manner, the interface is configured to demote data from the current tier to tier−1. For example, the interface accesses data associated to an owner ID and potentially an address range. When there is a cache miss, the data manager transmits a request to the lower tier to fetch the data. Here, the interface is configured to check whether the current owner ID has enough space for caching the requested data. If not, more resources may be added. If there are not more resources, the issue is escalated—e.g., to the POD Manager or to the orchestrator. If there is room, the interface circuitry is configured to migrate the data from the tier−1 node to the current node.

In an example, each owner ID (e.g., tenant) may have one or more bit-streams governing whether to promote or demote data within the caching hierarchy. In an example, tenant may select a default data caching policy provided by the edge gateway. Thus, each owner ID may implement a customized bit-stream or a generic cache management policy.

In further examples, privacy or legal considerations may prevent collection and distribution of biometric images in the manner described above. In such scenarios, a design principle may be employed to keep the biometric reference template on a personal device, in a smart jewelry, or some form of authenticated component that contains cryptographic keys. The keys are used to authenticate the used, and such keys can be propagated, cached, and used as needed without violating privacy norms. The keys may contain attestation claims about the secure element used to protect the keys to associate a level of trust with the key and the binding of the user to the key. (For instance, a user may be provided with the ability to register different names with the name-key binding so that they can be known by an alias or application specific name or account rather than by their biometry—which can't be changed by the user).

A first example method (Example U1) for multi-tenant high throughput edge biometry processing (e.g., within edge cloud 110, and implementing systems and devices) is a method performed using processing circuitry (e.g., implemented on or by node or device 2200, 2232, 2240, or 2250), the method comprising: receiving, at an intelligent network interface controller (iNIC), a biometric authentication request; retrieving, by the iNIC from a pooled storage controller, biometric data corresponding to the request; comparing, by the iNIC, the biometric data to data within the request to perform biometric authentication; and transmitting, by the iNIC, a response to the request that includes, the biometric authentication.

In a second example (Example U2), the subject matter of Example U1 includes, retrieving the biometric data from the pooled storage controller which includes searching, by the pooled storage controller, a local cache for the biometric data, the local caching being a part of a cache hierarchy in which lower-levels of the hierarchy are closer to an edge device.

In a third example (Example U3), the subject matter of Example U2 includes, the biometric authentication request being received from a lower-level device in the hierarchy in response to the biometric data being absent from a local caching of the lower-level device.

In a fourth example (Example U4), the subject matter of Example U3 includes, transmitting the biometric data to the lower-level device along with the response to enable caching of the biometric data at the lower-level device.

In various settings, Examples U1-U4 (and other aspects of multi-tenant biometric processing) may be observed or monitored as a result of, defined application programming interfaces, or interface specifications; uses of protocols, message formats, telemetry data, or definitions: and other uses and implementations of policies and logic for biometric services within an edge computing environment. The biometric services of Examples U1-U4 and other variations discussed above may also be observed or implemented as a result of being invoked or coordinated with other service operations and service functions (e.g., from service messaging and data communications used in FaaS, or EaaS settings). Additionally, the methods of examples U1-U4 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples U1-U4 (and other features of biometric data processing and management) may be combined with any of the other Examples herein to configure an edge cluster or edge cloud system, as coordinated or designed by a system orchestrator or architect.

Migrating, Propagating, and Adapting SLAs Examples

In an example, edge computing scenarios may be adapted to consider and adapt to suitable QoS conditions among multiple tenants and stakeholders. Edge cloud architectures in particular may struggle with how to increase or maximize service density per platform while being able to keep a certain level of QoS or meet specific SLAs. In terms of quality of service attributes or service level agreements, three types of potential models can apply: (1) No quality of service definition or service level agreement to that particular service. That may mean no fixed amount of private or shared resources attached: (2) Soft Service Level Agreement. Relevant services have an allocation of a set of amount of private resources (e.g.: core hardware resources) and a set of shared resources (e.g.: last-level cache or memory) such that the service will provide the throughput and latency to users depending on the amount of private and shared compute resources, even as the amount of services is limited by the use of the shared resources. Hence, in this scenario, 99% guaranteed latency may not be possible when the amount or complexity of services (and the pressure to the platform) increases. (3) Hard Service Level Agreement. Here, the service is using all the resources in a private mode. In this case the expected jitter is supposed to be minimal. To achieve this SLA, two approaches can be taken: (a) ensure a platform is fully allocated to a service; (b) configure all the shared resources to be hard partitioned and allocated to individuals.

To accomplish either type of SLA, a distributed edge cloud architecture may attempt to distribute workloads and workflows among multiple edge nodes. However, edge computing systems may encounter a number of issues when attempting to deploy and utilize SLAs that provide service operation among multiple edge nodes. First, there is no readily usable mechanism which enables SLAs to be adapted and utilized at multiple compute locations. Second, as multiple compute locations are invoked and as services move to different nodes (e.g., as compute is moved relative to the data), orchestrators and service coordinators will need to understand how services are being perceived, and whether additional nodes need to be invoked. Third, as services are moved around to multiple edge nodes to meet SLAs, there may be issues if the move is unsuccessful, or if the newly involved node is not capable of meeting the SLA.

Figure 56:
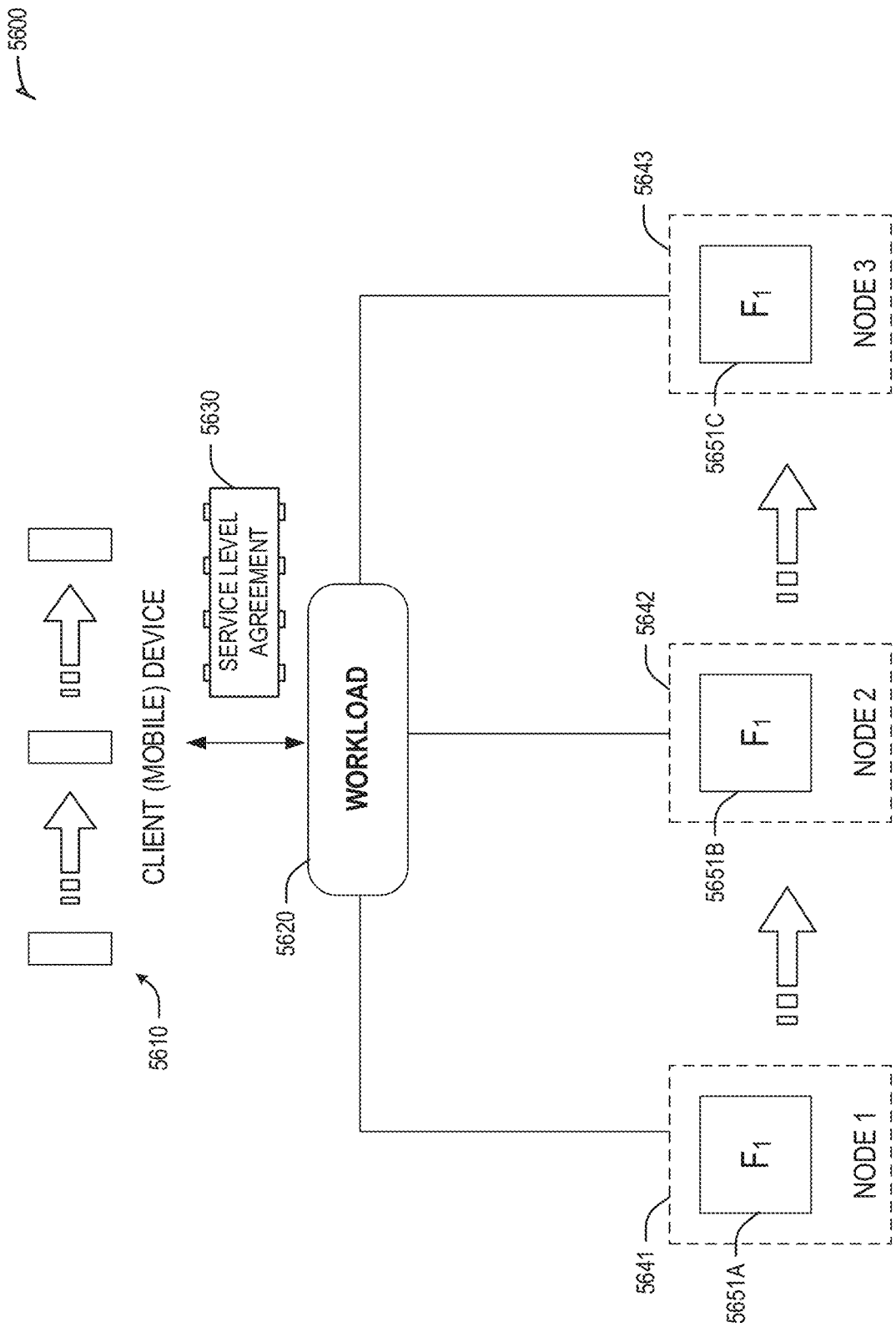
FIG. 56 illustrates a scenario for migration, monitoring, and propagation of an SLA among multiple edge nodes of an edge computing system.

FIG. 56 illustrates a scenario for migration of an SLA among multiple edge nodes of an edge computing system 5600 (e.g., a system provided to implement a portion of the edge cloud 110, or the edge computing system configurations depicted in FIGS. 3 to 22D). In this scenario, an SLA "service hosting" abstraction is established for service execution, which assists the transfer of function workloads from one node to another (e.g., from node 1 5641 to node 2 5642 to node 3 5643). This service hosting abstraction differs from a "service provider" abstraction (e.g., as is provided by approaches such as UPNP), because the abstraction is not trying to specify the service or function to be invoked. Rather, the abstraction is used to describe hosting environment attributes and constraints needed to meet an SLA.

In a first example, a workload 5620 operating under an SLA 5630 may be migrated across the edge nodes (e.g., from node 1 5641 to node 2 5642 to node 3 5643). During and after this migration, data traceability approaches are used to see where the workload has landed, and the availability to perform this workload among the respective nodes, to ensure the fulfillment of the SLA 5630. As will be understood, coherency and continuity of services needs to be trackable and verifiable, especially when workloads and service availability for such workloads are moved around the infrastructure (e.g., with instances 5651A, 5651B, 5651C). This includes verifying how the services (and the SLA 5630 objectives) are perceived by the client (e.g., a UE 5610). Additionally, from a security perspective, an SLA 5630 can be a vehicle for negotiating the type and strategy for LSM use, as the SLA 5630 can establish a value for security protections and the framework for its application.

Migration of the workload to utilize different services (and service instances) on different nodes may occur using east-west (node to node) movement, north-south (client to server, or from endpoint further into the network) movement, or an orderly combination of both approaches. Migration may be triggered or controlled based on the recognition or prediction that an edge node is encountering issues meeting the SLA 5630, and needs help (e.g., from a nearby node with resource availability, from a server or gateway further into the network, etc.)

Migration may involve the use of a resource selection phase, to dynamically adapt an offered service to use SLAs that are established by mobile client endpoints. Thus, as a user's UE (e.g., UE 5610) moves around to different geographic areas or service areas and comes in contact with different edge computing resources, the SLA 5630 may migrate with the UE 5610.

The particular SLA migration actions that occur may be based on the dependencies between the SLA 5630 and the edge computing system, as well as the type of services invoked, the characteristics of the workload, and the like. Services may be grouped into two or more categories. High priority or critical services may need proactive migration (e.g., guaranteed minimum level of service, under all circumstances) to meet an SLA, while the others are given standard migration approaches to meet an SLA (E.g., to migrate as 5% of memory capacity or 10% of memory bandwidth is held in reserve for services that are considered business critical but migratable for high availability).

In further examples, the SLA 5630 for a particular workload or service may be treated within the edge computing environment as a portion of a global (e.g., system-wide, multi-system-wide) SLA that involves multiple workloads. Thus, in a scenario where one of the compute nodes is unable to meet the SLA 5630 for a particular workload, migration actions may be invoked to cause additional resources to be leveraged to meet the SLA 5630. The use of an SLA in this scenario benefits from the use of a workload that can be divided among multiple edges (including, a workload that results in a workflow pipeline for compute activities from node to node to node). As a result, if resources cannot be met for any items of the workload, the global SLA for the workflow will step in to marshal resources and accomplish the workload processing.

These concepts for defining and migrating an SLA abstraction, among services and nodes of an edge computing system, are also applicable for use with a specific SLO abstraction defined for a measurable objective of a workflow or a service. Also, in further examples, the SLA 5630 or SLO may be adapted among multiple edge nodes based on external inputs, conditions, or data (e.g., external to the edge node itself, including at the device). As a result, the abstracted priority or SLA/SLO for a workflow or service may be dependent on the inputs from other peers or edge devices that can provide metrics or telemetry (such as, backhaul bandwidth metrics, which suggest the use and coordination of edge compute services).

In further examples, an SLA abstraction may be associated with concepts for SLA "Healing", in the form of adaptation, correction, and adjustment of the SLA 5630 within the edge computing service. Such processes for SLA healing may involve identifying potential other edges (e.g., new computing locations to submit the service), identifying how to add more resources to adjust an SLA that is not working any more, or implementing similar changes.

SLA healing may be used to reduce the occurrence of global SLA breaches, by introducing some potential redundancies to address workloads. For instance, every host or edge node may be given access to the instructions related to all workload fragmentations. In case a host cannot meet SLA requirements (e.g., a latency requirement), the host can pass an "execution token" to another one. Such coordination may be event-driven, and enabled through the use of inter-host/inter-orchestrator communications.

Deployments of an SLA abstraction, SLA migration, and SLA healing may occur in a variety of use cases, and be provided among a variety of orchestrators and hosts. In further examples, use of these techniques (and other adaptations to an SLA or system operations) may depend on the particular use case scenario. For example, in automotive use cases, safety-relevant features might never compromise their SLAs, while infotainment features may adapt to the MEC environment (e.g., deployment, load etc.). Thus, SLA adaptation within a distributed edge computing system may take a variety of forms.

A first example method (Example V1) for managing SLAs in an edge computing system (e.g., edge cloud 110, and implementing systems and devices) is a method performed using processing circuitry (implemented on or by node or device 2200, 2232, 2240, or 2250), the method comprising: identifying characteristics of edge compute resources for processing a workload in an edge computing system according to a defined service level agreement (SLA); comparing hosting environment attributes and constraints needed to meet the SLA with available hosting environment attributes and constraints of the edge computing system, the attributes and constraints obtained from the characteristics identified for processing the workload; and performing a migration of the workload from a first edge node to a second edge node of the edge computing system, based on the comparing, wherein the comparing produces a recognition or a prediction that the first edge node cannot meet the SLA for the workload, and the migration is performed in response to the recognition or prediction.

In a second example (Example V2), the subject matter of Example V1 includes, wherein the migration occurs within a network of the edge computing system based on east-west, node-to-node movement at a level of the network.

In a third example (Example V3), the subject matter of Examples V1-V2 includes, wherein the migration occurs within a network of the edge computing system based on north-south, node-to-node movement at different levels of the network.

In a fourth example (Example V4), the subject matter of Examples V1-V3 includes, dynamically adapting the SLA to the characteristics of the second edge node, the second edge node being configured to meet the adapted SLA for the workload.

In a fifth example (Example V5), the subject matter of Examples V1-V4 includes, wherein the hosting environment attributes and constraints are changed from mobility of a client computing device utilizing the workload, the client computing device moving among different geographic service areas of computing nodes within the edge computing system.

In a sixth example (Example V6), the subject matter of Examples V1-V5 includes, wherein a type, an amount, or a speed of migration is based on a type of services invoked by the workload, or characteristics of the workload.

In a seventh example (Example V7), the subject matter of Examples V1-V6 includes, wherein the SLA for the workload is a subset of a global SLA, the global SLA defined for a plurality of workloads distributed among nodes of the edge computing system.

In an eighth example (Example V8), the subject matter of Examples V1-V7 includes, dynamically adapting the SLA or one or more service level objectives (SLOs) of the SLA, based on external inputs, conditions, metrics, telemetry, or data from within the edge computing system.

In a ninth example (Example V9), the subject matter of Examples V1-V8 includes, performing changes of the SLA and additional assignments of the SLA and the workload to respective edge nodes of the edge computing system, based on computation resources available for processing by the respective edge nodes of the edge computing system.

In a tenth example (Example V10), the subject matter of Examples V1-V9 includes, wherein execution of the workload among the nodes of the edge computing system is based on use of an execution token communicated among the nodes, the execution token used to coordinate and perform at least a portion of the workload at a particular node.

In various settings, Examples V1-V10 (and other aspects of SLA management) may be observed or monitored as a result of, defined application programming interfaces, or interface specifications; uses of messaging, protocols, and definitions; and other uses and implementations of logic and data processing for migrating, propagating, and adapting SLAs and SLA values within an edge computing environment. Examples V1-V10 and other aspects of these SLA management operations may also be observed or implemented as a result of service operations and service functions (e.g., with workloads provided in services in FaaS or EaaS settings). Additionally, the methods of examples V1-V10 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples V1-V10 (and other examples of service level agreement management) may be combined with any of the other Examples herein to configure an edge cluster or edge cloud system, as coordinated or designed by a system orchestrator or architect.

Changing Service Level Objective Examples

One of the challenges in a distributed architecture is how to ensure service level agreements (SLAs) and corresponding service level objectives (SLOs) are being met for tenants at any time with respect to the services the tenants have in a distributed edge architecture where a variety of processing units may be used to execute a workload and where the workload my shift to various locations.

The systems and methods described herein use a distributed (but coordinated architecture) where edge platforms (e.g., edge cloud 110, and the edge computing system configurations depicted in FIGS. 3 to 22D) may publish transform SLO functions using transformation policies, registration functions, and quality of service (QoS) enforcement policies. Edge tenants may obtain services and perform or execute workloads distributed across the architecture while SLAs are maintained.

Migration of workloads to a different edge cloud with different edge locations may require a function that automatically translates new SLAs to match SLOs as the workloads are moved to new hardware with new capabilities. For example, SLA1 may be needed for a Service A in Edge Location 1 with SLO of A. When the workload moves to Edge Location 2 it may need an automatic way to update the SLA based on the new location (e.g., Edge Location 2).

Figure 57:
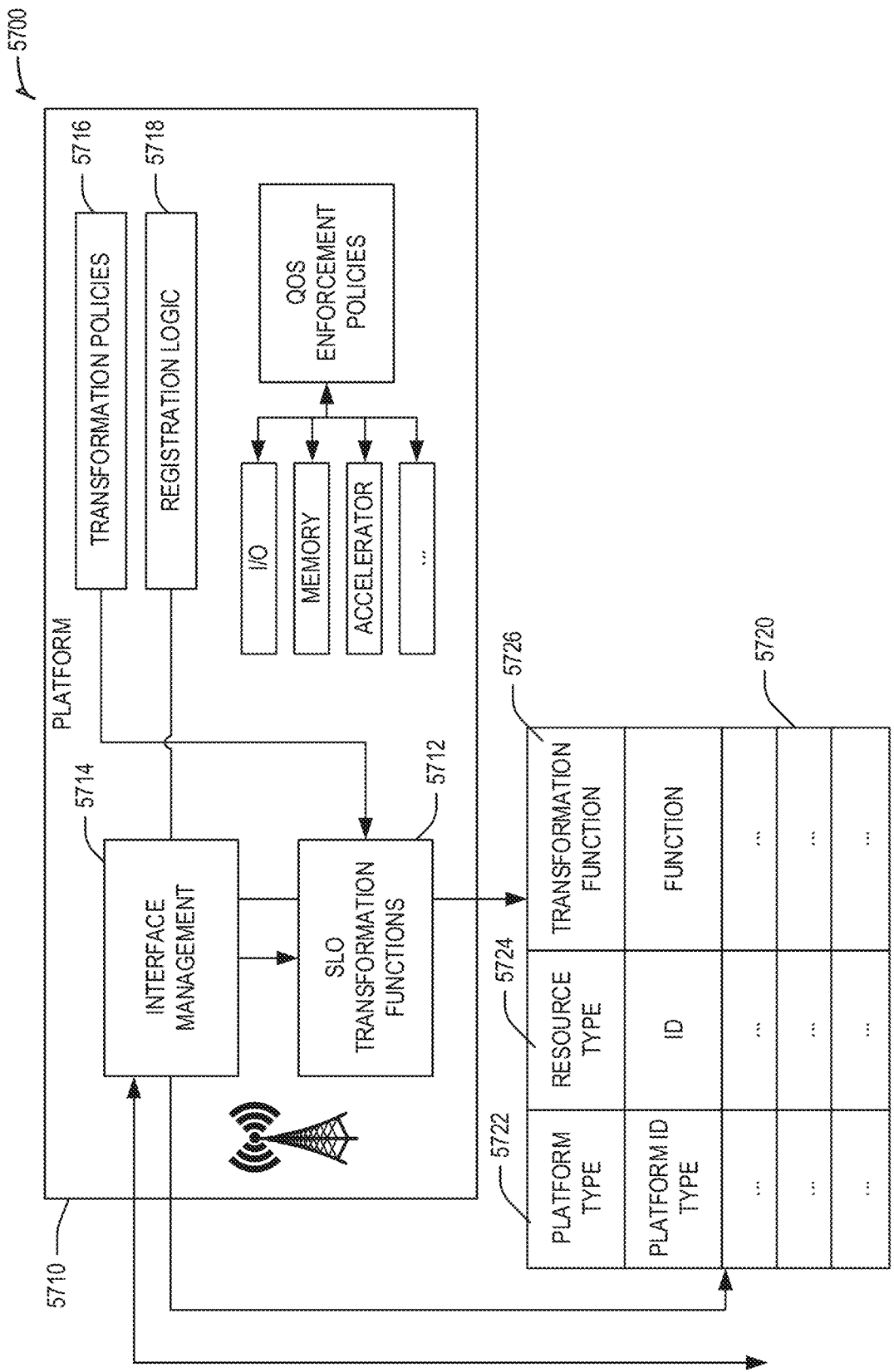
FIG. 57 illustrates a system diagram for edge function-based changes to service level objectives.

FIG. 57 illustrates a system 5700 for edge function-based changes to service level objectives in accordance with some examples. FIG. 57 provides a description of the different components that would be expanded in the example platform 5710.

The platform 5710, in an example, includes a set of interfaces (e.g., managed by interface management 5714) that allow for configuration. The interfaces may include an interface that allows a transformation to be specified for an SLO function. Parameters 5720 that may be specified may include a source platform type 5722, a source resource type 5724, and a transformation function 5726. The source platform type 5722 may indicate a source from where the service is being migrated. This may be a specific type of platform model or a type of platform that has certain type of functionalities. The source resource type 5724 may indicate a type of resource where an SLO for the source platform may potentially be established. The transformation function 5726 (e.g., one of functions 5712) may be executed to provide a configuration for a service level agreement of the original platform that generates a configuration for a particular resource in the current platform to maintain the same SLO semantics. For example: a service may have been executing in an original system that had one gigabyte of memory and the transformation function 5726 may compute that it needs to modify register A1 in a memory controller of the new system in order to implement the SLA of one gigabyte of memory equivalent in the new system.

The platform 5710 may also include an interface that allows a new service to migrate an existing SLA. The interface may allow to specification of, for example, a Process Address Space ID (PASID) that identifies the new service migrated to the system, a list of resources and a corresponding list of SLAs in the original platform, a type of platform in the original resource, and instructions or code that executes the interface. The instructions may include transformation policies 5716 that execute the transformation functions 5726 and invoke registration functions 5718 to configure necessary platform configuration options. The SLO transformation functions 5726 may be included in a database of functions registered using the interfaces.

After the parameters have been configured via the interfaces, an indication may be received that a workload with a corresponding SLA/SLO has been moved from hardware at a first location to hardware at a second location. The source hardware information and corresponding SLA/SLO information may be analyzed and a transformation function 5726 may be selected for execution. Upon execution, the transformation function 5726 may configure the hardware at the second location to operate within the SLA requirements or to conform to an SLO. Thus, the SLA may be met while the workload travels throughout the edge network. (This workload may include the state of the services, data, and any element that relates to execution and that may have some level of SLA).

A first example method (Example W1) for implementing edge functions to change SLOs in an edge computing environment (e.g., edge cloud 110, and implementing systems and devices) is a method performed using processing circuitry (e.g., implemented on or by node or device 2200, 2232, 2240, or 2250), the method comprising: receiving source platform information for a workload to be executed on an edge network; determining a target computing node for execution of the workload based on the source platform information; obtaining a transformation function from a transformation data source for the edge network; configuring parameters of the target computing node using the transformation function and a service level agreement for the workload; and transmitting the workload to the target computing node for execution.

In a second example (Example W2), the subject matter of Example W1 includes, a configuration where the source platform information includes at least one member of a source platform group or a source resource type.

In a third example (Example W3), the subject matter of Examples W1-W2 includes, a configuration where the service level agreement includes service level objectives and configuring the parameters of the target computing node include applying the transformation function to the service level objective to determine values for the parameters.

In a fourth example (Example W4), the subject matter of Examples W1-W3 includes, receiving a request to migrate a service from a source computing node to the target computing node; determining a process address identifier for the service; identifying a list of resources and a corresponding service level agreement for the source computing node and a platform type of the source computing node; and configuring the target computing node based on the platform type and the service level agreement for the source computing node.

In a fifth example (Example W5), the subject matter of Example W4 includes, registering the configured target node with the service.

In various settings, Examples W1-W5 (and other aspects of SLO management) may be observed or monitored as a result of, defined application programming interfaces, or interface specifications; uses of messaging, telemetry data formats, or telemetry definitions; analytics; and other uses and implementations of policies and logic for migrating or configuring SLOs within an edge computing environment. Examples W1-W5 and other aspects of these service level change operations may also be observed or implemented as a result of service operations and service functions (e.g., in SLOs defined for services in FaaS or EaaS settings). Additionally, the methods of examples W1-W5 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples W1-W5 (and other features of service level objective or agreement management, including those suggested in examples V1-V10) may be combined with any of the other Examples herein to configure an edge cluster or edge cloud system, as coordinated or designed by a system orchestrator or architect.

Data-Centric Orchestration Examples

In an example, edge computing can be characterized as a form of cloud computing which is adapted for real-time, generally interactive, network-edge computations that demand low-latency or high-bandwidth. To meet these demands, edge compute nodes are generally situated close to (e.g., physically, via a small number of network hops, etc.) to the end device (e.g., edge device, edge node, consumer, etc., as resources are moved closer to the data). This distributed proximity to end devices generally results in edge devices with limited power, computational speed, scale, or storage capacity. In one example deployment, an edge node may be adapted to allow specific edge-based distributed execution of a cloudlet, a type of a "cloud service in a box", which also may be referred to as an "edgelet".

A cloudlet, in this context, is a group of nodes or functions that traditionally are done in the cloud but moved closer to the edge and are disposed in an edge environment that is more local to the data consumers or customers. The corollary is an edgelet, which is a group of edge nodes or functions that would normally be thought of as edge functions, but which might operate on cloud hardware or use what would be traditional cloud compute elements (potentially differing from the edge node arrangements discussed above). Thus, in many of the following examples, a cloudlet and edgelet refer to the same element, and share the same general attribute of being a defined subset of available functions arranged to complete a specific task or offer specified services. Further, the functions defined and achieved for the grouping are more relevant than a choice of nomenclature between cloudlet or edgelet.

Generally, the purpose of a cloudlet is to provide discrete compute resources at the edge, typically in cloud or data center environments, in service of highly interactive mobile applications. References to an "cloudlet" and "edgelet" used herein refer to a limited-scale implementation of a cloud-like computing service in an edge computing setting (often at a CO or on an edge compute device), using the architecture and configurations discussed herein.

In an example applicable in an edge computing system (e.g., edge cloud 110, and the edge computing system configurations depicted in FIGS. 3 to 22D), cloudlets execute in as a middle tier in a three-tier hierarchy where the lowest tier is the end device, then the cloudlets, and then the cloud at the highest level of the hierarchy. Generally, as a mobile device moves, the computational backend may also move by transferring a workload from a cloudlets at a first base station to another cloudlet that may be at a second base station (e.g., for better locality). In this scenario, the cloud-based, next tier backend may remain and support less latency sensitive, but more compute intensive, tasks. Cloudlets thus absorb computationally demanding tasks without causing latency due to communication and consolidated scheduling typical of a traditional cloud. It is frequently the case that a virtual machine (VM) or a container that is in the cloudlet serving a mobile application will be migrated to another cloudlet at a next edge node when a mobile device moves from the first to the second edge node (e.g., from a first to a second base station).

Migrating cloudlet service processing from one edge node or central office (CO) to another in order to keep the cloudlet service proximate to a moving user equipment (UE) (e.g., a mobile phone, tablet, other end device) may result in latency reduction, it may also result in significant data movement within the cloudlet tier. Along with data movement, the edge infrastructure may incur additional penalties, such as data marshalling and input-output (O) overhead, or overhead driven by maintaining distributed consistency of data during staged migration (e.g., migration is performed in stages), among others. Migrating the data and the corresponding overhead may also increase the burden on the communication infrastructure, possibly applying the load over the baseline. This impact may be significant as the communication infrastructure is often costly to build and expand as mobility becomes a dominant usage and as new data intensive services emerge in the edge ecosystem.

In congruence with data center clouds, edge clouds often embrace modern microservices architecture—where monolithic application logic is refactored into a collection of simple and loosely coupled micro applications. Here, frequent migration of cloudlets may result in amplified migration of state that is shared and kept consistent across multiple microservices. Unlike data center clouds, where such sharing is facilitated by a hyper-converged storage or distributed data management architecture, edge infrastructures tend to incur more significant, and costly, communication traffic over relatively limited bandwidth between cloudlets.

Despite the emergence of fog-like networks and service installations, the issues above have not generally been addressed in current solutions. While UE migration between base stations is common, not much else is generally migrated. Instead many network services are delivered by hardware appliances limiting the ability to migrate the services, or the network services are maintained solely within the cloud, often increasing latency. While some content data networks (CDNs), such as video streaming services, co-locate data near devices, these edge services do not require significant amounts of compute beyond media encoding or transcoding; activities which are not as dependent on state transfer from one edge node to another as some other activities. Emerging usages like augmented reality (AR) or virtual reality (VR) will likely underperform given current architectures.

Hardware intensive, network specialized solutions do not scale in current architectures, and face problems of interoperability with other elements the ecosystem. Providers of immersive data intensive computations typically wish to move the edge itself close to the data generation or consumption point, but often fail due to the complexity and cost to create a scalable infrastructure for ubiquitous deployment, as its general usage requires continuous availability of high bandwidths across the breadth of customer networks.

To address some of these issues, an apparatus and technique for intelligent orchestration of cloudlets or distributed similar applications and services among edge computing systems is described. These elements are adaptive to different sensitivities of different edge cloud-based applications (e.g., microservice applications). In an example, cloudlets proxy other cloudlets in order to migrate latency sensitive user interface (UT) interactions in accordance with device movement while retaining data intensive compute operations according to a data gravity metric.

Figure 58:
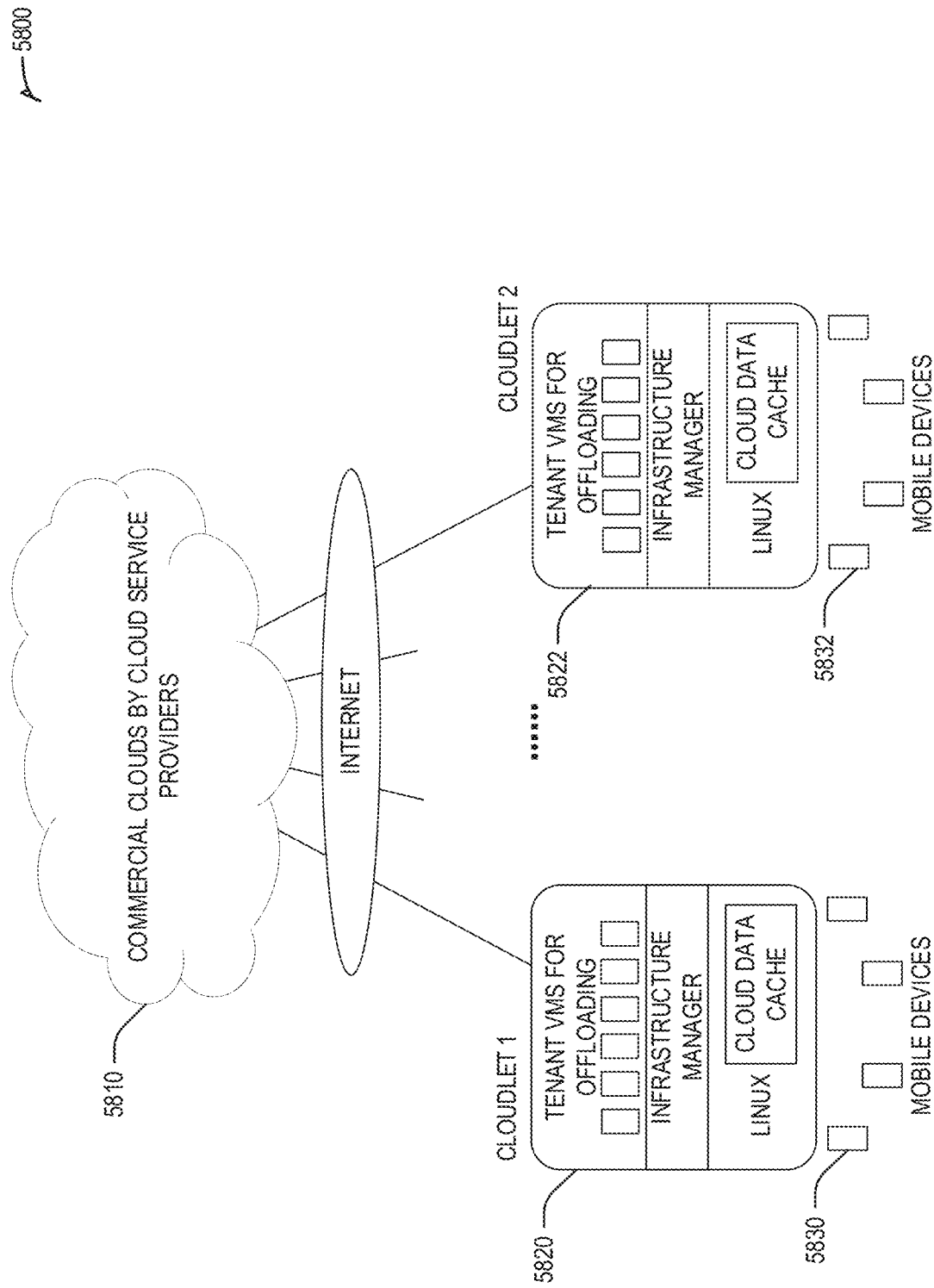
FIG. 58 illustrates a three-level hierarchy of an edge computing system among the cloud, edge, and mobile devices locations.

FIG. 58 illustrates a three-level hierarchy 5800 with a cloud environment (e.g., cloud 5810) at the highest level, cloudlets (e.g., 5820 or 5822) in the middle level, and mobile devices (e.g., device 5830 or 5832) at the lowest level. Typically, a cloudlet 5820, 5822 is positioned for low (e.g., one or two hop) latency from an end device 5830, 5832. In an example, the cloudlet 5820, 5822 may migrate from a base station A to another base station B if the device moves from a location close to base station A to a second location closer to base station B.

Figure 59:
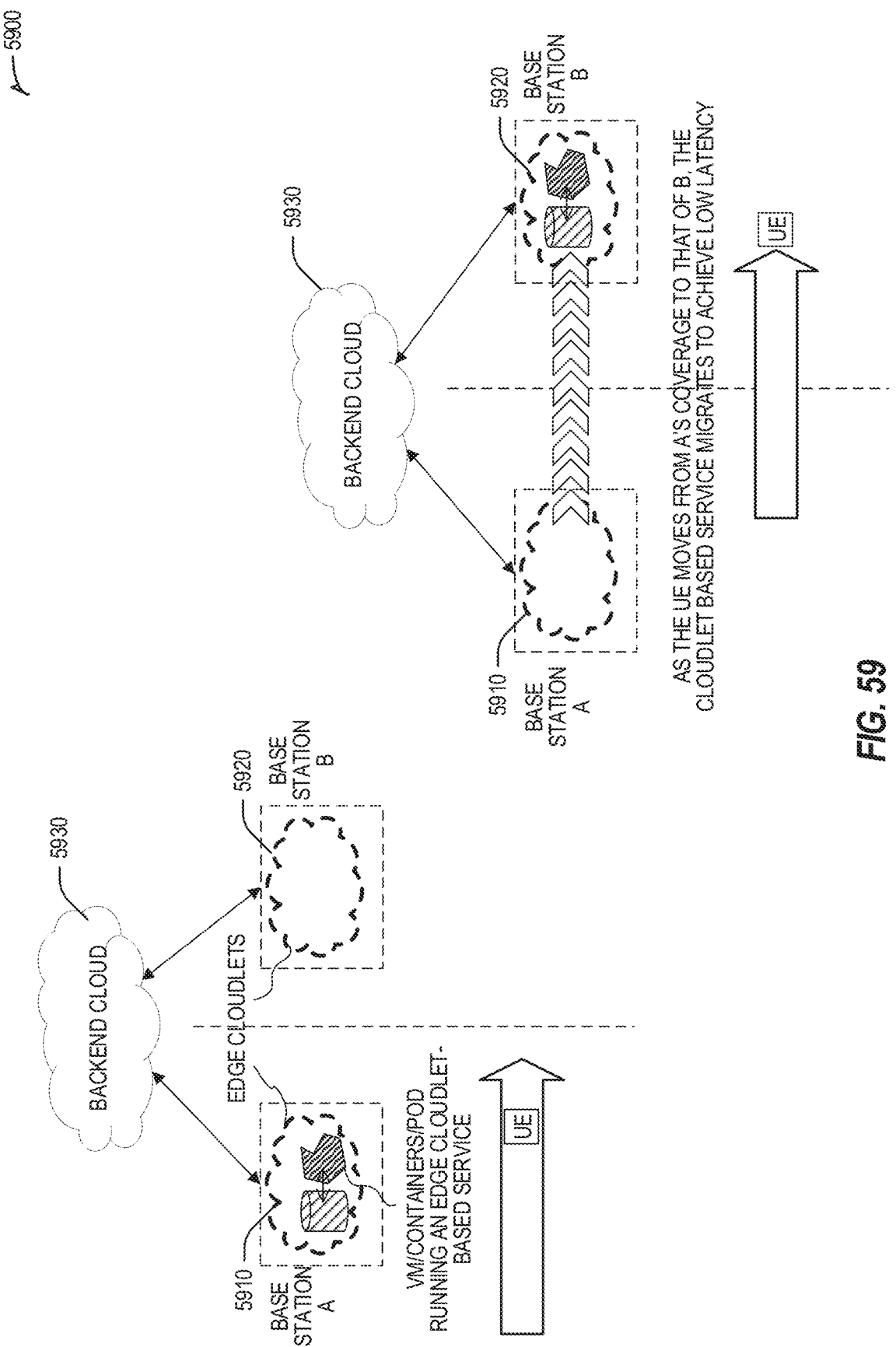
FIG. 59 illustrates an example of edge service migration.

FIG. 59 illustrates an example of cloudlet service migration 5900. As illustrated, a cloudlet 5910 at base station A and a cloudlet at base station B 5920 are presumed to be equidistant from the backend cloud infrastructure 5930. This may enable scalable operations as the cloudlet, at any base station, may escalate an operation (e.g., compute, data request, etc.) to the backend cloud 5930 without great variability in access to the cloud.

Figure 60:
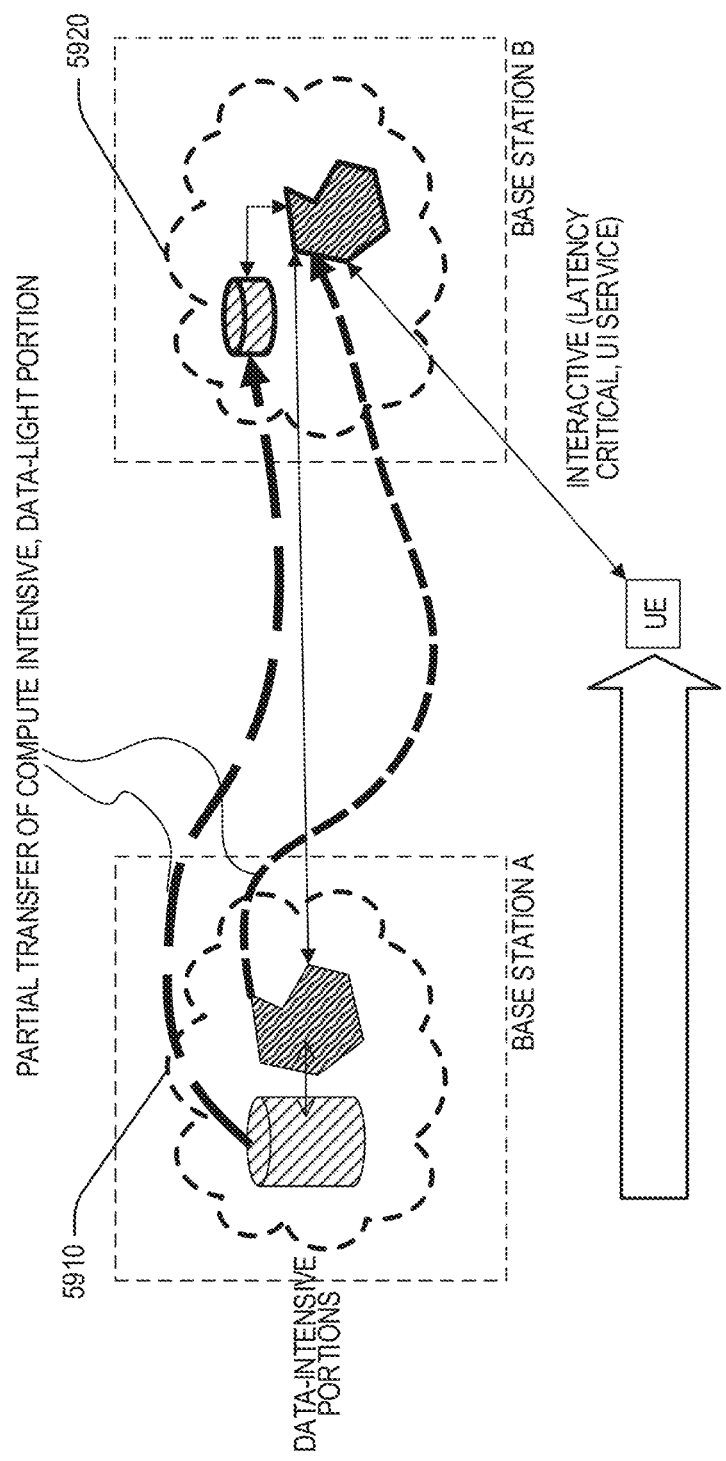
FIG. 60 illustrates an example of partial edge service migration.

FIG. 60 illustrates an example of partial cloudlet service migration 6000. Continuing the example of FIG. 59, FIG. 60 illustrates migration with sensitivity to the amount of data (e.g., data gravity) for a mobile compute operation. Thus, if the data gravity is high (e.g., a large amount of data), migrating the cloudlet 5910 from base station A to base station B (cloudlet 5920), or migrating the data from base station A to a cloud backend (not shown), may result in high bandwidth use, or requirements, while possibly dramatically increasing long latencies due to the data transfer. Instead of transferring the high-gravity data, the base station A may retain the data while the migrated cloudlet on base station B works to proxy interactions with the data. This enables the migration of latency sensitive UI interactions in accordance with device movement, but data intensive compute operations tend to be "sticky" at a base station, according to data gravity.

Figure 61:
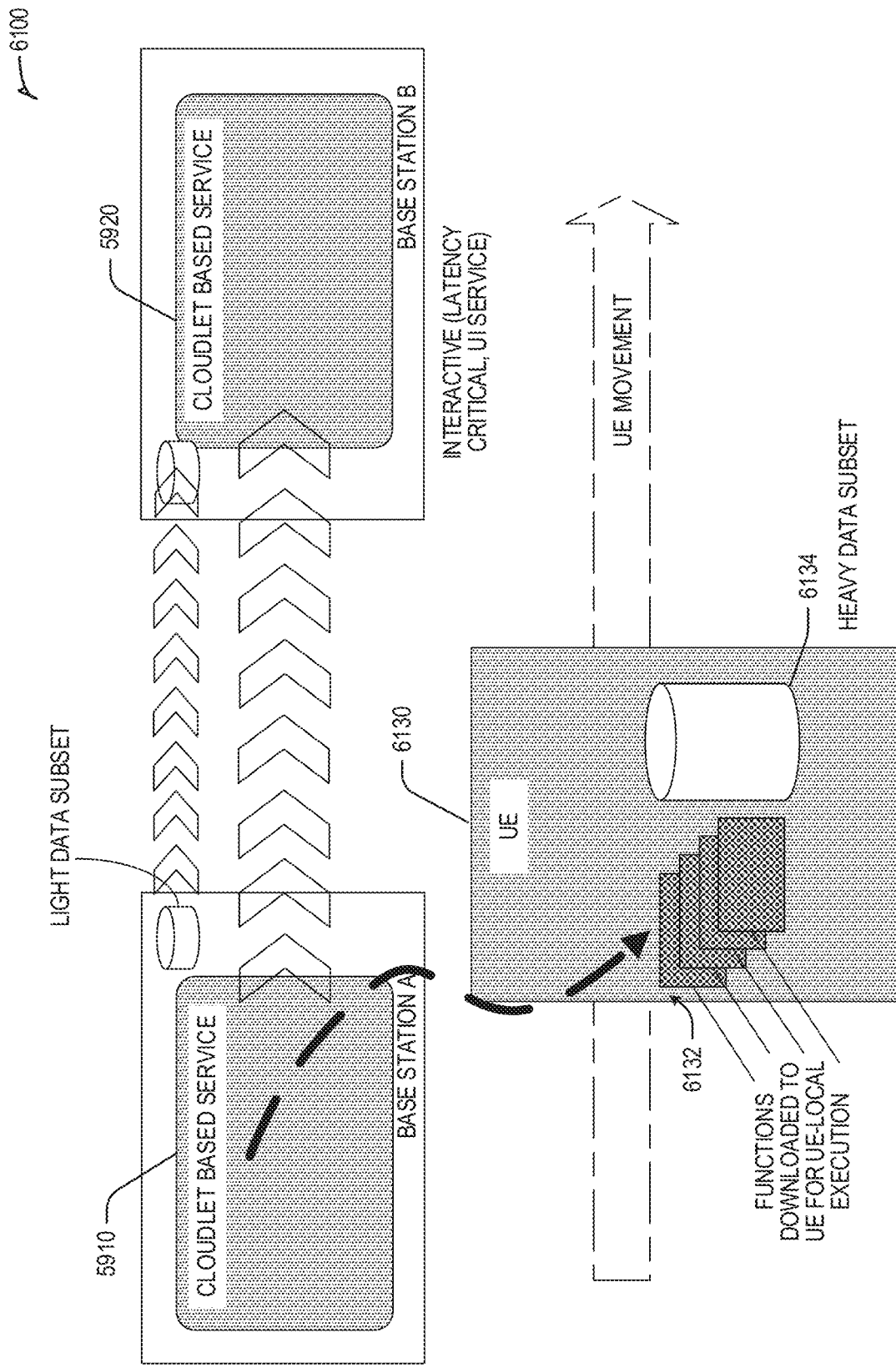
FIG. 61 illustrates an example of horizontal proxying in edge workloads.

FIG. 61 illustrates an example of horizontal proxying in cloudlets 6100. Here, peer-to-peer (e.g., cloudlet-to-cloudlet) proxying is extended to both horizontal and vertical proxying (e.g., for migration of cloudlet 5910 from base station A to cloudlet 5920 at base station B). Here, horizontal proxying may operate by enabling cloudlets to push some operations back to a proxy that is pre-installed at participating devices. This proxy is configured to receive operations from a cloudlet and execute them locally. For example, a sufficiently capable base station may have a pre-installed deep learning inference stack as well as data from a UE 6130. The UE 6130 may include a function 6132 downloaded to the UE 6130 for local execution, or a heavy data subset 6134. Here, the cloudlet may push various inference operations to the proxy so that data intensive inputs—such as speech objects, image or video objects, etc.—do not have to be moved to cloudlet 5910, 5920.

With vertical proxying, a data intensive operation may be split into a portion that is executed locally at a cloudlet 5910, 5920 to, for example, locally extract key feature from the data, then send the key features to the cloud backend, where computationally intensive operations may be executed on the extracted features or historical context data to produce refined inferences. For example, a cloudlet 5910, 5920 may perform character recognition, image features recognition, etc., but then forward those features to a computationally richer cloud backend where other processing might be performed to reduce ambiguity and map characters to words to sentences and their meanings, especially in multi-modal inference tasks.

The dynamic decision about which operations to proxy at the cloudlet 5910, 5920 and which operations to perform at which peer cloudlet 5910, 5920 or to push to a backend cloud (e.g., as discussed in the offloading and migration operations above in FIGS. 58-60) may be driven by data gravity policies. These data gravity policies may be dynamic. In an example, the data gravity policy is based on storage and memory capacities and throughputs of the hardware platforms supporting the cloudlets 5910, 5920. In an example, the policy is based on channel security. In an example, the policy is based on throughput or latency. In an example, the policy is based on base station ownership or costs of computation and communication.

From a security context, referring to FIGS. 58-60, an infrastructure manager may provide a LSM enforcement point for Mobile Device or Tenant VM isolation and control. A Cloud data cache may be accompanied by an LSM that contains cloud entity specific policy. Access to cached cloud content may be enforced by the OS (or bifurcated infrastructure manager where one side applies a tenant oriented LSM policy while the other side applies cloud specific LSM policy). Other components involved in the migration and policy enforcement may also provide an LSM enforcement point.

In further examples, various types of decisions for orchestration in the edge computing system may be delegated and offloaded to other entities, or may be based on information available from other entities. For example, consider a first scenario where Orchestrator A wants to orchestrate a workload or other edge processing job or service. Orchestrator A contacts a set of edge orchestrator systems (or subsystems) in order to gather the information in order to select a system. The Orchestrator A may then evaluate this information and select a best candidate to delegate and offload orchestration tasks.

Also, consider a second scenario where Orchestrator A wants to orchestrate a job on a system (System B) that is managed by another orchestrator (Orchestrator B). Here, Orchestrator A sends to the orchestrator of system B (Orchestrator B), requesting to schedule a job or service according to a particular orchestration policy. Orchestrator A can provide the policy plus other requirements (such as SLAs, SLOs, etc.)

Such orchestration delegation also may be implemented using a method to transfer the authority of system A to use the resources of system B. For instance, this delegation may be provided when the system A sends a certified request to system B providing certification on: the request to be executed; what privileges the orchestration A is providing to system B to execute the services; and any other information needed to execute the services.

In still further examples, such orchestration delegation may be implemented within a MEC system deployment (e.g., as compatible with an ETSI MEC specification). The information that is identified and exchanged using various MEC reference points (interfaces) such as a MEO-to-MEO reference point (e.g., as defined by an ETSI MEC specification).

A first example method (Example X1) for implementing data centric orchestration is a method performed in an edge computing system (e.g., edge cloud 110, and implementing systems and devices) using processing circuitry (e.g., implemented on or by node or device 2200, 2232, 2240, or 2250), the method comprising: receiving a cloudlet migration signal at a first cloudlet; analyzing computation components of the first cloudlet to produce a data gravity metric; and move a first component, in response to a first data gravity value for the first component being below a threshold, to a second cloudlet; refraining from moving a second component, in response to a second data gravity value for the second component being above the threshold, to the second cloudlet; and providing an interface for the second component to the second cloudlet.

In a second example (Example X2), the subject matter of Example X1 includes, a configuration where the first cloudlet is at a first base station, and the second cloudlet is at a second base station.

In a third example (Example X3), the subject matter of Example X2 includes, the cloudlet migration signal being is in response to a hand-off of user equipment from the first base station to the second base station, wherein the user equipment is using the services of the first cloudlet prior to the handoff.

In a fourth example (Example X4), the subject matter of Examples X1-X3 includes, the data gravity being based on a size of data used by the second component.

In a fifth example (Example X5), the subject matter of Example X4 includes, the data gravity being further based on a computation of the data size, the computation being at least one of a count of resources to move the data to the second cloudlet or a cost to move the data to the second cloudlet.

In a sixth example (Example X6), subject matter of Examples X1-X5 includes, orchestration within the edge computing system occurring in response to a delegation from a first orchestrator to a second orchestrator.

In a seventh example (Example X7), the subject matter of Example X6 includes, the orchestration occurring according to an orchestration policy communicated from the first orchestrator to the second orchestrator.

In various settings, Examples X1-X7 (and other aspects of data-centric orchestration) may be observed or monitored as a result of, defined application programming interfaces, or interface specifications; uses of message formats, telemetry data, or definitions; analytics and testing; and other uses of policies and logic for orchestration within an edge computing environment. Examples X1-X7 and other aspects of these orchestration techniques may also be observed or implemented as a result of service operations and service functions (e.g., for cloudlets offered as services in FaaS or EaaS settings). Additionally, the methods of examples X1-X7 may be provided in the edge computing system as implemented instructions (e.g., with a machine-readable medium which performs the method when the instructions are executed) or as implemented hardware configurations (e.g., with an apparatus that includes a configuration to perform or accomplish the method).

Secure Backend Data Sharing Examples

As discussed above, edge computing nodes in an edge computing system (e.g., edge cloud 110, and the edge computing system configurations depicted in FIGS. 3 to 22D) may be configured to operate a cloudlet (or edgelet), with a cloudlet being adapted to provide compute resources at the edge in service of highly interactive mobile applications. In an example, cloudlets serve as a middle tier in a three-tier hierarchy where the lowest tier is the end device, then the cloudlet, and then the cloud at the highest level of the hierarchy. Generally, as a mobile device moves, the computational backend may also move by transferring a workload from a cloudlet at a first base station to another cloudlet that may be at a second base station (e.g., for better locality). In this scenario, the cloud-based, next tier backend may remain and support less latency sensitive, but more compute intensive, tasks. Cloudlets thus absorb computationally demanding tasks without causing latency due to communication and consolidated scheduling typical of a traditional cloud. It is frequently the case that a virtual machine (VM) or a container that is in the cloudlet serving a mobile application will be migrated to another cloudlet at a next base station when a mobile device moves from the first to the second base station.

Workload (e.g., task, applications, service, virtual machine, container, etc.) migration from one base station to another generally involves transferring data (e.g., state) between base stations. Migration data transfers may not always occur over a private communication channel (e.g., a channel controlled or secured by the operator of the cloudlet). In these cases, it is typical to use encryption to secure the data (e.g., via a secure socket layer (SSL) tunnel or the like).

Some workloads have a large static data footprint but a much smaller dynamic data footprint. In these cases, the pattern of data accesses in the dynamic data may not be known ahead of time. These conditions may lead to latency challenges. For example, if data is transferred in bulk, all of the data must be secured (e.g., encrypted and decrypted) during the migration. This may result in significant processing and time overhead for the migration as some, or much, of the data is not needed for the migrated workload to continue even though it is probably more efficient to perform the encryption on the entirety of the data. However, if the data is transferred piecemeal, on demand, then each transfer incurs the additional latency of encrypting and decrypting, although it may result in a much smaller total transfer if the data is not needed to continue the migrated workload processing at the new base station. Although, in some infrastructures, data encryption and decryption may be offloaded to specialized hardware (e.g., in a network interface controller (NIC)), such dedicated encryption hardware is not universally available because a provider may avoid expensive hardware to save costs. This may be exacerbated when the additional hardware raises the cost or power requirements in a cloudlet infrastructure. Also, many providers may not employ specialized decryption circuitry because network protocols that are employed for communication and encryption may change over time and using a particular hardware-based encryption scheme may interfere with timely adoption of new protocols.

An additional complication that may occur involves the circumstance where the data to be moved is itself in an encrypted state in storage on the first cloudlet. This is an increasing trend as edge locations are often more vulnerable to data theft attempts if it is stored in the clear (e.g., non-encrypted). This is not generally a concern in traditional data centers where the physical devices are secured. Thus, the overhead of transferring data may be compounded by the need to decrypt and encrypt at the storage interface with a key (e.g., for storage). Thus, there may be excessive encryption to address both storage security as wells as transfer security.

To address the excessive overhead that may occur in the scenarios noted above, workload data is encrypted for storage and not then re-encrypted for network transfer. The double encryption is not necessary, and essentially a result of the storage and network aspects of cloudlets not coordinating their efforts. In an example, the trajectory of workloads are measured in order to distributed storage encryption keys to cloudlets likely to migration targets for the workload. In an example, data (e.g., dynamic data) is also measured to determine "hot spots." Here, hot spot refers to data that is often referenced during workload execution. Just-in-time compiler techniques may be used to identify the hot spots. Once identified, hotspots may be proactively transmitted to likely migration target cloudlets. In an example, the data is pre-decrypted at the target cloudlet to further reduce latencies.

This solution may involve several interesting aspects. First, in an example, transmitted data is encrypted for storage instead of using a second encryption-decryption operation for the network transmission. Second, in an example, encryption keys (e.g., used for data storage) are shared securely among sharers of data. Third, in an example, hot subsections of data and indicators that help predict which hot data will most likely be referenced in near future are identified. This data may be proactively moved or decrypted, reducing latency. Fourth, in an example, the cloudlet platform employs an encrypted memory (e.g., working memory as opposed to storage) technique, such as multi-key total memory encryption. This may avoid having to transform (e.g., encrypt or decrypt) the data when being transferred from block storage (e.g., disk) to working memory. Fifth, in an example, functions that are data intensive are moved to the data, rather than moving the data to the function. Here, the latency of a possibly long-distance remote procedure call to the cloudlet having the data is less than having to transfer the data to a more local cloudlet.

These features lead to several benefits. For example, SSL tunnels, or the like, are avoided, reducing connection latencies. Further, data-at-rest protection is leveraged for secure inter-node communications. Again, this reduces the latency of the interaction between cloudlets without sacrificing security.

Figure 62:
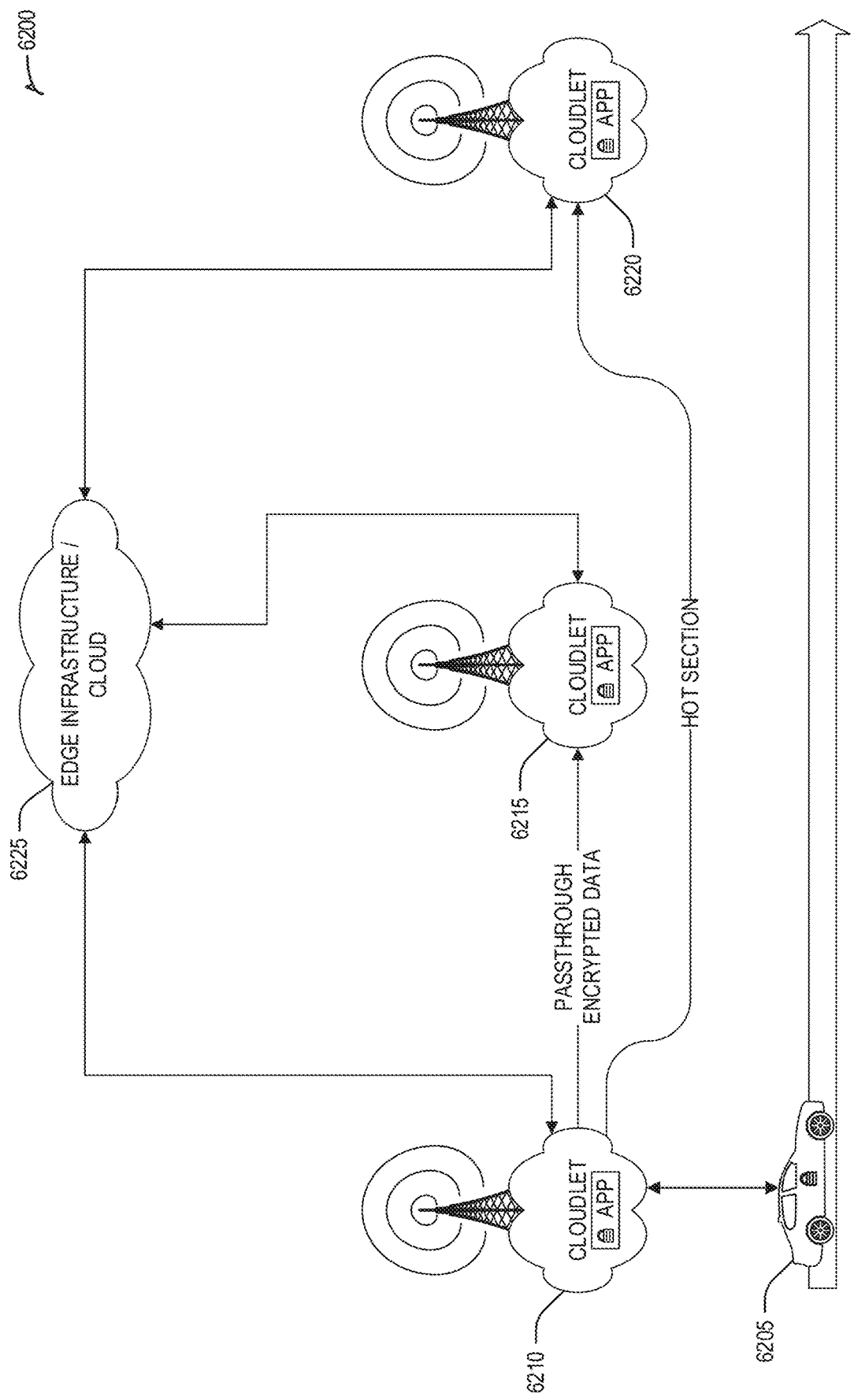
FIG. 62 illustrates an example of moving an edge workload to multiple forward edge workloads based on the workload component types.

FIG. 62 illustrates an example scenario 6200 of moving a cloudlet workload to multiple forward cloudlets (e.g., the cloudlet 6215 or the cloudlet 6220) based on the workload component types. As illustrated, the mobile device 6205 has a workload at the cloudlet 6210 and has a trajectory that will carry the mobile device 6205 to the forward cloudlets 6215 and 6220. Ultimately, these cloudlets 6210, 6215, and 6220 are backed by the cloud 6225.

As noted above, the illustrated system achieves reduced latencies while securely migrating workloads between cloudlets. Thus, several actions are performed by the cloudlet 6210, upon which the workload is currently executing, to facilitate the secure migration. To this end, the cloudlet 6210 is configured to maintain the workload data in an encrypted form on local storage. In an example, this encryption discipline is carried over to working memory for the cloudlet 6210. Thus, in this example, the data is only ever unencrypted when transmitted from working memory (e.g., random access memory (RAM) or cache supporting the resident processors) to the processors (e.g., among the processing resources depicted in FIGS. 21A-22D). To facilitate maintaining local encryption of the workload data, the cloudlet 6210 may implement an interface for exchanging memory encryption keys used for hardware-implemented in-memory encryption-decryption, such that these same keys may be used for maintaining the data encrypted at rest in block storage. This sharing makes it unnecessary to perform any software directed pre-encryption or pre-decryption over data.

The cloudlet 6210 is configured to transmit the data for the workload via a non-encrypted—but possibly message integrity protected—channel to the cloudlets 6215 or 6220. This eliminates encryption and decryption overhead. Because the data is encrypted when in local storage, there is no need to produce an additional encrypted tunnel. Because encryption or decryption may be an intensive operation, eliminating this aspect of the inter-cloudlet communication may result in significant resource savings. In an example, the data is protected from being maliciously altered in transit by sending a hash (e.g., signature) that reveals any attempt to alter the data. The hash may be pre-computed and at block granularity over the original (e.g., unencrypted, plaintext, etc.) contents, so that it is both more efficient to compute a second level hash over the block hashes that are being sent, or more tamper resistant because any intermediary has to reverse engineer both the hash and the encryption in order to tamper.

In an example, the cloudlet 6210 is configured to share storage security keys (e.g., keys used to encrypt or decrypt the workload data in local storage) among cloudlets (e.g., forward cloudlet 6215 or cloudlet 6220). This enables these cloudlets to access the data in the storage-encrypted format that will be transmitted during workload migration. In an example, the key transfer technique operates via an architecture with provisions for ensuring that storage security keys are shared and updated through an edge-wide, strongly protected key-value store (e.g., a trusted execution environment (TEE)).

In an example, the cloudlet 6210 is configured to analyze components of the workload to identify which elements of data to pre-transmit, pre-request, or pre-cache at various cloudlets. This analysis may mirror that of JIT compilers, identifying hot-spots, data types, or execution types that are frequently used in the workload. Here, however, instead of compiling code sections, the cloudlet 6210 proactively transfers these components. In an example, these components may be proactively decrypted (e.g., in memory) to further reduce latencies.

To further explore the typing of workload components, one may consider a division between small dynamic and static footprints in workloads. Those operations that are compute intensive but have a small dynamic data footprint (e.g., computations that require more processor work but do not require a lot of aggregate data to be accessed) are performed in the destination cloudlet when the workload (e.g., VMs or containers) migrate from the cloudlet 6210 to a destination cloudlet (e.g., the cloudlet 6215). Yet, those computations that work on a large amount of data (e.g., either because their access patterns are random, and where the bytes/OP ratio is very high) are handled back at the source. Thus, if the workload migrated to the cloudlet 6215, the data intensive operation is maintained at the cloudlet 6210 along with the data. If that component is called (e.g., referenced) on the cloudlet 6215, a remote procedure call, or the like, is made back to the cloudlet 6210 to get the result. Thus, in an example, datasets that are accessed frequently are not moved much, which saves both bandwidth and latency.

With respect to securely sharing and using encryption keys, two aspects may emerge, sharing the keys locally (e.g., between working memory and storage), and between cloudlets. Securing sharing, in general, involves sharing the keys such that the encryption keys are never directly revealed to those who share in their use for transforming data. This may be accomplished by keeping encryption keys over distributed blocks of named data in a replicated key value store. The encryption keys may be wrapped (e.g., signed and encrypted) by the credentials of their owners. When a sending owner needs to share some data with a receiving party, the sending owner provides a signed token to the receiving party. The signed token enables the receiving party to retrieve the wrapped keys from the key value store, decrypt the keys, and install them in their hardware memory encryption key sets, for example. This decryption and install may be performed by a system service, by a secure enclave (e.g., TEE), or by a hardware instruction. These avenues may have different security strengths, but not an appreciable performance difference between them.

This organization of elements to secure the keys is one of several configurations that may be used. Other possibilities may include strong mutual authentication based secure channels among entities to transfer encryption keys to one another. Generally, these transfers are small and therefore are not computationally expensive because data is not being encrypted, rather just the key that protects the data is encrypted. For example, the nodes (e.g., cloudlets) that implement a replicated key-value store may be connected to each other and to the cloudlets by SSL channels for transferring encryption keys to one another or for completing their installation into memory encryption capabilities through secure system runtimes.

The features above may be integrated into an operations flow such as that which follows. When one cloudlet (e.g., the cloudlet 6210) begins the process of migrating a workload (e.g., container or a VM) to another cloudlet (e.g., the cloudlet 6215), the cloudlet 6210 sends the keys, or wrapped keys, to the second cloudlet 6215, which are then installed at the destination cloudlet 6215.

A prediction engine may be invoked to evaluate a heat-map or a past history-based predictor to begin requesting the transfer of those blocks of data in the workload that are most likely to be touched in the course of execution. Recent history of data accesses at the source cloudlet and long-term popularity (e.g., the heatmap) over data are two techniques that may be employed to determine which content may be streamed to the destination. Depending on the level of security needed by the data, blocks may be encrypted using more or less strong (or different) encryption schemes.

The destination cloudlet 6215 may then pre-decrypt the data using the shared storage keys, choose to wait until a data access request for the data occurs), or rely on a memory encryption system decryption (if available).

The destination cloudlet 6215 maintains an indicator to track when it does not have all of the data locally cached for the workload it is executing. The destination cloudlet 6215 therefore consults, for each task that it may be about to perform, whether that task is identified as high in its bytes-per-operation metric. If it is, then it may choose to send a remote execution message to the origin cloudlet 6210 instead of requesting the origin cloudlet 6210 to send the data that is needed for executing such a task.

If the bytes-per-operation metric is small (e.g., smaller than a threshold), then the destination cloudlet 6215 requests the needed data-unless the data has already arrived as a result of a prior prediction based prefetch or a pre-send. In an example, some or all of these operations may be implemented through data sidecars, which transparently predict and move data proactively or on demand, and decrypt or encrypt data proactively if so needed. Here, a data sidecar extends a communication proxy to include the tasks of predicting and migrating storage based encrypted data from source to destination. The data sidecar may also transparently execute a function at the other (e.g., remote) end if the function is data intensive, instead of executing function at a local end and requesting the data that it needs, to be brought in.

A first example method (Example Y1) for implementing secure backend data sharing in an edge computing environment (e.g., edge cloud 110, and implementing systems and devices is a method performed using processing circuitry (implemented on or by node or device 2200, 2232, 2240, or 2250), the method comprising: encrypting data, to create encrypted data, for a workload in a local data store in a source cloudlet; transfer keys for the encrypted data to a destination cloudlet from the source cloudlet; receive a workload migration indication: transmit, in response to the workload migration indication, the encrypted data over an unsecure channel to the destination cloudlet.

In a second example (Example Y2), the subject matter of Example Y1 includes, a configuration where the encrypted data is transferred to working memory from the local data store as encrypted data.

In a third example (Example Y3), the subject matter of Example Y2 includes, a configuration where the source cloudlet uses a total memory encryption circuitry to decrypt the encrypted data when the data is transferred to the processor from the working memory.

In a fourth example (Example Y4), the subject matter of Examples Y1-Y3 includes, a configuration where a portion of the encrypted data is not transferred as part of the workload migration, the portion determined by profiling data use by the workload.

In a fifth example (Example Y5), the subject matter of Examples Y1-Y4 includes the cloudlet configured according to Examples X1-X7 and accompanying data-centric orchestration examples.

In various settings, Examples Y1-Y4 (and other aspects of secure data sharing) may be observed or monitored as a result of, defined application programming interfaces, or cloudlet interface specifications; uses of data communication formats or definitions; and other uses of policies and logic for data communication and management within an edge computing environment. Examples Y1-Y4 and other aspects of data sharing may also be observed or implemented as a result of coordinated service operations and service function environments (e.g., for data sharing among or within services in FaaS or EaaS settings). Additionally, the methods of examples Y1-Y4 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples Y1-Y4 (and other features of data sharing management and operations) may be combined with any of the other Examples herein to configure an edge cluster or edge cloud system, as coordinated or designed by a system orchestrator or architect.

Democratization of Edge Telemetry Examples

One of the challenges in a distributed architecture is how to use telemetry on a distributed edge architecture that may be accessed by tenants at any time. Such telemetry may be generated with respect to the services the tenants have in a distributed edge architecture, with considerable variation in how that telemetry is actually attested and validated where it comes from.

The systems and methods described herein use a distributed (but coordinated) telemetry architecture in an edge computing system (e.g., edge cloud 110, and the edge computing system configurations depicted in FIGS. 3 to 22D) where edge platforms may publish telemetry for edge services in a certified way. Edge tenants may access, discover, or add monitors to their services distributed across the architecture. The tenants may validate how and when telemetry is generated. The telemetry described below is edge-aware and coordinated.

Figure 63:
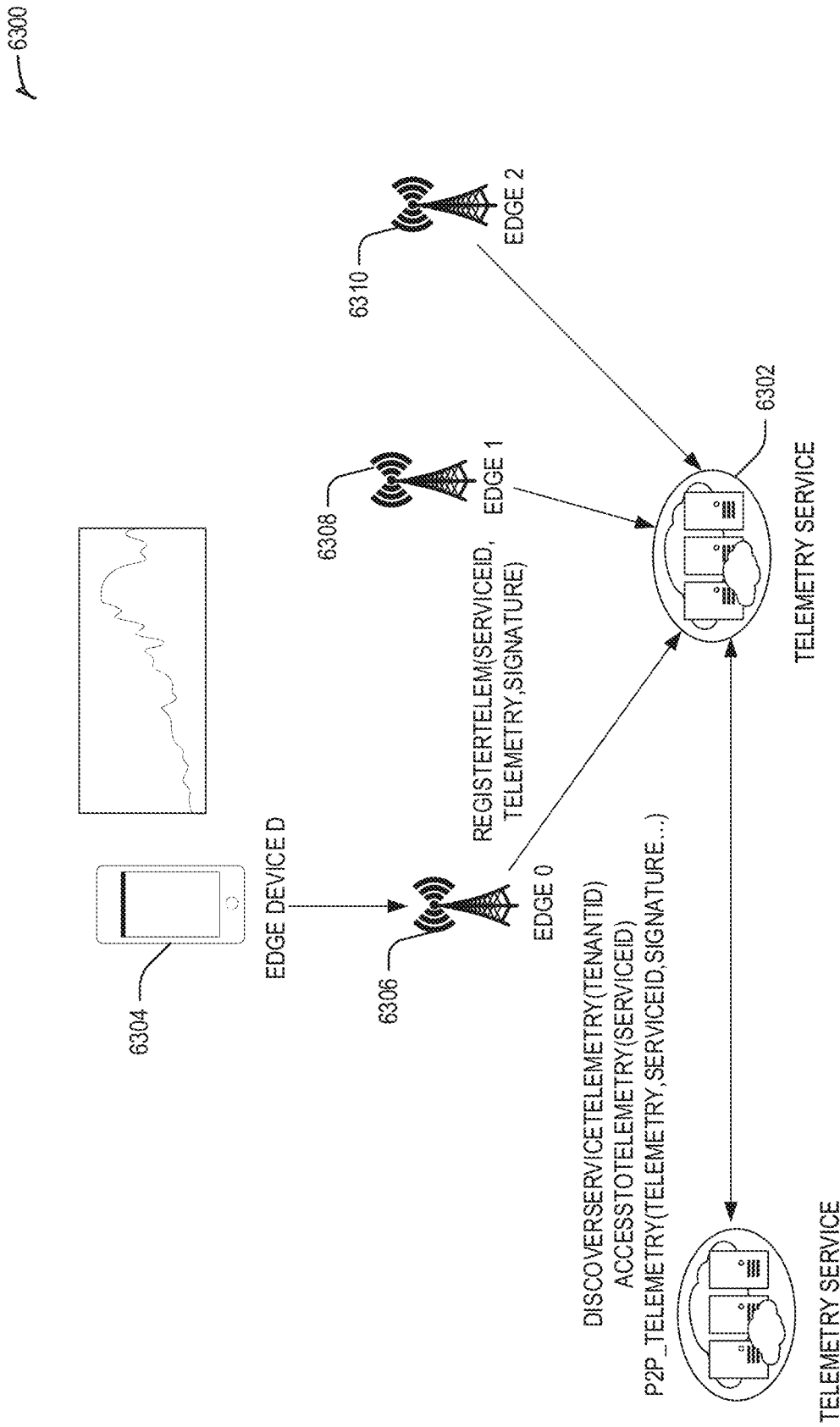
FIG. 63 illustrates a system diagram for coordinated, distributed, edge telemetry services.

FIG. 63 illustrates a system 6300 for distributed telemetry in a coordinated edge system. The edge system of system diagram 6300 may be any edge system as described herein.

The edge system includes a telemetry service 6302 to receive data from a plurality of edge nodes 6306, 6308, 6310, platforms, services, sensors, devices (e.g., device 6304), other telemetry services, etc. The telemetry service 6302 in an example may be run on an edge node 6306, 6308, 6310 of the edge system. The telemetry service 6302 receives telemetry data that may be stored on an edge node 6306, 6308, 6310. Storage of telemetry data may be distributed across edge nodes 6306, 6308, 6310. For example, a portion of edge nodes 6306, 6308, 6310 within the edge system may act as telemetry data storage nodes. Further, such telemetry data may include aspects of multi-tenant and multi-user information, with data being organized or indexed according such multi-tenant and multi-user properties.

The set of distributed edge nodes 6306, 6308, 6310 in the edge system may be coordinated edge telemetry instances where each distributed edge platform may publish telemetry associated to the respective services running in the platform. A set of different edge locations (e.g., 10 base stations, all base stations within a same region, etc.) may have a telemetry service associated to each of those base stations and any devices connected to the base stations.

An edge appliance may send telemetry from a platform for a particular service (such as LLC misses, memory BW, tenant service data, metadata, metrics relevant for the service, etc.). The telemetry may be signed with the local certificate of the platform (or, with a platform certificate and tenant certificate, if telemetry is created for tenant instance by an orchestrator or similar entity). The telemetry may be signed by an instance of the service validating the telemetry, in an example. A service may send service telemetry (such as txt/s to the telemetry service or the edge node).

In an example, a tenant may access a telemetry service that is registered to the edge telemetry services. For example, the tenant may discover what services are being monitored by a particular edge telemetry service (e.g., by sending a discovery request to the edge node 6306, 6308, 6310 maintaining the particular edge telemetry service). Through the monitoring service, the tenant may also discover host information by other edge appliances for other telemetry services. The monitoring service may register telemetry to other services.

Tenants may attest a telemetry signature based on the platform certificate (e.g., platform generating the telemetry). In an example, a tenant may attest the telemetry signature using a service-signature for the telemetry data. In another example, a service may validate the telemetry in response to a tenant query.

From a security context, telemetry services and edge hosting environments may serve as LSM enforcement points. Edge devices can also serve as an LSM enforcement point (such as in a case presuming that the user cannot tamper with LSM). There may be a bifurcation of LSM enforcement where Edge infrastructure LSMs are protected from Device user tampering and device user LSMs are protected from Edge infrastructure manipulation.

In a further example, a technique for distributed edge telemetry access or storage may include a method or sequence of operations. The technique includes a first operation to receive, at an edge node, telemetry data from a plurality of platforms, the telemetry data signed with a local certificate of respective platforms of the plurality of platforms. In an example, at least some of the telemetry data is received from another edge node 6306, 6308, 6310. The edge node 6306, 6308, 6310 may be one of a plurality of distributed edge nodes for a region.

The technique further includes an operation to store the telemetry data at the edge node. The technique further includes an operation to receive a request from a tenant device for a portion of the telemetry data corresponding to a service. In an example, the portion of the telemetry data corresponding to the service is signed by the service. In an example, the request may include an https request to a telemetry service system. The request may be sent to a cloud server where a signature from tenant device may be validated to allow access.

The technique also includes an operation to send, from the edge node 6306, 6308, 6310 to the tenant device (e.g., device 6304), the portion of the telemetry data corresponding to the service, including a corresponding local certificate. In an example, before sending the portion of the telemetry data, the edge node may verify that the tenant device is properly credentialed to access the portion of the telemetry data. In an example, the response to the tenant device may include a JSON response.

The technique may include an operation to execute an edge telemetry service 6302 at the edge node 6306, 6308, 6310 to receive or manage the telemetry data. The technique may include an operation to receive, from the tenant device (e.g., 6304), a discovery request for services monitored by the edge node 6306, 6308, 6310. In response, the edge node 6306, 6308, 6310 may send a list of services monitored by the edge node 6306, 6308, 6310. The technique may include an operation to receive service telemetry data from the service 6302.

A first example method (Example Z1) for implementing edge telemetry democratization in an edge computing system (e.g., edge cloud 110, and implementing systems and devices) is a method performed using processing circuitry, the method performed by processing and communication circuitry (implemented on or by node or device 2200, 2232, 2240, or 2250) comprising: receiving, at an edge node, telemetry data from a plurality of platforms, the telemetry data signed with a local certificate of respective platforms of the plurality of platforms; storing the telemetry data at the edge node; receiving a request from a tenant device for a portion of the telemetry data corresponding to a service; and sending, from the edge node to the tenant device, the portion of the telemetry data corresponding to the service, including a corresponding local certificate.

In a second example (Example Z2), the subject matter of Example Z1 includes, running an edge telemetry service at the edge node to receive the telemetry data.

In a third example (Example Z3), the subject matter of Examples Z1-Z2 includes, receiving, from the tenant device, a discovery request for services monitored by the edge node, and in response, sending a list of services monitored by the edge node.

In a fourth example (Example Z4), the subject matter of Examples Z1-Z3 includes, a configuration where the portion of the telemetry data corresponding to the service is signed by the service.

In a fifth example (Example Z5), the subject matter of Examples Z1-Z4 includes, receiving service telemetry data from the service.

In a sixth example (Example Z6), the subject matter of Examples Z1-Z5 includes, a configuration where at least some of the telemetry data is received from another edge node.

In a seventh example (Example Z7), the subject matter of Examples Z1-Z6 includes, a configuration where the edge node is one of a plurality of distributed edge nodes for a region.

In various settings, Examples Z1-Z7 (and other aspects of edge telemetry coordination) may be observed or monitored as a result of, defined application programming interfaces, or interface specifications; uses of telemetry data formats, messaging, or definitions; and other uses and implementations of policies and logic for collecting and communicating telemetry data within an edge computing environment. Examples Z1-Z7 and other aspects of these edge telemetry uses may also be observed or implemented as a result of service operations and service functions (e.g., for telemetry generated in connection with services provided in FaaS or EaaS settings). Additionally, the methods of examples Z1-Z7 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples Z1-Z7 (and other features of edge telemetry collection and use examples) may be combined with any of the other Examples herein to configure an edge cluster or edge cloud system, as coordinated or designed by a system orchestrator or architect.

Orchestrated Load Balancing Examples

Typical load-balancing approaches in enterprise/data-center clouds generally attempt to distribute work to ensure even processor utilization within constraints such as available power, available I/O or memory bandwidths, etc. In a data-center cloud, staging of latency-critical or high QoS workloads may also be performed within dedicated parts of infrastructure. These approaches are not generally available to edge cloud infrastructures—not only may the edge cloud have relatively basic resources, but the edge cloud may face a much more complex and time-varying demand profile. Edge cloud systems also are likely to receive a highly variable, and generally non-predictable, incoming work stream—having a high variety and high range of incoming request rates, wide variation in latency or jitter tolerance, and high variation in expected sensitivity of their consumer bases to agility of service.

Limited types of load balancing schemes have attempted hierarchical load balancing, but with the use of pure software management. The following examples provide additional approaches for utilizing an edge computing system to implement QoS policies across multiple edge nodes, while enacting aspects of load balancing within hardware controls. Such types of hierarchical load balancing and management may assist to reduce orchestration overhead and increase throughput of edge processing systems.

The following load balancing schemes specifically improve the use of resources within infrastructure components of edge computing systems (e.g., edge cloud 110, and the edge computing system configurations depicted in FIGS. 3 to 22D) to balance considerations of moving compute resources to the data, or moving the data to the compute resources. These schemes may simplify the resource allocation problem by making edge cloud infrastructures themselves malleable, through time-varying and adaptive specialization of low-level resource management. This specialization can allow simpler, request stream adaptive resourcing postures at the platform level, and thus allow load-balancers to simplify their decisions through a divide and conquer approach.

With the following load balancing approaches, each cloudlet or other edge workload may be adapted for processing at a given time, and specialized for a particular mode of operation, even as an edge computing node can adapt the mode of operation as the overall mix of workload requests changes. Thus, a cloudlet or other edge workload at one time can be adapted for high throughput with moderate drop-percentage; at another time, the workload can be configured for higher security and confidentiality, with low drop-percentage; and so on. The edge cloud may change an overall service posture by changing how many cloudlets or workloads are configured for which objective. This means that variable numbers of nodes or cloudlets at those nodes are specialized for handling certain dominant parts of the request population with high efficiency; even when some resources are specialized, the nodes remain assignable to other request types (at a slightly lower efficiency) so that overall the total service capacity does not fragment into uneven islands of services.

In an example, an edge gateway (or an edge cloudlet node, other compute execution node) operates in one of multiple modes. These modes may include, for instance, a standard mode "S", a throughput-optimized mode "T", a low-latency and low-jitter mode "L", and the like. For instance, in this scenario, the following definitions for each mode may be established:

"S" Standard Mode: Maximize throughput, subject to 95-percentile latency<=N ns.

"T" Throughput Mode: Maximize throughput, subject to 80-percentile latency<=N ns, and 95-percentile latency<=5 N ns.

"L" Low Latency/Jitter Mode: Maximize throughput, subject to median latency<=N/10 ns, 95-percentile latency<=N ns, and 99-percentile latency<=2 N ns.

"X" High Security Mode: Maximize throughput for white-listed workloads, subject to a median latency for white-listed workloads to be under N ns.

Accordingly, with use of each mode definition, the resources of the edge computing system can be managed for speed, versus being managed for throughput, security, etc. as higher priority objectives. The use of these definitions assists to achieve resonance, to enable multiple edge processing systems to coordinate towards similar goals, rather than only respond to packet-by-packet or flow-by-flow reprioritizations alone.

In further examples, reinforced deep learning may be used, to ensure that the proper parameters (and their optimization function) are used for the respective workloads.

Figure 64:
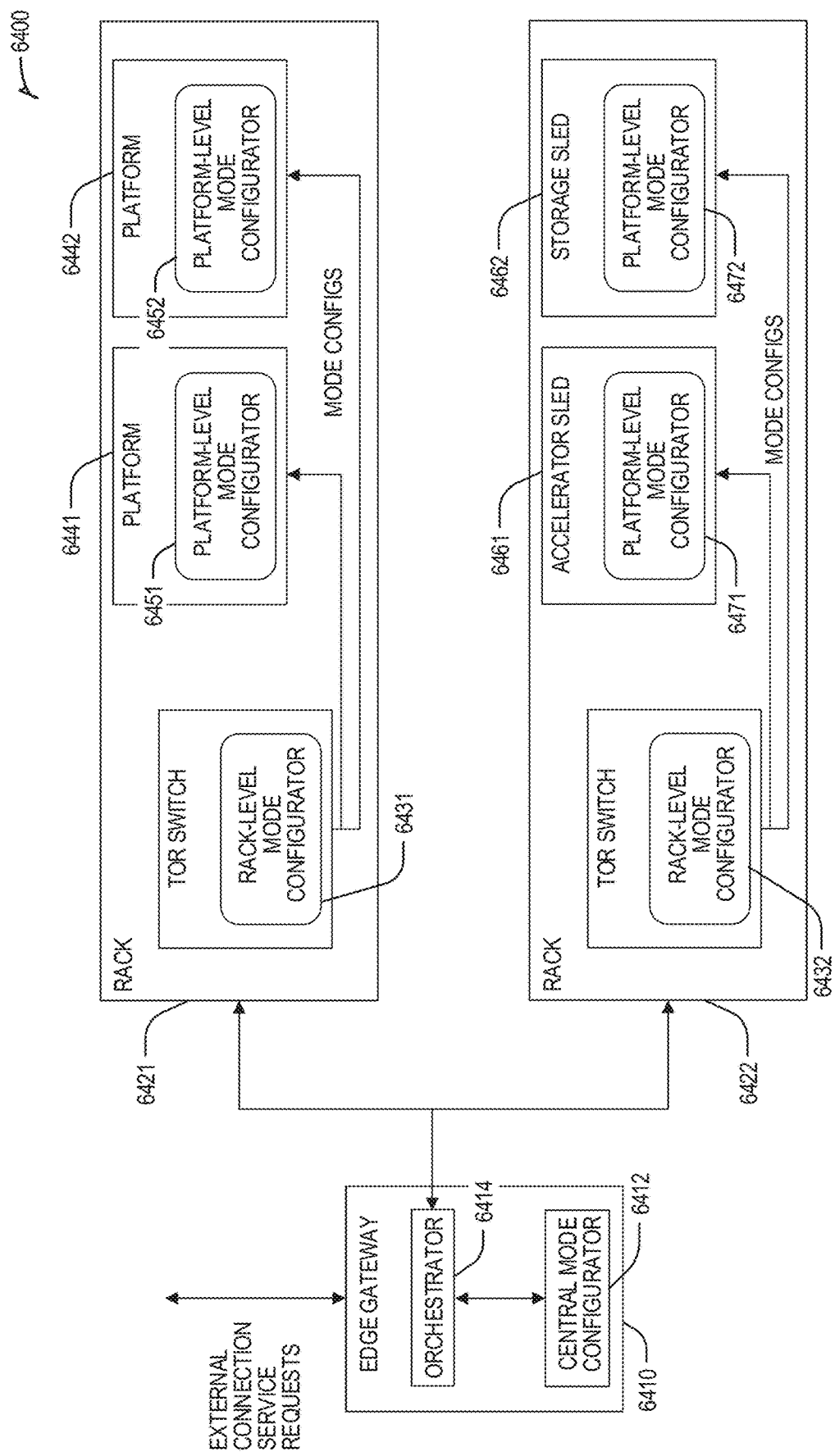
FIG. 64 illustrates an implementation of configurators among distributed systems, adapted to implement load balancing within an edge computing system.

FIG. 64 illustrates an implementation of the above approaches in an edge computing system 6400 with different levels of configurators 6431, 6432, 6451, 6452, 6471, 6472 (at racks 6421, 6422, platforms 6441, 6442, sleds 6461, 6462, and orchestrator 6414) that together coordinate to setup configurations in the respective compute platforms according to the chosen mode. The orchestrator 6414 is coupled to a mode configurator 6412 (at edge gateway 6410) which is responsible for identifying the required mode (based on factors mentioned above) and then propagating the mode to the system resources among the racks 6421, 6422 and rack components. The respective top-of-rack (TOR) switches include a mode configurator (6431, 6432), which may perform required changes at higher granularities (such as accelerator association/disassociation), while the platform level mode configurators (6431, 6432, 6451, 6452) may perform the lower granularity actions (such as setting of cache allocation parameters and core bindings).

In an example, the modes (such as those listed above) may be represented as a set of configurations that span in the ranges of different granularities. For example: (Configuration 1) Association/disassociation of multiple FPGAs to/from compute nodes, impacts the service density in a platform, and is applicable in configurable edge cloud infrastructures (such as involving rack scale design or configuration); (Configuration 2) Amount of cores consumed by a service in a platform and changing the number of instances of the service, as more instances of the service with lower cores being allocated per service aims at higher throughput at the cost of higher latency (high throughput mode) while less instances with more cores per instance may favor lower latency (low latency mode); (Configuration 3) Change cache allocation parameters, which impacts the resources available for a service to tune its throughput and latency rates.

The orchestrator 6414 may be configured with the different system configurations that map to a particular mode. The orchestrator 6414 also may use machine learning to predict the windows for switching between the modes which may be based on arrival rates and patterns, historical downstream and upstream information, queue lengths, etc.

In further examples, the dynamic mode-changing may not necessarily be applicable to whole edge cloud system. The edge cloud may be divided into partitions of different modes (e.g., a Standard mode partition, a high throughput mode partition, etc.) and resources may be malleably migrated to these partitions from a common pool of resources. Thereby, different percentages of the edge cloud may be in different modes. Also, in some cases, the nodes may be designed to push back certain requests to a common work pool, which cannot be handled with high efficiency in a current mode of operation. This may occur when characteristics become evident during execution and are found to require a recirculation back into a low-level work re-mapper; the low-level re-mapper may perform a round-robin reassignment of such re-mapping towards standard mode cloudlets in the edge infrastructure.

From an implementation perspective, the use of these modes may be implemented using one or multiple of implementation methods. With a first implementation method, the orchestrator is configured with the parameters and system configurations for different modes. When a mode needs to be changed it triggers specific instructions to setup these system configurations. With a second implementation method, each platform is equipped with a "mode awareness" and parameters that map to each mode (with respect to cache allocation, core bindings, etc.). When the orchestrator instructs platform to transform to a specific mode, the platform applies the known parameters and sets up the system.

As apparent from the examples above, edge computing infrastructures are more challenged with respect to sharing—because among other reasons, such systems do not have the full elasticity of large data center clouds. This provides a challenge for edge clouds and service providers to "cloudburst" between edge and interior network processing nodes (deeper in the network). Such processing nodes at interior network locations may, in general, have a much higher cost either in latencies incurred in transferring the data out of the edge, or in dynamic costs (e.g., caused by just in time provisioning as opposed to planned, proactive provisioning at negotiated low rates).

In an example, edge computing system infrastructures may shuffle less performance critical services temporarily into interior network node locations, deeper into the network, while using the edge node locations to proxy such services. This enables the system to free up the limited infrastructure at the edges to handle higher priority demands or higher criticality services that arise suddenly.

Within such an arrangement, edge infrastructures may perform dynamic peer-to-peer shifting and balancing of sudden increases in demand, while identifying lower priority services to cloud-burst into higher layers on a cluster-by-cluster basis. For instance, edge node 1 may shift some work to edge node 2 which is located close to it (on the basis of latency or geographic proximity); edge node 2 in turn shifts some of its work to a nearby CSP to make room for the work shifted into it from edge node 1. Such shifting and adaptation may be performed in the context of ongoing workflows or activities.

In further examples, shifting and adaptation may occur in the context of network slicing and federated edge operations, such as indicated by ETSI MEC system specifications, or other coordinated approaches. Further, in the context of ETSI MEC or other coordinated approaches, a cooperative orchestration framework may be enhanced from an edge-remote cloud resources leasing negotiation model; this, in its turn has implications on billing and charging of services.

A first example method (Example AA1) for implementing edge load balancing schemes in an edge computing system (e.g., edge cloud 110, and implementing systems and devices) is a method performed using processing circuitry (e.g., as implemented on or by node or device 2200, 2232, 2240, or 2250), the method comprising: identifying, at an edge compute node of an edge computing system, a plurality of modes used for load balancing resources within the edge computing system; receiving, at an edge compute node from a mode configurator associated with an orchestrator, an indication of a selected mode from the plurality of modes for load balancing resources; and implementing changes to resource usage at the edge compute node, based on the selected mode for load balancing resources.

In a second example (Example AA2), the subject matter of Example AA1 includes, the indication of the selected mode being received from the orchestrator in a command to switch a configuration of the edge compute node to the selected mode.

In a third example (Example AA3), the subject matter of Examples AA1-AA2 includes, receiving, from the orchestrator, respective parameters and system configurations for the plurality of modes.

In a fourth example (Example AA4), the subject matter of Examples AA1-AA3 includes, the indication of the selected mode being determined from the orchestrator, wherein the orchestrator utilizes machine learning on telemetry data to predict timings for usage among the plurality of modes.

In a fifth example (Example AA5), the subject matter of Examples AA1-4 includes, identifying, at the edge compute node, parameters and system configurations that map to the plurality of modes for operation.

In a sixth example (Example AA6), the subject matter of Examples AA1-AA5 includes, dynamically changing the edge compute node from a previous mode of operation to the selected mode for operation.

In a seventh example (Example AA7), the subject matter of Example AA6 includes, a configuration where based on the dynamic changing, a first portion of the edge computing system is adapted to utilize the selected mode for load balancing resources, and a second portion of the edge computing system is adapted to utilize another mode for load balancing resources.

In an eighth example (Example AA8), the subject matter of Examples AA1-AA7 includes, a configuration where the modes specify variations in one or more of: association or disassociation of accelerators with compute nodes, usage of cores, number of instances offered for a service, or cache allocation parameters.

In a ninth example (Example AA9), the subject matter of Examples AA1-AA8 includes, a configuration where the modes provide respective definitions for throughput according to a defined latency percentile.

In a tenth example (Example AA10), the subject matter of Examples AA1-AA9 includes, a configuration where the load balancing is implemented within the edge compute node based on configuration information identified at: a switch, a platform, a sled, or an orchestrator system.

In an eleventh example (Example AA11), the subject matter of Examples AA1-AA10 includes, performing cooperative priority-based orchestration by shifting workloads among edge nodes and into deeper network layers based on priority of the workloads, whereby resources are freed among accessible edge nodes.

In various settings, Examples AA1-AA11 (and other aspects of orchestrated load balancing) may be observed or monitored as a result of, defined application programming interfaces, or interface specifications; uses of message formats, definitions, or functions; and other uses and implementations of policies and logic for detection and implementation of load balancing within an edge computing environment. Examples AA1-AA11 and other aspects of these load balancing operations may also be observed or implemented as a result of service operations and service functions (e.g., for load balancing of resources among services provided in FaaS or EaaS settings). Additionally, the methods of examples AA1-AA11 may be provided in the edge computing system as implemented instructions (e.g., with a machine-readable medium which performs the method when the instructions are executed) or as implemented hardware configurations (e.g., with an apparatus that includes a configuration to perform or accomplish the method). Thus, features of Examples AA1-AA11 (and other features of load balancing and load orchestration) may be combined with any of the other Examples herein to configure an edge cluster or edge cloud system, as coordinated or designed by a system orchestrator or architect.

VI. Connectivity Use Cases and Configurations for Edge Computing Configurations The following examples provide specific examples relevant to edge computing configurations provided within MEC and 5G network implementations. It will be understood, however, that many other standards and network implementations are applicable to the edge and service management concepts discussed throughout.

Connectivity within Multi-Access Edge Computing (MEC) networks, as well as connectivity between 5G networks and MEC networks, enable the delivery of ultra-responsive service experiences by rapidly processing content at the edge of the network. MEC is acknowledged as one of the key pillars for meeting the demanding Key Performance Indicators (KPIs) of 5G networks, including indicators related to lower latency and increased bandwidth efficiency. However, MEC and 5G connectivity in telecommunications networks are not only a technical enabler for the demanding KPIs, but improving intra-MEC as well as MEC-5G connectivity plays an essential role in the transformation of the telecommunications business, where telecommunications networks are turning into versatile service platforms for industry and other specific customer segments.

From a solution perspective, having a single edge location does not provide the flexibility that is required and does not reflect what can be offered to users in terms of connectivity as well as what solutions and product offerings that can be deployed within different locations within the edge infrastructure.

Defining where the actual edge resides and the connectivity options available for a particular use case or workload is directly related to key performance indicators (KPIs) or value propositions that a particular location provides to it. For example, defining an edge infrastructure for an Internet-of-Things (IoT) or Augmented Reality (AR)/Virtual Reality (VR) workload in the core of the operator infrastructure may not meet its KP requirements in terms of latency. Thus, the edge for this workload may be closer to the device (in the base station or central office). On the other hand, an edge for a content delivery network (CDN) workload can be either base station, central office or any other intermediate point of aggregation (POA or POP) of the operator infrastructure.

Figure 65:
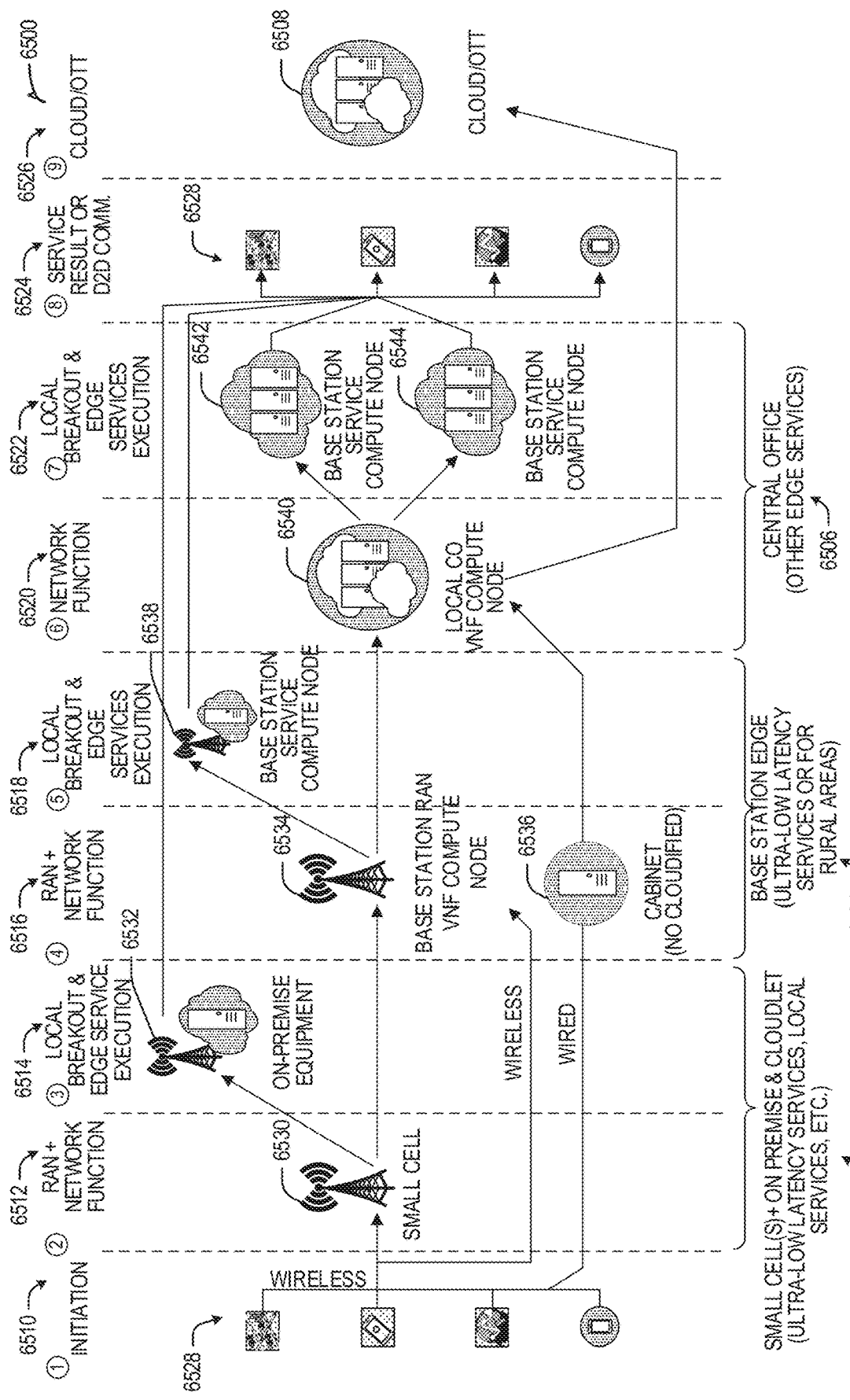
FIG. 65 illustrates example connections among different edge computing nodes.

FIG. 65 illustrates connections between different edge computing nodes in wireless network architecture. Referring to FIG. 65, the network architecture 6500 includes computing devices 6528 (e.g., user devices), edge computing nodes 6530-6544, and a cloud network (or "cloud") 6508. The edge computing nodes 6530-6544 can be subdivided based on the edge layer and function performed by individual nodes. For example, the small cell 6530 and the on-premise equipment (or edgelet/cloudlet) 6532 are associated with the small cell/on-premise edge layer 6502, with the small cell 6530 performing RAN and network functions 6512 and the on-premise equipment 6532 performing local breakout and edge service execution functions 6514. The small cell/on-premise edge layer 6502 can be associated with ultra-low latency services as well as local services. In some aspects, layer 6502 can be an access edge layer.

The base stations 6534, 6538 and the cabinet 6536 are associated with the base station edge layer 6504, with the base station 6534 performing RAN and network functions 6516 and the base station 6538 performing local breakout and edge services execution functions 6518. The base station edge layer 6504 can be associated with ultra-low latency services wireless connectivity services for rural areas or other locations.

In some aspects, the cabinet 6536 can be configured with a wired connection between the computing devices 6528 and the local CO 6540.

In some aspects, the base station 6534 is a VNF compute node configured to manage data plane communications associated with the network function, while the base station 6538 is a service compute node configured to process service related requests routed from the base station 6534. In some aspects, the base station 6534 and 6538 can be co-located at the same antenna tower.

The local central office (CO) 6540 and the base station service computing nodes 6542 and 6544 are associated with the central office layer 6506, with the local CO 6540 performing network functions 6520 and the base station service computing nodes 6542 and 6544 performing local breakout and edge services execution 6522. In some aspects, layer 6504 and layer 6506 can be considered as aggregation edge layers.

The computing devices 6528 are associated with network function initiation 6510 as well as service result delivery or D2D communications 6524. The cloud 6508 is associated with the cloud-related functions 6526, including over-the-top (OTT) media services.

FIG. 65 also shows a technical decomposition of an end-to-end flow from the Edge device to a network node providing the requested service. In some aspects, the edge location (e.g., layers 6502, 6504, 6506) is dependent on the physical media used to connect to the infrastructure. For example, only the wireless device (e.g., one of devices 6528) may have access to the base station location (e.g., 6534) depending on how the infrastructure is managed and connected. However, as the change of infrastructure happens, operators are trending to Fixed Mobile Convergence (FMC), which in the long term may imply that potential edge tiers converge as well for both mobile and fixed type of connections.

Figure 66:
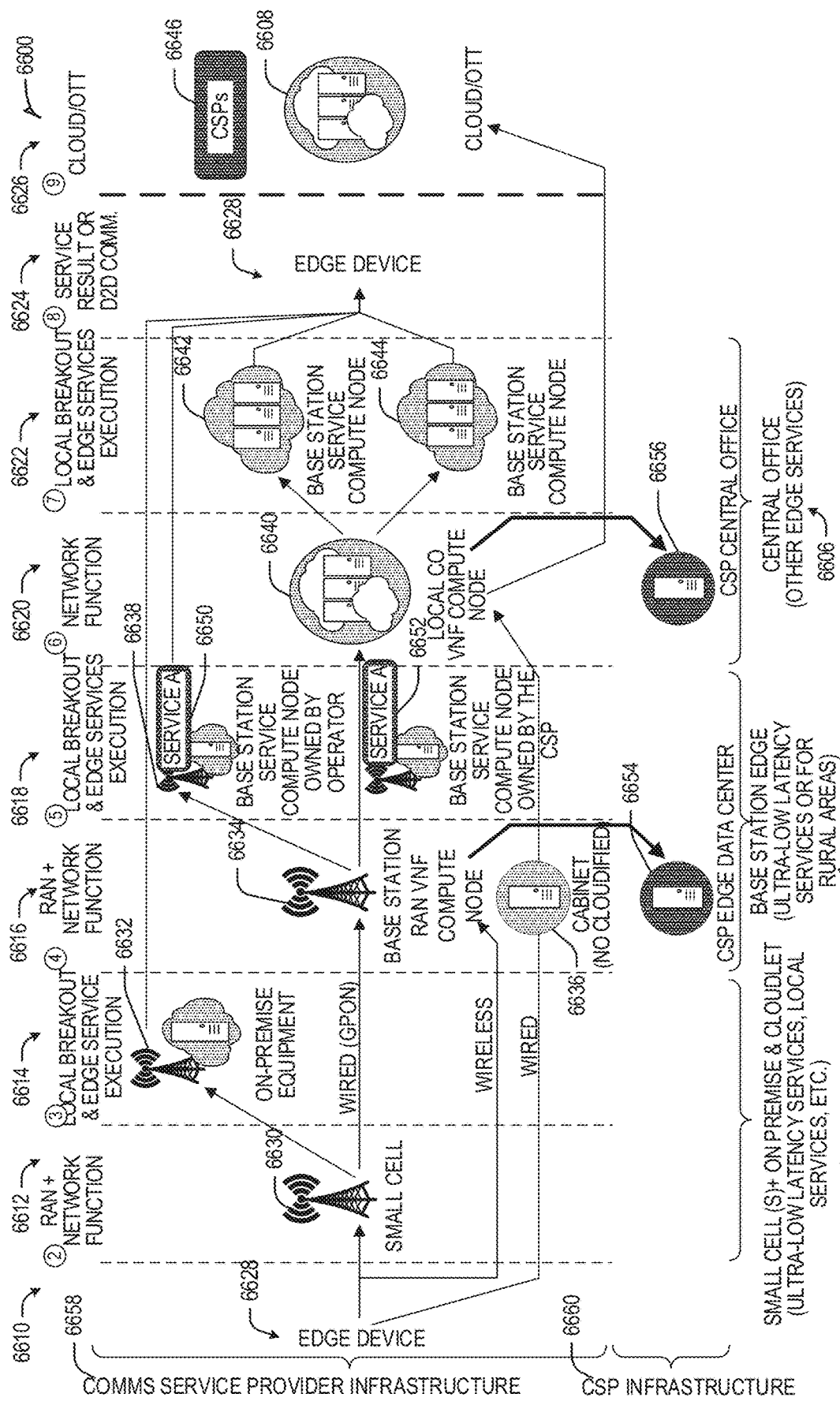
FIG. 66 illustrates an example edge communication interplay between telecommunication service providers (TSPs) and cloud service providers (CSPs).

FIG. 66 illustrates an edge communication interplay between telecommunication service providers (TSP) and cloud service providers (CSPs). Referring to FIG. 66, the network architecture 6600 is similar to the network architecture 6500, except that FIG. 66 further illustrates connectivity between the communication service provider infrastructure 6658 and the cloud service provider infrastructure 6660. FIG. 66 elements referenced as 6602-6644 correspond to elements referenced as 6502-6544 in FIG. 65 respectively.

As illustrated in FIG. 66, the CSP infrastructure 6660 can include one or more network nodes of the CSP 6646 associated with cloud 6608. More specifically, the base station edge layer 6604 can include a CSP edge data center 6654, which can provide cloud functionalities normally offered by cloud 6608 within the base station edge layer 6604, closer to edge devices 6628. In this regard, network traffic that would normally be forwarded from the base station edge layer 6604 of the TSP infrastructure 6658 to the CO edge layer 6606 and the cloud 6608 would be routed to the CSP edge data center 6654 within the base station edge layer 6604, resulting in a faster and more efficient connectivity link.

Similarly, the CO edge layer 6606 can include a CSP CO 6656, which can provide cloud functionalities normally offered by cloud 6608 within the CO edge layer 6606, closer to edge devices 6628. In this regard, network traffic that would normally be forwarded from the CO edge layer 6606 of the TSP infrastructure 6658 to the cloud 6608 would be routed to the CSP CO 6656 within the CO edge layer 6606.

One of the fundamental questions that come with edge cloud once the potential service mapping is done is who is offering those services and who is implementing them. In this context, operators (or TSPs) are willing to own the entire infrastructure (including compute), offer their own services to their own subscribers and potentially rent compute to other service providers (e.g., Google) to run their own software stack. On the other hand, Cloud Service Providers (or CSPs) do not necessarily accept running their software stack (for IP protection, for security and for quality of service) on the hardware provided by the TSPs. In these aspects, CSPs are seeing TSPs as network infrastructure providers only and asking for space in their edge locations to place and run their own black boxes (e.g., closed racks), as illustrated in FIG. 66.

In some aspects and as illustrated in FIG. 66, three potential scenarios can take place with respect to hardware provisioning and service hosting:

(1) A TSP owns the end-to-end network infrastructure including networking and compute resources. In this scenario, the TSP uses its own platforms to run its own services and potentially rent spare platforms to third parties. The TSPs can consider issues related to (1) security: (2) privacy: (3) QoS; and (4) IP protection when designing the network infrastructure. The following three levels of resource renting can occur:
  a. Operator owning the infrastructure divides the compute resources in multiple partitions and each of them is actually rented to another operator. This model can become relevant in those countries where small operators are using infrastructure for tier 1 operators.
  b. The partition (if any) allocated to a particular operator can be divided into three logical partitions (level) at the same type: (1) one partition meant to be rented or third party service providers; (2) one partition meant to be used to execute network functions (such as vBNG or vEPC); (3) one partition meant to be used to host services that the operator is providing to its own customers.
  c. The level 2 partition (if any) can be divided at the same time to multiple partitions meant to be rented to service providers (level 2), such as Amazon or Google. Each of these partitions can be managed and virtually owned by the service provider. For instance, including Amazon Web Services to allow end users running their own services on this partition or including Amazon Green Grass to expose its own services.

(2) The TSP owns the networking infrastructure, data center, and the compute resources that are used to deploy its own network functions and services. CSPs rent their own space in the desired edge location (base station, central office, etc.) and deploys its own compute solution. In this aspect, the TSP facilitates connectivity and infrastructure to the CSP and the CSP can deploy a solution sized and architecture to deploy and secure its services. For some CSPs, this option is more suitable in order to guarantee data privacy, IP protection, and the required performance.

(3) A CSP manages its own data center that is placed or hosted outside the TSP network infrastructure. In this aspect, a particular edge location (e.g., a base station) has a wired direct connection to that particular data center.

Figure 67:
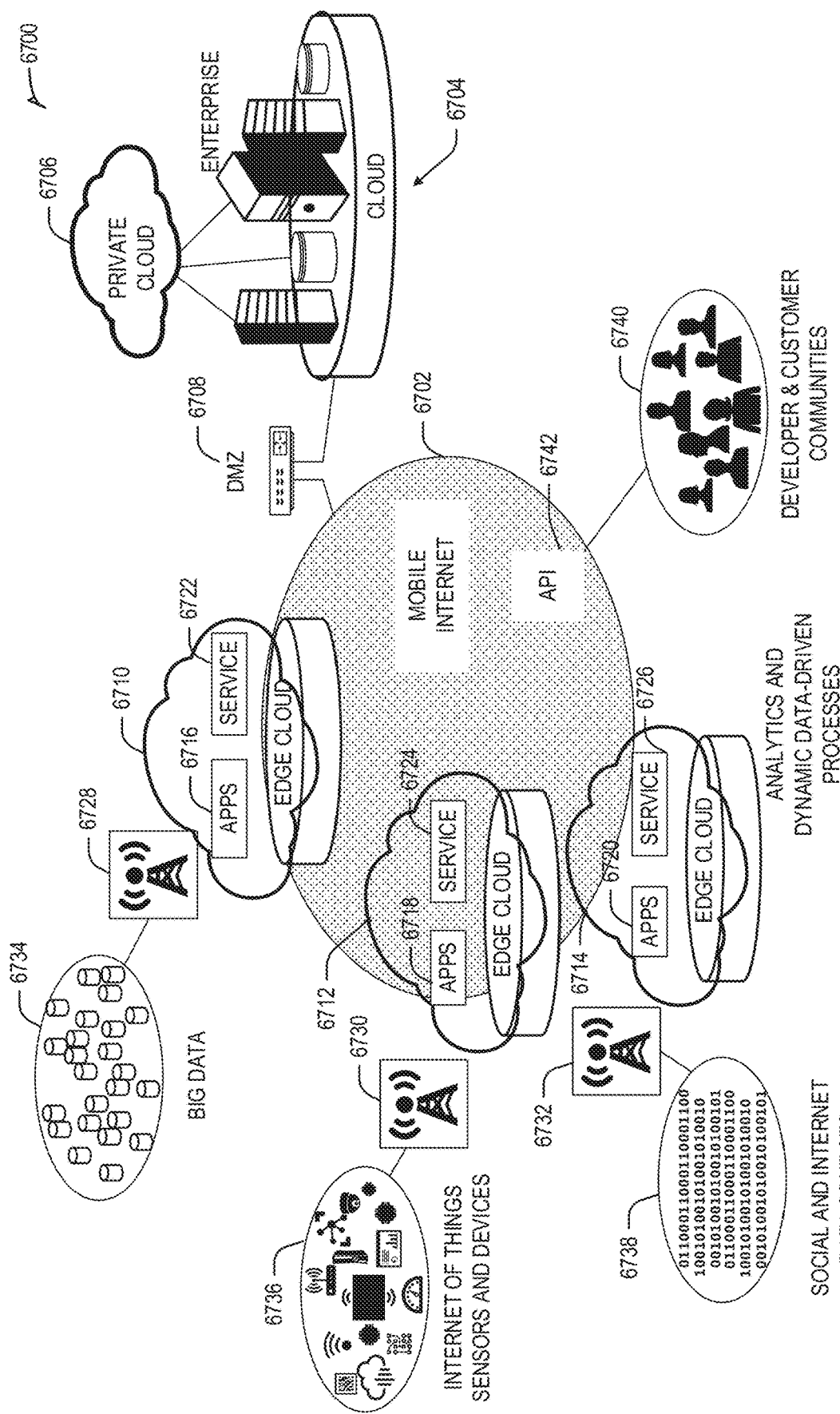
FIG. 67 illustrates a 5G-MEC (multi-access edge computing) interconnection, deployable in an example edge computing system.

FIG. 67 illustrates a 5G-MEC interconnection. Referring to FIG. 67, diagram 6700 illustrates various edge clouds (or edge layers) 6710, 6712, and 6714 which can be all interconnected via a communication network 6702 such as a mobile Internet network. In some aspects, edge computing (and MEC) is access agnostic and communication links can be established between MEC nodes within the edge clouds and other wireless nodes via one or more Radio Access Technologies (RATs), including 3GPP LTE, 5G NR, Wi-Fi, or other RATs, and also covering many verticals like automotive as well as other industrial use cases.

For example, edge cloud 6710 can expose applications 6716 and services 6722 to one or more network nodes associated with big data network 6734 (e.g., provided from a data lake or a data warehouse) via base station 6728. Edge cloud 6712 can expose applications 6718 and services 6724 to one or more IoT sensors and devices 6736 via base station 6730. Edge cloud 6714 can expose applications 6720 and services 6726 to one or more social and Internet data sources 6738 via the base station 6732. In some aspects, base station 6728, 6730, and 6732 can be associated with different RATs, including 5G-NR.

In some aspects, the communication network 6702 can provide an application programming interface (API) 6742 to a developer or customer community 6740 for accessing and configuring applications and services within one or more of the edge clouds 6710-6714.

Network traffic received at the edge clouds 6710-6714 in connection with applications or services running in those clouds can be routed to cloud 6704, or data can be requested from the cloud 6704, via the network demilitarized zone (DMZ) 6708. The DMZ 6708 can be referred to as a perimeter network or a screened subnet, which is a physical or logical subnetwork that adds an additional layer of security to the cloud 6704 as well as the private cloud 6706.

Figure 68:
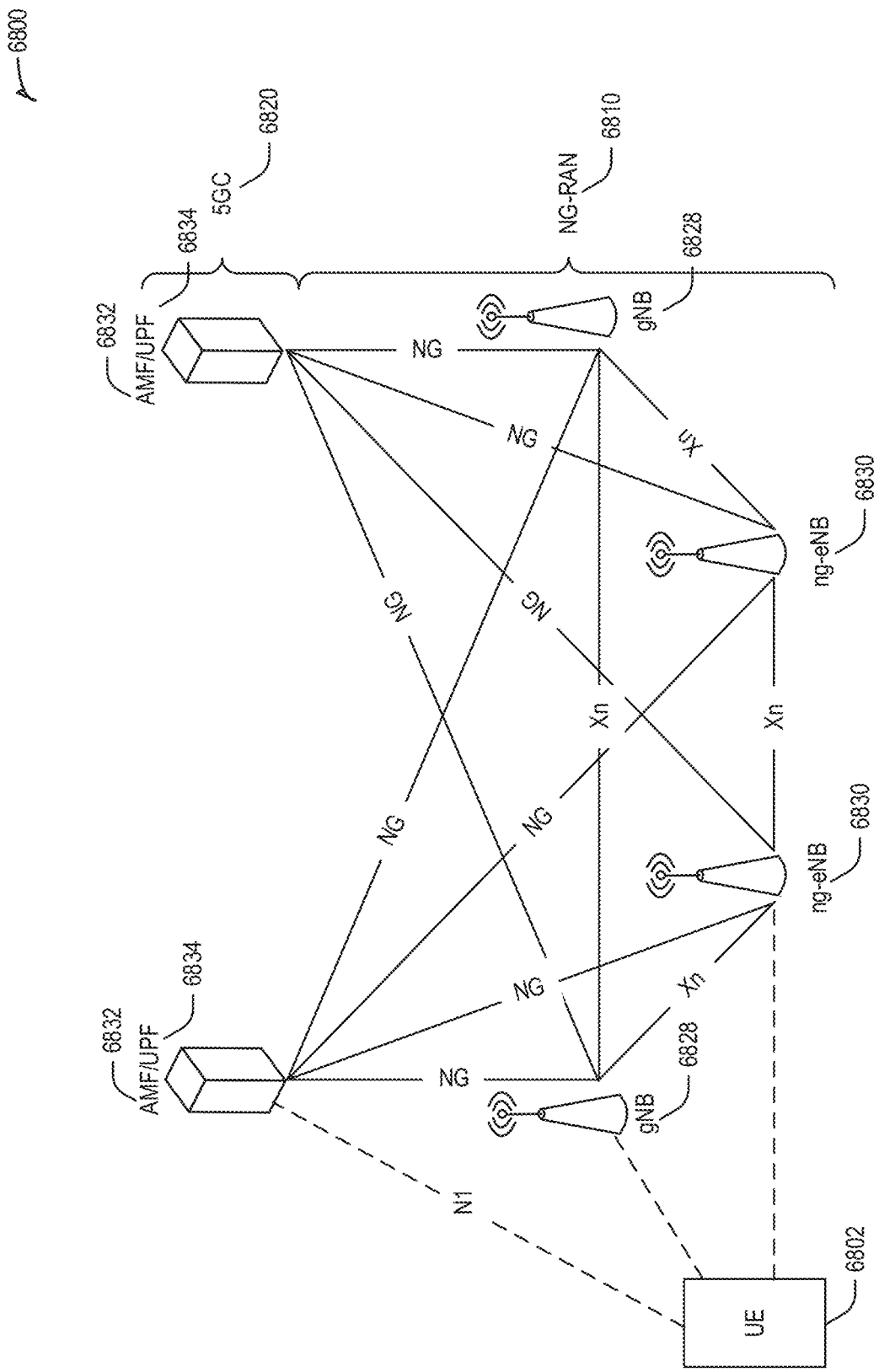
FIG. 68 is a simplified diagram of an overall 5G next generation (NG) system architecture, deployable in an example edge computing system.

FIG. 68 is a simplified diagram of an overall 5G next generation (NG) system architecture 6800. Referring to FIG. 68, the NG system architecture 6800 includes NG-RAN 6810 and a 5G network core (5GC) 6820. The NG-RAN 6810 can include a plurality of nodes, such as Next Generation Node-Bs (gNBs) 6828 and NG Evolved Node-Bs (NG-eNBs) 6830.

The 5GC 6820 can include an access and mobility function (AMF) 6832 and/or a user plane function (UPF) 6834. The AMF 6832 and the UPF 6834 can be communicatively coupled to the gNBs 6828 and the NG-eNBs 6830 via NG interfaces. More specifically, in some aspects, the gNBs 6828 and the NG-eNBs 6830 can be connected to the AMF 6832 by NG-C interfaces, and to the UPF 6834 by NG-U interfaces. The gNBs 6828 and the NG-eNBs 6830 can be coupled to each other via Xn interfaces.

In some aspects, a gNB 6828 can include a node providing new radio (NR) user plane and control plane protocol termination towards the UE 6802 and is connected via the NG interface to the 5GC 6820. In some aspects, an NG-eNB 6830 can include a node providing evolved universal terrestrial radio access (E-UTRA) user plane and control plane protocol terminations towards the UE 6802 and is connected via the NG interface to the 5GC 6820.

In some aspects, the NG system architecture 6800 can use reference points between various nodes as provided by 3GPP Technical Specification (TS) 23.501 (e.g., V15.4.0, 2018-12).

In some aspects, each of the gNBs 6828 and the NG-eNBs 6830 can be implemented as a base station, a mobile edge server (e.g., a MEC host), a small cell, a home eNB, and so forth.

In some aspects, node 6828 can be a master node (MN) and node 6830 can be a secondary node (SN) in a 5G architecture. The MN 6828 can be connected to the AMF 6832 via an NG-C interface and to the SN 6830 via an XN-C interface. The MN 6828 can be connected to the UPF 6834 via an NG-U interface and to the SN 6830 via an XN-U interface.

Figure 69:
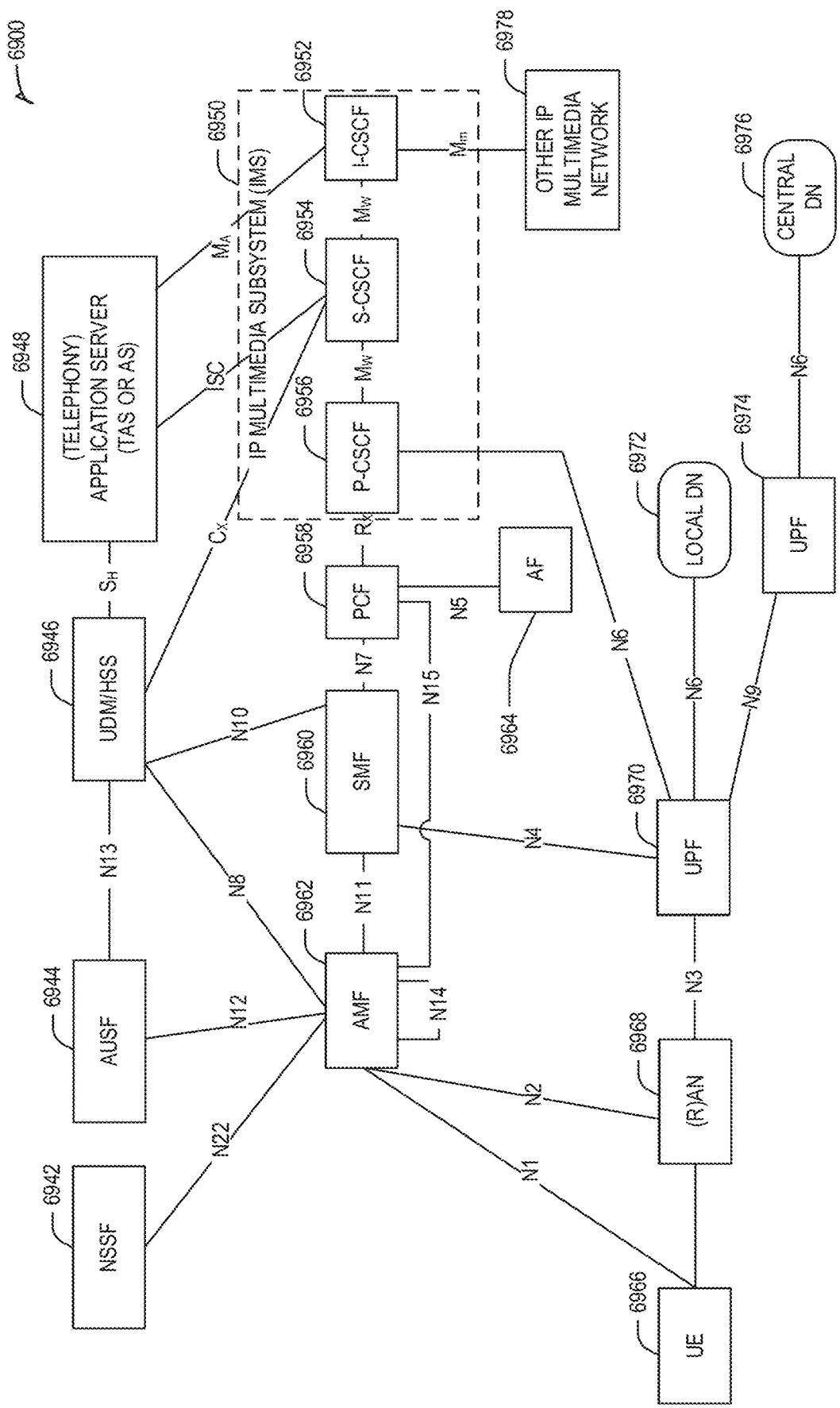
FIG. 69 illustrates a non-roaming 5G system architecture, deployable in an example edge computing system.

FIG. 69 illustrates a non-roaming 5G system architecture 6900. Referring to FIG. 69, there is illustrated a 5G system architecture 6900 in a reference point representation. More specifically, UE 696 can be in communication with RAN 6968 as well as one or more other 5G core (5GC) network entities. The 5G system architecture 6900 includes a plurality of network functions (NFs), such as access and mobility management function (AMF) 6962, session management function (SMF) 6960, policy control function (PCF) 6958, application function (AF) 6964, user plane function (UPF) 6970, network slice selection function (NSSF) 6942, authentication server function (AUSF) 6944, and unified data management (UDM)/home subscriber server (HSS) 6946.

The UPF 6970 can provide a connection to a local data network (DN) 6972, which can include, for example, operator services, Internet access, or third-party services. The AMF 6962 can be used to manage access control and mobility and can also include network slice selection functionality. The SMF 6960 can be configured to set up and manage various sessions according to network policy. The UPF 6970 can be deployed in one or more configurations according to the desired service type. The PCF 6958 can be configured to provide a policy framework using network slicing, mobility management, and roaming (similar to PCRF in a 4G communication system). The UDM 6946 can be configured to store subscriber profiles and data (similar to an HSS in a 4G communication system).

In some aspects, UPF 6970 can connect via an N9 interface to another UPF 6974 connected to a central DN 6976 via an N6 interface.

In some aspects, the 5G system architecture 6900 includes an IP multimedia subsystem (IMS) 6950 as well as a plurality of IP multimedia core network subsystem entities, such as call session control functions (CSCFs). More specifically, the IMS 6950 includes a CSCF, which can act as a proxy CSCF (P-CSCF) 6956, a serving CSCF (S-CSCF) 6954, an emergency CSCF (E-CSCF) (not illustrated in FIG. 69), or interrogating CSCF (I-CSCF) 6952. The P-CSCF 6956 can be configured to be the first contact point for the UE 696 within the IMS 6950. The S-CSCF 6954 can be configured to handle the session states in the network, and the E-CSCF can be configured to handle certain aspects of emergency sessions such as routing an emergency request to the correct emergency center or PSAP. The I-CSCF 6952 can be configured to function as the contact point within an operator's network for all IMS connections destined to a subscriber of that network operator, or a roaming subscriber currently located within that network operator's service area. In some aspects, the I-CSCF 6952 can be connected to another IP multimedia network 6978, e.g., an IMS operated by a different network operator.

In some aspects, the UDM/HSS 6946 can be coupled to an application server 6948, which can include a telephony application server (TAS) or another application server (AS). The AS 6948 can be coupled to the IMS 6950 via the S-CSCF 6954 or the I-CSCF 6952.

In some aspects, the 5G system architecture 6900 can be configured to use 5G access control mechanism techniques, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator-specific ways.

A reference point representation shows that interaction can exist between corresponding NF services. For example, FIG. 69 illustrates the following reference points: N1 (between the UE 696 and the AMF 6962), N2 (between the RAN 6968 and the AMF 6962), N3 (between the RAN 6968 and the UPF 6970), N4 (between the SMF 6960 and the UPF 6970), N5 (between the PCF 6958 and the AF 6964), N6 (between the UPF 6970 and the DN 6972), N7 (between the SMF 6960 and the PCF 6958), N8 (between the UDM 6946 and the AMF 6962), N9 (between UPFs 6970 and 6974), N10 (between the UDM 6946 and the SMF 6960), N11 (between the AMF 6962 and the SMF 6960), N12 (between the AUSF 6944 and the AMF 6962), N13 (between the AUSF 6944 and the UDM 6946), N14 (between two AMFs 6962), N15 (between the PCF 6958 and the AMF 6962 in case of a non-roaming scenario, or between the PCF 6958 in a visited network and AMF 6962 in case of a roaming scenario), N16 (between two SMFs 6960, not shown), and N22 (between AMF 6962 and NSSF 6942). Other reference point representations not shown in FIG. 69 can also be used.

Figure 70:
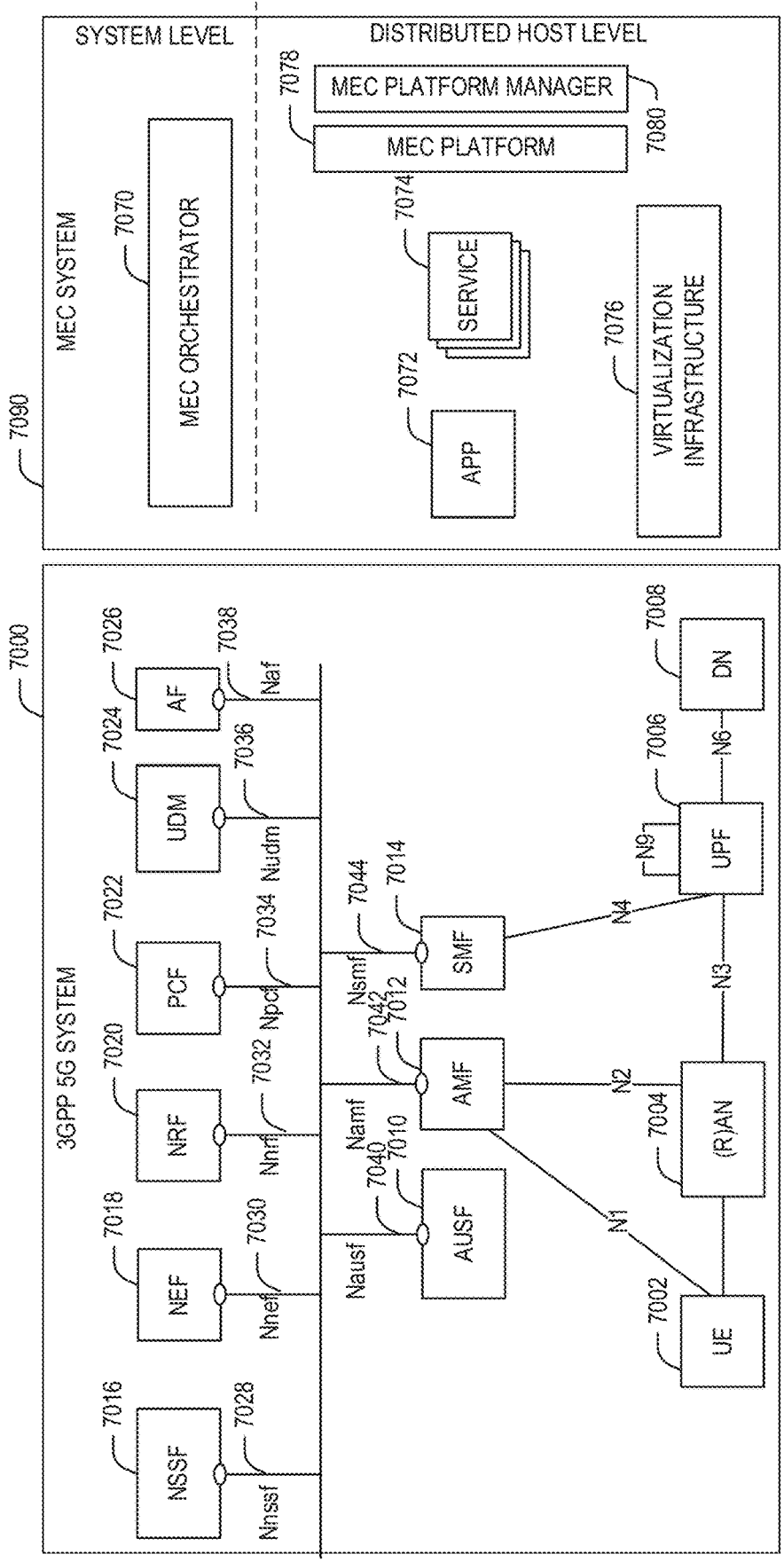
FIG. 70 illustrates a 5G service-based architecture and a generic MEC architecture, deployable in an example edge computing system.

FIG. 70 illustrates a 5G service-based architecture 7000 and a generic MEC architecture 7090. The 5G system architecture 7000 is illustrated in a service-based representation and can be substantially similar to (or the same as) system architecture 6900 of FIG. 69. For example, the 5G system architecture 7000 includes the following entities that also appear in the system architecture 6900: NSSF 7016, PCF 7022, UDM 7024, AF 7026, AUSF 7010, AMF 7012, SMF 7014, UE 7002, RAN 7004, UPF 7006, and DN 7008. In addition to these network entities, the 5G system architecture 7000 also includes a network exposure function (NEF) 7018 and a network repository function (NRF) 7020. In some aspects, 5G system architectures can be service-based and interaction between network functions can be represented by corresponding point-to-point reference points Ni (as illustrated in FIG. 70) or as service-based interfaces (as illustrated in FIG. 69).

A reference point representation shows that interaction can exist between corresponding NF services. For example, the 5G system architecture 7000 can be configured with the following reference points: N1 (between the UE 7002 and the AMF 7012), N2 (between the RAN 7004 and the AMF 7012), N3 (between the RAN 7004 and the UPF 7006), N4 (between the SMF 7014 and the UPF 7006), N5 (between the PCF 7022 and the AF 7026; not illustrated), N6 (between the UPF 7006 and the DN 7008), N7 (between the SMF 7014 and the PCF 7022; not illustrated), N8 (between the UDM 7024 and the AMF 7012; not illustrated), N9 (between two UPFs 7006), N10 (between the UDM 7024 and the SMF 7014; not illustrated), N11 (between the AMF 7012 and the SMF 7014; not illustrated), N12 (between the AUSF 7010 and the AMF 7012; not illustrated), N13 (between the AUSF 7010 and the UDM 7024; not illustrated), N14 (between two AMFs 7012; not illustrated), N15 (between the PCF 7022 and the AMF 7012 in case of a non-roaming scenario, or between the PCF 7022 in a visited network and AMF 7012 in case of a roaming scenario; not illustrated), N16 (between two SMFs 7014; not illustrated), and N22 (between AMF 7012 and NSSF 7016). Other reference point representations not shown in FIG. 70 can also be used.

In some aspects, as illustrated in FIG. 70, service-based representations can be used to represent network functions within the control plane that enable other authorized network functions to access their services. In this regard, the 5G system architecture 7000 can include the following service-based interfaces: Namf 7042 (a service-based interface exhibited by the AMF 7012), Nsmf 7044 (a service-based interface exhibited by the SMF 7014), Nnef 7030 (a service-based interface exhibited by the NEF 7018), Npcf 7034 (a service-based interface exhibited by the PCF 7022), Nudm 7036 (a service-based interface exhibited by the UDM 7024), Naf 7038 (a service-based interface exhibited by the AF 7026), Nnrf 7032 (a service-based interface exhibited by the NRF 7020), Nnssf 7028 (a service-based interface exhibited by the NSSF 7016), Nausf 7040 (a service-based interface exhibited by the AUSF 7010). Other service-based interfaces (e.g., Nudr, N5g-eir, and Nudsf) not shown in FIG. 70 can also be used.

In some aspects, the NEF 7018 can provide an interface to a MEC host in a MEC system, such as MEC system 7090, which can be used to process wireless connections with the RAN 7004.

The MEC system 7090 can include a MEC orchestrator 7070 (operating at a system level) as well as the following MEC entities operating at a distributed host level: one or more applications 7072, one or more services 7074, a virtualization infrastructure 7076, a MEC platform 7078, a MEC platform manager 7080. Components of the MEC system 7090 are discussed in greater detail hereinbelow.

Figure 71:
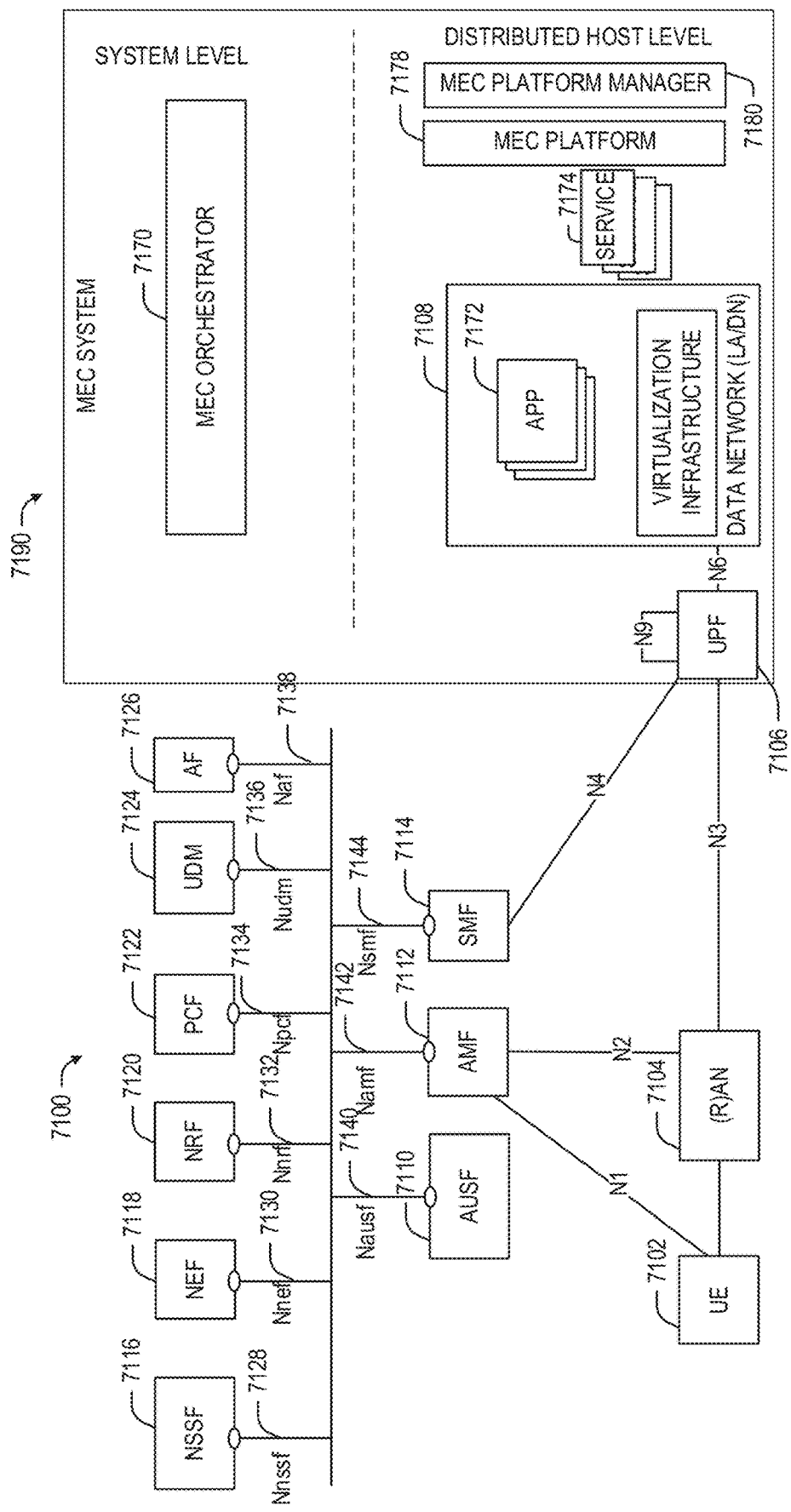
FIG. 71 illustrates an integrated MEC deployment in a 5G network, usable with an example edge computing system.

FIG. 71 illustrates an integrated MEC deployment of a MEC system 7190 in a 5G network 7100, where some of the functional entities of the MEC system interact with the network functions of the 5G network. Referring to FIG. 71, the MEC system 7190 includes components 7170-7180 which are similar to components 7070-7080 of the MEC system 7090 in FIG. 70. Similarly, the 5G network 7100 includes components 7102-7144 which are similar to components 7002-7044 of the 5G network 7000 in FIG. 70.

In some aspects, an integrated MEC deployment within the 5G network 7100 can be configured using one or more of the following techniques:

(1) Local Routing and Traffic Steering: the 5G network 7100 can be configured to select traffic to be routed to the applications 7172 in the local data network (e.g., 7108), which can be part of the MEC system 7190. A protocol data unit (PDU) session may have multiple N6 interfaces towards the data network 7108. The UPFs (e.g., 7106) that terminate these interfaces can be configured to support PDU Session Anchor functionality. In some aspects, traffic steering by the UPF 7106 is supported by Uplink Classifiers that operate on a set of traffic filters matching the steered traffic, or alternatively, by IPv6 multi-homing, where multiple IPv6 prefixes have been associated with the PDU session in question.

(2) The ability of an AF 7126 to influence UPF 7106 (re)selection and traffic routing directly via the PCF 7122 or indirectly via the NEF 7118, depending on the operator's policies.

(3) The Session and Service Continuity (SSC) modes for UE 7102 and application mobility scenarios.

(4) Support of Local Area Data Network (LADN) (e.g., 7108) by the 5G network 7100 by providing support to connect to the LADN in a certain area where the applications 7172 are deployed. The access to a LADN 7108 may be available in a specific LADN service area, defined as a set of Tracking Areas in the serving PLMN of the UE. In some aspects, LADN 7108 can be configured as a service provided by the serving PLMN of the UE.

The network functions within the 5G network 7100 and the services they produce are registered in the NRF 7120, while in the MEC system 7190 the services produced by the MEC applications 7172 are registered in the service registry of the MEC platform 7178. In some aspects, service registration can be part of the application enablement functionality. To use the service, if authorized, a network function can directly interact with the network function that produces the service. The list of available MEC services can be discovered from the NRF 7120. Some of the services may be accessible via the NEF 7118, which is also available to untrusted entities that are external to the domain, to access the service. Put another way, the NEF 7118 can function as a centralized point for service exposure and also has a key role in authorizing all access requests originating from outside of the system. In some aspects, procedures related to authentication can be served by the Authentication Server Function (AUSF) 7110.

In some aspects, the 5G network 7100 can use network slicing which allows the allocation of the required features and resources from the available network functions to different services or to tenants that are using the services. The Network Slice Selection Function (NSSF) 7116 can be configured to assist in the selection of suitable network slice instances for users, and in the allocation of the necessary AMF 7112. A MEC application 7172, e.g., an application hosted in the distributed cloud of the MEC system 7190, can belong to one or more network slices that have been configured in the 5G network 7100.

In some aspects, policies and rules in the 5G network 7100 are handled by the PCF 7122. The PCF 7122 is also the function whose services an AF, such as a MEC platform, requests in order to impact the traffic steering rules. The PCF 7122 can be accessed either directly, or via the NEF 7118, depending on whether the AF 7126 is considered trusted or not, and in the case of traffic steering, whether the corresponding PDU session is known at the time of the request.

The UDM function 7124 is responsible for services related to users and subscriptions. For example, the UDM 7124 can be configured to generate 3GPP authentication and key agreement (AKA) authentication credentials, handle user identification related information, manage access authorization (e.g., roaming restrictions), register the user serving NFs (serving AMF 7112, SMF 7114), support service continuity by keeping record of SMF/Data Network Name (DNN) assignments, support interception procedures in outbound roaming by acting as a contact point, and perform subscription management procedures.

The UPF 7106 can be configured to assist in an integrated MEC deployment in the 5G network 7100. In some aspects, UPFs can be considered as a distributed and configurable data plane from the MEC system 7190 perspective. The control of that data plane, such as in a traffic rules configuration, may follow the NEF-PCF-SMF communication route. Consequently, in some aspects, the local UPF 7106 may be part of the MEC implementation (as illustrated in FIG. 71).

Referring to FIG. 71, the MEC orchestrator 7170 is a MEC system level functional entity that, acting as an AF, can interact with the NEF 7118, or in some scenarios directly with the target 5G network functions (or NFs). On the MEC host level, the MEC platform 7178 can be configured to interact with the 5G NFs, again in the role of an AF. In some aspects, the MEC host, e.g., the host level functional entities, may be deployed in a data network (e.g., 7108) in the 5G system. While the NEF 7118 as a 5G core network function is a system level entity deployed centrally together with similar NFs, in some aspects, an instance of NEF can also be deployed in the edge to allow low latency, high throughput service access from a MEC host.

In some aspects, MEC can be deployed on the N6 reference point of the UPF 7106, e.g., in a data network (e.g., 7108) external to the 5G system 7100. This functionality can be enabled by flexibility in locating the UPF. In some aspects, the distributed MEC host can accommodate, apart from MEC apps 7172, a message broker as a MEC platform service 7174, and another MEC platform service to steer traffic to local accelerators. The choice to rn a service as a MEC app or as a platform service can be implementation-specific and can factor in the level of sharing and authentication needed to access the service. A MEC service such as a message broker could be initially deployed as a MEC app 7172 and then become available as a MEC platform service 7174.

In some aspects, the AMF 7112 is configured to handle mobility related procedures. In addition, the AMF 7112 is responsible for the termination of RAN control plane and Non-Access Stratum (NAS) procedures, protecting the integrity of signaling, management of registrations, connections and reachability, interfacing with any interception function for access and mobility events, providing authentication and authorization for the access layer, and hosting the Security Anchor Functionality (SEAF). In some aspects, the AMF 7112 can be configured to provide communication and reachability services for other NFs and it may allow subscriptions to receive notifications regarding mobility events.

In some aspects, the SMF 7114 is configured to provide functionalities including session management, IP address allocation and management, dynamic host configuration protocol (DHCP) services, selection/re-selection and control of the UPF, configuring the traffic rules for the UPF, interception for session management events, charging, and support for roaming. As MEC services may be offered in both centralized and edge clouds, the SMF 7114 can be configured to select and control the UPF as well as to configure its rules for traffic steering. The SMF 7114 is also configured to expose service operations to allow MEC as a 5G AF to manage the PDU sessions, control the policy settings and traffic rules, as well as to subscribe to notifications on session management events.

In some aspects, MEC hosts of the MEC system 7190 are deployed in the edge or in a central data network. The UPF 7106 can be configured to manage to steer the user plane traffic towards the targeted MEC applications in the data network. The locations of the data networks and the UPF are a choice of the network operator and the network operator may choose to place the physical computing resources based on technical and business parameters such as available site facilities, supported applications and their requirements, measured or estimated user load, etc. The MEC management system, orchestrating the operation of MEC hosts and applications, may decide dynamically where to deploy the MEC applications 7172.

In terms of physical deployment of MEC hosts, the following options may be used in different aspects: (1) the MEC host and the local UPF 7106 are co-located with the base station of a base station edge layer; (2) the MEC host co-located with a transmission node which may include a local UPF 7106; (3) the MEC host and the local UPF 7106 co-located with a network aggregation point; and (4) the MEC host is co-located with the 5G core network functions (e.g., in the same data center).

Figure 72:
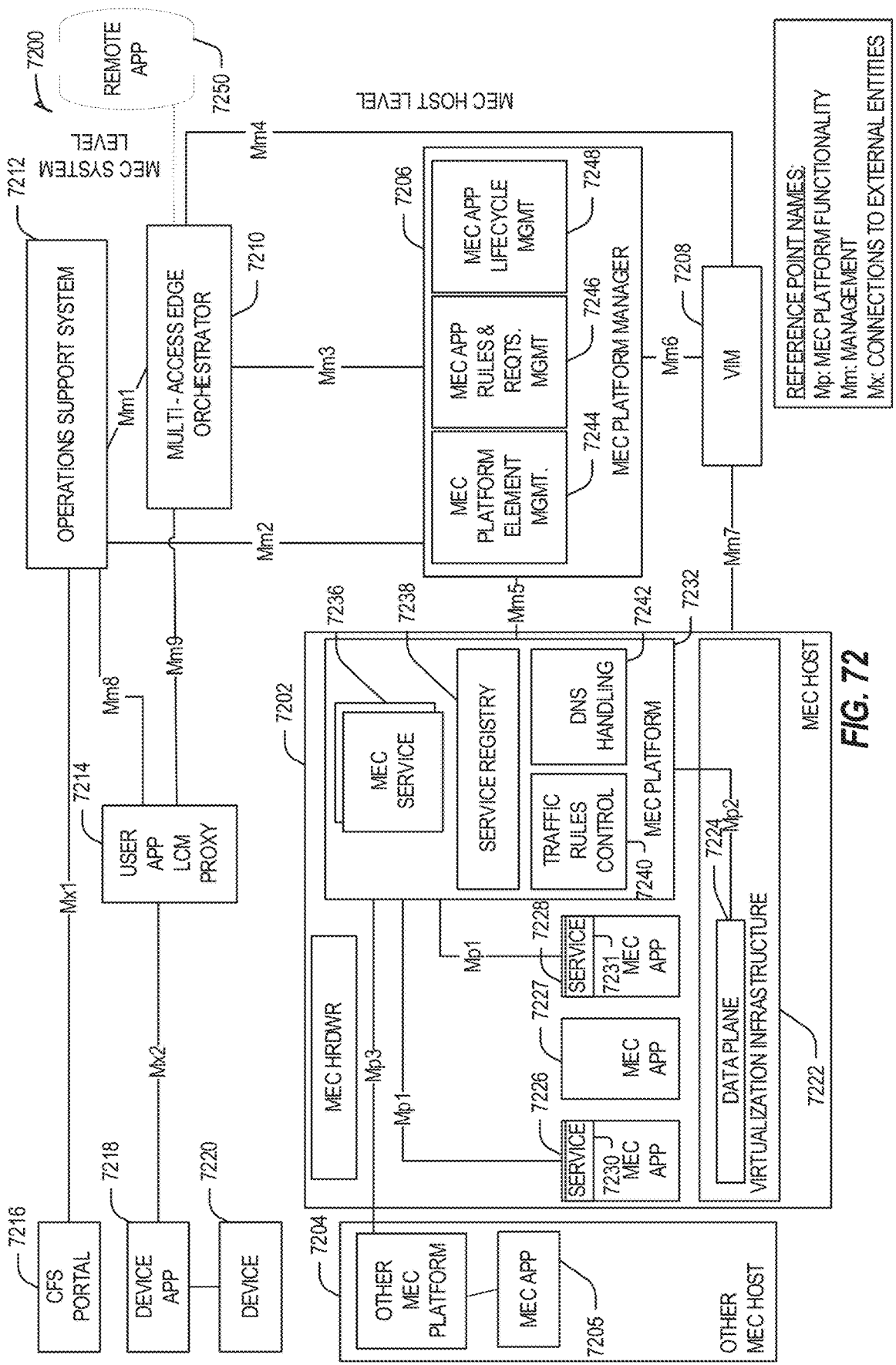
FIG. 72 illustrates an example mobile edge system reference architecture.

FIG. 72 illustrates a mobile edge system reference architecture (or MEC architecture) 7200. FIG. 72 specifically illustrates a MEC architecture 7200 with MEC hosts 7202 and 7204 providing functionalities in accordance with the ETSI GS MEC-003 specification. In some aspects, enhancements to the MEC platform 7232 and the MEC platform manager 7206 may be used for providing slice management, resource management, and traceability functions within the MEC architecture 7200. This may include provisioning of one or more network slices, dynamic management of resources used by the network slices, as well as resource traceability functions within the MEC architecture.

Referring to FIG. 72, the MEC network architecture 7200 can include MEC hosts 7202 and 7204, a virtualization infrastructure manager (VIM) 7208, an MEC platform manager 7206, an MEC orchestrator 7210, an operations support system 7212, a user app proxy 7214, a UE app 7218 running on UE 7220, and CFS portal 7216. The MEC host 7202 can include a MEC platform 7232 with filtering rules control component 7240, a DNS handling component 7242, a service registry 7238, and MEC services 7236. The MEC services 7236 can include at least one scheduler, which can be used to select resources for instantiating MEC apps (or NFVs) 7226, 7227, and 7228 upon virtualization infrastructure 7222. The MEC apps 7226 and 7228 can be configured to provide services 7230 and 7231, which can include processing network communications traffic of different types associated with one or more wireless connections (e.g., connections to one or more RAN or telecom-core network entities). The MEC app 7205 instantiated within MEC host 7204 can be similar to the MEC apps 7226-7728 instantiated within MEC host 7202. The virtualization infrastructure 7222 includes a data plane 7224 coupled to the MEC platform via an MP2 interface. Additional interfaces between various network entities of the MEC architecture 7200 are illustrated in FIG. 72.

The MEC platform manager 7206 can include MEC platform element management component 7244, MEC app rules and requirements management component 7246, and MEC app lifecycle management component 7248. The various entities within the MEC architecture 7200 can perform functionalities as disclosed by the ETSI GS MEC-003 specification.

In some aspects, the remote application (or app) 7250 is configured to communicate with the MEC host 7202 (e.g., with the MEC apps 7226-7728) via the MEC orchestrator 7210 and the MEC platform manager 7206.

Figure 73:
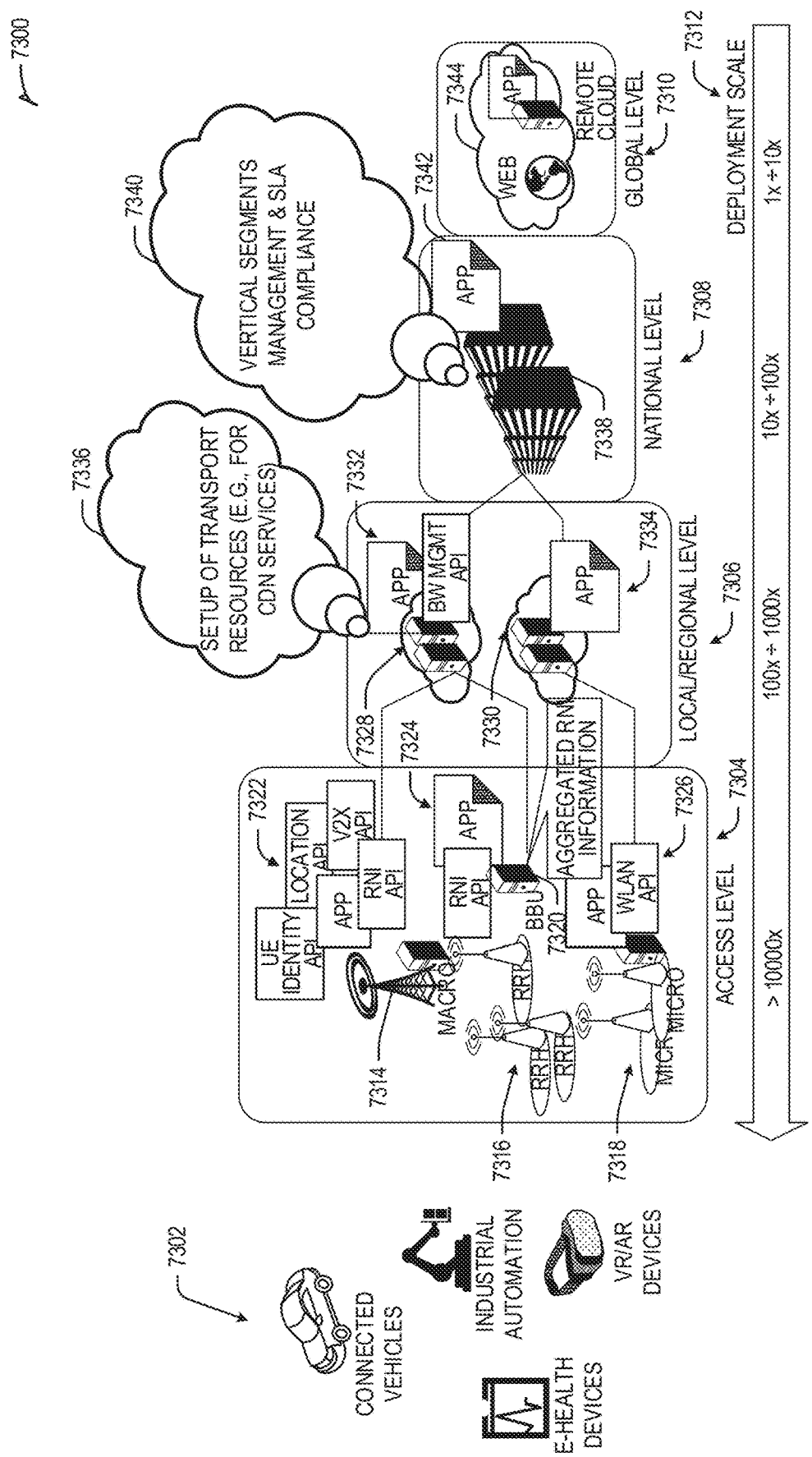
FIG. 73 illustrates example MEC deployment options in different edge computing system levels.

FIG. 73 illustrates an edge network 7300 with MEC deployment options in different edge levels. Referring to FIG. 73, the edge network 7300 includes computing devices 7302 which can be coupled to a remote cloud 7344 via edge layers, each layer being configured at a different deployment scale 7312. For example, computing devices 7302 are coupled to the remote cloud 7344 (which can be a global level edge layer at a deployment scale of 1×-10×) via an access level edge 7304 (which can be at a deployment scale of greater than 10000×), a local/regional level edge 7306 (which can be at a deployment scale of 100×-1000×), and a national level edge 7308 (which can be at a deployment scale of 10×-100×).

The access level edge 7304 can include macro base stations 7314, remote radio heads (RRHs) 7316, and micro base stations 7318, which can use one or more APIs 7322, 7324, and 7326 respectively to communicate with the local/regional level edge 7306.

The local/regional level edge 7306 can include network nodes 7328 and 7330 using corresponding applications 7332 and 7334 to communicate with the national level edge 7308. The network nodes 7328 and 7330 can be configured to perform setup of transport resources 7336 (e.g., for CDN services).

The national level edge 7308 can include network nodes 7338 which can use applications 7342 for accessing the remote cloud 7344 within the global level edge 7310. The network nodes 7338 can be configured for vertical segment management and SLA compliance 7340.

In some aspects, MEC deployment can be based on the definition of "edge". Several options are allowed by the MEC standard, in order to provide the required degree of freedom to mobile network operators (MNOs), especially when deploying MEC in an NFV environment (in this aspect, MEC entities can be instantiated as Virtualized Network Functions (VNFs), thus with high flexibility in terms of deployment for the operator).

In some aspects, MEC can be flexibly deployed depending on the use case/vertical segment/information to be processed. Furthermore, some components of the MEC system can be co-located with other elements of the system. As an example, in certain use cases (e.g., enterprise), a MEC app may need to consume a MEC service locally, and it may be efficient to deploy a MEC host locally equipped with the needed set of APIs. In other aspects, deploying a MEC server in a data center (which can be away from the access network) may not need to host some APIs like the radio network information (RNI) API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. In some other aspects, a bandwidth management API may be present both at the access level edge 7304 and also in more remote edge locations, in order to set up transport networks (e.g., for Content Delivery Network (CDN)-based services).

Figure 74:
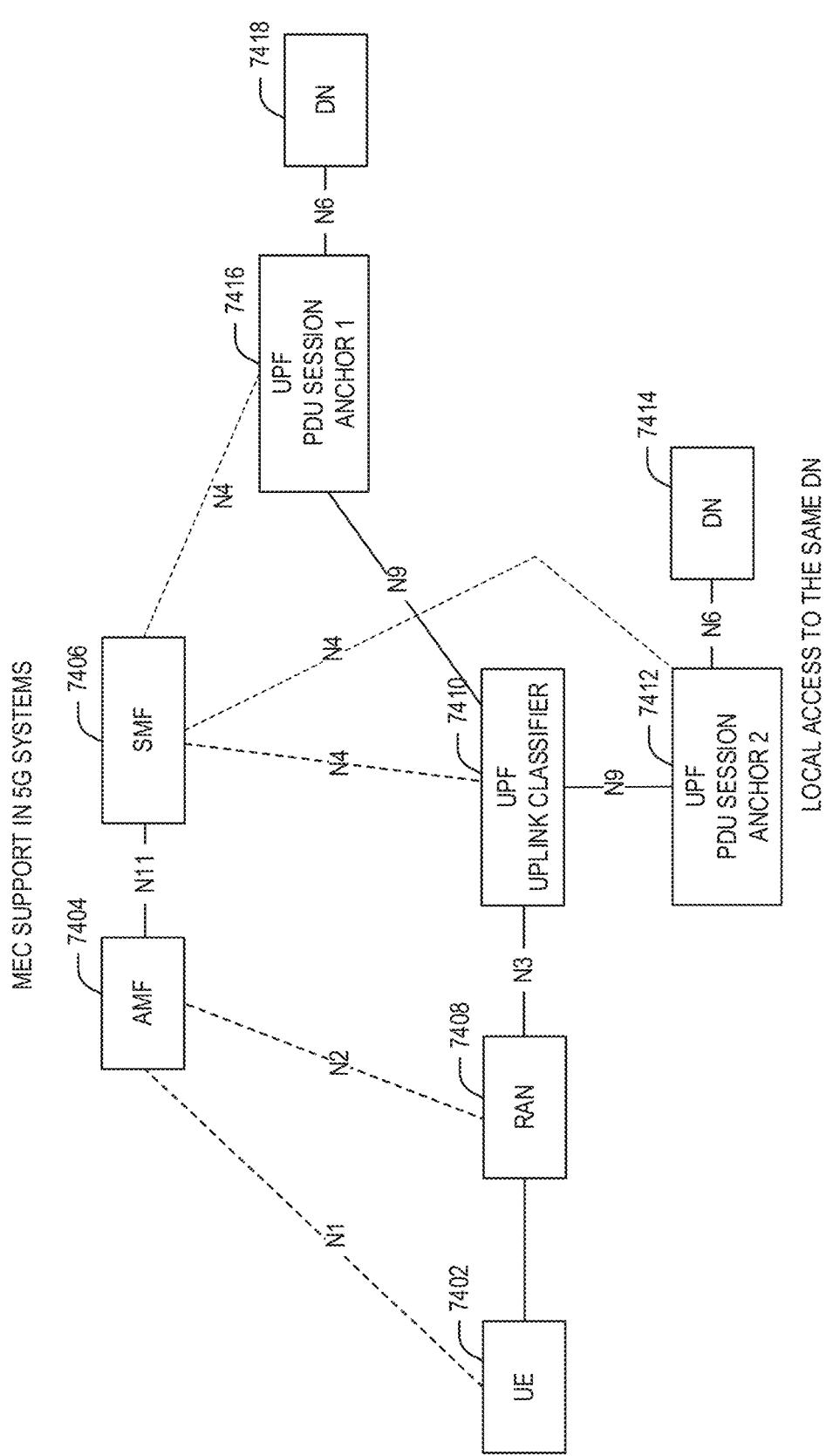
FIG. 74 illustrates MEC support in 5G systems, usable with an example edge computing system.

FIG. 74 illustrates MEC support in a 5G system architecture 7400. Referring to FIG. 74, the 5G system architecture 7400 is similar to the 5G system architecture 6900 of FIG. 69 (with FIG. 74 illustrating only a subset of the network functions used by the 5G system architecture 6900 of FIG. 69). More specifically, the 5G system architecture 7400 includes a UE 7402 coupled to a radio access network (RAN) 7408. The 5G system architecture 7400 further includes AMF 7404, SMF 7406, UPFs 7410, 7412, and 7416. The UPF 7412 is coupled to a data network 7414, and the UPF 7416 is coupled to a data network 7418.

In some aspects, to provide MEC support in a 5G network, the 5G network can select a UPF close to the UE and execute the traffic steering from the UPF to the local DN via an N6 interface. The functionality supporting edge computing in a 5G system includes local routing (the 5G core network selects UPF to route the user traffic to the local DN), traffic steering (the 5G core network selects the traffic to be routed to the applications in the local DN), session and service continuity to enable UE and application mobility, user plane selection and reselection (e.g., based on input from the AF), an AF may influence UPF (re)selection and traffic routing, network capability exposure (the 5G core network and the AF may provide information to each other via NEF), quality of service (QoS) and charging (the PCF can be configured to provide rules for QoS control and charging for the traffic routed to the local DN), and support of Local Area Data Network (LADN) (the 5G core network provides support to connect to the LADN in a certain area where the applications are deployed).

In some aspects, an integrated MEC deployment within the 5G network 7400 can be configured using local routing and traffic steering. In some aspects, UPF 7410 can be configured as an uplink classifier, and UPFs 7412 and 7416 can be configured as PDU session anchors for communication with DNs 7414 and 7418 respectively (e.g., concurrent access to two data networks). The uplink classifier 7410 can be configured to provide forwarding of uplink traffic towards different PDU session anchors (e.g., 7412 and 7416) and merge of downlink traffic to the UE 7402 (e.g., merging the traffic from the different PDU session anchors on the link towards the UE 7402).

The 5G network 7400 can be configured to select traffic to be routed to applications in the local data network (e.g., 7414), which can be part of a MEC system. A PDU session may have multiple N6 interfaces towards one or more data networks (e.g., 7414 and 7418). The UPFs (e.g., 7412 and 7416) that terminate these interfaces can be configured to support PDU Session Anchor functionality. In some aspects, traffic steering by the UPF 7410 is supported by Uplink Classifiers that operate on a set of traffic filters matching the steered traffic, or alternatively, by IPv6 multi-homing, where multiple IPv6 prefixes have been associated with the PDU session in question.

Figure 75:
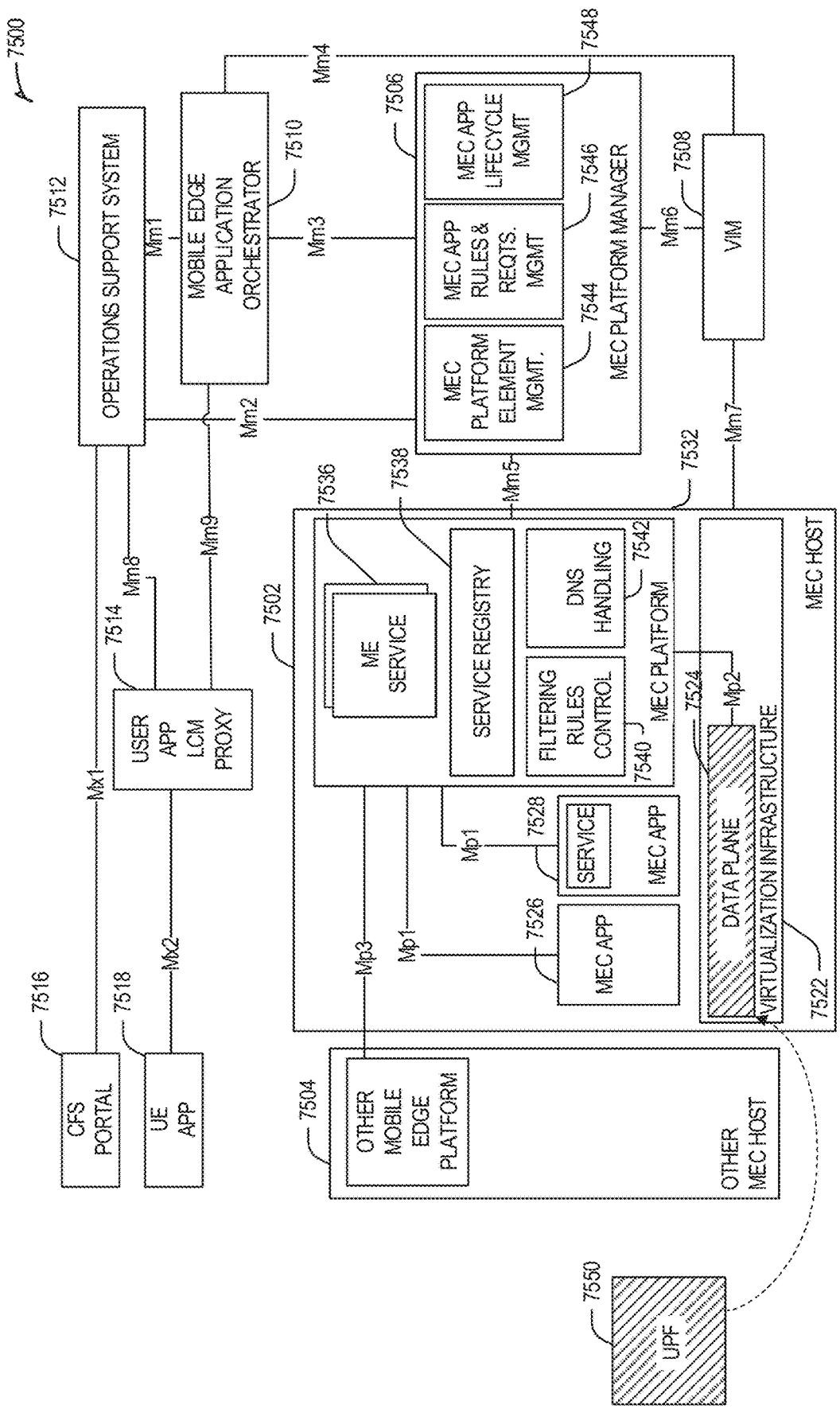
FIG. 75, FIG. 76, and FIG. 77 illustrate MEC mapping in 5G systems, usable with an example edge computing system.
Figure 76:
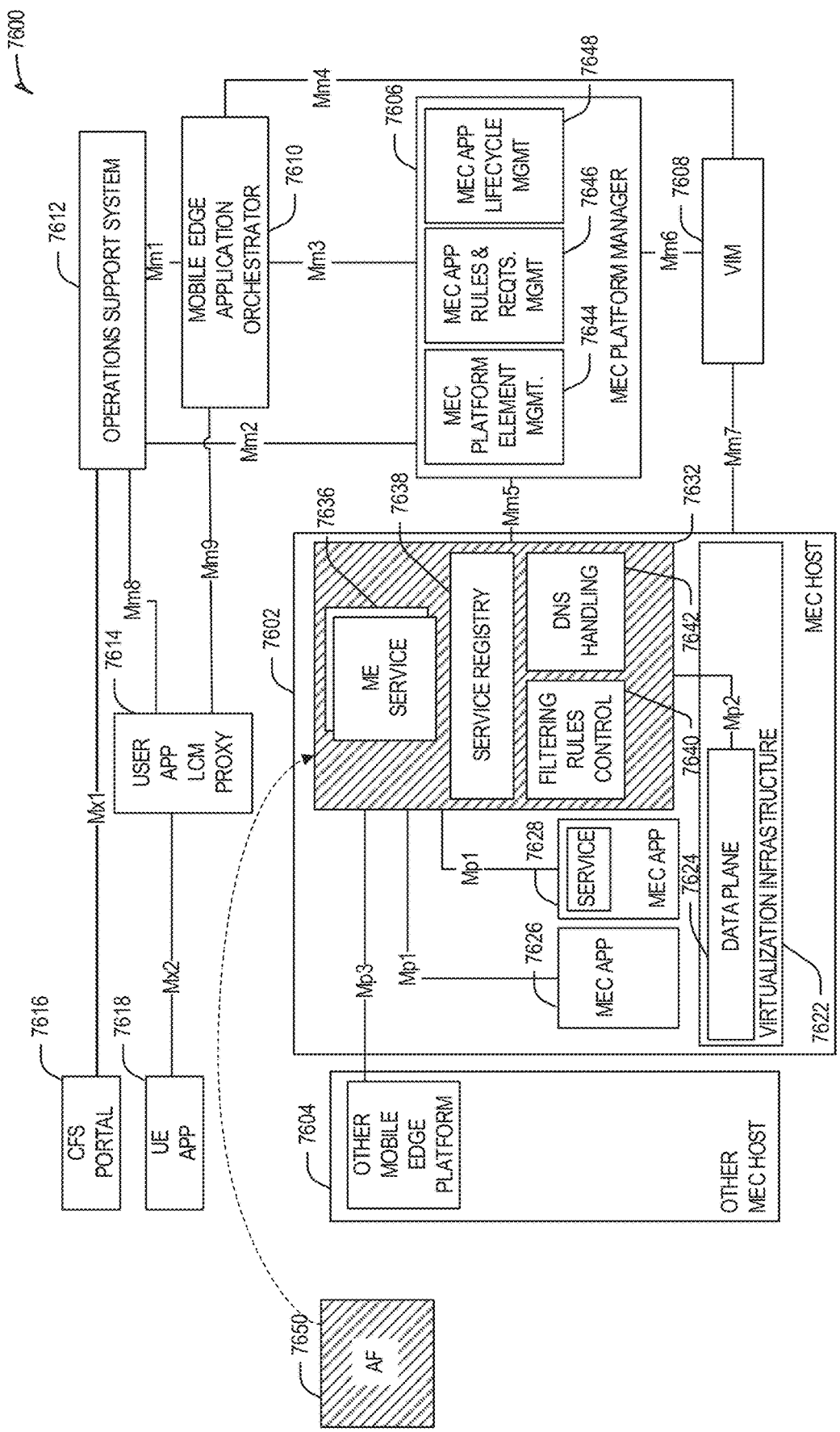
Figure 77:
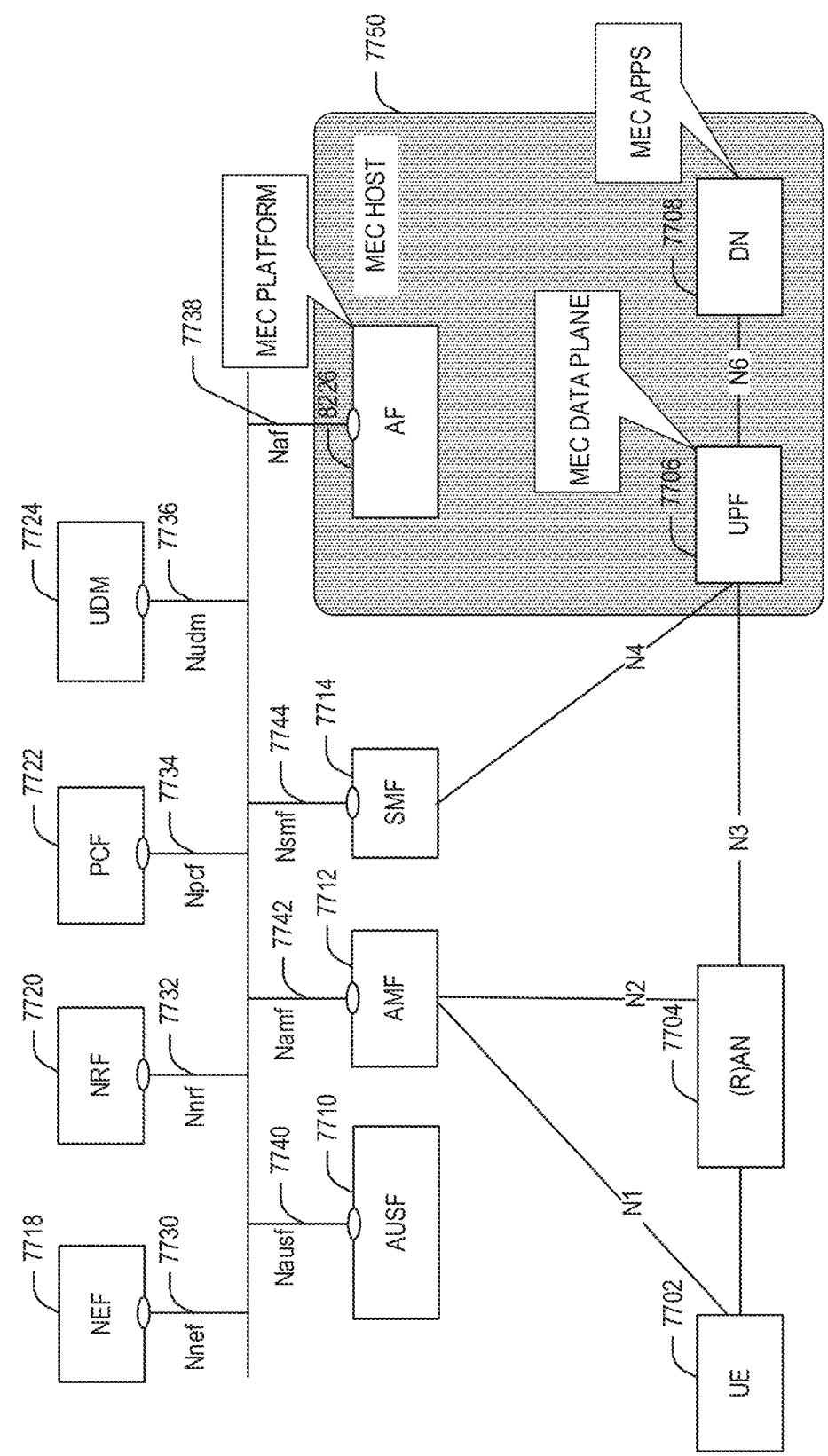

FIG. 75, FIG. 76, and FIG. 77 illustrate MEC mapping in 5G systems, according to examples. Referring to FIG. 75, there is illustrated a MEC architecture 7500, which is similar to the MEC architecture 7200 of FIG. 72. More specifically, network elements 7502-7548 of the MEC architecture 7500 correspond to network elements 7202-7748 of the MEC architecture 7200.

FIG. 75 also illustrates the UPF 7550 of an example 5G network (such as 5G network architecture 6900 of FIG. 69) and a mapping of the UPF 7550 into the MEC architecture 7500. The UPF 7550 handles the user plane path of PDU sessions. Additionally, UPF 7550 provides the interface to a data network and supports the functionality of a PDU session anchor. In this regard, UPF 7550 in a 3GPP (e.g., 5G) architecture may correspond to the functionalities defined in ETSI for the MEC data plane 7524.

Referring to FIG. 76, there is illustrated a MEC architecture 7600, which is similar to the MEC architecture 7200 of FIG. 72. More specifically, network elements 7602-7648 of the MEC architecture 7600 correspond to network elements 7202-7748 of the MEC architecture 7200.

FIG. 76 also illustrates the AF 7650 of an example 5G network (such as 5G network architecture 7100 of FIG. 71) and a mapping of the AF 7650 into the MEC architecture 7600. The AF 7650 is configured to perform the following high-level functionalities: application influence on traffic routing, accessing network capability exposure and interacting with the policy framework for policy control. In this regard. AF 7650 in a 3GPP (e.g., 5G) architecture may correspond to the functionalities defined in ETSI for the MEC platform 7632.

Referring to FIG. 77, there is illustrated a 5G architecture 7700, which is similar to the 5G architecture 7000 of FIG. 70. More specifically, network elements 7702-7744 of the 5G architecture 7700 correspond to network elements 7002-7044 of the 5G architecture 7000. A MEC host 7750 can be associated (or mapped) to the AF 7726 and the UPF 7706 in a 5G architecture (with the AF and UPF corresponding to a MEC platform and a MEC data plane respectively). Additionally, since in a 3GPP architecture the user traffic is routed to the local data network, MEC apps can be mapped in the 5G architecture 7700 as located in the DN 7708.

Figure 78:
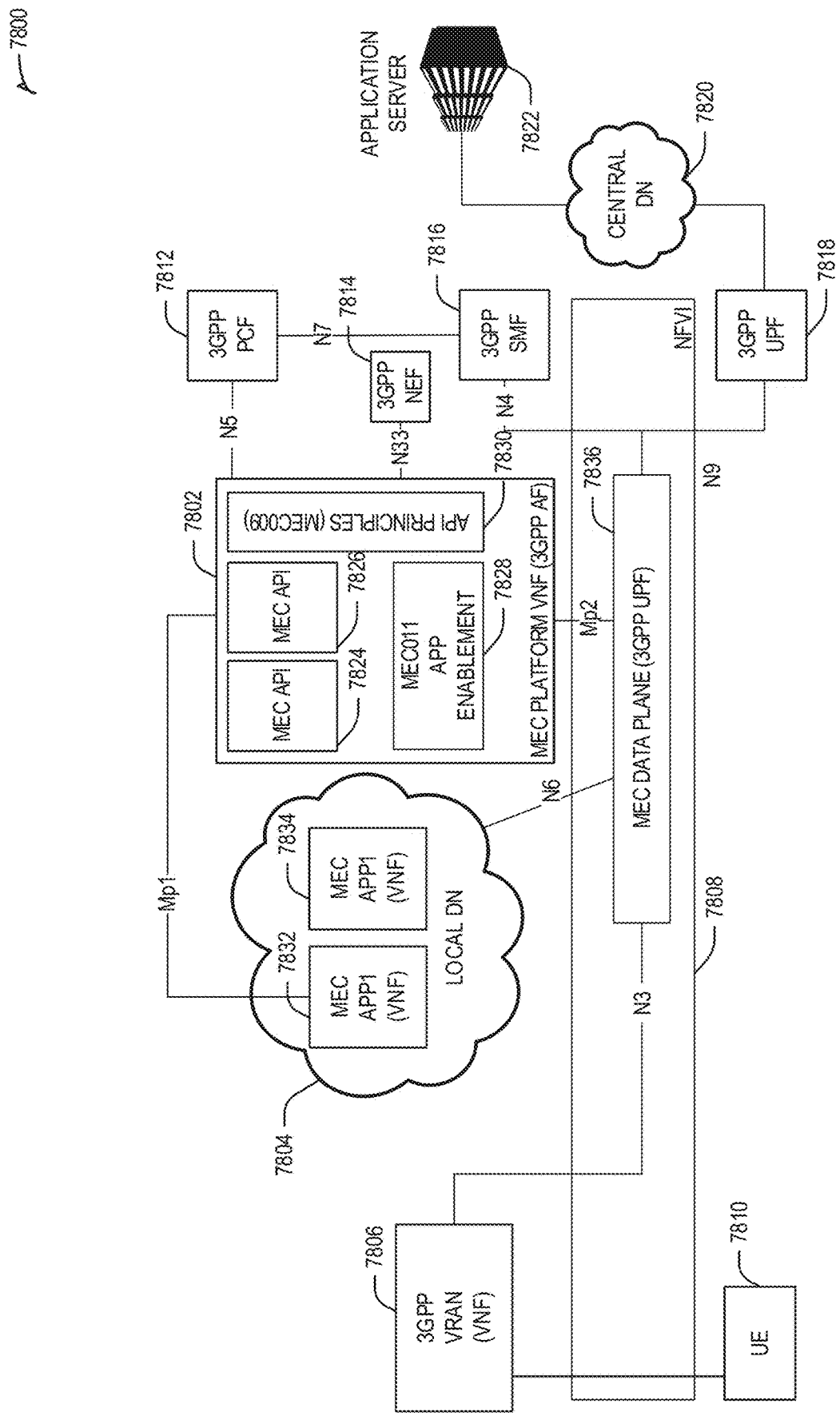
FIG. 78 illustrates a MEC deployment in an example 5G system.

FIG. 78 illustrates a MEC deployment in a 5G system, according to examples. More specifically, FIG. 78 illustrates a 3GPP-based 5G system architecture 7800 and example of the mapping of MEC entities to some of the 5G system's components (namely, AF and UPF). The architecture 7800 can be configured to provide functionalities in accordance with the ETSI GS MEC-003 specification and/or the ETSI GR MEC-017 specification.

Referring to FIG. 78, the 5G architecture 7800 includes UE 7810, RAN 7806 (which can be a virtual RAN based on a VNF), UPF 7836 and 7818, SMF 7816, PCF 7812, AF 7802, a local DN 7804, a central DN 7820, and an application server 7822. The UPF 7836 can be configured to function as a MEC data plane within a network function virtualization infrastructure (NFVI) 7808. The AF 7802 can be configured as MEC platform VNF, with MEC APIs a 324 and 7826, MEC application enablement functionality 7828 (e.g., in accordance with the ETSI GS MEC-011 specification), and API principles functionality 7830 (e.g., in accordance with the ETSI GS MEC-009 specification). The local DN 7804 can include MEC apps 7832 and 7834 instantiated as VNFs.

Techniques disclosed herein can be used in a MEC architecture to efficiently support 5G network slicing. The considered 5G communications system 7800 incorporates MEC system components, the architecture of which is specified in ETSI GS MEC-003, deployed in a 5G network, the system architecture of which is specified in 3GPP TS 23.501. The assumption is to consider all logical functions (e.g., network functions (NFs) and also application functions (AFs)) as virtualized ones. The mapping of MEC entities into a 5G system is depicted in FIG. 78. In particular: a MEC platform is implemented as a particular application function (AF) 7802 in 3GPP; the Data Plane in the MEC architecture corresponds to a User Plane Function (UPF) 7836 in 3GPP, and the MEC apps 7832 and 7834 are mapped to the local DN 7804 in 3GPP.

In some aspects, a starting point is to consider that the End-to-End (E2E) 5G system performance depends not only on the performance of Radio Access Network (RAN) and telecom-Core Network (CN) system components alone but also on the performance of the MEC functional entities.

Example: the E2E latency (e.g., between the UE and the MEC application), is composed of the Packet Delay Budget (PDB) (defined in 5G as the E2E delay between the UE and UPF, with a confidence of 98%) and the additional delay between the UPF and the Local DN (where the MEC apps are located). This second latency component is not taken into account by 5G QoS Class Identifier (5QI) characteristics in 3GPP, although it is important for performance optimization, as it is tightly related to the instantiation of the MEC applications. As a consequence, since the user traffic termination point is at the MEC app (located in the DN), network slice-relevant performance metrics (such as the PDB) are not sufficient to describe the overall E2E performance. Instead, MEC application instantiation and the related Virtual Machine (VM) allocation are carefully considered in order to reduce the total E2E latency, as per the slice requirements.

In some aspects, for a given network slice, the E2E performance of a virtualized 5G system, integrating a MEC system deployment, cannot be fully described only by 5G QoS Class Identifier (5QI) characteristics (as defined by 3GPP, e.g., terminating with the UPF), but also depends on MEC system performance, since user traffic is terminated at the MEC app instance; and optimal MEC deployment is also network slice-dependent, as MEC architectural entities need to be connected both to the UE and to the 5G Virtualized Network Functions (VNFs), in order for the E2E system performance to comply with each slice's needs.

In some aspects, a MEC system can be deployed in a (fully virtualized) 5G system, in order to accommodate multiple slices and improve the instantiation of MEC apps and the allocation of VMs across the edge cloud, according to a slice-aware strategy. The goal of this allocation is to meet the E2E performance requirements of the slice (which are assumed to be part of a Service Level Agreement (SLA), between the network operator and a vertical industry).

Prior techniques to address the challenges: the 3GPP standard for 5G networks specifies the PDB (packet delay budget) as the upper bound for the time that a packet may be delayed between the UE and the UPF, thus not considering the last part of the user plane traffic path (e.g., over the N6 interface from the UPF to the MEC app, as depicted in FIG. 78). In this regard, there is still no standard means/parameters in 3GPP to ensure real, total E2E performances, as the MEC app is an entity external to the 3GPP network. Moreover, when instantiating a specific network slice, there is still no standard definition of a (logical) interface between a MEC system to be deployed within a 5G network, and the 5G network orchestrator to perform slice-specific VM allocation and handoff over the MEC and 3GPP-relevant entities and to apply slice performance-compliant mobility management.

Figure 79:
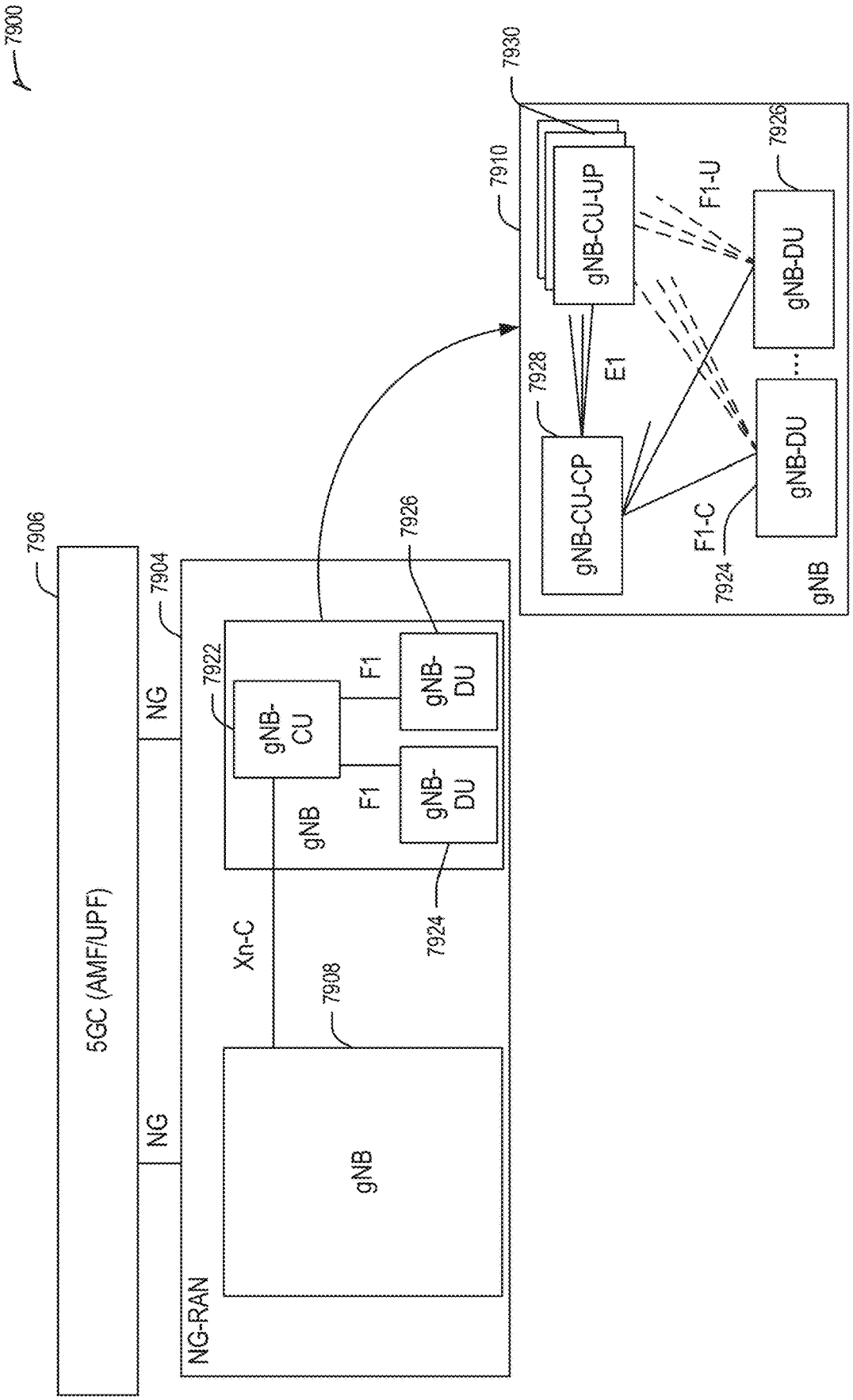
FIG. 79 illustrates components of an example 5G-NR architecture with control unit control plane (CU-CP)—control unit user plane (CU-UP) separation in connection with network slicing, usable in an edge computing deployment.

FIG. 79 illustrates components of an exemplary 5G-NR architecture with control unit control plane (CU-CP)—control unit user plane (CU-UP) separation in connection with network slicing. Referring to FIG. 79, the 5G-NR architecture 7900 can include a 5G core (5GC) 7906 and NG-RAN 7904. The NG-RAN 7904 can include one or more gNBs such as gNB 7908 and 7910. In some aspects, network elements of the NG-RAN 7904 may be split into central and distributed units, and different central and distributed units, or components of the central and distributed units, may be configured for performing different protocol functions (e.g., different protocol functions of the protocol layers).

In some aspects, the gNB 7910 can comprise or be split into one or more of a gNB Central Unit (gNB-CU) 7922 and gNB Distributed Unit(s) (gNB-DU) 7924, 7926. Additionally, the gNB 7910 can comprise or be split into one or more of a gNB-CU-Control Plane (gNB-CU-CP) 7928 and a gNB-CU-User Plane (gNB-CU-UP) 7930. The gNB-CU 7922 is a logical node configured to host the radio resource control (RRC) layer, service data adaptation protocol (SDAP) layer, and packet data convergence protocol layer (PDCP) protocols of the gNB or RRC, and PDCP protocols of the E-UTRA-NR gNB (en-gNB) that controls the operation of one or more gNB-DUs. The gNB-DU (e.g., 7924 or 7926) is a logical node configured to host the radio link control layer (RLC), medium access control layer (MAC), and physical layer (PHY) layers of the gNB and its operation is at least partly controlled by the gNB-CU 7922. In some aspects, one gNB-DU (e.g., 7924) can support one or multiple cells.

The gNB-CU-CP 7928 is a logical node configured to host the RRC and the control plane part of the PDCP protocol of the gNB-CU 7922 for an en-gNB or a gNB. The gNB-CU-UP 7930 is a logical (or physical) node configured to host the user plane part of the PDCP protocol of the gNB-CU 7922E for an en-gNB, and the user plane part of the PDCP protocol and the SDAP protocol of the gNB-CU 7922 for a gNB.

The gNB-CU 7922 and the gNB-DUs 7924, 7926 can communicate via the F1 interface, and the gNB 7908 can communicate with the gNB-CU 7922 via the Xn-C interface. The gNB-CU-CP 7928 and the gNB-CU-UP 7930 can communicate via the E1 interface(s). Additionally, the gNB-CU-CP 7928 and the gNB-DUs 7924, 7926 can communicate via the F1-C interface, and the gNB-DUs 7924, 7926 and the gNB-CU-UP 7930 can communicate via the F1-U interface.

In some aspects, the gNB-CU 7922 terminates the F1 interface connected with the gNB-DUs 7924, 7926, and in other aspects, the gNB-DUs 7924, 7926 terminate the F1 interface connected with the gNB-CU 7922. In some aspects, the gNB-CU-CP 7928 terminates the E1 interface connected with the gNB-CU-UP 7930 and the F1-C interface connected with the gNB-DUs 7924, 7926. In some aspects, the gNB-CU-UP 7930 terminates the E1 interface connected with the gNB-CU-CP 7928 and the F1-U interface connected with the gNB-DUs 7924, 7926.

In some aspects, the F1 interface is a point-to-point interface between endpoints and supports the exchange of signaling information between endpoints and data transmission to the respective endpoints. The F1 interface can support control plane and user plane separation and separate the Radio Network Layer and the Transport Network Layer. In some aspects, the E1 interface is a point-to-point interface between a gNB-CU-CP and a gNB-CU-UP and supports the exchange of signaling information between endpoints. The E1 interface can separate the Radio Network Layer and the Transport Network Layer, and in some aspects, the E1 interface may be a control interface not used for user data forwarding.

Referring to the NG-RAN 7904, the gNBs 7908, 7910 of the NG-RAN 7904 may communicate to the 5GC 7906 via the NG interfaces, and can be interconnected to other gNBs via the Xn interface. In some aspects, the gNBs 7908, 7910 can be configured to support FDD mode, TDD mode, or dual mode operation. In certain aspects, for EN-DC, the S1-U interface and an X2 interface (e.g., X2-C interface) for a gNB, consisting of a gNB-CU and gNB-DUs, can terminate in the gNB-CU.

In some aspects, the gNB 7910 supports CP/UP separation and includes a single CU-CP entity 7928, multiple CU-UP entities 7930, and multiple DU entities 7924, . . . , 7926, with all entities being configured for network slice operation. As illustrated in FIG. 79, each DU entity 7924, . . . , 7926 can have a single connection with the CU-CP 7928 via an F1-C interface. Each DU entity 7924, . . . , 7926 can be connected to multiple CU-UP entities 7930 using F1-U interfaces. The CU-CP entity 7928 can be connected to multiple CU-UP entities 7930 via E1 interfaces. Each DU entity 7924, . . . , 7926 can be connected to one or more UEs, and the CU-UP entities 7930 can be connected to a user plane function (UPF) and the 5G core 7906.

In some aspects, entities within the gNB 7910 can perform one or more procedures associated with interfaces or radio bearers within the NG-RAN 7904 with the separation of CP/UP. For example, NG-RAN 7904 can support the following procedures associated with network slice configuration in connection with operation within 5G and MEC architectures:

E1 interface setup: this procedure allows to set up the E1 interface, and it includes the exchange of the parameters needed for interface operation. The E1 setup is initiated by the CU-CP 7928;

E1 interface reset: this procedure allows to reset the E1 interface, including changes in the configuration parameters. The E1 interface reset is initiated by either the CU-CP 7928 or the CU-UP 7930;

E1 error indication: this procedure allows to report detected errors in one incoming message. The E1 interface reset is initiated by either the CU-CP 7928 or the CU-UP 7930;

E1 load information: this procedure allows CU-UP 7928 to inform CU-CP 7928 of the prevailing load condition periodically. The same procedure could also be used to indicate overload of CU-UP 7930 with overload status (Start/Stop);

E1 configuration update: this procedure supports updates in CU-UP 7930 configuration, such as capacity changes;

Data Radio Bearer (DRB) setup: this procedure allows the CU-CP 7928 to setup DRBs in the CU-CP, including the security key configuration and the quality of service (QoS) flow to DRB mapping configuration;

DRB modification: this procedure allows the CU-CP 7928 to modify DRBs in the CU-CP, including the modification of security key configuration and the modification of the QoS flow to DRB mapping configuration;

DRB release: this procedure allows the CU-CP 7928 to release DRBs in the CU-CP; and Downlink Data Notification (DDN): This procedure allows CU-UP 7930 to request CU-CP 7928 to trigger paging procedure to support RRC Inactive state.

In some aspects, the NG-RAN 7904 can be configured to support E1 interface management procedures for network slicing including resource availability indication from the CU-UP 7930, resource management in CU-UP 7930, and latency indication from the CU-UP 7930.

In some aspects, the NG-RAN 7904 can be configured to support F1-C interface management procedures for network slicing including resource availability indication from the DU entities 7924, . . . 8426, the resource management in the DU entities 7924, . . . , 7926, and latency indication from the DU entities 7924, . . . , 7926.

In some aspects, the NG-RAN 7904 can be configured to support latency measurements over the F1-U interface so that the UP elements including DU entities (8424, . . . , 7926) and CU-UP entities 7930 are able to communicate latency information to other neighboring UP elements. In this regard, network slicing can be supported in the NG-RAN 7904 with the separation of CP/UP. In some aspects, slice-level isolation and the improved resource utilization can be provided by the central RRM in the CU-CP 7928.

In some aspects, procedures associated with network slicing include operations and communications over the E1 interface, the F1-C interface, and the F1-U interface. With these procedures, the CU-CP 7928 can select the appropriate DU and CU-UP entities to serve the specific network slicing request associated with a certain service level agreement (SLA).

In some aspects, the procedure over the E1 interface can include information collection from the CU-UP entities 7930 and resource management in the CU-CP 7928. Specifically, the information collection can include resource availability indication and latency indication, while resource management can include resource allocation and resource release. The CU-CP 7928 can be configured to collect the information from the CU-UP entities 7930 periodically or issue an on-demanding query based on a network slice request. In some aspects, a resource availability indication procedure can allow the CU-UP entities 7930 to inform the CU-CP 7928 of the availability of resources to process a network slicing request. For example, the indication of the available resource can assist the CU-CP 7928 to determine whether the specific CU-UP can serve the specific network slice requesting associated with a certain SLA.

In some aspects, a resource allocation procedure can allow the CU-CP 7928 to allocate the resource in the CU-UP 7930 that is associated with a specific slice. Upon the reception of a request for a network slice creation, the CU-CP 7928 can select the CU-UP 7930 (e.g., one of the CU-UP entities) following the indicated SLA and allocate the resource in the selected CU-UP to the network slice. In some aspects, a resource release procedure can allow the CU-CP 7928 to release the resource in the CU-UP that is assigned to an established network slice. Upon the removal of the slice, the CU-CP 7928 can notify the corresponding CU-UP to release the resource used by the removed network slice.

Figure 80:
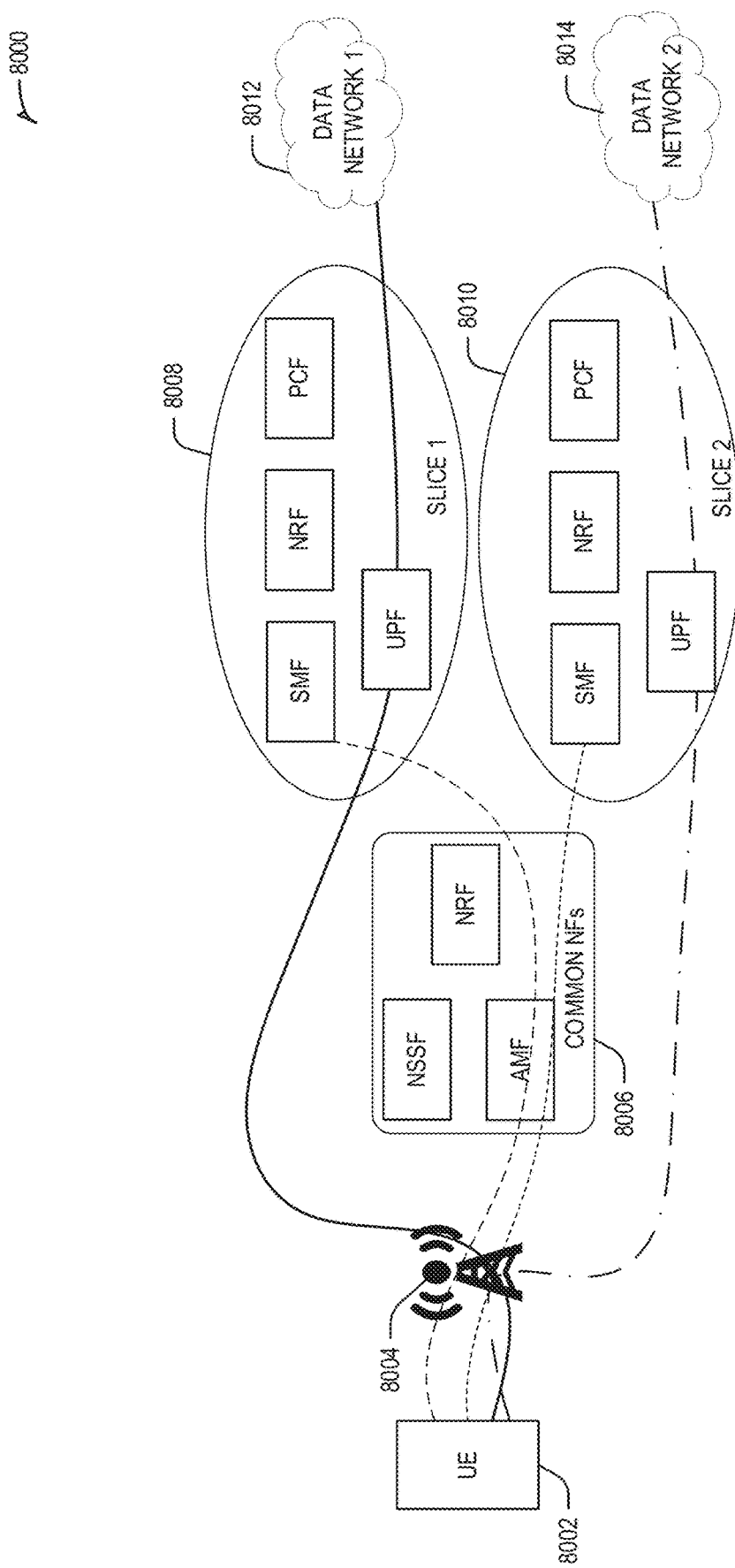
FIG. 80 illustrates a diagram with example network slices, usable in an edge computing deployment.

FIG. 80 illustrates a diagram 8000 with example network slices 8008 and 8010. A RAN 8004 can support differentiated handling of traffic between preconfigured, isolated RAN slices 8008 and 8010 for the UE 8002. How to perform this can be left to the implementation. Selection of the RAN slice will be based on IDs (which can be the slice service type and slice differentiator defined above) provided by the device or telecom-core network. A RAN slice may or may not be available at a given location. RAN will select the telecom-core network slice. QoS differentiation within a RAN slice will be supported as well.

As used herein, the term "network slicing" refers to the partitioning of the physical network into multiple virtual networks customized to meet a diverse set of vertical requirements. Network slicing can be relevant for Rel. 15 and beyond, and relevant 3GPP specifications include TS 23.501 (5GS Architecture), TS 22.261 (5G Requirements), and TS 28.531/28.532 (5G Slice Management).

Referring to FIG. 80, the Network Slice Selection Function (NSSF) within the common network functions 8006 supports selecting the network slice instances to serve the UE 8002, determining the allowed Network Slice Selection Assistance Information (NSSAI) and determining the AMF set to be used to serve the UE. NSSF can be configured as a new functionality not existing in the EPC. A Network Slice Template (NST) is defined as a subset of attributes' values used for the creation of instances of Network Slice Information Object Class (IOC). The content of NST may not be standardized by 3GPP, such as being defined by a mobile network operator (MNO) and vendor.

In some aspects, slice selection is determined by the network (AMF or NSSF), based on network slice policy with the assisted information (NSSAI) sent by the UE. In some aspects, a maximum of 8 network slices per UE may be used.

Automotive example: a vehicle may need to be simultaneously connected to multiple slice instances 8008 and 8010, belonging to different Slice/Service Types (SSTs) and coupled to corresponding data networks 8012 and 8014, to support different performance requirements of multiple automotive use cases. For example, Software Update and Tele-Operated Driving use cases could be associated with eMBB slice and URLLC slice respectively, based on their KPI requirements.

Figure 81:
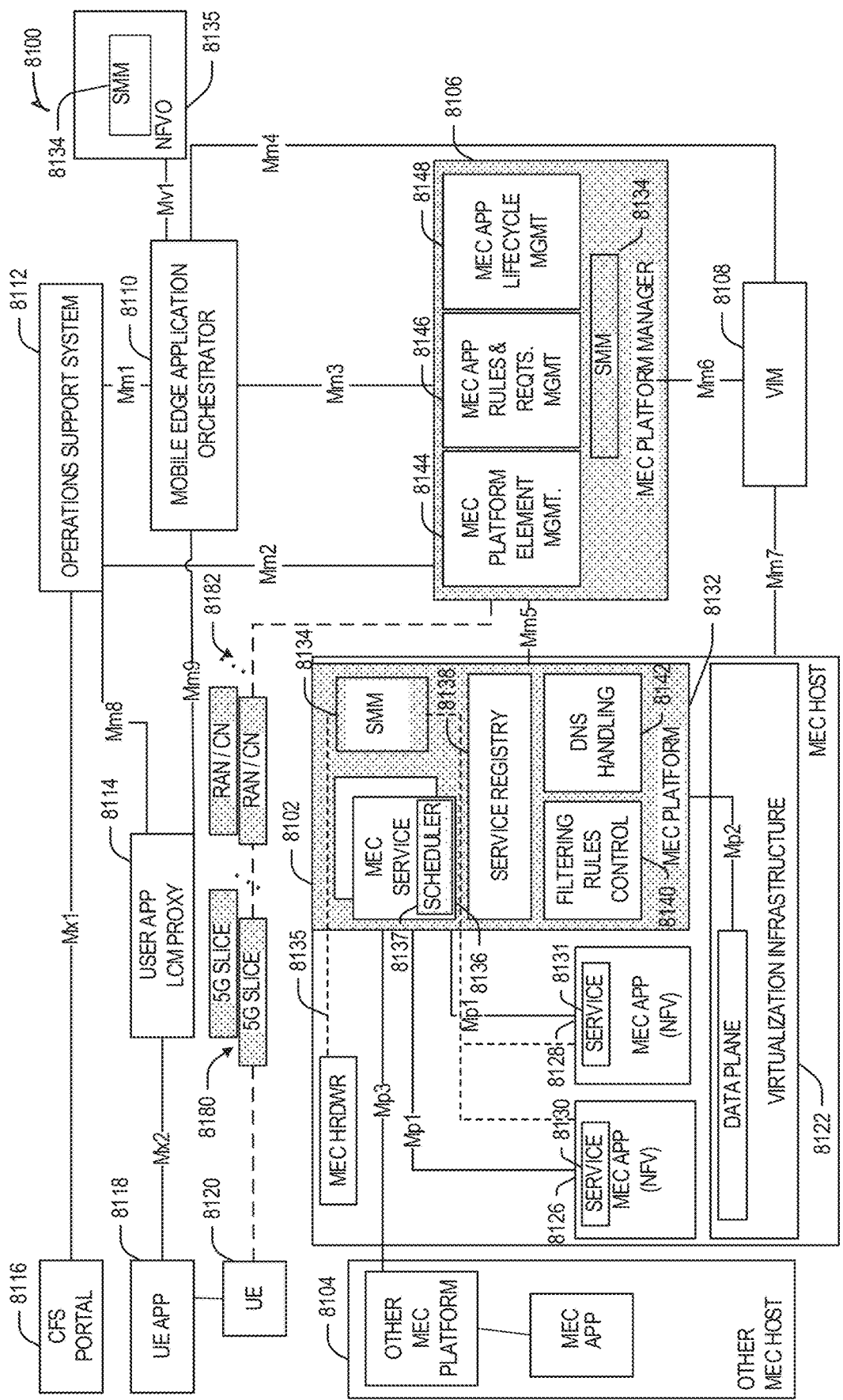
FIG. 81 illustrates a MEC network architecture supporting slice management, resource management, and traceability functions, deployable from an example edge computing system.

FIG. 81 illustrates a MEC network architecture 8100 supporting slice management, resource management, and traceability functions. FIG. 81 specifically illustrates a MEC architecture 8100 with MEC hosts 8102 and 8104 providing functionalities in accordance with the ETSI GS MEC-003 specification, with the shaded blocks used to indicate processing aspects for the MEC architecture configuration described herein in connection with slice management, resource management, and traceability functions. Specifically, enhancements to the MEC platform 8132 and the MEC platform manager 8106 may be used for providing slice management, resource management, and traceability functions within the MEC architecture 8100. This may include provisioning of one or more network slices, dynamic management of resources used by the network slices, as well as resource traceability functions within the MEC architecture. Although a limited number of MEC components (e.g., services, applications, managers) are shown here and in other drawings, it will be understood that MEC deployments are likely to include far more components than are illustrated.

In a further example, every entity in a MEC architecture could be instrumented to load an LSM or other security policy, and be an enforcement point for security operations. Operational and management entities can be tasked with provisioning of LSMs according to various ways resources are allocated to users, workloads, tenants, domains, uServices, functions, hosting environments.

Referring to FIG. 81, the MEC network architecture 8100 can include MEC hosts 8102 and 8104, a virtualization infrastructure manager (VIM) 8108, an MEC platform manager 8106, an MEC orchestrator 8110, an operations support system 8112, a user app proxy 8114, a UE app 8118 running on UE 8120, and CFS portal 8116. The MEC host 8102 can include a MEC platform 8132 with filtering rules control component 8140, a DNS handling component 8142, service registry 8138, and MEC services 8136. The MEC services 8136 can include at least one scheduler 8137, which can be used to select resources for instantiating MEC apps (or NFVs) 8126 and 8128 upon virtualization infrastructure 8122. The MEC apps 8126 and 8128 can be configured to provide services 8130 and 8131, which can include processing network communications traffic of different types associated with one or more wireless connections (e.g., connections to one or more RAN or telecom-core network entities).

The MEC platform manager 8106 can include a MEC platform element management component 8144, MEC app rules and requirements management component 8146, and a MEC app lifecycle management component 8148. The various entities within the MEC architecture 8100 can perform functionalities as disclosed by the ETSI GS MEC-003 specification.

In some aspects, the UE 8120 can be configured to communicate to one or more of the telecommunication core networks 8182 via one or more of the network slices 8180. In some aspects, the telecommunication core networks 8182 can use slice management functions (e.g., as provided by a slice management module, or SMM, 8134) to dynamically configure slices 8180, including dynamically assign a slice to a UE, reassign a slice to a UE, dynamically allocate or reallocate resources (including MEC resources) used by one or more of the slices 8180, or other slice related management functions. One or more of the functions performed in connection with slice management can be initiated based on user requests (e.g., via a UE) or request by a service provider. In some aspects, the slice management functions in connection with network slices 8180 can be facilitated by E2E multi-slice support functions for MEC-enabled 5G deployments, provided by the SMM 8134 within the MEC host 8102 or the MEC platform manager 8106 (or within another MEC entity).

In some aspects, the SMM 8134 can be within an NFV orchestrator (NFVO) 8135, which can be coupled to the MEC orchestrator 8110, as well as to other MEC entities.

Figure 82:
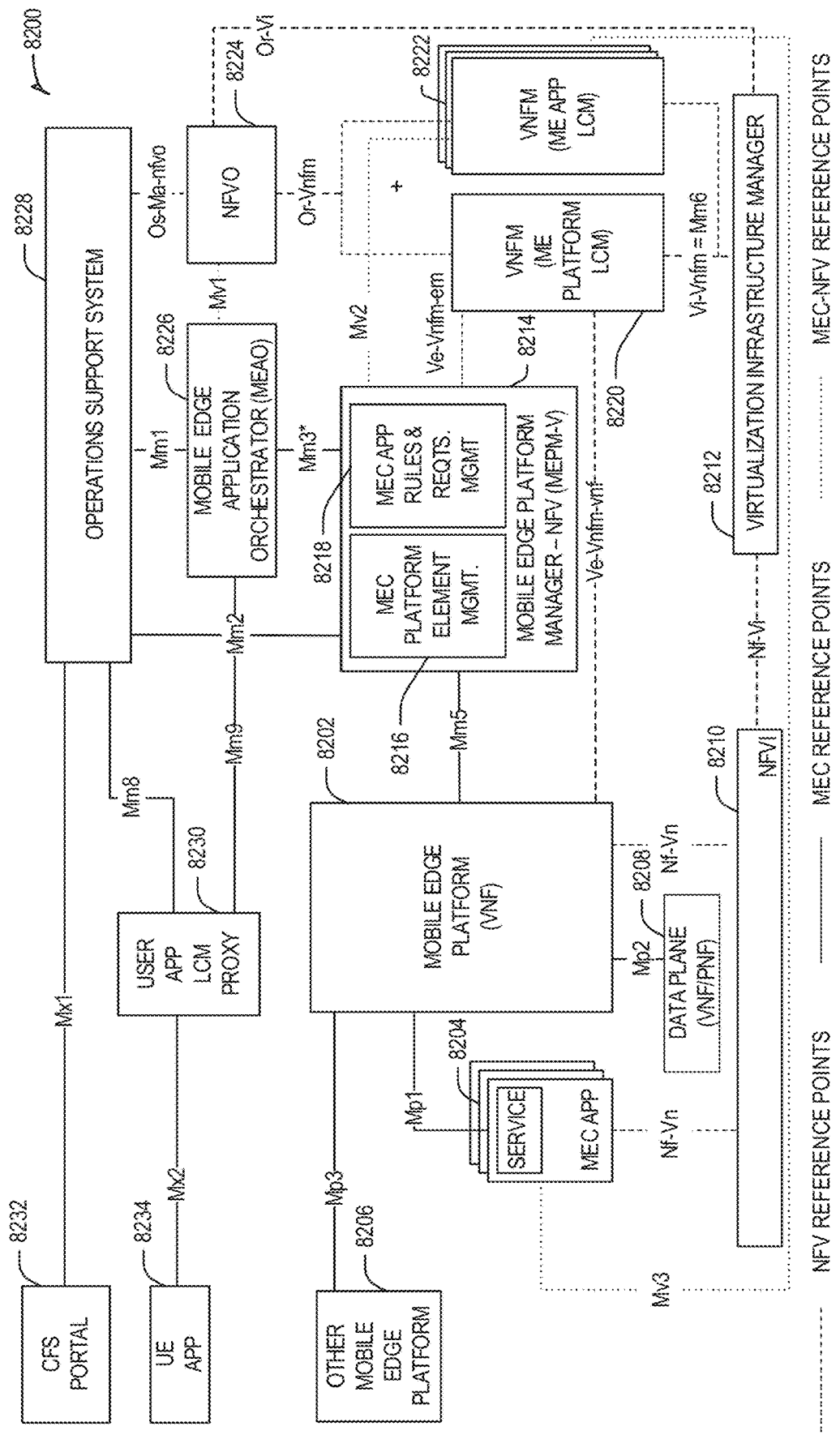
FIG. 82 illustrates a MEC reference architecture in a Network Function Virtualization (NFV) environment, deployable from an example edge computing system.

FIG. 82 illustrates a MEC reference architecture 8200 in a Network Function Virtualization (NFV) environment. The MEC architecture 8200 can be configured to provide functionalities in accordance with the ETSI GR MEC-017 specification.

In some aspects, ETSI MEC can be deployed in an NFV environment as illustrated in FIG. 82.

The MEC reference architecture 8200 includes a mobile edge platform 8202, a mobile edge platform manager 8214, a data plane 8208, a network function virtualization infrastructure (NFVI) 8210, virtual network function managers (VNFMs) 8220 and 8222, and NFVO 8224, a mobile edge application orchestrator (MEAO) 8226, an operations support system 8228, a user app LCM proxy 8230, a UE app 8234, and a CFS portal 8232. The mobile edge platform manager 8214 can include a MEC platform element management 8216 and MEC app rules and requirements management 8218. In some aspects, the mobile edge platform 8202 can be coupled to another mobile edge platform 8206 via an MP3 interface.

In some aspects, the MEC platform 8202 is deployed as a virtualized network function (VNF). The MEC applications 8204 can appear like VNFs towards the ETSI NFV Management and Orchestration (MANO) components. This allows re-use of ETSI NFV MANO functionality. In some aspects, the full set of MANO functionality may be unused and certain additional functionality may be needed. Such a specific ME application is denoted by the name "ME app VNF" as discussed herein. In some aspects, the virtualization infrastructure is deployed as an NFVI and its virtualized resources are managed by the virtualized infrastructure manager (VIM) 8212. For that purpose, one or more of the procedures defined by ETSI NFV Infrastructure specifications, e.g., ETSI GS NFV-INF 003, ETSI GS NFV-INF 004, and ETSI GS NFV-INF 005 can be used.

In some aspects, the ME application (or app) VNFs 8204 will be managed like individual VNFs, allowing that a MEC-in-NFV deployment can delegate certain orchestration and Life Cycle Management (LCM) tasks to the NFVO 8224 and VNFM functional blocks 8220 and 8222, as defined by ETSI NFV MANO.

In some aspects, the Mobile Edge Platform Manager (MEPM) 8214 can be transformed into a "Mobile Edge Platform Manager—NFV" (MEPM-V) that delegates the LCM part to one or more virtual network function manager(s) (VNFM(s)) 8220 and 8222. The Mobile Edge Orchestrator (MEO), as defined in the MEC reference architecture ETSI GS MEC-003, can be transformed into a "Mobile Edge Application Orchestrator" (MEAO) 8226 that uses the NFVO 8224 for resource orchestration, and for orchestration of the set of ME app VNFs as one or more NFV Network Services (NSs).

In some aspects, the Mobile Edge Platform VNF, the MEPM-V 8214, and the VNFM (ME platform LCM) can be deployed as a single package as per the ensemble concept in 3GPP TR 32.842, or that the VNFM is a Generic VNFM as per ETSI GS NFV-IFA 009 and the Mobile Edge Platform VNF and the MEPM-V are provided by a single vendor.

In some aspects, the Mpl reference point between a ME application and the ME platform can be optional for the ME application, unless it is an application that provides and/or consumes a ME service In some aspects, the Mm3* reference point between MEAO 8226 and the MEPM-V 8214 is based on the Mm3 reference point, as defined by ETSI GS MEC-003. Changes may be configured to this reference point to cater for the split between MEPM-V and VNFM (ME applications LCM).

In some aspects, the following new reference points (Mv1, Mv2, and Mv3) are introduced between elements of the ETSI MEC architecture and the ETSI NFV architecture to support the management of ME app VNFs. The following reference points are related to existing NFV reference points, but only a subset of the functionality may be used for ETSI MEC, and extensions may be necessary: Mv1 (this reference point connects the MEAO and the NFVO; it is related to the Os-Ma-nfvo reference point, as defined in ETSI NFV); Mv2 (this reference point connects the VNF Manager that performs the LCM of the ME app VNFs with the MEPM-V to allow LCM related notifications to be exchanged between these entities; it is related to the Ve-Vnfm-em reference point as defined in ETSI NFV, but may possibly include additions, and might not use all functionality offered by Ve-Vnfm-em); Mv3 (this reference point connects the VNF Manager with the ME app VNF instance, to allow the exchange of messages (e.g., related to ME application LCM or initial deployment-specific configuration); it is related to the Ve-Vnfm-vnf reference point, as defined in ETSI NFV, but may include additions, and might not use all functionality offered by Ve-Vnfm-vnf.

In some aspects, the following reference points are used as they are defined by ETSI NFV: Nf-Vn (this reference point connects each ME app VNF with the NFVI); Nf-Vi (this reference point connects the NFVI and the VIM); Os-Ma-nfvo (this reference point connects the OSS and the NFVO. It is primarily used to manage NSs, e.g., a number of VNFs connected and orchestrated to deliver a service); Or-Vnfm (this reference point connects the NFVO and the VNFM; it is primarily used for the NFVO to invoke VNF LCM operations); Vi-Vnfm (this reference point connects the VIM and the VNFM; it is primarily used by the VNFM to invoke resource management operations to manage the cloud resources that are needed by the VNF; it is assumed in an NFV-based MEC deployment that this reference point corresponds 1:1 to Mm6); and Or-Vi (this reference point connects the NFVO and the VIM; it is primarily used by the NFVO to manage cloud resources capacity).

Figure 83:
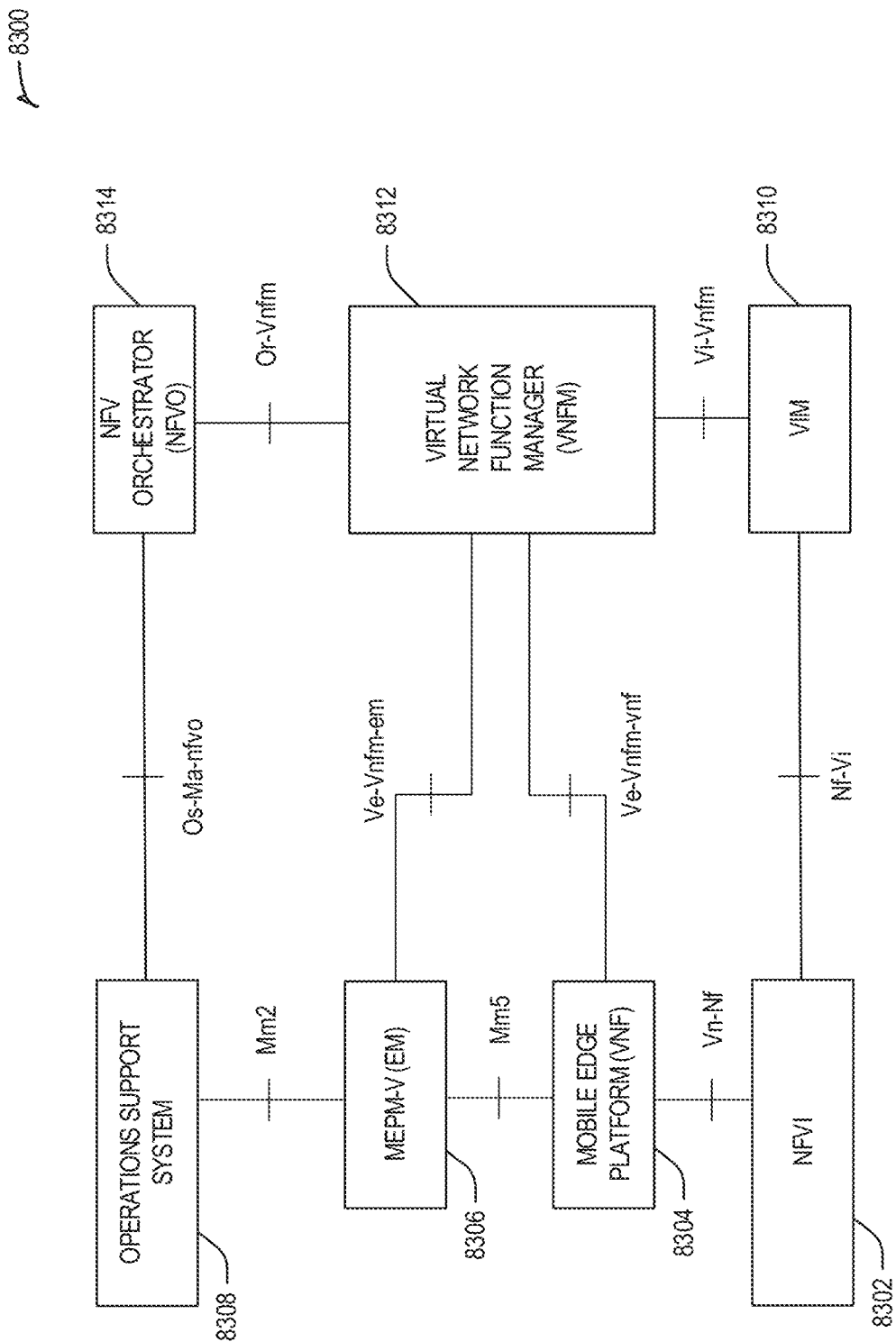
FIG. 83 illustrates the management of a MEC platform as a virtualized network function (VNF), deployable from an example edge computing system.

FIG. 83 illustrates the management of a MEC platform as a virtualized network function (VNF). Referring to FIG. 83, diagram 8300 illustrates management components from the MEC reference architecture 8200 in an NFV environment. More specifically, diagram 8300 illustrates the operations support system 8308, the MEPM-V 8306, the mobile edge platform 8304, the NFVI 8302, the NFVO 8314, the VNFM 8312, and the VIM 8310.

In some aspects, the MEPM-V 8306 can be configured to function as the Element Manager (EM) of the ME platform VNF 8304. In some aspects, a VNF Manager (VNFM) 8312, according to ETSI NFV (e.g., Specific VNFM, Generic VNFM), is used to perform LCM of the ME platform VNF 8304.

Diagram 8300 further illustrates the following reference point connects between the management components 8302-8314, as defined by ETSI NFV:

Ve-Vnfm-em: this reference point connects the VNF Manager (VNFM) that manages the lifecycle of the ME platform with the Mobile Edge Platform Manager—NFV (MEPM-V). The Ve-Vnfm-em reference point can be as defined in ETSI NFV. Since the Mobile Edge Platform VNF is considered as a network function, it is not expected that there are any impacts to the Ve-Vnfm-em procedures as defined by ETSI NFV.

Ve-Vnfm-vnf: this reference point connects the VNFM that manages the lifecycle of the ME platform with the Mobile Edge Platform VNF. The Ve-Vnfm-vnf reference point can be as defined in ETSI NFV. Since the Mobile Edge Platform VNF is considered as a network function, it is not expected that there are any impacts to the Ve-Vnfm-vnf procedures as defined by ETSI NFV.

Nf-Vn: this reference point connects the Mobile Edge Platform VNF and the NFVI. Nf-Vi: this reference point connects the NFVI and the VIM. Os-Ma-nfvo: this reference point connects the OSS and the NFVO. It is primarily used to manage NSs, e.g., a number of VNFs connected and orchestrated to deliver a service. Or-Vnfm: this reference point connects the NFVO and the VNFM that manages the lifecycle of the ME platform. It is primarily used for the NFVO to invoke VNF LCM operations. Vi-Vnfm: this reference point connects the VIM and the VNFM that manages the lifecycle of the ME platform. It is primarily used by the VNFM to invoke resource management operations to manage the cloud resources that are needed by the VNF. Or-Vi: this reference point connects the NFVO and the VIM. It is primarily used by the NFVO to manage cloud resources capacity.

In some aspects, 5G adoption depends on the ability to provide TSPs the ability to provision, manage, adjust, and operate multiple virtual networks over a common set of physical (wireless and wired) network infrastructure. End-to-end "slices" carve out virtual logical networks using physical computing and network resources. Each slice can be specifically configured to support performance related to the service supported including capacity, security levels, geographical coverage, and latency. Slices included partitioning the wireless radio of Radio Access Network (RAN), telecommunication system core infrastructure including the Evolved Packet Core (EPC), as well as the switches and Data Center Servers where the 5G mobile applications and content may be hosted. Furthermore, 5G EDGE devices may also be included in the slice depending on the service latency requirements.

In some aspects, 5G network slices will support a wide range of applications from (semi-)autonomous vehicles, remote health monitoring and first-responder applications requiring the best security/traceability to tiered smartphone plans and IoT devices that may be ok without extra resource traceability.

In some aspects, the information elements required to perform the disclosed interactions are complex and dynamic and must be access-controlled. It may be visualized as a resource graph (e.g., visualizing which CPUs, memories, bandwidth, I/O, storage systems, network nodes), which resources are owned by which actor, the state of allocation (of a resource) to a particular service instance. However, for security, not all parts of this "graph" are equally visible to each actor. The elements are stored in different slices; communication between slices and thus blockchain is based on policies and rights settings, which are dynamic in nature.

In some aspects, A techniques disclosed herein can be used to infer/predict SLA impacts to the network operator resources and the enterprise SLAs, including the price of resourcing at the time of request for transfer of resourcing.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

VII. Example Edge Computing Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

An example implementation is an edge computing system, including respective edge processing devices and nodes to invoke or perform the operations of Examples A1-AA11, or other subject matter described herein.

Another example implementation is a client endpoint node, operable to invoke or perform the operations of Examples A1-AA11, or other subject matter described herein.

Another example implementation is an aggregation node, network hub node, gateway node, or core data processing node, within or coupled to an edge computing system, operable to invoke or perform the operations of Examples A1-AA11, or other subject matter described herein.

Another example implementation is an access point, base station, road-side unit, street-side unit, or on-premise unit, within or coupled to an edge computing system, operable to invoke or perform the operations of Examples A1-AA11, or other subject matter described herein.

Another example implementation is an edge provisioning node, service orchestration node, application orchestration node, or multi-tenant management node, within or coupled to an edge computing system, operable to invoke or perform the operations of Examples A1-AA11, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples A1-AA11, or other subject matter described herein.

Another example implementation is an edge computing system operable as an edge mesh, as an edge mesh with side car loading, or with mesh-to-mesh communications, operable to invoke or perform the operations of Examples A1-AA11, or other subject matter described herein.

Another example implementation is an edge computing system including aspects of network functions, acceleration functions, acceleration hardware, storage hardware, or computation hardware resources, operable to invoke or perform the use cases discussed herein, with use of Examples A1-AA11, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of Examples A1-AA11, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples A1-AA11, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples A1-AA11, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples A1-AA11, or other subject matter described herein.

Another example implementation is an edge computing system configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples A1-AA11, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples A1-AA11, or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples A1-AA11, or other subject matter described herein.

Another example implementation is an apparatus of an edge computing system comprising means, logic, modules, or circuitry to invoke or perform the use cases discussed herein, with use of Examples A1-AA11, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. An edge computing system, comprising:
   communication circuitry configured to receive and transmit communications with edge computing devices of the edge computing system, wherein the edge computing devices coordinate execution of one or more collaborative workloads; and processing circuitry configured to:

identify initiation of a group communication session established for the execution of the one or more collaborative workloads, wherein the one or more collaborative workloads are orchestrated to be executed for multiple tenants of the edge computing system, and wherein a same collaborative workload of the one or more collaborative workloads is orchestrated to be executed on behalf of different tenants of the multiple tenants;

determine a participating set of the edge computing devices of the edge computing system, located among multiple locations, to execute the one or more collaborative workloads and participate in the group communication session, wherein the same collaborative workload of the one or more collaborative workloads is orchestrated to be moved from at least a first computing device associated with a first tenant to a second computing device of the participating set of the edge computing devices associated with a second tenant;

generate a secure group communication channel for the group communication session, the secure group communication channel limited to the participating set of the edge computing devices determined to execute the one or more collaborative workloads; and transmit a key to members of the participating set of the edge computing devices to be used in facilitating secure communications associated with the execution of the one or more collaborative workloads by the participating set of the edge computing devices on behalf of the multiple tenants, using the secure group communication channel.

2. The edge computing system of claim 1, the processing circuitry further configured to:

determine a role associated with a task to be completed by the participating set of the edge computing devices using the secure group communication channel;

identify a base station set for the participating set of the edge computing devices, wherein the base station set includes base stations providing services to the participating set of the edge computing devices; and activate the role on one or more members of the base station set.

3. The edge computing system of claim 2, wherein the role is provided by a: orchestrator, group leader, or key manager.

4. The edge computing system of claim 1, wherein generating the secure group communication channel comprises operations to perform a key exchange with each member of the participating set of the edge computing devices, wherein the key is transmitted to the members upon successful completion of the key exchange.

5. The edge computing system of claim 1, the processing circuitry further configured to:

determine that the group communication session has ended;

revoke the key; and destroy the secure group communication channel.

6. The edge computing system of claim 1, wherein identifying initiation of the group communication session is based on an indication of initiation of a respective collaborative workload.

7. The edge computing system of claim 6, wherein determining the participating set of the edge computing devices to participate in the group communication session is based on an indication of one or more edge nodes designated for collaborating in the same collaborative workload.

8. The edge computing system of claim 7, wherein the one or more edge nodes are network peers in a layer of a distributed edge computing system.

9. The edge computing system of claim 1, wherein the edge computing system is an edge gateway.

10. The edge computing system of claim 9, wherein the one or more collaborative workloads execute on a platform served by the edge gateway.

11. The edge computing system of claim 1, wherein the edge computing system includes a base station, and wherein the edge computing devices are endpoint client devices.

12. At least one non-transitory machine-readable storage medium comprising instructions stored thereupon, which when executed by processor circuitry of an edge computing system, cause the processor circuitry to perform operations comprising:

identifying initiation of a group communication session established for execution of one or more collaborative workloads, wherein the one or more collaborative workloads are orchestrated to be executed for multiple tenants of the edge computing system, wherein a same collaborative workload of the one or more collaborative workloads is orchestrated to be executed on behalf of different tenants of the multiple tenants;

determining a participating set of edge computing devices of the edge computing system, located among multiple locations, to execute the one or more collaborative workloads and participate in the group communication session, wherein the same collaborative workload of the one or more collaborative workloads is orchestrated to be moved from at least a first computing device associated with a first tenant to a second computing device of the participating set of the edge computing devices associated with a second tenant;

generating a secure group communication channel for the group communication session, the secure group communication channel limited to the participating set of the edge computing devices determined to execute the one or more collaborative workloads; and transmitting a key to members of the participating set of the edge computing devices to be used in facilitating secure communications associated with the execution of the one or more collaborative workloads by the participating set of the edge computing devices on behalf of the multiple tenants, using the secure group communication channel.

13. The machine-readable storage medium of claim 12, the operations further comprising:

determining a role associated with a task to be completed by the participating set of the edge computing devices using the secure group communication channel;

identifying a base station set for the participating set of the edge computing devices, wherein the base station set includes base stations providing services to the participating set of the edge computing devices; and activating the role on one or more members of the base station set.

14. The machine-readable storage medium of claim 13, wherein the role is provided by a: orchestrator, group leader, or key manager.

15. The machine-readable storage medium of claim 12, wherein generating the secure group communication channel further comprises performing a key exchange with each member of the participating set of the edge computing devices, wherein the key is transmitted to the members upon successful completion of the key exchange.

16. The machine-readable storage medium of claim 12, the operations further comprising:
   determining that the group communication session has ended;
   revoking the key; and
   destroying the secure group communication channel.

17. The machine-readable storage medium of claim 12, wherein identifying initiation of the group communication session is based on an indication of initiation of a respective collaborative workload.

18. The machine-readable storage medium of claim 17, wherein determining the participating set of the edge computing devices to participate in the group communication session is based on receiving an indication of one or more edge nodes designated for collaborating in the same collaborative workload.

19. The machine-readable storage medium of claim 18, wherein the one or more edge nodes are network peers in a layer of a distributed edge computing system.

20. The machine-readable storage medium of claim 12, wherein the edge computing system includes an edge gateway.

21. The machine-readable storage medium of claim 20, wherein the one or more collaborative workloads execute on a platform served by the edge gateway.

22. The machine-readable storage medium of claim 12, wherein the edge computing system includes a base station, and wherein the edge computing devices are endpoint client devices.

23. A method performed in an edge computing system, comprising:
   identifying initiation of a group communication session established for execution of one or more collaborative workloads, wherein the one or more collaborative workloads are orchestrated to be executed for multiple tenants of the edge computing system, and wherein a same collaborative workload of the one or more collaborative workloads is orchestrated to be executed on behalf of different tenants of the multiple tenants;
   determining a participating set of edge computing devices of the edge computing system, located among multiple locations, to execute the one or more collaborative workloads and participate in the group communication session, wherein the same collaborative workload of the one or more collaborative workloads is orchestrated to be moved from at least a first computing device associated with a first tenant to a second computing device of the participating set of the edge computing devices associated with a second tenant;
   generating a secure group communication channel for the group communication session, the secure group communication channel limited to the participating set of the edge computing devices determined to execute the one or more collaborative workloads; and
   transmitting a key to members of the participating set of the edge computing devices to be used in facilitating secure communications associated with the execution of the one or more collaborative workloads by the participating set of the edge computing devices on behalf of the multiple tenants, using the secure group communication channel.

24. The method of claim 23, further comprising:
   determining a role associated with a task to be completed by the participating set of the edge computing devices using the secure group communication channel;
   identifying a base station set for the participating set of the edge computing devices, wherein the base station set includes base stations providing services to the participating set of the edge computing devices; and
   activating the role on one or more members of the base station set;
   wherein the role is provided by a: orchestrator, group leader, or key manager.

25. The method of claim 23, wherein generating the secure group communication channel further comprises performing a key exchange with each member of the participating set of the edge computing devices, wherein the key is transmitted to the members upon successful completion of the key exchange.

* * * * *